US011851511B2

(12) United States Patent
Scott et al.

(10) Patent No.: US 11,851,511 B2
(45) Date of Patent: Dec. 26, 2023

(54) POLYMERIZATION PHOTOINHIBITOR

(71) Applicant: The Regents of the University of Michigan, Ann Arbor, MI (US)

(72) Inventors: Timothy F. Scott, Ann Arbor, MI (US); Harry van der Laan, Ann Arbor, MI (US); Megan A. Cole, Ann Arbor, MI (US); Mark A. Burns, Ann Arbor, MI (US); Martin P. De Beer, Ann Arbor, MI (US); Zachary D. Pritchard, Ann Arbor, MI (US); Avi Bregman, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 17 days.

(21) Appl. No.: 17/500,151

(22) Filed: Oct. 13, 2021

(65) Prior Publication Data

US 2022/0106417 A1    Apr. 7, 2022

Related U.S. Application Data

(63) Continuation of application No. 16/970,600, filed as application No. PCT/US2019/018511 on Feb. 19, 2019, now Pat. No. 11,174,326.

(60) Provisional application No. 62/632,927, filed on Feb. 20, 2018, provisional application No. 62/632,903, filed on Feb. 20, 2018, provisional application No. 62/632,834, filed on Feb. 20, 2018.

(51) Int. Cl.
*C08F 2/46* (2006.01)
*C08F 2/50* (2006.01)
*C08G 61/04* (2006.01)
*C08F 4/04* (2006.01)
*C08F 4/40* (2006.01)
*C08F 222/40* (2006.01)

(52) U.S. Cl.
CPC .............. *C08F 2/50* (2013.01); *C08F 4/04* (2013.01); *C08F 4/40* (2013.01); *C08F 222/40* (2013.01)

(58) Field of Classification Search
CPC .... C08F 222/10; C08F 222/12; C08F 222/40; C08F 2/50; C08F 4/40; C08F 4/04
USPC .................. 522/4, 6, 1, 71, 189, 184; 520/1
See application file for complete search history.

(56) References Cited

U.S. PATENT DOCUMENTS

| 4,595,651 | A | 6/1986 | Grossa |
| 4,859,551 | A | 8/1989 | Kempf et al. |
| 5,691,541 | A | 11/1997 | Ceglio et al. |
| 6,238,852 | B1 | 5/2001 | Klosner |
| 6,248,509 | B1 | 6/2001 | Sanford |
| 6,312,134 | B1 | 11/2001 | Jain et al. |
| 7,649,029 | B2 | 1/2010 | Kolb et al. |
| 7,767,728 | B2 | 8/2010 | Lu et al. |
| 7,902,526 | B2 | 3/2011 | Kim et al. |
| 7,935,476 | B2 | 5/2011 | Teng et al. |
| 8,119,214 | B2 | 2/2012 | Schwantes et al. |
| 8,232,043 | B2 | 7/2012 | Williamson et al. |
| 8,697,346 | B2 | 4/2014 | McLeod et al. |
| 9,205,601 | B2 | 12/2015 | Desimone et al. |
| 9,216,546 | B2 | 12/2015 | Desimone et al. |
| 10,166,725 | B2 | 1/2019 | Willis et al. |
| 10,245,785 | B2 | 4/2019 | Adzima |
| 11,174,326 | B2 | 4/2021 | Scott et al. |
| 2003/0098442 | A1* | 5/2003 | Ichihashi .............. G03F 7/0007 430/7 |
| 2007/0112118 | A1 | 5/2007 | Park et al. |
| 2014/0342903 | A1 | 11/2014 | Jarvis et al. |
| 2016/0067921 | A1 | 3/2016 | Willis et al. |
| 2016/0107380 | A1 | 4/2016 | Smoot et al. |
| 2017/0210077 | A1* | 7/2017 | Ermoshkin ............. B29C 64/40 |
| 2018/0333911 | A1 | 11/2018 | Lin et al. |
| 2018/0348646 | A1 | 12/2018 | Lin et al. |
| 2018/0361666 | A1 | 12/2018 | Adzima |

FOREIGN PATENT DOCUMENTS

| CN | 102715751 A | 10/2012 | |
| JP | 2012210408 A | 11/2012 | |
| WO | WO2012129968 A1 | 10/2012 | |
| WO | WO-2016025599 A1 * | 2/2016 | ........... B29C 64/124 |
| WO | WO2017059082 A1 | 4/2017 | |
| WO | WO2018232175 A1 | 12/2018 | |
| WO | WO2019/164808 A1 | 8/2019 | |

OTHER PUBLICATIONS

Dessauer, Photochemistry History and Commercial Applications of Heaarylbiimidazoles, Elsevier 2006 (TOC only).
Fuchs et al., "Ultrathin Selective Molecularly Imprinted Polymer Microdots Obtained by Evanescent Wave Photopolymerization" Chemistry of Materials, 2011 23: 3645-51.
Fujita et al., "Photochromism of a radical diffusion-inhibited hexaarylbiimidazole derivative with intense coloration and fast decoloration performance" Organic Letters, 2008, 10: 3105-08.
Hatano et al., "Unprecedented radical-radical reaction of a [2.2]paracyclophane derivative containing an imidazolyl radical moiety" Org Lett., 2010, 12: 4152-55.
Hatano et al., "Reversible photogeneration of a stable chiral radical-pair from a fast photochromic molecule" The Journal of Physical Chemistry Letters, 2011,2: 2680-82.
Harada et al., "Remarkable acceleration for back-reaction of a fast photochromic molecule" The Journal of Physical Chemistry Letters, 2010, 1: 1112-15.

(Continued)

*Primary Examiner* — Jessica Whiteley
(74) *Attorney, Agent, or Firm* — CASIMIR JONES S.C.; Thomas A. Isenbarger

(57) ABSTRACT

Provided herein is technology relating to polymerization and producing polymers and particularly, but not exclusively, to methods, systems, and compositions for producing articles using three-dimensional printing and for improving control of polymerization using a polymerization photoinhibitor having fast back reaction kinetics such as hexaarylbiimidazole compounds and bridged hexaarylbiimidazole compounds.

19 Claims, 44 Drawing Sheets

(56) References Cited

OTHER PUBLICATIONS

Hayashi, et al., "Preparation of a new phototropic substance" Bull. Chemical Society of Japan, 1960,33(4): 565-66.

International Search Report and Written Opinion issued for corresponding International application No. PCT/US2019/018511, dated Jun. 17, 2019, 18 pages.

Iwahori, et al., "Rational design of a new class of diffusion-inhibited HABI with fast back-reaction", Journal of Physical Organic Chemistry, 2007 vol. 20 pp. 857-863.

Iwasaki et al., "A chiral BINOL-bridged imidazole dimer possessing sub-millisecond fast photochromism" Chem Communications, 2014, 50: 7481-84.

Junkers et al. "Laser Induced Marking of Polymer Chains with Radical Spin Traps" Macromolecular Rapid Communications, 2008, 29 (6): 503-10.

Karatekin, "Photocopying Living Chains. 1. Steady-State" Macromolecules, 2001 34(23): 8187-8201.

Karatekin, "Photocopying Living Chains. 2. Time-Dependent Measurements" Macromolecules, 2001, 4 (23): 8202-15.

Kawai et al., "Entropy-controlled thermal back-reaction of photochromic [2.2]paracyclophane-bridged imidazole dimer" Dyes and Pigments., 2012, 92: 872-76.

Kimoto et al., "Fast photochromic polymers carrying [2.2]paracyclophane-bridged imidazole dimer" Macromolecules, 2010, 43: 3764-69.

Kishimoto, et al., "A fast photochromic molecule that colors only under UV light" Journal of the American Chemical Society, 2009, 131: 4227-29.

Kobayashi et al., "Fast Photochromic Molecules toward Realization of Photosynergetic Effects", Journal of Physical Chemistry Letters, 2016 vol. 7 pp. 3666-3675.

Liao et al., "Efficient solar water-splitting using a nanocrystalline CoO photocatalyst" Nature Nanotechnology, 2014, 9: 69-73).

Mutoh et al., "An efficient strategy for enhancing the photosensitivity of photochromic [2.2]paracyclophane-bridged imidazole dimers" J Photopolymer Science and Technology, 2010, 23: 301-06.

Mutoh, et al., "Comprehensive understanding of structure-photosensitivity relationships of photochromic [2.2]paracyclophane-bridged imidazole dimers" The Journal of Physical Chemistry A., 2011, 115: 4650-56.

Mutoh et al., "Photochromism of a water-soluble vesicular [2.2]paracyclophane bridged imidazole dimer" Chemical Communications, 2011, 47:8868-70.

Mutoh et al., "Spectroelectrochemistry of a photochromic [2.2]paracyclophane-bridged imidazole dimer: Clarification of the electrochemical behavior of HABI" The Journal of Physical Chemistry A., 2012, 116: 6792-97.

Mutoh et al., "Photochromism of a naphthalene-bridged imidazole dimer constrained to the 'anti' conformation" Organic Letters, 2013, 15: 2938-41.

Sadykov et al. "ESR study of the polymerization of methyl methacrylate photoinhibited by butyl nitrite" Polymer Science USSR 1988, 30 (9), 2045-2049.

Sathe, et al., "Re-examining the Photomediated Dissociation and Recombination Kinetics of Hexaarylbiimidazoles" Industrial & Engineering Chemistry Research, 2015 54 (16): 4203-12.

Satoh et al., "Ultrafast laser photolysis study on photodissociation dynamics of a hexaarylbiimidazole derivative" Chem. Phys. Lett., 2007,448 (4-6): 228-31.

Scott et al.,"Two-color single-photon photoinitiation and photoinhibition for subdiffraction photolithography" Science, 2009, 324(5929): 913-7.

Scott et al., "Rapid continuous additive manufacturing by volumetric polymerization inhibition patterning" Sciences Advances, 2019, 1(5): 1-8.

Scott et al., "Volumetric Photopolymerization Confinement through Dual-Wavelength Photoinitiation and Photoinhibition" ACS Macro Letters 2019 8 (8), 899-904.

Shima et al., "Enhancing the versatility and functionality of fast photochromic bridged-imidazole dimers by flipping imidazole rings" Journal of the American Chemical Society, 2014, 136: 3796-99.

Takizawa et al. "Photochromic organogel based on [2.2]paracyclophane-bridged imidazole dimer with tetrapodal urea moieties" Dyes and Pigments, 2011, 89: 254-59.

Tumbleston et al., "Continuous liquid interface production of 3D objects" Science, 2015, 347: 1349.

U.S. Appl. No. 16/049,288.

U.S. Appl. No. 62/632,834.

U.S. Appl. No. 62/632,903.

Yamaguchi et al., "Nanosecond photochromic molecular switching of a biphenyl-bridged imidazole dimer revealed by wide range transient absorption spectroscopy" Chem Communications, 2015, 51: 1375-78.

Yamashita, et al., "Photochromic properties of [2.2]paracyclophane-bridged imidazole dimer with increased photosensitivity by introducing pyrenyl moiety" The Journal of Physical Chemistry A. 2011, 115: 13332-37.

\* cited by examiner

CQ

EDAB

(1)

(2)

(3)

(4)

(5)

POLYMERIZATION PHOTOINHIBITOR

This application is a Continuation of U.S. application Ser. No. 16/970,600, filed Aug. 17, 2020, which is a 371 U.S. National Phase Entry of International Application No. PCT/US2019/018511, filed Feb. 19, 2019, which claims priority to U.S. Provisional Application No. 62/632,903, filed Feb. 20, 2018; U.S. Provisional Application No. 62/632,834, filed Feb. 20, 2018; and U.S. Provisional Application No. 62/632,927, filed Feb. 20, 2018, each of which is incorporated herein by reference in its entirety.

STATEMENT REGARDING FEDERALLY SPONSORED RESEARCH OR DEVELOPMENT

This invention was made with government support under DE023771 awarded by the National Institutes of Health. The government has certain rights in the invention.

FIELD

Provided herein is technology relating to polymerization and producing polymers and particularly, but not exclusively, to methods, systems, and compositions for producing articles using three-dimensional printing and for improving control of polymerization using a polymerization photoinhibitor having fast back reaction kinetics such as hexaarylbiimidazole compounds and bridged hexaarylbiimidazole compounds.

BACKGROUND

Photolithographic rapid prototyping (e.g., stereolithography) technologies typically achieve reaction confinement in depth using patterned irradiation of a photopolymerizable resin at a wavelength where the resin strongly absorbs so that a thin layer of material is solidified. Consequently, three-dimensional objects are fabricated by progressive, two-dimensional addition of material. However, these extant technologies are limited by having a slow fabrication rate and require structures to support overhanging features.

In some polymerization strategies, a monomeric resin is polymerized by irradiating a mixture of the monomeric resin and a photoinitiator at a wavelength where the photoinitiator absorbs. Activating the photoinitator produces an activating species (e.g., a radical) that causes the monomer to polymerize in the region comprising the activating species. Some technologies provide additional control over polymerization by using both a photoinitiator and a photoinhibitor to define regions of polymerization and inhibition of polymerization. In particular, strategies have been developed in which concurrent photoinitiation and photoinhibition using two wavelengths of light provides improved control of polymerization. Accordingly, controlling polymerization depends not only on the pattern and intensity of the irradiating wavelengths, but also on the kinetics of photoactivation and subsequent inactivation of the photoinitiator and photoinhibitor (e.g., by a reverse back reaction that reforms the inactivated photoinitiator and photoinhibitor). Polymerization technologies (e.g., in particular, polymerization confinement technologies) would thus benefit from improved photoinhibitors and polymerization strategies involving photoinhibitors.

SUMMARY

The technology provided herein relates to facile, three-dimensional photopolymerization patterning in bulk resin. In particular, embodiments of the technology provided herein relate to the fabrication of three-dimensional objects at rates unattainable by conventional rapid prototyping approaches. Further, embodiments of the technology obviate the need for structures to support overhanging features because the solidified material is buoyed within the monomeric liquid.

Several photoinhibitors of radical-mediated polymerizations have been described, including tetraethylthiuram disulfide ("TED"; see, e.g., Scott et al. (2009) "Two-color single-photon photoinitiation and photoinhibition for sub-diffraction photolithography" Science 324(5929): 913-7, incorporated herein by reference); bis(2,2,6,6-tetramethylpiperidin-1-yl)disulfide (see, e.g., U.S. Pat. No. 8,697,346, incorporated herein by reference); arylmethyl sulfones (see, e.g., Karatekin (2001) "Photocopying Living Chains. 1. Steady-State" Macromolecules 34(23): 8187-8201; and Karatekin (2001) "Photocopying Living Chains. 2. Time-Dependent Measurements" Macromolecules 4 (23): 8202-15, each of which is incorporated herein by reference); and alkyl nitrites (e.g., butyl nitrite; see Sadykov et al. "ESR study of the polymerization of methyl methacrylate photoinhibited by butyl nitrite" Polymer Science USSR 1988, 30 (9), 2045-2049 (1988), incorporated herein by reference). See, e.g., FIGS. 1, 2, and 3.

However, identifying appropriate photoinhibitors has been challenging. For example, it has been known in the art that "a photo-cleavable terminator that does not initiate polymerization is not easily identified as the formation of a highly stabilized radical is required" (see, e.g., Junkers et al. (2008) "Laser Induced Marking of Polymer Chains with Radical Spin Traps" Macromolecular Rapid Communications 29 (6): 503-10). Moreover, previous examination of TED (FIG. 1) and bis(2,2,6,6-tetramethylpiperidin-1-yl)disulfide (FIG. 2) as photoinhibitors of radical-mediated photopolymerization revealed several limitations. In particular, the non-photoactivated forms of TED and related compounds (e.g., TEMPDS) have chain transfer activities that retard radical-mediated polymerizations. In addition, the photoactivated forms of TED and related compounds (e.g., TEMPDS) exhibit a low but significant polymerization initiation activity. Also, arylmethyl sulfones (FIG. 3) produce sulfur dioxide gas during radical formation. These gas bubbles therefore form in the polymerized material, thus compromising structural integrity and introducing artefacts. And, bubbles in the composition refract the initiating and/or inhibiting wavelengths of light and thus can affect the intended polymerization confinement, which produces unwanted solidification of resin outside the intended region.

Accordingly, in some embodiments the technology provided herein relates to photoinhibitors that are activated by light to form a polymerization inhibiting species and that have a fast back reaction that reforms the inactive photoinhibitor from the polymerization inhibiting species. In some embodiments, when not activated by light (e.g., in the inactive state), the photoinhibitors do not inhibit and/or do not retard polymerization and do not have initiating activity; when activated by light, the photoinhibitors form an inhibiting species that inhibits polymerization and that does not initiate polymerization. Accordingly, the technology provided herein relates to photoinhibition that is quickly turned "on" and quickly turned "off" by the presence and absence of light and that does not have undesirable inhibition and/or initiation activities.

Consequently, production and persistence of the polymerization inhibiting species (e.g., a radical that inhibits polymerization) occurs only where the appropriate activating wavelength irradiates the photoinhibitor. Activated photoinhibitor that diffuses out of the irradiated region subsequently reforms the inactive state quickly (e.g., nearly instantaneously). In some embodiments, the light-activated photoinhibitor compounds form polymerization inhibiting species (e.g., polymerization inhibiting radicals) having a half-life of approximately 100 ns to 100 μs to 100 ms to 100 s (e.g., 10, 20, 30, 40, 50, 60, 70, 80, 90, 100, 200, 300, 400, 500, 600, 700, 800, 900, or 1000 ns; 10, 20, 30, 40, 50, 60, 70, 80, 90, 100, 200, 300, 400, 500, 600, 700, 800, 900, or 1000 μs; 10, 20, 30, 40, 50, 60, 70, 80, 90, 100, 200, 300, 400, 500, 600, 700, 800, 900, or 1000 ms; or 0, 20, 30, 40, 50, 60, 70, 80, 90, 100, 200, 300, 400, 500, 600, 700, 800, 900, or 1000 s).

In some embodiments, the technology relates to the use of a photoinhibitor having fast back reaction kinetics that reforms the inactive photoinhibitor from the inhibiting species. In some embodiments, the photoinhibitor is activated by light in a photolysis reaction to form one or more inhibiting species (e.g., polymerization inhibiting radicals) having a half-life of approximately 100 ns to 100 μs to 100 ms (e.g., 10, 20, 30, 40, 50, 60, 70, 80, 90, 100, 200, 300, 400, 500, 600, 700, 800, 900, or 1000 ns; 10, 20, 30, 40, 50, 60, 70, 80, 90, 100, 200, 300, 400, 500, 600, 700, 800, 900, or 1000 μs; or 10, 20, 30, 40, 50, 60, 70, 80, 90, 100, 200, 300, 400, 500, 600, 700, 800, 900, or 1000 ms).

In some embodiments, the photoinhibitor is activated by light in a photolysis reaction to form one inhibiting species (e.g., a polymerization inhibiting radical) and reformation of the inactive form is not limited by diffusion and/or is not a thermally driven reaction. In some embodiments, the polymerization inhibiting radical has a half-life of approximately 100 ns to 100 μs to 100 ms (e.g., 10, 20, 30, 40, 50, 60, 70, 80, 90, 100, 200, 300, 400, 500, 600, 700, 800, 900, or 1000 ns; 10, 20, 30, 40, 50, 60, 70, 80, 90, 100, 200, 300, 400, 500, 600, 700, 800, 900, or 1000 μs; or 10, 20, 30, 40, 50, 60, 70, 80, 90, 100, 200, 300, 400, 500, 600, 700, 800, 900, or 1000 ms).

One example of a photoinhibitor that forms a polymerization inhibiting species that reforms the inactive compound with a fast back reaction is hexaarylbiimidazole and compounds related thereto (e.g., bridged HABI compounds as discussed herein). Hexaarylbiimidazole (HABI) compounds (see, e.g., FIGS. 4A, 4B, 5A, 5B, 5C, 5D, 5E, and 6) address some of the problems associated with other known photoinhibitors. While HABIs have been known in the art since 1960 (see, e.g., Hayashi and Maeda, Bull. Chem. Soc. Japan 33: 565) as thermochromic, photochromic, and piezochromic compounds, they have been understood in the polymer art as polymerization photoinitiators. See, e.g., Ahn et al. (2015) "Hexaarylbiimidazoles as Visible Light Thiol-Ene Photoinitiators" Dent Mater. 31(9): 1075-89, incorporated herein by reference). For example, HABI compounds were sold as photoinitiators by DUPONT under the name DYLUX. See, e.g., Dessauer (2005) "The Invention of DYLUX Instant-Access Imaging Materials and the Development of HABI Chemistry—A Personal History" Advances in Photochemistry, Volume 28: 129-261, incorporated herein by reference in its entirety). The use of HABI compounds as photoinhibitors was not known or predictable in the art.

When activated by the appropriate wavelength, HABI compounds undergo homolytic cleavage to form imidazolyl (e.g., lophyl) radicals. See, e.g., FIGS. 4B and 6. As produced from some HABI compounds, lophyl radicals are unreactive with oxygen and have slow recombination rates attributable to steric hindrance and electron delocalization.

While the lophyl radical is very stable, the lophyl radical alone does not initiate polymerization. Indeed, HABI photoinitiators exhibit no initiation activity of polymerizable monomers (e.g., in particular (meth)acrylate formulations) without the presence of a hydrogen-donating coinitiator. Thus, when HABI compounds are used as photoinitiators of polymerization, HABI compounds are used with coinitiator compounds to photoinitiate photopolymerization reactions. For example, some polymerization systems comprise use of a coinitiator comprising a thiol. Upon production of the lophyl radical from a HABI compound, the lophyl radical extracts a hydrogen from the thiol to produce a radical sulfur species (e.g., a sulfur comprising an unpaired electron). The radical sulfur species initiates polymerization of the monomers in the resin.

In contrast, the present technology relates in some embodiments to the use of HABIs as photoinhibitors of photopolymerization. In particular, HABIs exhibit several favorable attributes as photoinhibitors. As noted above, HABI compounds do not exhibit photoinitiation activity when irradiated. Moreover, HABI compounds do not participate in chain transfer reactions and thus polymerization rates are not inherently retarded by the presence of HABI compounds. Finally, HABI compounds typically exhibit very weak absorbance in the blue region of the electromagnetic spectrum and moderately absorb in the near-UV region of the electromagnetic spectrum, thus complementing the absorbance spectrum of several photoinitiators activated by blue light. In particular, camphorquinone (CQ) is a photoinitiator commonly employed for visible light photopolymerization—CQ absorbs blue light with an absorption peak centered at approximately 470 nm and absorbs poorly in the near-UV. The complementary absorption spectra of HABI compounds and CQ thus provide a selective generation of lophyl or initiating radicals by irradiating a composition comprising HABI and CQ with either near UV light or blue light, respectively. See, e.g., FIG. 7.

The recombination rates of some HABI-derived lophyl radicals are typically very slow, proceeding over the course of tens of seconds to minutes in solution. This slow recombination rate limits the concurrent photoinitiation/photoinhibition exposure rate for some HABI compounds, e.g., for a patterned solidification of monomer resin formulations.

Accordingly, in some embodiments the technology comprises use of a photoinhibitor compound having fast back reaction kinetics (e.g., HABI compounds (e.g., HABI compounds that comprise bridged imidazole dimers. See, e.g., FIGS. 5A, 5B, 5C, 5D, and 5E)). While the recombination of the conventional HABI compounds is a second order reaction, the recombination of the bridged compounds proceeds as a first order reaction. Thus, while the lophyl radicals formed from conventional HABI compounds have a half-life of tens of seconds to several (e.g., 5 to 10 or more) minutes (see, e.g., Sathe, et al. (2015) "Re-examining the Photomediated Dissociation and Recombination Kinetics of Hexaarylbiimidazoles" Ind. Eng. Chem. Res. 54 (16): 4203-12, incorporated herein by reference), the radicals produced from the tethered HABI compounds have a half-life faster than 10 seconds, e.g., approximately 10, 9, 8, 7, 6, 5, 4, 3, 2, or 1 second(s) to tens or hundreds of milliseconds to tens or hundreds of microseconds (e.g., less than 10.0, 9.9, 9.8, 9.7, 9.6, 9.5, 9.4, 9.3, 9.2, 9.1, 9.0, 8.9, 8.8, 8.7, 8.6, 8.5, 8.4, 8.3, 8.2, 8.1, 8.0, 7.9, 7.8, 7.7, 7.6, 7.5, 7.4, 7.3, 7.2, 7.1, 7.0, 6.9, 6.8, 6.7, 6.6, 6.5, 6.4, 6.3, 6.2, 6.1, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 seconds; less than 1000, 990, 980, 970, 960, 950, 940, 930, 920, 910, 900, 890, 880, 870, 860, 850, 840, 830, 820, 810, 800, 790, 780, 770, 760, 750, 740, 730, 720, 710, 700, 690, 680, 670, 660, 650, 640, 630, 620, 610, 600, 590, 580, 570, 560, 550, 540, 530, 520, 510, 500, 490, 480, 470, 460, 450, 440, 430, 420, 410, 400, 390, 380, 370, 360, 350, 340, 330, 320, 310, 300, 290, 280, 270, 260, 250, 240, 230, 220, 210, 200, 190, 180, 170, 160, 150, 140, 130, 120, 110, 100, 90, 80, 70, 60, 50, 40, 30, 20, or 10 milliseconds; less than 1000, 990, 980, 970, 960, 950, 940, 930, 920, 910, 900, 890, 880, 870, 860, 850, 840, 830, 820, 810, 800, 790, 780, 770, 760, 750, 740, 730, 720, 710, 700, 690, 680, 670, 660, 650, 640, 630, 620, 610, 600, 590, 580, 570, 560, 550, 540, 530, 520, 510, 500, 490, 480, 470, 460, 450, 440, 430, 420, 410, 400, 390, 380, 370, 360, 350, 340, 330, 320, 310, 300, 290, 280, 270, 260, 250, 240, 230, 220, 210, 200, 190, 180, 170, 160, 150, 140, 130, 120, 110, 100, 90, 80, 70, 60, 50, 40, 30, 20, or 10 microseconds).

The faster recombination rates of HABIs (e.g., bridged HABIs) provide for a higher rate of patterned photoinhibition irradiation exposures and thus finds use in rapid resin solidification, e.g., in two and/or three dimensions. Thus, the technology provided herein also relates to the use of "bridged" or "tethered" photoinhibitors, such as "bridged" or "tethered" HABI compounds (see, e.g., FIGS. 5A, 5B, 5C, 5D, and 5E), that have reassociation kinetics that are faster than the reassociation kinetics of some unbridged HABI compounds.

Accordingly, embodiments of the technology provide a composition comprising a photoinhibitor compound having fast back reaction kinetics (e.g., a HABI photoinhibitor (e.g., a bridged HABI photoinhibitor)). For example, some embodiments provide a composition comprising a polymerizable monomer, a photoinitiator, and photoinhibitor compound having fast back reaction kinetics (e.g., a HABI photoinhibitor (e.g., a bridged HABI photoinhibitor)). In some embodiments, the compositions further comprise a coinitiator.

The technology is not limited in the polymerizable monomer. Several polymerizable monomers are described herein. In some particular embodiments, the polymerizable monomer comprises an acrylate or a methacrylate.

The technology is not limited in the photoinitiator. Several photoinitiators are described herein. In some particular embodiments, the photoinitiator comprises camphorquinone.

In some embodiments, the compositions further comprise a photon-absorbing dye.

The technology relates to the production of a polymer, e.g., a three-dimensional article made from a polymer. Accordingly, in some embodiments, the compositions further comprise a polymer produced from polymerization of said polymerizable monomer.

In some embodiments, the photoinhibitor compound having fast back reaction kinetics (e.g., a HABI photoinhibitor (e.g., a bridged HABI photoinhibitor)) forms radicals (e.g., imidazolyl radicals (e.g., covalently linked imidazolyl radicals)) upon irradiation with an appropriate wavelength and/or intensity of light. Accordingly, embodiments relate to compositions further comprising radicals (e.g., imidazolyl radicals (e.g., covalently linked imidazolyl radicals)) formed from the photoinhibitor compound having fast back reaction kinetics (e.g., a HABI photoinhibitor (e.g., a bridged HABI photoinhibitor)). The radicals exist transiently for the duration of irradiation with an appropriate wavelength and/or intensity of light.

The components of the compositions can be provided in various amounts, concentrations, ratios, etc. For example, in some embodiments the composition comprises the polymerizable monomer at a concentration of, e.g., approximately 1 to 99.99 wt % (e.g., approximately 1, 2, 3, 4, 5, 6, 7, 8, 9, 10, 15, 20, 25, 30, 35, 40, 45, 50, 55, 60, 65, 70, 75, 80, 85, 90, 91, 92, 93, 94, 95, 96, 97, 98, 99, 99.1, 99.2. 99.3, 99.4, 99.5, 99.6, 99.7, 99.8, 99.9, 99.95, to 99.99 wt %)). In some embodiments, the composition comprises the photoinitiator at a concentration of 0.5 to 5 wt %. In some embodiments, the composition comprises the photoinitiator at a concentration of approximately 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %). And, in some embodiments the composition comprises a photoinhibitor compound having fast back reaction kinetics (e.g., a HABI photoinhibitor (e.g., a bridged HABI photoinhibitor)) at a concentration of 1 to 5 wt %. In some embodiments the composition comprises a photoinhibitor compound having fast back reaction kinetics (e.g., a HABI photoinhibitor (e.g., a bridged HABI photoinhibitor)) at a concentration of approximately 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %).

As described herein, the technology relates in some embodiments to various bridged HABI photoinhibitors. In some embodiments, the bridged HABI photoinitiator comprises a bond linking the imidazolyl moieties. In some embodiments, the bridged HABI photoinhibitor comprises an R group linking the imidazolyl moieties. For example, in some embodiments the bridged HABI photoinhibitor comprises a naphthalene-bridged HABI; in some embodiments, the bridged HABI photoinhibitor comprises a [2.2]paracyclophane-bridged HABI; and, in some embodiments the bridged HABI photoinhibitor comprises a 1,1'-bi-naphthol-bridged HABI.

While description of HABI compounds and bridged HABI compounds is provided herein, the technology encompasses other compounds having fast back reaction kinetics, e.g., photoactivated inhibitors that produce linked, tethered, and/or bridged moieties that inhibit polymerization of polymerizable monomers and that reform the inactive photoinhibitor with fast back reaction kinetics (e.g., the polymerization inhibiting radical has a half-life of approximately 100 ns to 100 µs to 100 ms (e.g., 10, 20, 30, 40, 50, 60, 70, 80, 90, 100, 200, 300, 400, 500, 600, 700, 800, 900, or 1000 ns; 10, 20, 30, 40, 50, 60, 70, 80, 90, 100, 200, 300, 400, 500, 600, 700, 800, 900, or 1000 µs; or 10, 20, 30, 40, 50, 60, 70, 80, 90, 100, 200, 300, 400, 500, 600, 700, 800, 900, or 1000 ms)). In some embodiments, the moieties that inhibit polymerization of polymerizable monomers are not linked, tethered, and/or bridged but nonetheless reform the inactive photoinhibitor with fast back reaction kinetics.

Additional embodiments relate to a system for polymerizing a monomer to produce a polymer. For example, some embodiments relate to producing an article comprising a polymer. In some embodiments, systems comprise a composition comprising a polymerizable monomer, a photoinitiator, and a photoinhibitor compound having fast back reaction kinetics (e.g., a HABI photoinhibitor (e.g., a bridged HABI photoinhibitor)); a first light source to provide a first wavelength of light; and a second light source to provide a second wavelength of light. In some embodiments, the first light source provides patterned light. In some embodiments, the second light source provides patterned light. In some embodiments, the first and/or second light sources comprises a digital light processor, liquid crystal display, light emitting diode, digital micromirror device, or mirror array. In some embodiments, the first and/or second light sources comprise(s) a collimated beam or a planar waveguide. In some embodiments, the system further comprises a microcontroller configured to control the first and/or second light sources. And, in some embodiments, the system further comprises a software object comprising instructions for forming a three-dimensional object.

Additional embodiments relate to methods for polymerizing a polymerizable monomer. In some embodiments, methods comprise steps of, e.g., providing a composition comprising a polymerizable monomer, a photoinitiator, and a photoinhibitor compound having fast back reaction kinetics (e.g., a HABI photoinhibitor (e.g., a bridged HABI photoinhibitor)); irradiating said composition with a first wavelength of light; and irradiating said composition with a second wavelength of light. In some embodiments, the first wavelength of light is blue light. In some embodiments, the second wavelength of light is UV light. In some embodiments, methods comprise irradiating with a pattern of said first wavelength. In some embodiments, methods comprise irradiating with a pattern of said second wavelength. Further, in some embodiments, the methods comprise varying the intensity of the first and/or second wavelength of light. In some embodiments, the methods comprise moving a source of the first wavelength of light and/or moving a source of the second wavelength of light. In related method embodiments, methods comprise providing a composition comprising a polymerizable monomer, a photoinitiator, and a photoinhibitor compound having fast back reaction kinetics (e.g., a HABI photoinhibitor (e.g., a bridged HABI photoinhibitor)); producing a photoinitiation region in said composition with a first wavelength of light; and producing a photoinhibition region in said composition with a second wavelength of light.

In some embodiments, the technology comprises use of a photoinitiator and a photoinhibitor having complementary absorption spectra. In some embodiments, the photoinhibitor has fast back reaction kinetics. In some embodiments, the photoinhibitor is a hexaarylbiimidazole (HABI) compound. In some embodiments, the photoinhibitor is a bridged hexaarylbiimidazole (HABI) compound (e.g., a bridged HABI compound having a kinetically fast back reaction that reforms the HABI from the photolytic radical products of the forward reaction). In some embodiments, the photoinitiator and photoinhibitor are provided in a composition comprising a photopolymerizable resin formulation and the composition is irradiated with two overlapping irradiation patterns at wavelengths that independently effect either polymerization initiation or inhibition. The overlapping irradiation patterns produce a defined region of polymerization that is confined in depth within a volume of the resin. Whereas the polymerization initiating species are generated by irradiation at one wavelength effect rapid, irreversible solidification of the liquid resin in regions exclusively under exposure by that wavelength, the polymerization inhibiting species transiently generated by irradiation at the second, independent wavelength sufficiently reduce the polymerization rate to prevent solidification of the resin in volumes concurrently exposed to both wavelengths or exclusively to the second wavelength. As the resin solidification is irreversible and the polymerization inhibiting species recombine in the dark (e.g., nearly instantaneously), the technology provides for the fabrication of arbitrary three-dimensional objects using a series of patterned irradiation exposures.

The technology provides several advantages over extant, conventional technologies. For instance, processing is much faster than conventional stereolithography or competing rapid prototyping technologies and the solidified object is near-neutrally buoyant in the liquid resin, eliminating the need for overhang support structures. In addition, a wide range of polymerizable monomers can be used with the technology described herein relative to conventional technologies because the resin is stationary during object solidification. In particular, in some embodiments, the technology comprises use of viscous monomers or highly filled materials (e.g., if the filler is transparent and index-matched to the resin) that are incompatible with conventional three-dimensional printing methods.

Accordingly, provided herein is a method of producing a polymerized article. In particular embodiments, the method comprises providing a composition comprising a polymerizable monomer, a photoinitiator, and a photoinhibitor (e.g., a photoinhibitor compound having fast back reaction kinetics (e.g., a HABI photoinhibitor (e.g., a bridged HABI photoinhibitor))); irradiating said composition with a first wavelength of light; and irradiating said composition with a second wavelength of light. In some embodiments, the first wavelength of light is blue light. In some embodiments, the second wavelength of light is UV light. Furthermore, in some embodiments, irradiating with the first wavelength comprises irradiating with a pattern of said first wavelength. And, in some embodiments, irradiating with the second wavelength comprises irradiating with a pattern of said second wavelength. As described herein, in some embodiments, the volume of the composition irradiated by said first wavelength of light and the volume of the composition irradiated by said second wavelength of light overlap at least partially. In some embodiments, the angle between the irradiation by the first wavelength of light and the irradiation by the second wavelength of light is approximately 90°. In some embodiments, the first and second wavelengths of light irradiate the composition from approximately the same direction (e.g., at an angle of approximately 0°). The technology is not, however, limited to these angles and various embodiments comprise the first and second wavelengths irradiating the composition at any angle from 0 to 180° as described herein (e.g., 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, or 180°).

In some embodiments, the first and/or second wavelengths of light irradiate the composition from multiple sources and from multiple directions. That is, in some embodiments, a plurality of sources (e.g., a first source of the first wavelength, a second source of the first wavelength, etc.) irradiates the composition with the first wavelength from more than one direction. The technology is not limited in the angles between the plurality of sources that irradiates the composition with the first wavelength and thus various embodiments comprise providing angles between any two sources providing the first wavelength to be any angle from 0 to 180° as described herein (e.g., 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, or 180°). In some embodiments, a plurality of sources (e.g., a first source of the second wavelength, a second source of the second wavelength, etc.) irradiates the composition with the second wavelength from more than one direction. The technology is not limited in the angles between the plurality of sources that irradiates the composition with the second wavelength and thus various embodiments comprise providing angles between any two sources providing the first wavelength to be any angle from 0 to 180° as described herein (e.g., 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, or) 180°).

Embodiments relate to providing light that varies in wavelength, shape, intensity, and/or pattern. Thus, in some embodiments, methods comprise irradiating with a time-varying pattern of a first wavelength. And, in some embodiments, methods comprise irradiating with a time-varying pattern of a second wavelength. In some embodiments, the first and/or said second wavelength is provided by a digital light processor, liquid crystal display, light emitting diode, digital micromirror device, or mirror array. In yet further embodiments, methods comprise providing a reaction vessel, e.g., to hold a composition as described herein.

Further embodiments are related to systems for producing an article comprising polymer. In particular, in some embodiments, a system comprises a composition comprising a polymerizable monomer, a photoinitiator, and a photoinhibitor (e.g., a photoinhibitor compound having fast back reaction kinetics (e.g., a HABI photoinhibitor (e.g., a bridged HABI photoinhibitor))); a first light source to provide a first wavelength of light; and a second light source to provide a second wavelength of light. In some embodiments, the first light source provides patterned light. In some embodiments, the second light source provides patterned light. In some embodiments, the first light source irradiates said composition at approximately 90° relative to the second light source. In some embodiments, the first light source irradiates said composition from the same direction as the second light source (e.g., at an angle of approximately 0°). The technology is not, however, limited to these angles and various embodiments comprise the first and second sources irradiating the composition with the first and second wavelengths of light at any angle from 0 to 180° as described herein.

In some embodiments, the system comprises a digital light processor, liquid crystal display, light emitting diode, digital micromirror device, or mirror array. For example, in some embodiments, the first and/or second light sources comprises a digital light processor, liquid crystal display, light emitting diode, digital micromirror device, or mirror array. In some embodiments, the first and/or second light sources comprises a collimated beam or a planar waveguide. In some embodiments, a first and/or second source is controlled by a computer or microcontroller. Accordingly, in some embodiments, systems further comprise a microcontroller configured to control the first and/or second light sources. In some embodiments, systems further comprise a software object comprising instructions for forming a three-dimensional object. In some embodiments, systems further comprise a reaction vessel. In some embodiments, systems further comprise a pattern generator, mask, or other component to produce patterned light (e.g., from the first and/or second sources). In some embodiments, the first and/or second light source provides a time-varying intensity or pattern of the first and/or second light source. In some embodiments, a computer provides control to provide said time-varying intensity or pattern of the first and/or second light source.

The technology finds wide use. For example, embodiments are related to use of a polymerizable monomer, a photoinitiator, a photoinhibitor (e.g., a photoinhibitor compound having fast back reaction kinetics (e.g., a HABI photoinhibitor (e.g., a bridged HABI photoinhibitor))), a first wavelength of light, and a second wavelength of light to produce a three-dimensional object. For example, in some embodiments the technology relates to use of a photoinhibitor compound having fast back reaction kinetics (e.g., a HABI photoinhibitor (e.g., a bridged HABI photoinhibitor)) for three-dimensional printing, stereolithography, or continuous liquid interface printing (CLIP). In some embodiments, the technology relates to use of a photoinhibitor compound having fast back reaction kinetics (e.g., a HABI photoinhibitor (e.g., a bridged HABI photoinhibitor)) to produce a three-dimensional object.

In some embodiments, the technology finds use for improved production and control of dead zones for continuous printing (e.g., three-dimensional printing). In particular, embodiments of the technology provide compositions, methods, kits, and systems to produce a dead zone during a continuous printing process using two wavelengths of light—a first wavelength of light inhibits polymerization in a localized region at the projection window and a second wavelength of light initiates polymerization (e.g., deeper into the resin composition). The technology provides facile control over the dead zone thickness at a wide range of polymerizing light intensities and provides for the production of larger dead zones. Accordingly, the technology increases the speed of continuous printing and especially improves the speed of printing large cross sectional area items.

Accordingly, provided herein is technology related to a method of producing a polymerized item. For example in some embodiments, the method comprises providing a composition comprising a polymerizable monomer, a photoinhibitor, and a photoinitiator; irradiating said composition with a first wavelength of light to produce a dead zone comprising an inhibiting species produced from the photoinhibitor; and irradiating said composition with a second wavelength of light to produce an initiating species from the photoinitiator above the dead zone, wherein said initiating species polymerizes polymerizable monomers to produce at least a portion of said polymerized item. The technology provides a dead zone having a thickness larger than is provided by extant technologies, e.g., technologies dependent on a dead zone produced by $O_2$ replenished to the dead zone by diffusion. For example, in some embodiments, the technology provided herein relates to producing a dead zone having a thickness of at least 0.5 mm (e.g., at least 0.5, 0.6, 0.7, 0.8, 0.9, 1.0, 1.1, 1.2, 1.3, 1.4, 1.5, 1.6, 1.7, 1.8, 1.9, or 2.0 mm or more). In particular embodiments, the dead zone has a thickness of at least 1 mm. In some embodiments, methods further comprising providing a reaction vessel comprising an optically transparent window. And, in some embodiments of methods, the intensity of the first wavelength and the intensity of the second wavelength of light provide that the second wavelength of light activates the photoinitiator deeper into the composition than the first wavelength of light activates the photoinhibitor. Methods provide a CLIP-like technology for producing items from a polymer. Accordingly, in some embodiments, methods further comprise providing a build plate to support and/or move the polymerized item (e.g., vertically up out of the composition). Some embodiments comprise moving vertically the item or at least a portion of said polymerized item.

In some embodiments, the second wavelength of light is provided as a patterned light, e.g., in some embodiments the second wavelength of light is provided as a time-varying patterned light. In some embodiments, the second wavelength of light is provided by a plurality of pixels and the intensity of each pixel is independently controlled. In some embodiments, the methods further comprise changing the pattern of said second wavelength of light.

The technology produces items having a cross-sectional area, or items comprising portions having a cross-sectional area, that is/are larger than the cross-sectional areas produced by extant technologies. For instance, in some embodiments, the polymerized item or portion thereof has a cross sectional area of more than 1 cm$^2$, e.g., in some embodiments, the polymerized item or portion thereof has a cross sectional area of 1 to 10 cm$^2$ (e.g., more than 1, 1.5, 2, 2.5, 3, 3.5, 4, 4.5, 5, 5.5, 6, 6.5, 7, 7.5, 8, 8.5, 9, 9.5, 10, or more than 10 cm$^2$).

In some embodiments, the composition does not comprise $O_2$. And, in some embodiments, the composition does not comprise an inhibiting concentration of $O_2$. In some embodiments, the composition comprises a light absorbing component, e.g., to attenuate the intensity of the first and/or second wavelengths of light.

Related embodiments are related to a system for producing an item from a polymerizable monomer. For example, in some embodiments systems comprise a reaction vessel comprising an optically transparent window; a composition comprising a polymerizable monomer, a photoinhibitor, and a photoinitiator; a first light source providing a first wavelength of light; a second light source providing a second wavelength of light; and a vertically movable build plate. In some embodiments, the reaction vessel holds said composition. In some embodiments, the first wavelength of light and said second wavelength of light irradiate said composition through said optically transparent window.

As described herein, embodiments relate to improved dead zones and dead zone control for stereolithographic methods such as those related to CLIP. Accordingly, in some embodiments, the first wavelength of light produces a dead zone within said composition. As described herein, the technology provides a larger dead zone than extant technologies and thus the present technology has improved printing speeds. In some embodiments, the technology produces a dead zone having a thickness that is an order of magnitude larger than the dead zone thickness provided by extant technologies (extant technologies, e.g., comprising use of $O_2$ inhibition, provide a dead zone of 100 μm to 1000 μm). For example, in some embodiments, the technology provides a dead zone having a width of at least 0.5 mm (e.g., 0.5, 0.6, 0.7, 0.8, 0.9, 1.0, 1.1, 1.2, 1.3, 1.4, 1.5, 1.6, 1.7, 1.8, 1.9, 2.0, or more). In some embodiments, the dead zone has a width of at least 1 mm. In some embodiments, the technology provided herein produces a dead zone having a thickness of at least approximately 1 mm to 10 mm (e.g., at least approximately 1, 2, 3, 4, 5, 6, 7, 8, 9, or 10 mm). In some embodiments, the technology provided herein produces a dead zone having a thickness that is greater than 10 mm. In some embodiments, the increased dead zone thickness minimizes and/or eliminates problems related to resin reflow rates and associated limits on print speed.

In some embodiments, the first light source and second light source are configured to provide the second wavelength of light at a depth to activate the photoinitiator deeper into the composition than the first wavelength of light activates the photoinhibitor.

In some embodiments, systems comprise a component to produce patterned light. In some embodiments, composition further comprises a light absorbing component. And, in some embodiments, systems further comprise a software object comprising instructions for producing said item.

Methods and systems described herein comprise providing or using compositions comprising a polymerizable monomer, a photoinitiator, and a photoinhibitor. In some embodiments, the photoinhibitor has fast back reaction kinetics. In some embodiments, the photoinhibitor is a "precise photoinhibitor". In some embodiments, the photoinhibitor is a "precise photoinhibitor" having fast back reaction kinetics. In some embodiments, the photoinitiator is a HABI compound. In some embodiments, the photoinitiator is a bridged HABI compound.

The technology finds use in a wide range of applications. For example, in some embodiments, methods and systems find use in producing an item comprising a polymer.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

FIG. 8A is a schematic of an embodiment of an optical system for two-color, stereolithographic additive manufacturing (AM) by concurrent photopolymerization and photoinhibition. Near UV (365 nm) is superimposed onto patterned blue (458 nm) with a dichroic mirror and projected through a transparent window into a photopolymerizable resin vat. FIG. 8B to FIG. 8D show the structures of photoinitiator CQ (FIG. 8B), co-initiator EDAB (FIG. 8C), and photoinhibitor o-Cl-HABI (FIG. 8D). FIG. 8E shows a photograph of a solid block M (left) and a photograph of a tug boat printed using the two-color, photopolymerization and photoinhibition stereolithography system at 500 mm/hr and 375 mm/hr, respectively. FIG. 8F is a plot of data indicating that the polymerization inhibition volume thickness is affected by varying intensity ratios of the incident irradiation wavelengths ($I_{UV,0}/I_{blue,0}$) and resin absorbance ($h_{UV}$).

FIG. 10E-FIG. H are plots of data measured for alkene conversion versus time for resin formulations of (FIG. 10F) bisGMA/TEGDMA, (FIG. 10G) BPAEDA, and (FIG. 10H) TEGDVE/NPM (vinyl ether and maleimide conversions denoted by solid and dashed lines, respectively) under continuous irradiation with exclusively 470 nm at 100 mW/cm$^2$ (black line, squares), 470 nm at 100 mW/cm$^2$ and 365 nm at 10 mW/cm$^2$ (green line, triangles), 470 nm at 100 mW/cm$^2$ and 365 nm at 30 mW/cm$^2$, (red line, circles), and 365 nm at 30 mW/cm$^2$ (blue line, diamonds).

In FIG. 25A, an item 101 is being produced from a resin composition 102 (e.g., comprising a polymerizable monomer, a photoinitiator, and a photoinhibitor) according to an embodiment of the technology provided herein. A build support plate 103 is attached to the item 101 and draws it up from the resin composition 102. A first wavelength of light 104 (dotted lines) and a second wavelength of light 105 (solid lines) irradiate the resin composition 102 through an optically transparent window 106. The first wavelength of light 104 has a wavelength and intensity to activate the photoinhibitor (e.g., to produce an inhibiting species (e.g., an inhibiting radical) in the composition. The second wavelength of light 105 has a wavelength and intensity to activate the photoinitiator (e.g., to produce an initiating species (e.g., an initiating radical) in the composition. The first wavelength of light 104 activates the photoinhibitor to produce the dead zone 107 as shown in FIG. 25B.

Figure 1:
FIG. 1 shows the structure of tetraethylthiuram disulfide ("TED") and the reversible production of radicals from TED by light.
Figure 2:
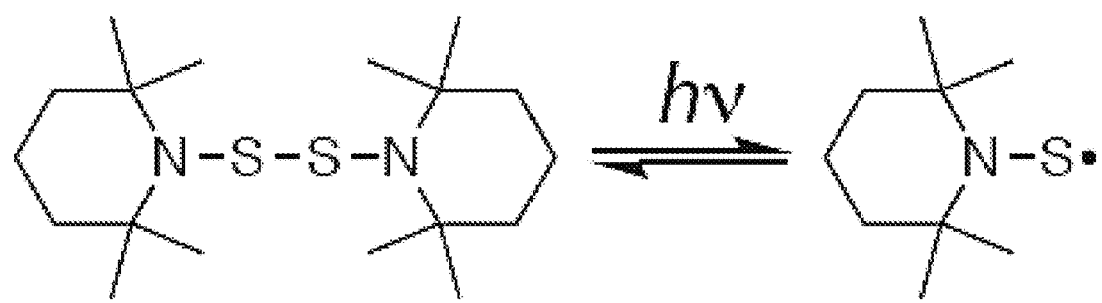
FIG. 2 shows the structure of bis(2,2,6,6-tetramethylpiperidin-1-yl)disulfide and the reversible production of radicals from bis(2,2,6,6-tetramethylpiperidin-1-yl)disulfide by light.
Figure 3:
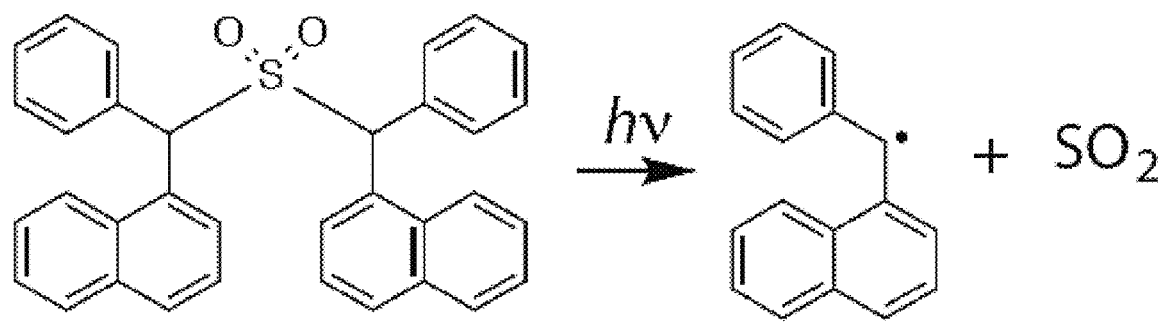
FIG. 3 shows the structure of an arylmethyl sulfone and the production of radicals and sulfur dioxide from arylmethyl sulfone by light.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to producing polymers and particularly, but not exclusively, to methods and systems for producing articles using three-dimensional printing. Provided herein is technology relating to polymerization and particularly, but not exclusively, to methods, systems, and compositions for improving control of polymerization using a polymerization photoinhibitor having fast back reaction kinetics such as hexaarylbiimidazole compounds and bridged hexaarylbiimidazole compounds.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. That is, the singular forms "a," "and," and "the" include plural referents unless the context clearly dictates otherwise. Thus, for example, reference to "a polymer" may include more than one polymer. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, spatially relative terms, such as "under," "below," "lower," "over," "upper", "left", "right", and the like are used for ease of description to describe relationships between components, elements, features, etc., e.g., as illustrated in a figure. Spatially relative terms are intended to encompass different orientations of embodiments of the technology in use or operation, e.g., in addition to the orientation as depicted in the figures. For example, elements described as "under" or "beneath" other elements or features would then be oriented "over" the other elements or features when the positions of elements are changed in some embodiments.

As used herein, the term "optional" or "optionally" means that the subsequently described circumstance may or may not occur and is not necessary, so that the description includes instances where the circumstance occurs and instances where it does not occur.

As used herein, the term "polymer" refers to a macromolecule formed by the chemical union of monomers (e.g., polymerizable monomers). In some embodiments, a polymer comprises two, three, four, five, or more monomers. The term polymer includes homopolymer and copolymer block copolymers, and polymers of any topology including star polymers, block copolymers, gradient copolymers, periodic copolymers, telechelic polymers, bottle-brush copolymers, random copolymers, statistical copolymers, alternating copolymers, graft polymers, branched or hyperbranched polymers, comb polymers, such polymers tethered from particle surfaces, as well as other polymer structures.

As used herein, the term "moiety" refers to one of two or more parts into which something may be divided, such as, for example, the various parts of a molecule or a chemical group.

The term "alkyl" as used herein is a branched or unbranched saturated hydrocarbon group of 1 to 24 carbon atoms, for example 1 to 12 carbon atoms or 1 to 6 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, substituted or unsubstituted alkyl, cycloalkyl, alkoxy, amino, ether, halide, hydroxy, nitro, silyl, sulfo-oxo, or thiol, as described herein. A "lower alkyl" group is an alkyl group containing from one to six carbon atoms.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, substituted or unsubstituted alkyl, cycloalkyl, alkoxy, amino, ether, halide, hydroxy, nitro, silyl, sulfo-oxo, or thiol as described herein, The term "polyalkylene group" as used herein is a group having two or more $CH_2$ groups linked to each other. The polyalkylene group can also be represented by the formula —(CH$_2$)$_n$— where "n" is an integer of from 2 to 500.

The terms "alkoxy" and "alkoxyl" are used herein to refer to an alkyl or cycloalkyl group bonded through an ether linkage; that is, an "alkoxy" group can be defined as —OA1 where A1 is alkyl or cycloalkyl as defined above. "Alkoxy" also includes polymers of alkoxy groups as just described; that is, an alkoxy can be a polyether such as —OA1-OA2 or —OA1-(OA2)$_n$-OA3, where "n" is an integer of from 1 to 200 and A1, A2, and A3 are alkyl and/or cycloalkyl groups.

The term "alkenyl" as used herein is a hydrocarbon group of from 2 to 24 carbon atoms with a structural formula containing at least one carbon-carbon double bond. Asymmetric structures such as (A1A2)C=C(A3A4) are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkenyl" as used herein is a non-aromatic carbon-based ring composed of at least three carbon atoms and containing at least one carbon-carbon double bound as represented in some embodiments as C=C. Examples of cycloalkenyl groups include, but are not limited to, cyclopropenyl, cyclobutenyl, cyclopentenyl, cyclopentadienyl, cyclohexenyl, cyclohexadienyl, norbornenyl, and the like. The term "heterocycloalkenyl" is a type of cycloalkenyl group as defined above, and is included within the meaning of the term "cycloalkenyl," where at least one of the carbon atoms of the ring is replaced with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "alkynyl" as used herein is a hydrocarbon group of 2 to 24 carbon atoms with a structural formula containing at least one carbon-carbon triple bond. The alkynyl group can be unsubstituted or substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkynyl" as used herein is a non-aromatic carbon-based ring composed of at least seven carbon atoms and containing at least one carbon-carbon triple bound. Examples of cycloalkynyl groups include, but are not limited to, cycloheptynyl, cyclooctynyl, cyclononynyl, and the like. The term "heterocycloalkynyl" is a type of cycloalkenyl group as defined above, and is included within the meaning of the term "cycloalkynyl," where at least one of the carbon atoms of the ring is replaced with a heteroatom such as, but not limited to, nitrogen, oxygen, sulfur, or phosphorus. The cycloalkynyl group and heterocycloalkynyl group can be substituted or unsubstituted. The cycloalkynyl group and heterocycloalkynyl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein. The term "biaryl" is a specific type of aryl group and is included in the definition of "aryl." Biaryl refers to two aryl groups that are bound together via a fused ring structure, as in naphthalene, or are attached via one or more carbon-carbon bonds, as in biphenyl.

The term "aldehyde" as used herein is represented by the formula —C(O)H. Throughout this specification "C(O)" is a short hand notation for a carbonyl group, represented in some embodiments as C=O.

The terms "amine" or "amino" as used herein are represented by the formula NA1A2A3, where A1, A2, and A3 can be, independently, hydrogen or substituted or unsubstituted alkyl, cycloalkyl, alkenyl, cycloalkenyl, alkynyl, cycloalkynyl, aryl, or heteroaryl group as described herein, The term "carboxylic acid" as used herein is represented by the formula —C(O)OH.

The term "ester" as used herein is represented by the formula —OC(O)A1 or —C(O)OA1, where A1 can be a substituted or unsubstituted alkyl, cycloalkyl, alkenyl, cycloalkenyl, alkynyl, cycloalkynyl, aryl, or heteroaryl group as described herein. The term "polyester" as used herein is represented by the formula -(A1O(O)C-A2-C(O)O)a- or —(A1O(O)C-A2-OC(O))$_n$—, where A1 and A2 can be, independently, a substituted or unsubstituted alkyl, cycloalkyl, alkenyl, cycloalkenyl, alkynyl, cycloalkynyl, aryl, or heteroaryl group described herein and "n" is an integer from 1 to 500. "Polyester" is as the term used to describe a group that is produced by the reaction between a compound having at least two carboxylic acid groups with a compound having at least two hydroxyl groups.

The term "ether" as used herein is represented by the formula A1OA2, where A1 and A2 can be, independently, a substituted or unsubstituted alkyl, cycloalkyl, alkenyl, cycloalkenyl, alkynyl, cycloalkynyl, aryl, or heteroaryl group described herein. The term "polyether" as used herein is represented by the formula —(A1O-A2O)$_n$—, where A1 and A2 can be, independently, a substituted or unsubstituted alkyl, cycloalkyl, alkenyl, cycloalkenyl, alkynyl, cycloalkynyl, aryl, or heteroaryl group described herein and "n" is an integer of from 1 to 500. Examples of polyether groups include polyethylene oxide, polypropylene oxide, and polybutylene oxide.

The term "halide" as used herein refers to the halogens fluorine, chlorine, bromine, and iodine.

The term "hydroxyl" as used herein is represented by the formula —OH.

The term "ketone" as used herein is represented by the formula A1C(O)A2, where A1 and A2 can be, independently, a substituted or unsubstituted alkyl, cycloalkyl, alkenyl, cycloalkenyl, alkynyl, cycloalkynyl, aryl, or heteroaryl group as described herein, The term "azide" as used herein is represented by the formula —$N_3$.

The term "nitro" as used herein is represented by the formula —$NO_2$.

The term "nitrile" as used herein is represented by the formula —CN.

The term "sulfo-oxo" as used herein is represented by the formulas —S(O)A1, —S(O)2A1, —OS(O)2A1, or —OS(O)$_2$OA1, where A1 can be hydrogen or a substituted or unsubstituted alkyl, cycloalkyl, alkenyl, cycloalkenyl, alkynyl, cycloalkynyl, aryl, or heteroaryl group as described herein. Throughout this specification "S(O)" is a short hand notation for S=O. The term "sulfonyl" is used herein to refer to the sulfo-oxo group represented by the formula —S(O)2A1, where A1 can be hydrogen or a substituted or unsubstituted alkyl, cycloalkyl, alkenyl, cycloalkenyl, alkynyl, cycloalkynyl, aryl, or heteroaryl group as described herein. The term "sulfone" as used herein is represented by the formula A1S(O)2A2, where A1 and A2 can be, independently, a substituted or unsubstituted alkyl, cycloalkyl, alkenyl, cycloalkenyl, alkynyl, cycloalkynyl, aryl, or heteroaryl group as described herein. The term "sulfoxide" as used herein is represented by the formula A1S(O)A2, where A1 and A2 can be, independently, a substituted or unsubstituted alkyl, cycloalkyl, alkenyl, cycloalkenyl, alkynyl, cycloalkynyl, aryl, or heteroaryl group as described herein.

The term "thiol" as used herein is represented by the formula —SH.

As used herein, the term "alkylacrylic acid" refers to acrylic acid, alkyl-substituted acrylic acids, salts thereof, and derivatives thereof. In one aspect, an alkylacrylic acid can be further substituted. In a further aspect, an alkylacrylic acid is methacrylic acid.

As used herein, the term "sterically hindered" refers to a tertiary or quaternary substituted moiety wherein at least one of the substituents has at least two carbon atoms. For example, a sterically hindered moiety can have the structure: wherein A1 is a carbon atom or silicon atom and wherein at least one of A2, A3, and A4 is an organic group having at least two carbon atoms. In a further aspect, at least one of A2, A3, and A4 is methyl, and at least one of A2, A3, and A4 is an organic group having at least two carbon atoms.

The term "inert" to refer to a substituent or compound means that the substituent or compound will not undergo modification either (1) in the presence of reagents that will likely contact the substituent or compound, or (2) under conditions that the substituent or compound will likely be subjected to (e.g., chemical processing carried out subsequent to attachment an "inert" moiety to a substrate surface).

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

As used herein, the term "radical" refers to an atom, molecule, or ion that has an unpaired valence electron. For instance, in some embodiments, a "radical" is a small molecule comprising one (sometimes two) unpaired electron on an atom or functional group. In some embodiments, a radical is formed by homolytic cleavage of a bond. As used herein, the terms "radical" and "free radical" are equivalent.

As used herein, a "photoinitiator" is a molecule that produces radicals after irradiation with light to initiate polymerization of a polymerizable monomer. Free radical photoinitiators are known in the art. These photoinitiators absorb energy in varying ranges in the UV spectrum (100-450 nm), including UV A (320-400 nm), UV B (280-320 nm), UV C (200-280 nm), deep UV (100-200 nm) and near-visible UV (400-450 nm, also known as UV-VIS) and produce a free radical reactive species, which then initiates polymerization of the polymerizable monomers. See, e.g., W. Arthur Green, "Industrial Photoinitators: A Technical Guide," CRC Press, 2010. In some embodiments, the free radical photoinitiators are activated in the visible spectrum, e.g., at wavelengths up to 600 or 700 nm.

As used herein, a "photoinhibitor" is a molecule that produces an inhibiting species after irradiation with light to minimize, inhibit, prevent, and/or terminate polymerization of a polymerizable monomer. In some embodiments, a photoinhibitor forms a radical that minimizes, inhibits, prevents, and/or terminates polymerization of a polymerizable monomer. However, a photoinhibitor need not produce radicals; thus, in some embodiments, a photoinhibitor produces, e.g., an inhibiting species that is, e.g., a non-radical molecular fragment or an isomer that inhibits polymerizations (e.g., radical polymerizations). A photoinhibitor absorbs energy in varying ranges in the UV spectrum (100-450 nm), including UV A (320-400 nm), UV B (280-320 nm), UV C (200-280 nm), deep UV (100-200 nm) and near-visible UV (400-450 nm, also known as UV-VIS) and produces an inhibiting species, which then inhibits polymerization of the polymerizable monomers. In some embodiments, the photoinhibitors are activated in the visible spectrum, e.g., at wavelengths up to 600 or 700 nm.

As used herein, the term "precise photoinhibitor" refers to a photoinhibitor for which the non-photoactivated form of the photoinhibitor does not inhibit or retard a polymerization of polymerizable monomers, for which the non-photoactivated form of the photoinhibitor does not initiate polymerization of polymerizable monomers, for which the photoactivated form of the photoinhibitor (e.g., inhibiting species) inhibits the polymerization of polymerizable monomers, and for which the photoactivated form of the photoinhibitor (e.g., inhibiting species) does not initiate polymerization of polymerizable monomers. In some embodiments, a precise photoinhibitor has a fast back reaction.

As used herein, the terms "back reaction" or "thermal back reaction" refer to the reformation of the photoinhibitor or photoinitiator molecule from their products (e.g., radicals), e.g., the products produced from the photoinhibitor or photoinitiator by irradiation.

As used herein, the term "fast reaction" refers to a chemical reaction (e.g., a back reaction) that has fast reaction kinetics. As used herein, the term "fast reaction kinetics" refers to a chemical reaction that depletes a compound such that the compound has a half-life of approximately 100 ns to 100 µs to 100 ms to 100 s (e.g., 10, 20, 30, 40, 50, 60, 70, 80, 90, 100, 200, 300, 400, 500, 600, 700, 800, 900, or 1000 ns; 10, 20, 30, 40, 50, 60, 70, 80, 90, 100, 200, 300, 400, 500, 600, 700, 800, 900, or 1000 µs; 10, 20, 30, 40, 50, 60, 70, 80, 90, 100, 200, 300, 400, 500, 600, 700, 800, 900, or 1000 ms; or 0, 20, 30, 40, 50, 60, 70, 80, 90, 100, 200, 300, 400, 500, 600, 700, 800, 900, or 1000 s). In some embodiments, a fast reaction (e.g., a fast back reaction) reforms a compound (e.g., a photoactivatable compound (e.g., a photoinhibitor, a photoinitiator)) from its products (e.g., an inhibiting species (e.g., inhibiting radical)) with fast kinetics. In particular embodiments, a fast reaction reforms an inactive form of a photoinhibitor from the inhibiting species (e.g., inhibiting radical) with fast reaction kinetics such that an amount or concentration of the inhibiting species (e.g., inhibiting radical) that is effective in inhibiting polymerization of the polymerizable monomer is only present in a region irradiated by an intensity and/or wavelength of light that activates the photoinhibitor to form the inhibiting species (e.g., inhibiting radical).

As used herein, the term "light" is understood to refer to electromagnetic radiation in any appropriate region of the electromagnetic spectrum and is not limited to visible light. Accordingly, the term "light" encompasses infrared, ultraviolet, and visible electromagnetic radiation. As used herein, the term "irradiation" refers to light directed toward a surface, composition, molecule, etc., so that it contacts the surface, composition, molecule, etc. As used herein, the term "blue light" refers to light having a wavelength in the range of approximately 450-495 nm. As used herein, "UV light" refers to light having a wavelength of approximately 100-450 nm.

In some embodiments, an "activating" intensity of light is light provided above a threshold intensity required to effect a chemical reaction. For example, in some embodiments light provided at an activating intensity forms an initiating radical from a photoinitiator or forms an inhibiting radical from a photoinhibitor. In some embodiments, an activating intensity of light is expressed as the intensity of irradiation at a particular wavelength of electromagnetic radiation or an average irradiation over a particular range of wavelengths of electromagnetic radiation. In some embodiments, the "activating" intensity is expressed as a number of photons (e.g., photons of a particular wavelength) absorbed by a photoactivatable molecule. In some embodiments, the "activating" intensity is expressed in units of irradiance or intensity, e.g., in the form of power per unit area (e.g., $W/cm^2$ or the like). In some embodiments, the activating intensity is expressed as an irradiance at the absorption maximum of a photoactivatable molecule. However, the activating light need not be provided at a wavelength at or near the absorption maximum (e.g., wavelength of maximal absorption) of a photoactivatable molecule; thus, in some embodiments, the activating light is provided at a wavelength at which the absorption by the photoactivatable molecule of said wavelength is less than 50, 45, 40, 35, 30, 25, 20, 15, 10, 9, 8, 7, 6, 5, 4, 3, 2, or 1% of the absorption by the molecule at the wavelength of the absorption maximum.

As used herein, the term "photon" refers to a unit particle of electromagnetic energy.

As used herein, the term "color" or "wavelength" is used interchangeably with the term "spectrum." However, the term, "color" generally is used to refer to a property of electromagnetic radiation that is perceivable by an observer (though this usage is not intended to limit the scope of this term). Accordingly, the term "different colors" implies two different spectra with different wavelengths, wavelength components, wavelength ranges, spectra, and/or bandwidths. In addition, "color" may be used to refer to white and non-white light.

As used herein, the terms "photon beam", "light beam", "electromagnetic beam", "image beam", or "beam" refer to a somewhat localized (in time and space) beam or bundle of photons or electromagnetic waves of various frequencies or wavelengths within the electromagnetic spectrum.

As used herein, the terms "light source", "photon source", or "source" refer to various devices that are capable of emitting, providing, transmitting, or generating one or more photons or electromagnetic waves of one or more wavelengths or frequencies within the electromagnetic spectrum. A light or photon source may transmit one or more outgoing light beams. A photon source may be a laser, a light emitting diode (LED), a light bulb, or the like. A photon source may generate photons via stimulated emissions of atoms or molecules, an incandescent process, or various other mechanisms that generate an electromagnetic wave or one or more photons. A photon source may provide continuous or pulsed outgoing light beams of a predetermined frequency, range of frequencies, wavelength, range of wavelengths, or spectra. The outgoing light beams may be coherent light beams. The photons emitted by a light source may be of various wavelengths or frequencies.

As used herein, the term "dead zone" refers to a layer of polymerizable monomer that does not polymerize, e.g., due to the presence of a species that inhibits polymerization of the polymerizable monomer. That is, the "dead zone" is a layer of unpolymerized composition adjacent to the polymerized item. In some embodiments, the dead zone comprises an inhibitor of polymerization (at least in a polymerization-inhibiting amount) and in an adjacent layer, the inhibitor is not present (e.g., is present in less than a polymerization-inhibiting amount), e.g., because the inhibitor has been consumed, has not been produced, or has not moved to the adjacent layer. The technology is not limited in the shape of the dead zone. For example, in some embodiments, the dead zone has a regular shape (e.g., a rectangular prism or "slab" of the composition comprising the polymerizable monomer). In some embodiments, the dead zone has an irregular shape (e.g., the dead zone has a contoured "topology" at the interface with the adjacent layer). In some embodiments, the shape of the dead zone is produced by projecting a two-dimensional image comprising varied intensities (e.g., at the pixel level) of the wavelength of light that activates the photoinhibitor (e.g., that produces the inhibiting species from the photoinhibitor).

As used herein, a "large cross section" and/or a "large cross-sectional area" refers to a cross-section having an area of approximately 1 to 10 $cm^2$ (e.g., 1, 1.5, 2, 2.5, 3, 3.5, 4, 4.5, 5, 5.5, 6, 6.5, 7, 7.5, 8, 8.5, 9, 9.5, or 10 $cm^2$).

Description

Provided herein is technology relating to polymerization and particularly, but not exclusively, to methods, systems, and compositions for improving control of polymerization using a polymerization photoinhibitor having fast back reaction kinetics such as hexaarylbiimidazole compounds and bridged hexaarylbiimidazole compounds. The technology has several advantages. For example, the polymerization technology is not susceptible to polymerization-retarding chain transfer reactions, in contrast to technologies that comprise use of compounds that participate extensively in chain transfer reactions, e.g., TED, bis(2,2,6,6-tetramethylpiperidin-1-yl)disulfide, etc. Further, the technology comprises use of photoinhibitor compounds that absorb at wavelength ranges that are compatible and complementary with many photoinitiation sensitizers. The present technology does not comprise use of compounds that release small molecules upon photocleavage, e.g., gases or other compounds that compromise polymerized structures. As described herein, photocleavage of the photoinhibitors is reversible and reformation of the photoinhibitor compound has fast back reaction kinetics (e.g., a HABI photoinhibitor (e.g., a bridged HABI photoinhibitor)).

Although the disclosure herein refers to certain illustrated embodiments, it is to be understood that these embodiments are presented by way of example and not by way of limitation.

Hexaarylbiimidazole (HABI) Compounds

Figure 4A:
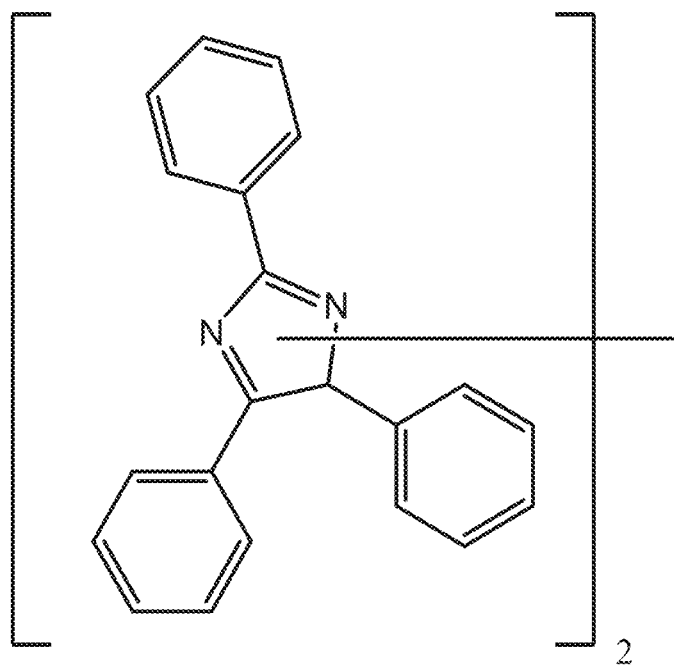
FIG. 4A shows a generic structure of a hexaarylbiimidazole (HABI) compound showing its dimeric structure comprising two imidazolyl moieties connected by a bond between the imidazole ring structures. The bond can connect C to N, C to C, or N to N.
Figure 4B:
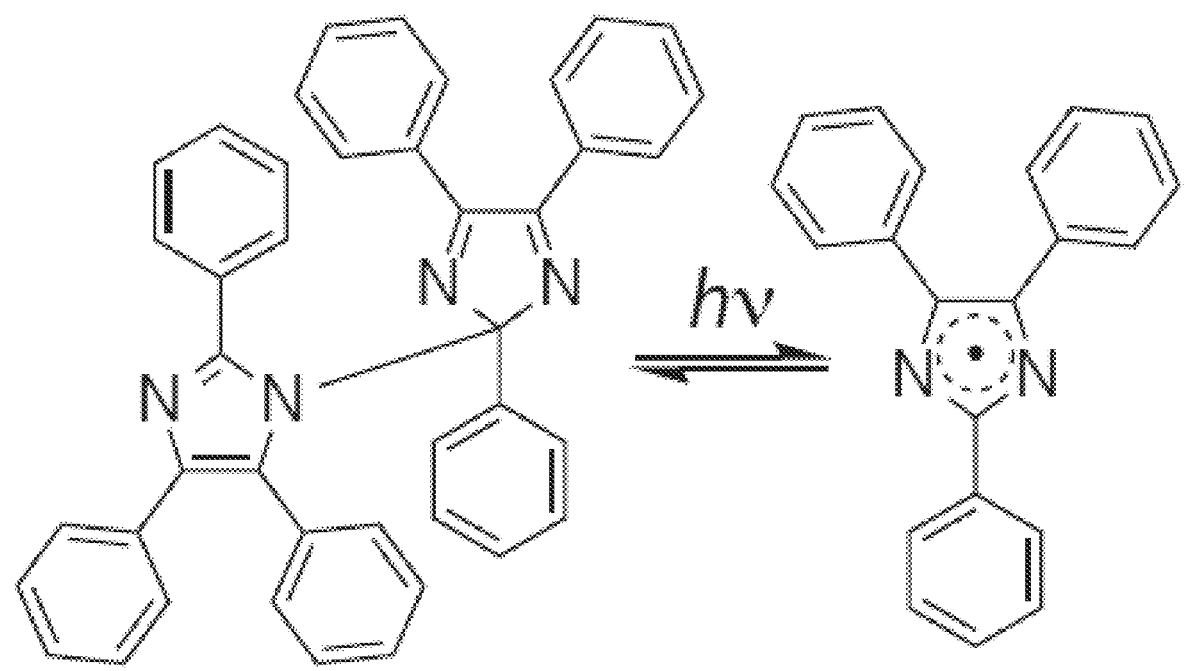
FIG. 4B shows the structure of a HABI compound and the reversible production of radicals from the HABI compound by light.
Figure 6:
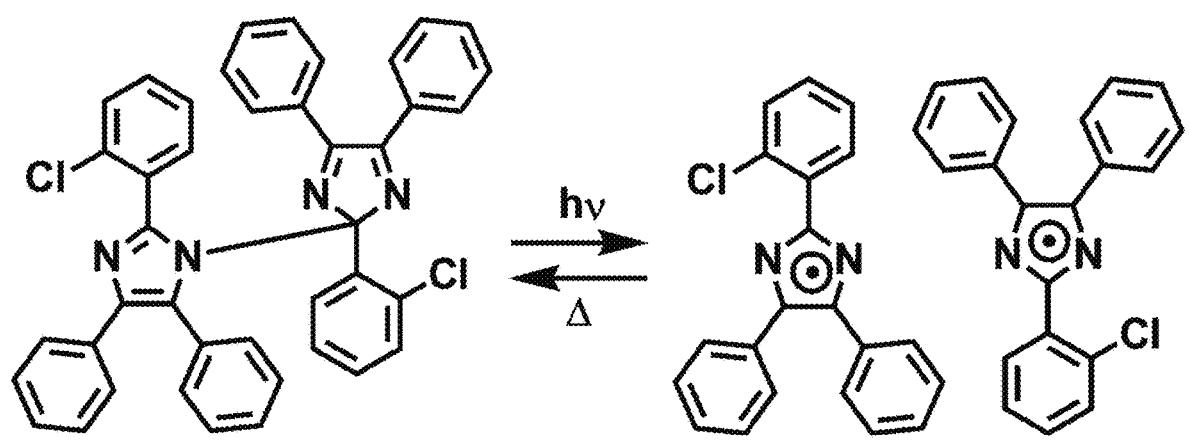
FIG. 6 shows the structure of o-Cl-HABI and the reversible production of radicals from o-Cl-HABI by light.

In some embodiments, the technology relates to the use of a hexaarylbiimidazole (HABI) compound as a photoactivated inhibitor of polymerization ("photoinhibitor"). Hexaarylbiimidazole (HABI) was developed in the 1960s as a photochromic molecule by Hayashi and Maeda (see, e.g., Hayashi and Maeda (1960) "Preparation of a new phototropic substance" Bull. Chem. Soc. Jpn. 33(4): 565-66, incorporated herein by reference). The general structure of a HABI compound is shown in FIG. 4A and one particular HABI compound is shown on the left in FIG. 4B. FIG. 4B shows: i) the light-induced homolytic cleavage of the HABI C—N bond to produce two radicals (e.g., triphenylimidazolyl radicals ("TPIR"), also known as lophyl radicals); and ii) recombination of the two radicals in the "back reaction" to reform the HABI imidazole dimer (accordingly, also called a triphenylimidazolyl dimer "TPID"). The recombination "back reaction" is driven by thermal energy and radical diffusion. The lophyl radical has a large absorption band in the visible region of the electromagnetic spectrum, whereas HABI absorbs strongly in the UV region and weakly in the blue region of the electromagnetic spectrum and is therefore either colorless or yellow. Consequently, HABI generates a colored radical species upon UV light irradiation and the radicals slowly reform to produce the colorless HABI imidazole dimer when light irradiation is stopped. FIG. 6 shows o-chlorohexaarylbiimidazole (o-Cl-HABI), the light-induced reaction forming the chloro-triphenylimidizolyl radicals, and the thermally driven back reaction to reform the o-Cl-HABI. The halflife of the radicals formed in this reaction is approximately tens of seconds (e.g., approximately 10 s). Thus, in some embodiments, the technology relates to an o-chlorohexaarylbiimidazole (o-Cl-HABI) that has a half-life of approximately tens of seconds (e.g., approximately 10 s).

Cleavage of the HABI C—N bond by UV irradiation occurs in less than 100 fs and is thus nearly (e.g., substantially, effectively) instantaneous; recombination of the radicals to reform HABI is a second order reaction that occurs over a time of up to a few minutes at room temperature. Thus, the lophyl radicals formed from HABI have a half-life of tens of seconds to several (e.g., 5 to 10 or more) minutes (see, e.g., Satoh et al. (2007) "Ultrafast laser photolysis study on photodissociation dynamics of a hexaarylbiimidazole derivative" Chem. Phys. Lett. 448 (4-6): 228-31; Sathe, et al. (2015) "Re-examining the Photomediated Dissociation and Recombination Kinetics of Hexaarylbiimidazoles" Ind. Eng. Chem. Res. 54 (16): 4203-12, each of which is incorporated herein by reference). HABI has been known as a photoinitiator, e.g., for imaging and photoresists. HABI compounds do not initiate on their own upon formation of radicals. When used as a photoinitiator, the radical abstracts hydrogen atoms from coinitiator thiol groups (e.g., a crystal violet precursor) to form an initiating moiety. See, e.g., Dessauer, R. (2006) Photochemistry History and Commercial Applications of Heaarylbiimidazoles, Elsevier.

As noted above, HABI compounds do not exhibit photoinitiation activity when irradiated. Moreover, HABI compounds do not participate in chain transfer reactions and thus polymerization rates are not inherently retarded by the presence of HABI compounds. Finally, HABI compounds typically exhibit very weak absorbance in the blue region of the electromagnetic spectrum and moderately absorb in the near-UV region of the electromagnetic spectrum, thus complementing the absorbance spectrum of several photoinitiators activated by blue light.

In some embodiments, the technology relates to use of a bridged HABI. See, e.g., Iwahori et al. (2007) "Rational design of a new class of diffusion-inhibited HABI with fast back-reaction" J Phys Org Chem 20: 857-63; Fujita et al. (2008) "Photochromism of a radical diffusion-inhibited hexaarylbiimidazole derivative with intense coloration and fast decoloration performance" Org Lett 10: 3105-08; Kishimoto and Abe (2009) "A fast photochromic molecule that colors only under UV light" J Am Chem Soc 131: 4227-29; Harada et al. (2010) "Remarkable acceleration for back-reaction of a fast photochromic molecule" J Phys Chem Lett 1: 1112-15; Mutoh et al. (2010) "An efficient strategy for enhancing the photosensitivity of photochromic [2.2]paracyclophane-bridged imidazole dimers" J Photopolym Sci Technol 23: 301-06; Kimoto et al. (2010) "Fast photochromic polymers carrying [2.2]paracyclophane-bridged imidazole dimer" Macromolecules 43: 3764-69; Hatano et al. (2010) "Unprecedented radical-radical reaction of a [2.2]paracyclophane derivative containing an imidazolyl radical moiety" Org Lett 12: 4152-55; Hatano et al. (2011) "Reversible photogeneration of a stable chiral radical-pair from a fast photochromic molecule" J Phys Chem Lett 2: 2680-82; Mutoh and Abe (2011) "Comprehensive understanding of structure-photosensitivity relationships of photochromic [2.2]paracyclophane-bridged imidazole dimers" J Phys Chem A 115: 4650-56; Takizawa et al. (2011) "Photochromic organogel based on [2.2]paracyclophane-bridged imidazole dimer with tetrapodal urea moieties" Dyes Pigm 89: 254-59; Mutoh and Abe (2011) "Photochromism of a water-soluble vesicular[2.2]paracyclophane bridged imidazole dimer" Chem Comm 47:8868-70; Yamashita and Abe (2011) "Photochromic properties of [2.2]paracyclophane-bridged imidazole dimer with increased photosensitivity by introducing pyrenyl moiety" J Phys Chem A 115: 13332-37; Kawai et al. (2012) "Entropy-controlled thermal back-reaction of photochromic [2.2]paracyclophane-bridged imidazole dimer" Dyes Pigm 92: 872-76; Mutoh et al. (2012) "Spectroelectrochemistry of a photochromic[2.2]paracyclophane-bridged imidazole dimer: Clarification of the electrochemical behavior of HABI" J Phys Chem A 116: 6792-97; Mutoh et al. (2013) "Photochromism of a naphthalene-bridged imidazole dimer constrained to the 'anti' conformation" Org Lett 15: 2938-41; Shima et al. (2014) "Enhancing the versatility and functionality of fast photochromic bridged-imidazole dimers by flipping imidazole ring" J Am Chem Soc 136: 3796-99; Iwasaki et al. (2014) "A chiral BINOL-bridged imidazole dimer possessing sub-millisecond fast photochromism" Chem Commun 50: 7481-84; and Yamaguchi et al. (2015) "Nanosecond photochromic molecular switching of a biphenyl-bridged imidazole dimer revealed by wide range transient absorption spectroscopy" Chem Commun 51: 1375-78, each of which is incorporated herein by reference in its entirety.

Similar to the conventional HABI molecules, the bridged HABI molecules form radicals instantaneously upon exposure to UV light. However, the radicals are linked by a covalent bond (e.g., one or more covalent bonds and/or, e.g., an R group), which prevents diffusion of the radicals away from one another and thus accelerates the thermally driven reformation of the bridged HABI molecule. Accordingly, the bridged HABI molecules instantaneously produce radicals upon UV light irradiation and the radicals rapidly disappear when UV irradiation is stopped.

As used herein, the term "bridged HABI" refers to a HABI molecule in which the triphenylimidazolyl radicals are linked (e.g., by one or more covalent bonds or by an R group) to each other such that they do not diffuse away from one another upon hemolytic cleavage of the bond connecting the imidazole centers (e.g., by light). As used herein, the term "X-bridged HABI", where "X" refers to an R group (e.g., moiety, chemical group, etc.), refers to a HABI wherein the imidazolyl moieties are linked by the R group. See, e.g., FIGS. 5A, 5B, 5C, and 5D.

In an exemplary embodiment, the half-life of the radicals formed from a naphthalene-bridged HABI and a [2.2]paracyclophane-bridged HABI dimer are approximately 830 ms and 33 ms at 25° C. in benzene, respectively. See, e.g., Iwahori et al. (2007) "Rational design of a new class of diffusion-inhibited HABI with fast back-reaction" J Phys Org Chem 20: 857-63; Fujita et al. (2008) "Photochromism of a radical diffusion-inhibited hexaarylbiimidazole derivative with intense coloration and fast decoloration performance" Org Lett 10: 3105-08; Kishimoto and Abe (2009) "A fast photochromic molecule that colors only under UV light" J Am Chem Soc 131: 4227-29, each of which is incorporated herein in its entirety.

Additional exemplary embodiments relate to use of a HABI in which the imidazole moieties are linked by a 1,1'-bi-naphthol bridge. The 1,1'-bi-naphthol-bridged HABI has a half-life of approximately 100 µs. See, e.g., Iwasaki et al. (2014) "A chiral BINOL-bridged imidazole dimer possessing sub-millisecond fast photochromism" Chem Commun 50: 7481-84, incorporated herein by reference. In some embodiments, the technology relates to use of a HABI comprising a bond linking the imidazolyl groups (e.g., a bond links the imidazolyl groups; see, e.g., FIG. 5D) that has a half-life of approximately 100 ns, which is the fastest thermal back reaction for a HABI compound presently known in the art. See, e.g., Yamaguchi et al. (2015) "Nanosecond photochromic molecular switching of a biphenyl-bridged imidazole dimer revealed by wide range transient absorption spectroscopy" Chem Commun 51: 1375-78, incorporated herein by reference in its entirety. In some embodiments, the bridged HABI comprises a cyclophane (see, e.g., FIG. 5E).

Accordingly, the technology relates in some embodiments to use of bridged HABI molecules as photoactivatable inhibitors of polymerization. In some embodiments, the bridged HABI molecules form a radical upon irradiation by light (e.g., at an appropriate wavelength to form a radical from the HABI). In some embodiments, the radical rapidly disappears upon stopping the irradiation by light. For example, embodiments relate to a bridged HABI that forms a radical having a half-life of approximately 100 ns to 100 µs to 100 ms to 100 s (e.g., 10, 20, 30, 40, 50, 60, 70, 80, 90, 100, 200, 300, 400, 500, 600, 700, 800, 900, or 1000 ns; 10, 20, 30, 40, 50, 60, 70, 80, 90, 100, 200, 300, 400, 500, 600, 700, 800, 900, or 1000 µs; 10, 20, 30, 40, 50, 60, 70, 80, 90, 100, 200, 300, 400, 500, 600, 700, 800, 900, or 1000 ms; or 0, 20, 30, 40, 50, 60, 70, 80, 90, 100, 200, 300, 400, 500, 600, 700, 800, 900, or 1000 s). That is, after formation of the radical by irradiation of the bridged HABI at the appropriate wavelength, the radical rapidly reforms the bridged HABI upon stopping the irradiation. Consequently, the radical is only formed in the region irradiated by the appropriate wavelength to form a radical from the HABI.

Accordingly, the technology provided herein relates to photoinhibitors that are activated by light to form a polymerization inhibiting species and that have a fast back reaction that reforms the inactive photoinhibitor from the polymerization inhibiting species. When not activated by light (e.g., in the inactive state), the photoinhibitors do not have inhibiting activity and do not have initiating activity; when activated by light, the photoinhibitors form an inhibiting species that inhibits polymerization and that does not initiate polymerization. Accordingly, the technology provided herein relates to photoinhibition that is quickly turned "on" and quickly turned "off" by the presence and absence of light and that does not have undesirable inhibition and/or initiation activities.

In some embodiments, the photoinhibitor compounds of the technology (e.g., compounds having fast back reaction kinetics and/or HABI (e.g., bridged HABI compounds)) do not exhibit photoinitiation activity when irradiated (e.g., when photoactivated) and thus only exhibit photoinhibition when irradiated (e.g., when photoactivated). Moreover, in some embodiments, the non-photoactivated photoinhibitor compounds of the technology do not retard polymerization rates (e.g., by chain transfer reactions).

In some embodiments, the photoinhibitor compounds are precise photoinhibitor compounds.

In some embodiments, the photoinhibitor compounds are precise photoinhibitor compounds having fast back reaction kinetics.

Finally, in some embodiments, the photoinhibitor compounds of the technology typically exhibit very weak or zero absorbance in the blue region of the electromagnetic spectrum and moderately absorb in the near-UV region of the electromagnetic spectrum, thus complementing the absorbance spectra of several photoinitiators activated by blue light.

Like HABI compounds, bridged HABI compounds do not exhibit photoinitiation activity when irradiated. Moreover, bridged HABI compounds do not participate in chain transfer reactions and thus polymerization rates are not inherently retarded by the presence of HABI compounds. Finally, bridged HABI compounds typically exhibit very weak absorbance in the blue region of the electromagnetic spectrum and moderately absorb in the near-UV region of the electromagnetic spectrum, thus complementing the absorbance spectrum of several photoinitiators activated by blue light. Finally, bridged HABI compounds exhibit fast back reaction kinetics.

Compositions

The technology relates to compositions for producing a polymer, e.g., to produce a patterned article of manufacture, e.g., for three-dimensional (3D) printing, etc. In particular, the technology relates to producing a polymer from polymerizable monomers (e.g., from a "resin"). The technology is not limited in the polymerizable monomer used provided that polymerization of the monomer is initiated by a radical formed from the photoinitiator and polymerization of the monomer is inhibited by a radical formed from the photoinhibitor compound having fast back reaction kinetics (e.g., a HABI photoinhibitor (e.g., a bridged HABI photoinhibitor)). That is, embodiments provide that polymerization of the monomers occurs where the photoinitiator is activated by a first wavelength of light and polymerization of the monomers does not occur where the photoinhibitor compound having fast back reaction kinetics (e.g., a HABI photoinhibitor (e.g., a bridged HABI photoinhibitor)) is activated by a second wavelength of light.

Accordingly, embodiments relate to compositions comprising a monomer, a photoinitiator, and a photoinhibitor (e.g., a photoinhibitor compound having fast back reaction kinetics (e.g., a HABI photoinhibitor (e.g., a bridged HABI photoinhibitor))). In some embodiments, compositions further comprise one or more light absorbing dyes. In some embodiments, compositions further comprise one or more coinitiators. In some embodiments, compositions comprise one or more solvents.

Figure 5A:
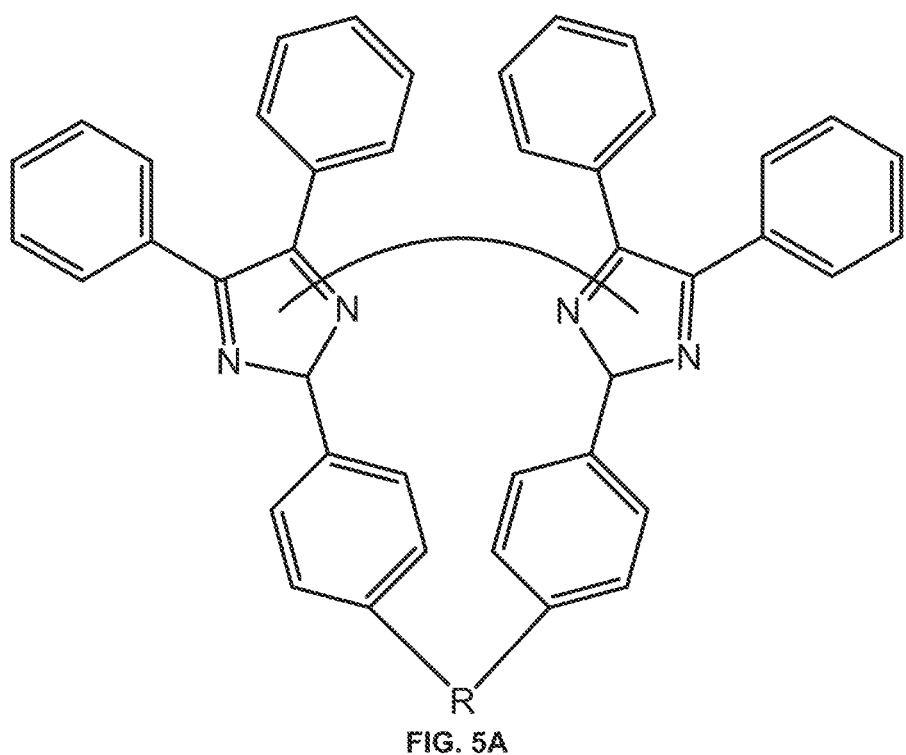
FIG. 5A shows the structure of a generic bridged HABI compound. The structure shows the connection between imidazolyl moieties by an R moiety, which can be any chemical group or linkage to connect the two imidazolyl moieties. The imidazolyl moieties are connected, in some embodiments, directly by a bond. The bond (curved line) between the imidazole ring structures can connect C to N, C to C, or N to N.
Figure 5B:
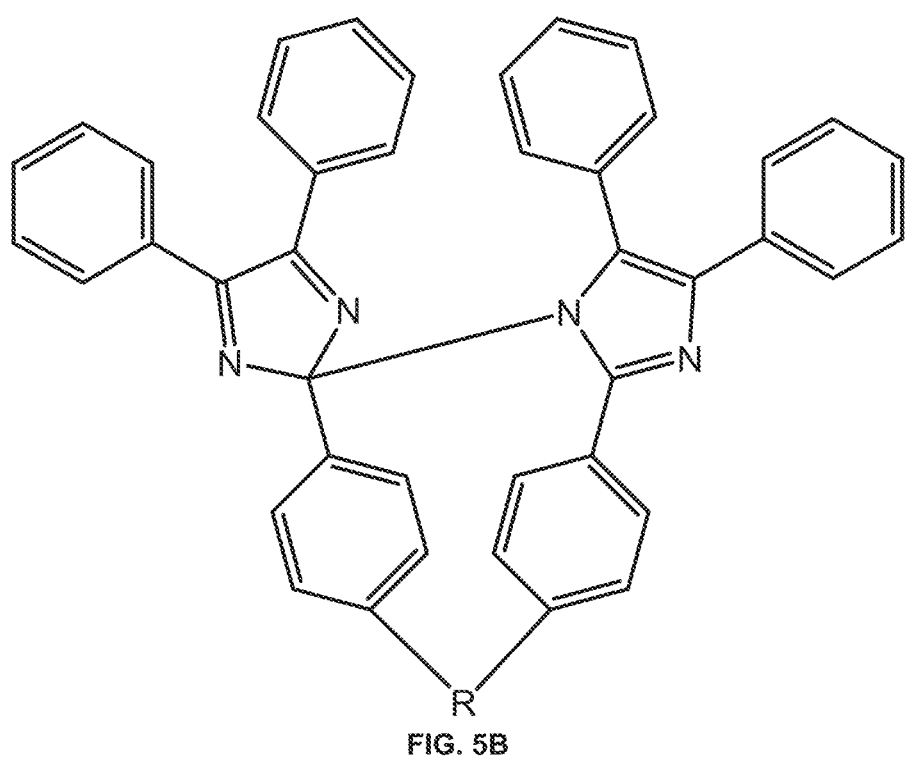
FIG. 5B shows the structure of a particular bridged HABI compound. The structure shows the connection between imidazolyl moieties by an R moiety, which can be any chemical group or linkage to connect the two imidazolyl moieties. The imidazolyl moieties are connected, in some embodiments, directly by a bond. The bond between the imidazole ring structures connects a C to an N.
Figure 5C:
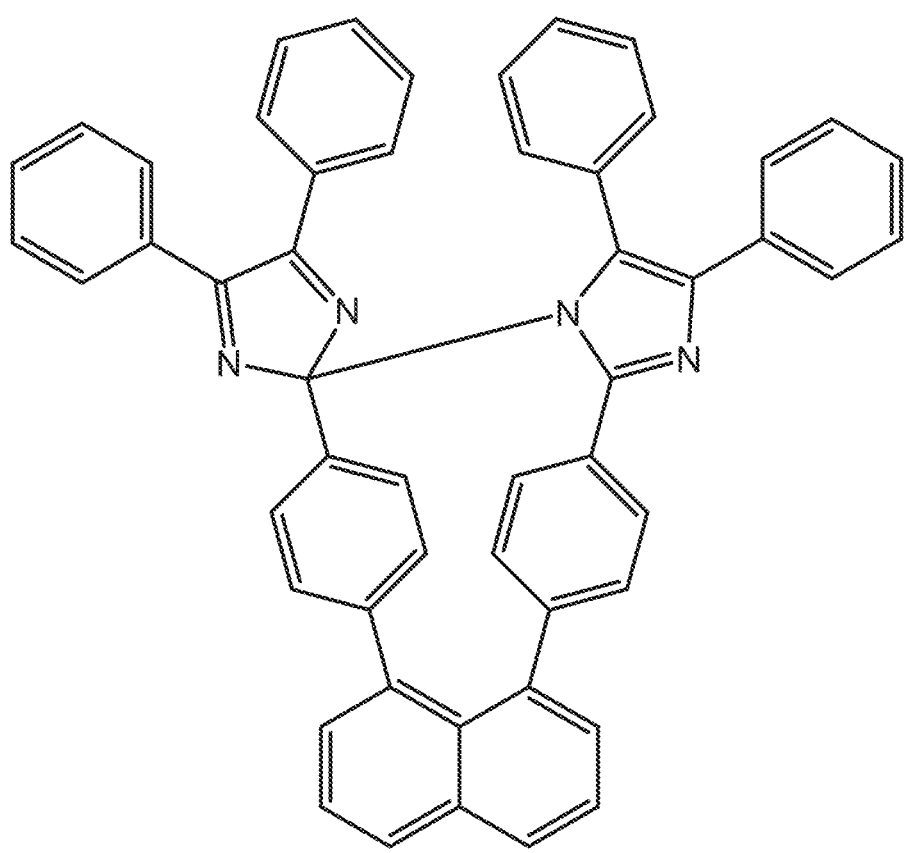
FIG. 5C shows the structure of a particular bridged HABI compound. The structure shows a naphthalene bridging the imidazolyl moieties (e.g., the R group is a naphthyl). The bond between the imidazole ring structures connects a C to an N.
Figure 5D:
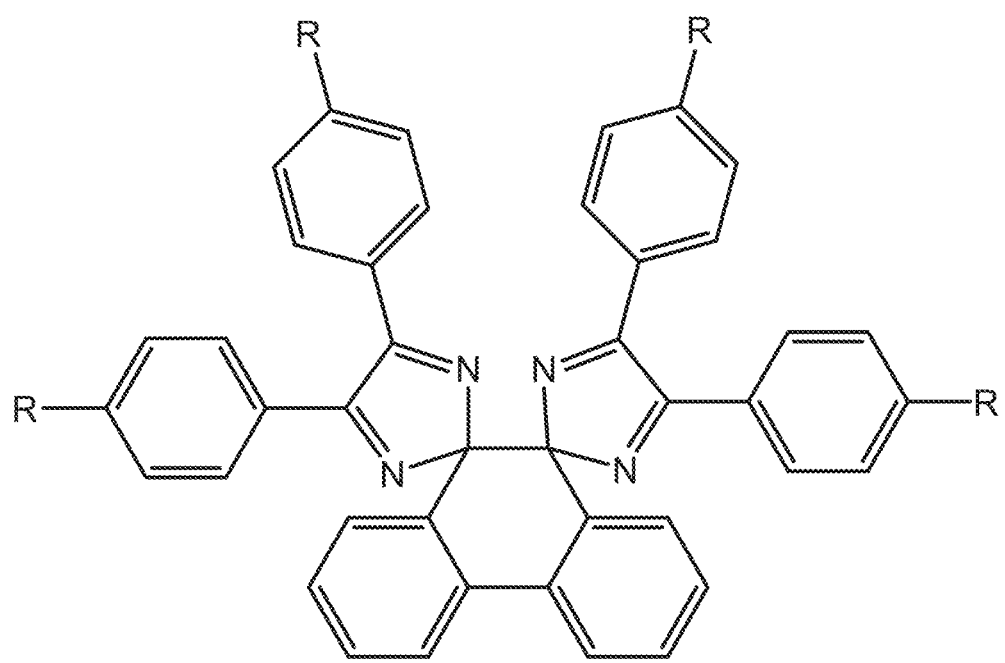
FIG. 5D shows the structure of a bridged HABI compound. The structure shows the connection between imidazolyl moieties by a bond. The bond between the imidazole ring structures connects C to C. Each of the R groups is independently selected from any substituent described herein. In some embodiments, the R is a methoxy.
Figure 5E:
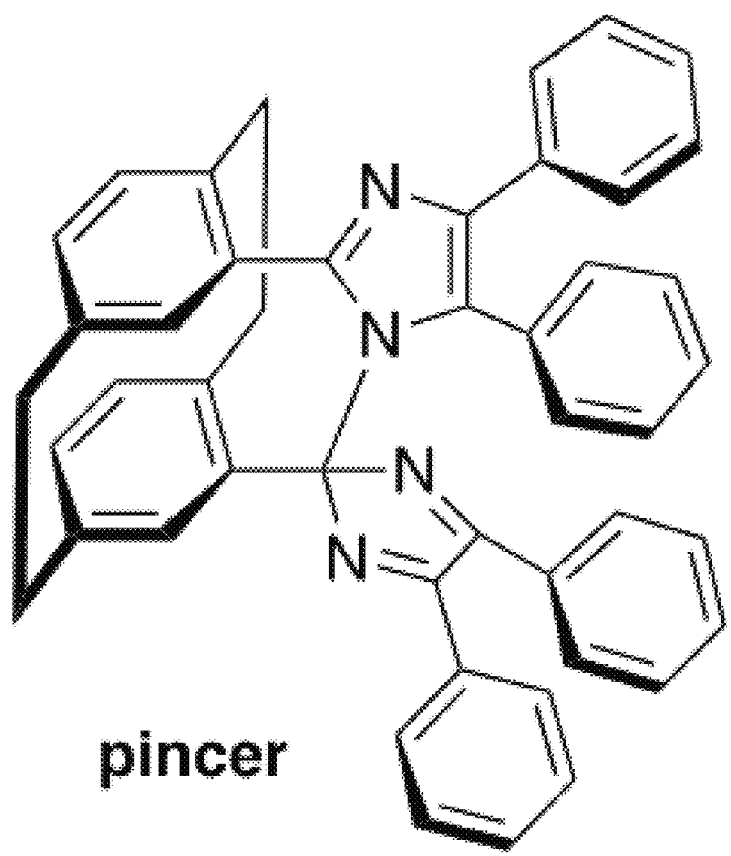
FIG. 5E shows the structure of a bridged HABI compound. The structure shows the connection between imidazolyl moieties by a cyclophane.

Embodiments of compositions comprise a photoinhibitor compound having fast back reaction kinetics (e.g., a HABI photoinhibitor (e.g., a bridged HABI photoinhibitor)). See, e.g., FIGS. 5A and 5B, in which the R group is any group that covalently links the two triphenylimidazolyl groups; FIG. 5C; and FIG. 5D, in which a bond links the imidazolyl groups and each R is a substituent (e.g., in some embodiments a methoxy). See, e.g., FIG. 5C showing a bridged HABI photoinhibitor in which the R group is naphthalene and FIG. 5D showing a bridged HABI photoinhibitor in which the phenyl groups are directly linked by a bond. See, e.g., FIG. 5E showing a bridged HABI photoinhibitor in which the R group is a cyclophane (e.g., a cyclophane links the imidazolyl groups).

The bridged HABI photoinhibitor may be one known in the art, as described herein, or a substituted variation thereof (e.g., comprising one or more moieties (e.g., an alkyl, halogenated alkyl, alkoxyalkyl, alkylamino, cycloalkyl, heterocycloalkyl, polyalkylene, alkoxyl, alkenyl, cycloalkenyl, alkynyl, cycloalkynyl, aryl, heteroaryl, aldehyde, amino, halo, or thio) on one or more phenyl rings and/or on the R group).

In some embodiments, the technology provides a composition comprising a photoinhibitor compound having fast back reaction kinetics (e.g., a HABI photoinhibitor (e.g., a bridged HABI photoinhibitor)) at approximately 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %.

The technology relates to compositions comprising any suitable polymerizable liquid. In some embodiments, the liquid (also referred to as "resin" herein) comprises monomers, particularly a photopolymerizable and/or free radical polymerizable monomers, and a suitable initiator such as a free radical initiator, and combinations thereof. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cute site monomers, functionalized PEGs, etc., including combinations thereof. In some embodiments, polymerizable monomers include, but are not limited to, monomeric, dendritic, and oligomeric forms of acrylates, methacrylates, vinyl esters, styrenics, other vinylic species, and mixtures thereof. Examples of liquid resins, monomers, and initiators include, but are not limited to, those described in U.S. Pat. Nos. 8,232,043; 8,119,214; 7,935,476; 7,767,728; 7,649,029; in Int'l Pat. Pub. No. WO 2012129968 A1; in Chinese patent application CN 102715751 A; and in Japanese patent application JP 2012210408A, each of which is incorporated herein by reference.

In particular, embodiments provide compositions comprising a monomer such as, e.g., hydroxyethyl methacrylate; n-lauryl acrylate; tetrahydrofurfuryl methacrylate; 2,2,2-trifluoroethyl methacrylate; isobornyl methacrylate; polypropylene glycol monomethacrylates, aliphatic urethane acrylate (e.g., RAHN GENOMER 1122); hydroxyethyl acrylate; n-lauryl methacrylate; tetrahydrofurfuryl acrylate; 2,2,2-trifluoroethyl acrylate; isobornyl acrylate; polypropylene glycol monoacrylates; trimethylpropane triacrylate; trimethylpropane trimethacrylate; pentaerythritol tetraacrylate; pentaerythritol tetraacrylate; triethylene glycol diacrylate; triethylene glycol dimethacrylate; tetrathylene glycol diacrylate; tetrathylene glycol dimethacrylate; neopentyldimethacrylate; neopentylacrylate; hexane dioldimethacylate; hexane diol diacrylate; polyethylene glycol 400 dimethacrylate; polyethylene glycol 400 diacrylate; diethylglycol diacrylate; diethylene glycol dimethacrylate; ethylene glycol diacrylate; ethylene glycol dimethacrylate; ethoxylated bis phenol A dimethacrylate; ethoxylated bis phenol A diacrylate; bisphenol A glycidyl methacrylate; bisphenol A glycidyl acrylate; ditrimethylolpropane tetraacrylate; or ditrimethylolpropane tetraacrylate.

Particular embodiments provide compositions comprising an acrylate monomer, e.g., an acrylate monomer, a methacrylate monomer, etc. In some embodiments, the acrylate monomer is an acrylate monomer such as, but not limited to, (meth)acrylic acid monomers such as (meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-pentyl(meth)acrylate, n-hexyl(meth) acrylate, cyclohexyl(meth)acrylate, n-heptyl(meth)acrylate, n-octyl(meth) acrylate, 2-ethylhexyl(meth)acrylate, nonyl(meth)acrylate, decyl(meth)acrylate, dodecyl(meth)acrylate, phenyl(meth)acrylate, toluoyl(meth)acrylate, benzyl(meth)acrylate, 2-methoxyethyl(meth)acrylate, 3-methoxybutyl(meth)acrylate, 2-hydroxyethyl(meth) acrylate, 2-hydroxypropyl(meth)acrylate, stearyl(meth)acrylate, glycidyl(meth)acrylate, 2-aminoethyl(meth)acrylate, 3-(methacryloyloxypropyl) trimethoxysilane, (meth)acrylic acid-ethylene oxide adducts, trifluoromethylmethyl(meth)acrylate, 2-trifluoromethylethyl(meth)acrylate, 2-perfluoroethylethyl(meth) acrylate, 2-perfluoroethyl-2-perfluorobutylethyl(meth)acrylate, 2-perfluoroethyl(meth) acrylate, perfluoromethyl(meth) acrylate, diperfluoromethylmethyl(meth)acrylate, 2-perfluoromethyl-2-perfluoroethylethyl(meth)acrylate, 2-perfluorohexylethyl(meth)acrylate, 2-perfluorodecylethyl(meth) acrylate and 2-perfluorohexadecylethyl(meth)acrylate.

Some embodiments provide a composition comprising n-butyl acrylate, methyl methacrylate, 2-ethylhexyl acrylate, methyl acrylate, tert-butyl acrylate, 2-hydroxyethyl acrylate, glycidyl methacrylate, or a combination thereof. However, embodiments of the technology encompass compositions comprising any acrylate or (meth)acrylate.

In some embodiments, the technology provides a composition comprising a monomer at approximately 1 to 99.99 wt % (e.g., approximately 1, 2, 3, 4, 5, 6, 7, 8, 9, 10, 15, 20, 25, 30, 35, 40, 45, 50, 55, 60, 65, 70, 75, 80, 85, 90, 91, 92, 93, 94, 95, 96, 97, 98, 99, 99.1, 99.2. 99.3, 99.4, 99.5, 99.6, 99.7, 99.8, 99.9, 99.95, to 99.99 wt %).

Embodiments of the technology provide a composition comprising a photoinitiator. The technology is not limited in the photoinitiator provided it is chemically compatible with the photoinhibitor compound having fast back reaction kinetics (e.g., a HABI photoinhibitor (e.g., a bridged HABI photoinhibitor)) described herein. Further, embodiments relate to use of a photoinitiator that is optically compatible with the photoinhibitor compound having fast back reaction kinetics (e.g., a HABI photoinhibitor (e.g., a bridged HABI photoinhibitor)) described herein. In particular, the technology comprises use of a photoinitiator that is activated by a wavelength of light that is different than the wavelength of light that activates the photoinhibitor compound having fast back reaction kinetics (e.g., a HABI photoinhibitor (e.g., a bridged HABI photoinhibitor)).

Accordingly, the technology comprises use of a wide variety of photoinitiator compounds and irradiation conditions for activating the photoinitiator to effect the photoinitiation process. Non-limiting examples of the photoinitiator include benzophenones, thioxanthones, anthraquinones, camphorquinones, thioxanthones, benzoylformate esters, hydroxyacetophenones, alkylaminoacetophenones, benzil ketals, dialkoxyacetophenones, benzoin ethers, phosphine oxides, acyloximino esters, alphahaloacetophenones, trichloromethyl-S-triazines, titanocenes, dibenzylidene ketones, ketocoumarins, dye sensitized photoinitiation systems, maleimides, and mixtures thereof. Particular examples of photoinitiators include, e.g., 1-hydroxy-cyclohexyl-phenyl-ketone (IRGACURE 184; BASF, Hawthorne, N.J.); a 1:1 mixture of 1-hydroxy-cyclohexyl-phenyl-ketone and benzophenone (IRGACURE 500; BASF); 2-hydroxy-2-methyl-1-phenyl-1-propanone (DAROCUR 1173; BASF); 2-hydroxy-1-[4-(2-hydroxyethoxy)phenyl]-2-methyl-1-propanone (IRGACURE 2959; BASF); methyl benzoylformate (DAROCUR MBF; BASF); oxy-phenyl-acetic acid 2-[2-oxo-2-phenyl-acetoxy-ethoxy]-ethyl ester; oxy-phenyl-acetic 2-[2-hydroxy-ethoxy]-ethyl ester; a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester (IRGACURE 754; BASF); alpha,alpha-dimethoxy-alpha-phenylacetophenone (IRGACURE 651; BASF); 2-benzyl-2-(dimethylamino)-1-[4-(4-morpholinyl)-phenyl]-1-butanone (IRGACURE 369; BASF); 2-methyl-1-[4-(methylthio)phenyl]-2-(4-morpholinyl)-1-propanone (IRGACURE 907; BASF); a 3:7 mixture of 2-benzyl-2-(dimethylamino)-1-[4-(4-morpholinyl) phenyl]-1-butanone and alpha,alpha-dimethoxy-alpha-phenylacetophenone per weight (IRGACURE 1300; BASF); diphenyl-(2,4,6-trimethylbenzoyl) phosphine oxide (DAROCUR TPO; BASF); a 1:1 mixture of diphenyl-(2,4,6-trimethylbenzoyl)-phosphine oxide and 2-hydroxy-2-methyl-1-phenyl-1-propanone (DAROCUR 4265; BASF); phenyl bis(2,4,6-trimethyl benzoyl) phosphine oxide, which may be used in pure form (IRGACURE 819; BASF, Hawthorne, N.J.) or dispersed in water (45% active, IRGACURE 819DW; BASF); 2:8 mixture of phosphine oxide, phenyl bis(2,4,6-trimethyl benzoyl) and 2-hydroxy-2-methyl-1-phenyl-1-propanone (IRGACURE 2022; BASF); IRGACURE 2100, which comprises phenyl-bis(2,4,6-trimethylbenzoyl)-phosphine oxide); bis-(eta 5-2,4-cyclopentadien-1-yl)-bis-[2,6-difluoro-3-(1H-pyrrol-1-yl) phenyl]-titanium (IRGACURE 784; BASF); (4-methylphenyl) [4-(2-methylpropyl)phenyl]-iodonium hexafluorophosphate (IRGACURE 250; BASF); 2-(4-methylbenzyl)-2-(dimethylamino)-1-(4-morpholinophenyl)-butan-1-one (IRGACURE 379; BASF); 4-(2-hydroxyethoxy)phenyl-(2-hydroxy-2-propyl)ketone (IRGACURE 2959; BASF); bis-(2,6-dimethoxybenzoyl)-2,4,4-trimethylpentylphosphine oxide; a mixture of bis-(2,6-dimethoxybenzoyl)-2,4,4-trimethylpentylphosphine oxide and 2-hydroxy-2-methyl-1-phenyl-propanone (IRGACURE 1700; BASF); 4-Isopropyl-9-thioxanthenone; and mixtures thereof.

In some embodiments, the photoinitiator is used in an amount ranging from approximately 0.01 to approximately 25 weight percent (wt %) of the composition (e.g., from approximately 0.1 to approximately 3.0 wt % of the composition (e.g., approximately 0.2 to 0.5 wt % of the composition)). In some embodiments, the technology provides a composition comprising a photoinitiator at approximately 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %.

Embodiments of the technology provide a composition further comprising a coinitiator, e.g., to enhance the polymerization rate, extent, quality, etc. The technology is not limited in the coinitiator. Non-limiting examples of co-initiators include primary, secondary, and tertiary amines; alcohols; and thiols. Particular examples of coinitiators include, e.g., dimethylaminobenzoate, isoamyl 4-(dimethylamino)benzoate, 2-ethylhexyl 4-(dimethylamino)benzoate; ethyl 4-(dimethylamino)benzoate; 3-(dimethylamino)propyl acrylate; 2-(dimethylamino)ethyl methacrylate; 4-(dimethylamino)benzophenones, 4-(diethylamino)benzophenones; 4,4'-bis(diethylamino)benzophenones; methyl diethanolamine; triethylamine; hexane thiol; heptane thiol; octane thiol; nonane thiol; decane thiol; undecane thiol; dodecane thiol; isooctyl 3-mercaptopropionate; pentaerythritol tetrakis(3-mercaptopropionate); 4,4'-thiobisbenzenethiol; trimethylolpropane tris(3-mercaptopropionate); CN374 (SARTOMER); CN371 (SARTOMER), CN373 (SARTOMER), GENOMER 5142 (RAHN); GENOMER 5161 (RAHN); GENOMER 5271 (RAHN); GENOMER 5275 (RAHN), and TEMPIC (BRUNO BOC, Germany).

In some embodiments, the coinitiator is used in an amount ranging from approximately 0.0 to approximately 25 weight percent (wt %) of the composition (e.g., approximately 0.1 to approximately 3.0 wt % of the composition (e.g., 0.1 to 1.0 wt %) when used in embodiments of the compositions). In some embodiments, the technology provides a composition comprising a coinitiator at approximately 0, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %.

Some embodiments comprise use of a photon absorbing component, e.g., a light blocking dye. In some embodiments, a photon absorbing component is selected in accordance with the wavelengths of the first and second lights. In some embodiments, dyes are used to both attenuate light and to transfer energy to photoactive species increasing the sensitivity of the system to a given wavelength for either or both photoinitiation and photoinhibition processes. In some embodiments, the concentration of the chosen dye is highly dependent on the light absorption properties of the given dye and ranges from approximately 0.001 to approximately 5 weight percent (wt %) of the composition. Useful classes of dyes include compounds commonly used as UV absorbers for decreasing weathering of coatings including, such as, 2-hydroxyphenyl-benzophenones; 2-(2-hydroxyphenyl)-benzotriazoles; and 2-hydroxyphenyl-s-triazines Other useful dyes include those used for histological staining or dying of fabrics. A non-limiting list includes Martius yellow, Quinoline yellow, Sudan red, Sudan I, Sudan IV, eosin, eosin Y, neutral red, and acid red. Pigments can also be used to scatter and attenuate light.

In some embodiments, the photon absorbing component (e.g., a light blocking dye) is used in an amount ranging from approximately 0.0 to approximately 25 weight percent (wt %) of the composition (e.g., approximately 0.1 to approximately 3.0 wt % of the composition (e.g., 0.1 to 1.0 wt %) when used in embodiments of the compositions). In some embodiments, the technology provides a composition comprising a photon absorbing component (e.g., a light blocking dye) at approximately 0, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %.

Some embodiments do not comprise a photon absorbing component (e.g., in some embodiments, compositions are "photoabsorber-free"). In particular, embodiments are provided in which compositions are photoabsorber-free to increase or maximize the penetration of a wavelength of light through a composition as described herein (e.g., comprising a polymerizable monomer, a photoinitiator, and a photoinhibitor compound having fast back reaction kinetics (e.g., a HABI photoinhibitor (e.g., a bridged HABI photoinhibitor))).

In some embodiments, a composition further comprises solid particles suspended or dispersed therein. Any suitable solid particle can be used, depending upon the end product being fabricated. In some embodiments, the solid particles are metallic, organic/polymeric, inorganic, or composites or mixtures thereof. In some embodiments, the solid particles are nonconductive, semi-conductive, or conductive (including metallic and non-metallic or polymer conductors); in some embodiments, the solid particles are magnetic, ferromagnetic, paramagnetic, or nonmagnetic. The particles can be of any suitable shape, including spherical, elliptical, cylindrical, etc.

In some embodiments, a composition comprises a pigment, dye, active compound, pharmaceutical compound, or detectable compound (e.g., fluorescent, phosphorescent, radioactive). In some embodiments, a composition comprises a protein, peptide, nucleic acid (DNA, RNA (e.g., siRNA)), sugar, small organic compound (e.g., drug and drug-like compound), etc., including combinations thereof.

In some embodiments, the compositions are homogenous. The technology is related to forming polymerized structures; accordingly, in some embodiments, the compositions are heterogeneous because the compositions, in some embodiments, comprise polymerized and non-polymerized regions. In some embodiments, compositions of the technology comprise a polymer (e.g., comprising polymerized monomers). In some embodiments, a polymerized region is patterned, localized, etc.

Methods

The technology relates to producing a polymer, e.g., by three-dimensional printing, stereolithography, photofabrication, etc. In some embodiments, methods comprise providing a composition comprising a polymerizable monomer, a photoinitiator, and a photoinhibitor compound having fast back reaction kinetics (e.g., a HABI photoinhibitor (e.g., a bridged HABI photoinhibitor)).

In some embodiments, methods comprise a step of irradiating the composition with a first wavelength of light, e.g., to initiate polymerization of monomers by producing a radical from the photoinitiator. In some embodiments, methods comprise a step of irradiating the composition with a second wavelength of light, e.g., to stop polymerization of monomers by producing a radical from the photoinhibitor compound having fast back reaction kinetics (e.g., a HABI photoinhibitor (e.g., a bridged HABI photoinhibitor)). Thus, in some embodiments, a first wavelength of light is focused on a composition as provided herein, e.g., to polymerize a polymerizable monomer in the composition ("photoinitiation"). In some embodiments, a second, different wavelength of light is focused on a composition as provided herein, e.g., to slow, hinder, and/or stop the polymerization of the polymerizable monomer ("photoinhibition").

In some embodiments, the first wavelength is produced by a first light source, and the second wavelength is produced by a second light source. In some embodiments, the first wavelength and the second wavelength are produced by the same light source. In some embodiments, the first wavelength and second wavelength have emission peak wavelengths that are at least 5 or 10 nm apart from one another (e.g., the emission peak of the first wavelength is at least 5, 6, 7, 8, 9, 10, or more nm apart from the emission peak of the second wavelength).

In particular, as discussed herein, the technology relates to use of a first wavelength to activate a photoinitiator. Activating the photoinitiator produces an initiating moiety (e.g., initiating radicals) from the photoinitiator. The initiating radicals initiate polymerization of the polymerizable monomers. Further, as discussed herein, the technology relates to use of a second wavelength to activate a photoinhibitor. Activating the photoinhibitor produces an inhibiting moiety (e.g., inhibiting radicals) from the photoinhibitor. The inhibiting radicals prevent polymerization of the polymerizable monomers. Accordingly, embodiments of the technology relate to use of: 1) a first wavelength of light that activates the photoinitiator and that does not activate the photoinhibitor; and 2) a second wavelength of light that activates the photoinhibitor and that does not activate the photoinhibitor. Thus, the photoinhibitor, photoinitiator, first wavelength, and second wavelength are chosen such that: 1) the first wavelength of light activates the photoinitiator and does not activate the photoinhibitor; and 2) the second wavelength of light activates the photoinhibitor and does not activate the photoinhibitor.

In some embodiments, the first wavelength is at or near the peak of the absorbance spectrum of the photoinitiator, e.g., within 50 nm (e.g., within 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm) of the peak of the absorbance spectrum of the photoinitiator. In some embodiments, the second wavelength is at or near the peak of the absorbance spectrum of the photoinhibitor, e.g., within 50 nm (e.g., within 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm) of the peak of the absorbance spectrum of the photoinhibitor.

A wavelength of light that is not strongly absorbed penetrates more deeply into a composition comprising an absorbing compound (e.g., a photoinitiator or photoinhibitor) and therefore activates a larger volume of photoactivated compound (e.g., a photoinitiator or photoinhibitor). Accordingly, in some embodiments, the first wavelength is chosen to be a wavelength that activates the photoinitiator, but that is also not strongly absorbed by the photoinitiator; similarly, in some embodiments, the second wavelength is chosen to be a wavelength that activates the photoinhibitor, but that is also not strongly absorbed by the photoinhibitor.

In some embodiments, the first wavelength is not near the peak of the absorbance spectrum of the photoinitiator, e.g., at least 50 nm (e.g., at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm) away from the peak of the absorbance spectrum of the photoinitiator. In some embodiments, the second wavelength is not near the peak of the absorbance spectrum of the photoinhibitor, e.g., at least 50 nm (e.g., within 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm) away from the peak of the absorbance spectrum of the photoinhibitor. Similarly, in some embodiments, the absorbance of the photoinitiator at the first wavelength is less than 25% (e.g., less than 25, 24, 23, 22, 21, 20, 19, 18, 17, 16, 15, 14, 13, 12, 11, 10, 9, 8, 7, 6, 5, 4.5, 4, 3.5, 3, 2.5, 2, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1, or 0.05%) of the absorbance of the photoinitiator at the wavelength of the absorbance peak of the photoinitiator. And, in some embodiments, the absorbance of the photoinhibitor at the second wavelength is less than 25% (e.g., less than 25, 24, 23, 22, 21, 20, 19, 18, 17, 16, 15, 14, 13, 12, 11, 10, 9, 8, 7, 6, 5, 4.5, 4, 3.5, 3, 2.5, 2, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1, or 0.05%) of the absorbance of the photoinhibitor at the wavelength of the absorbance peak of the photoinhibitor.

In some embodiments, a first light source initiates polymerization of monomers in a polymerizable composition. Further, a second light source providing a different wavelength of light is provided to inhibit (e.g., prevent) and spatially restrict polymerization of monomers in the polymerizable composition. In some embodiments, the first and second light sources irradiate overlapping regions of the composition. In some embodiments, the first and second light sources irradiate adjacent regions of the composition. In some embodiments, the first and second light sources irradiate different regions of the composition.

In some embodiments, light is provided in a pattern. In some embodiments, the first wavelength of light is provided as a pattern. In some embodiments, the second wavelength of light is provided as a pattern. The first and second wavelengths may be provided in patterns that are the same or different. In some embodiments, the methods comprise irradiating a composition as described herein with a pattern of a first wavelength of light. In some embodiments, the methods comprise irradiating a composition as described herein with a pattern of a second wavelength of light. In some embodiments, different patterns of light for two different wavelengths of light are used. In some embodiments, the patterns overlap in different configurations. In some embodiments, the methods comprise irradiating a composition as described herein with a first pattern of a first wavelength of light. In some embodiments, the methods comprise irradiating a composition as described herein with a second pattern of a second wavelength of light.

In some embodiments, the shape and/or size of a polymerized region is determined by the difference of the photoinitiating pattern of the first light source and the photoinhibiting pattern of the second light source.

In some embodiments, methods comprise irradiating a composition provided herein with a light of a first wavelength and a light of a second wavelength. In some embodiments, the methods comprise moving a first wavelength of light and a second wavelength of light to move the region of the composition irradiated by the first wavelength, second wavelength, and/or both the first and second wavelengths, e.g., as a function of time. Accordingly, irradiating the composition with the first and second wavelengths produces arbitrary three-dimensional objects comprising polymer.

In some embodiments, photoinhibition of polymerization is rapidly eliminated in the absence of the photoinhibition irradiation wavelength because the photoinhibitor compound having fast back reaction kinetics (e.g., a HABI photoinhibitor (e.g., a bridged HABI photoinhibitor)) reforms from the inhibiting radical with a half-life of approximately 100 ns to 100 µs to 100 ms to 100 s (e.g., 10, 20, 30, 40, 50, 60, 70, 80, 90, 100, 200, 300, 400, 500, 600, 700, 800, 900, or 1000 ns; 10, 20, 30, 40, 50, 60, 70, 80, 90, 100, 200, 300, 400, 500, 600, 700, 800, 900, or 1000 µs; 10, 20, 30, 40, 50, 60, 70, 80, 90, 100, 200, 300, 400, 500, 600, 700, 800, 900, or 1000 ms; or 0, 20, 30, 40, 50, 60, 70, 80, 90, 100, 200, 300, 400, 500, 600, 700, 800, 900, or 1000 s).

In particular, while the bridged HABI radicals are incapable of initiating free radical polymerization of polymerizable monomers (e.g., methacrylate monomers), the bridged HABI radicals rapidly recombine with and terminate the growing polymer chain.

In some embodiments, the methods further comprise varying the intensity of the first wavelength of light. In some embodiments, the methods further comprise varying the intensity of the second wavelength of light. In some embodiments, varying the intensity of the first and/or second wavelength of light changes the region of the composition in which polymerization occurs.

In some embodiments, the methods comprise varying the intensity and/or the wavelength of the first source of light. In some embodiments, the methods further comprise varying the intensity and/or wavelength of the second source of light. In some embodiments, varying the intensity and/or wavelength of the first and/or second sources of light changes the region of the composition in which polymerization occurs.

In some embodiments, methods comprise a step of irradiating the composition with a first source of light, e.g., to initiate polymerization of monomers by producing a radical from the photoinitiator. In some embodiments, methods comprise a step of irradiating the composition with a second source of light, e.g., to stop polymerization of monomers by producing a radical from the photoinhibitor compound having fast back reaction kinetics (e.g., a HABI photoinhibitor (e.g., a bridged HABI photoinhibitor)). In some embodiments, methods comprise a step of irradiating the composition with a first source of light, e.g., to produce a region (e.g., a three-dimensional region) within the composition where monomers polymerize. In some embodiments, methods comprise a step of irradiating the composition with a second source of light, e.g., to produce a region (e.g., a three-dimensional region) within the composition where monomers do not polymerize. In some embodiments, a region irradiated by both the first source of light and the second source of light is a region within the composition where monomers do not polymerize because the initiating radicals do not initiate polymerization in the presence of the inhibiting radicals.

In some embodiments, methods comprise producing a polymerizing region in a composition comprising a polymerizable monomer, a photoinitiator, and a photoinhibitor compound having fast back reaction kinetics (e.g., a HABI photoinhibitor (e.g., a bridged HABI photoinhibitor)). In some embodiments, the polymerizing region is a three-dimensional space contacted by light having a wavelength and intensity that activates the photoinitiator; in some embodiments, the polymerizing region is not contacted by light having an intensity and/or wavelength that activates the photoinhibitor. That is, in some embodiments the polymerizing region comprises sufficient photoinitiating radicals to produce polymer from monomer but does not comprise sufficient photoinhibitor to inhibit production of polymer from monomer.

As described herein, the size, wavelength, intensity, and pattern of the first and second wavelengths of light produce the three-dimensional space in the composition that is the polymerizing region. In some embodiments, the three-dimensional space has dimensions of approximately 0.5 µm-100 cm×0.5 µm-100 cm×0.5 µm-100 cm. Accordingly, the three-dimensional space is shaped, in various embodiments, as a dot, a thin rod or line, a slab, a prism, or a cube. The shape of the polymerizing region, however, is not limited to these particularly listed shapes and can be any arbitrary shape produced by the intersecting patterns of the first and second wavelengths of light.

Systems

In some embodiments, the technology relates to systems, e.g., comprising a composition as described herein and one or more light sources.

System embodiments comprise a suitable light source (or combination of light sources) selected to be appropriate for the particular monomer ("resin"), photoinitiator, and/or photoinhibitor employed (e.g., a photoinhibitor compound having fast back reaction kinetics (e.g., a HABI photoinhibitor (e.g., a bridged HABI photoinhibitor))). While embodiments are discussed in terms of a light source, embodiments also include sources of radiation including an electron beam and other ionizing radiation sources.

In some embodiments, the light source is an actinic radiation source (e.g., one or more light sources providing visible and/or ultraviolet electromagnetic radiation). In some embodiments, a light source is, e.g., an incandescent light, fluorescent light, phosphorescent or luminescent light, laser, light-emitting diode, etc., including arrays thereof. In some embodiments, a light source provides even coverage of light. Accordingly, in some embodiments a light source is a collimated beam or a planar waveguide, e.g., to provide even coverage of a light.

In some embodiments, light is provided in a pattern. Accordingly, in some embodiments a light source is a liquid crystal display (LCD), light emitting diode (LED), or a digital light projector (DLP), e.g., to deliver a pattern of light. In some embodiments, the light source includes a pattern-forming element operatively associated with a controller. In some embodiments, the light source or pattern forming element comprises a digital (or deformable) micromirror device (DMD) with digital light processing (DLP), a spatial modulator (SLM), or a microelectromechanical system (MEMS) mirror array, a mask (aka a reticle), a silhouette, or a combination thereof. See, U.S. Pat. No. 7,902,526, incorporated herein by reference. In some embodiments, the light source comprises a spatial light modulation array such as a liquid crystal light valve array or micromirror array or DMD (e.g., with an operatively associated digital light processor, typically in turn under the control of a suitable controller), configured to carry out exposure or irradiation of a composition as described herein (e.g., by maskless photolithography). See, e.g., U.S. Pat. Nos. 6,312,134; 6,248,509; 6,238,852; and 5,691,541, incorporated herein by reference.

In some embodiments, the light source(s) direct a first light and a second light into a composition as described herein. The second light has a second wavelength selected to produce photoinhibition (e.g., to produce a photoinhibition layer and/or to produce a photoinhibition volume) within the liquid. The first light has a first wavelength, different than the second wavelength, that is used to polymerize the photoactive resin in the liquid (e.g., within a photoinitiation layer). In some embodiments, the first light has a first wavelength that produces an initiating radical from the photoinitiator and the second light has a second wavelength, different than the first wavelength, that forms a radical from a photoinhibitor compound having fast back reaction kinetics (e.g., a HABI photoinhibitor (e.g., a bridged HABI photoinhibitor)). In some embodiments, the first and/or second light(s) are provided in accordance with a defined pattern or patterns. In addition, the one or more light sources can be a dual wavelength illumination source device or separate illumination devices.

In some embodiments, the one or more light sources is/are connected with a computer (or other controller). In some embodiments, the technology comprises use of a computer and/or microprocessor. For example, embodiments of technology are implemented in digital electronic circuitry, or in computer software, firmware, or hardware, including embodiments of methods described herein. For example, embodiments of the technology are implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

In some embodiments, the technology comprises use of a "data processing apparatus". The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by, and/or under the control of, one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), etc. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Some embodiments of the technology are implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

A computer includes a processor and a memory. The processor can be one or more hardware processors, which can each include multiple processor cores. The memory can include both volatile and non-volatile memory, such as Random Access Memory (RAM) and Flash RAM. The computer can include various types of computer storage media and devices, which can include the memory, to store instructions of programs that run on the processor. For example, a 3D printing program can be stored in the memory and run on the processor to implement the techniques described herein.

Kits

Some embodiments relate to kits. Embodiments of kits comprise one or more compositions, or separately packaged components of compositions, as described herein. For example, in some embodiments, the technology provides kits comprising a photoinhibitor compound having fast back reaction kinetics (e.g., a HABI photoinhibitor (e.g., a bridged HABI photoinhibitor)). In some embodiments, kits comprise a photoinhibitor compound having fast back reaction kinetics (e.g., a HABI photoinhibitor (e.g., a bridged HABI photoinhibitor)), a photoinitiator, and a polymerizable monomer. In some embodiments, kits further comprise a first and/or a second light source. Some embodiments of kits comprise a readable medium on which is provided computer instructions for producing an item from a polymerizable monomer.

Uses

The technology is not limited in its use and finds use in a wide variety of polymer-associated technologies. In some embodiments, the compositions, methods, and systems described herein are particularly useful for making three-dimensional articles. For instance, the technology described herein (e.g., photoinhibitor compounds having fast back reaction kinetics (e.g., a HABI photoinhibitor (e.g., a bridged HABI photoinhibitor))) find use in three-dimensional printing (e.g., ultra-rapid 3D printing). Three dimensional (3D) printing or additive manufacturing is a process in which a 3D digital model is manufactured by the accretion of construction material. In some embodiments, a 3D printed object is created by utilizing computer-aided design (CAD) data of an object through sequential construction of two dimensional (2D) layers or slices that correspond to cross-sections of 3D objects.

In some embodiments, the technology finds use in continuous layer interface production (CLIP). In particular, in some embodiments, the photoinhibitor compound having fast back reaction kinetics (e.g., a HABI photoinhibitor (e.g., a bridged HABI photoinhibitor)) finds use in producing a dead zone in CLIP. See, e.g., U.S. Pat. Nos. 9,205,601; 9,216,546; and U.S. Pat. App. Pub. No. 2016/0067921, each of which is incorporated herein by reference. In particular, the photoinhibitor compounds having fast back reaction kinetics (e.g., a HABI photoinhibitor (e.g., a bridged HABI photoinhibitor)) and photoinitiator/photoinhibitor technology provided herein finds use in the three-dimensional printing technology described in U.S. Pat. App. Pub. No. 2016/0067921 with the TED being replaced by the bridged HABI photoinhibitors described herein.

In some embodiments, the technology finds use in stereolithography (SL). SL is one type of additive manufacturing where a liquid resin is hardened by selective exposure to a radiation to form each 2D layer. In some embodiments, the radiation is in the form of electromagnetic waves (e.g., light, photons) or an electron beam. The most commonly applied energy source is ultraviolet, visible, or infrared radiation. The liquid photopolymer resin can contain monomers, oligomers, fillers and additives such as photoinitiators, blockers, colorants and other types depending on the targeted properties of the resin.

In some embodiments, the technology finds use in true additive manufacturing and/or in direct write lithography. Products that may be produced by the compositions, methods, and systems described herein include, but are not limited to, large-scale models or prototypes, small custom products, miniature or microminiature products or devices, etc. Examples include, but are not limited to, mechanical parts, medical devices and implantable medical devices such as stents, drug delivery depots, functional structures, microneedle arrays, fibers and rods such as waveguides, micromechanical devices, microfluidic devices, etc.

In some embodiments, the technology finds use in producing further exemplary products including, but not limited to, medical devices and implantable medical devices such as stents, drug delivery depots, catheters, breast implants, testicle implants, pectoral implants, eye implants, contact lenses, dental aligners, microfluidics, seals, shrouds, and other applications requiring high biocompatibility; functional structures; microneedle arrays; fibers; rods; waveguides; micromechanical devices; microfluidic devices; fasteners; electronic device housings; gears, propellers, and impellers; wheels; mechanical device housings; tools; structural elements; hinges including living hinges; boat and watercraft hulls and decks; wheels; bottles, jars, and other containers; pipes, liquid tubes, and connectors; foot-ware soles, heels, innersoles, and midsoles; bushings, o-rings, and gaskets; shock absorbers, funnel/hose assembly, and cushions; electronic device housings; shin guards, athletic cups, knee pads, elbow pads, foam liners, padding or inserts, helmets, helmet straps, head gear, shoe cleats, gloves, and other wearable or athletic equipment; brushes, combs, rings, jewelry, buttons, snaps, fasteners, watch bands, or watch housings; mobile phone or tablet casings or housings; computer keyboards, keyboard buttons, or components; remote control buttons or components; auto dashboard components, buttons, or dials; auto body parts, paneling, and other automotive, aircraft or boat parts; cookware, bakeware, kitchen utensils, and steamers; and any number of other three-dimensional objects.

Compositions for Three-Dimensional Printing

The technology relates to compositions for producing a polymer, e.g., to produce a patterned article of manufacture, e.g., for three-dimensional (3D) printing, etc. In particular, the technology relates to producing a polymer from polymerizable monomers (e.g., from a "resin"). The technology is not limited in the polymerizable monomer used provided that polymerization of the monomer is initiated by a radical formed from the photoinitiator and polymerization of the monomer is inhibited by a radical formed from the photoinhibitor (e.g., a photoinhibitor compound having fast back reaction kinetics (e.g., a HABI photoinhibitor (e.g., a bridged HABI photoinhibitor))). That is, embodiments provide that polymerization of the monomers occurs where the photoinitiator is activated by a first wavelength of light and polymerization of the monomers does not occur where the photoinhibitor (e.g., a photoinhibitor compound having fast back reaction kinetics (e.g., a HABI photoinhibitor (e.g., a bridged HABI photoinhibitor))) is activated by a second wavelength of light. Technologies (e.g., methods, systems, kits, apparatuses, uses, and compositions) related to use of photoinhibitors, e.g., "precise photoinhibitors", photoinhibitors having fast back reaction kinetics, and/or "precise photoinhibitors" having fast back reaction kinetics are described in herein and in U.S. Prov. Pat. App. Ser. No. 62/632,834, which is expressly incorporated herein by reference in its entirety.

Accordingly, embodiments relate to compositions comprising a monomer, a photoinitiator, and a photoinhibitor (e.g., a photoinhibitor compound having fast back reaction kinetics (e.g., a HABI photoinhibitor (e.g., a bridged HABI photoinhibitor))). In some embodiments, compositions further comprise one or more light absorbing dyes. In some embodiments, compositions further comprise one or more coinitiators. In some embodiments, compositions comprise one or more solvents.

Embodiments of compositions comprise a photoinhibitor. For example, in some embodiments, the technology relates to a composition comprising a photoinhibitor that is, e.g., a liquid or a gas. In some embodiments, the specific inhibitor depends upon the monomer being polymerized and the polymerization reaction.

A wide variety of radicals is known which tend to preferentially terminate growing polymer radicals, rather than initiating polymerizations. For example, ketyl radicals are known in the art to terminate rather than initiate photopolymerizations. Similarly, the technology comprises use of a controlled radical polymerization that uses a radical species to selectively terminate growing radical chains. Examples of terminating radicals that find use in embodiments of the technology include, but are not limited to, the sulfanylthiocarbonyl and other radicals generated in photoiniferter polymerizations; the sulfanylthiocarbonyl radicals used in reversible addition-fragmentation chain transfer polymerization; and the nitrosyl radicals used in nitroxide mediate polymerization.

In some other embodiments, the technology comprises use of a non-radical species that is generated to terminate growing radical chains, e.g., a metal/ligand complex such as those used as deactivators in atom-transfer radical polymerization (ATRP). Therefore, additional non-limiting examples of a photoinhibitor that finds use in embodiments of the technology include thiocarbamates, xanthates, dithiobenzoates, photoinititators that generate ketyl and other radicals that tend to terminate growing polymer chains radicals (e.g., camphorquinone and benzophenones), ATRP deactivators, and polymeric versions thereof.

In some embodiments, the photoinhibitor is, but not limited to: zinc dimethyl dithiocarbamate; zinc diethyl dithiocarbamate; zinc dibutyl dithiocarbamate; nickel dibutyl dithiocarbamate; zinc dibenzyl dithiocarbamate; tetramethylthiuram disulfide; tetraethylthiuram disulfide; tetramethylthiuram monosulfide; tetrabenzylthiuram disulfide; tetraisobutylthiuram disulfide; dipentamethylene thiuram hexasulfide; N,N'-dimethyl N,N'-di(4-pyridinyl)thiuram disulfide; 3-Butenyl 2-(dodecylthiocarbonothioylthio)-2-methylpropionate; 4-Cyano-4-[(dodecylsulfanylthiocarbonyl)sulfanyl]pentanoic acid; 4-Cyano-4-[(dodecylsulfanylthiocarbonyl)sulfanyl]pentanol; Cyanomethyl dodecyl trithiocarbonate; Cyanomethyl [3-

(trimethoxysilyl)propyl]trithiocarbonate; 2-Cyano-2-propyl dodecyl trithiocarbonate; S,S-Dibenzyl trithiocarbonate; 2-(Dodecylthiocarbonothioylthio)-2-methylpropionic acid; 2-(Dodecylthiocarbonothioylthio)-2-methylpropionic acid N-hydroxysuccinimide; Benzyl 1H-pyrrole-1-carbodithioate; Cyanomethyl diphenylcarbamodithioate; Cyanomethyl methyl(phenyl)carbamodithioate; Cyanomethyl methyl(4-pyridyl)carbamodithioate; 2-Cyanopropan-2-yl N-methyl-N-(pyridin-4-yl)carbamodithioate; Methyl 2-[methyl(4-pyridinyl)carbamothioylthio]propionate; 1-Succinimidyl-4-cyano-4-[N-methyl-N-(4-pyridyl)carbamothioylthio] pentanoate; Benzyl benzodithioate; Cyanomethyl benzodithioate; 4-Cyano-4-(phenylcarbonothioylthio)pentanoic acid; 4-Cyano-4-(phenylcarbonothioylthio)pentanoic acid N-succinimidyl ester; 2-Cyano-2-propyl benzodithioate; 2-Cyano-2-propyl 4-cyanobenzodithioate; Ethyl 2-(4-methoxyphenylcarbonothioylthio)acetate; 2-Phenyl-2-propyl benzodithioate; Cyanomethyl methyl(4-pyridyl) carbamodithioate; 2-Cyanopropan-2-yl N-methyl-N-(pyridin-4-yl)carbamodithioate; or Methyl 2-[methyl(4-pyridinyl)carbamothioylthio]propionate.

In some embodiments, the photoinhibitor is used in amounts ranging from about 0.01 to about 25 weight percent (wt %) of the composition. In some embodiments, the technology provides a composition comprising a photoinhibitor at approximately 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %.

Embodiments of compositions comprise a photoinhibitor (e.g., a photoinhibitor compound having fast back reaction kinetics (e.g., a HABI photoinhibitor (e.g., a bridged HABI photoinhibitor))). The bridged HABI photoinhibitor may be one known in the art, as described herein, or a substituted variation thereof (e.g., comprising one or more moieties (e.g., an alkyl, halogenated alkyl, alkoxyalkyl, alkylamino, cycloalkyl, heterocycloalkyl, polyalkylene, alkoxyl, alkenyl, cycloalkenyl, alkynyl, cycloalkynyl, aryl, heteroaryl, aldehyde, amino, halo, or thio) on one or more phenyl rings and/or on the R group).

In some embodiments, the photoinhibitor is a HABI compound or a bridged HABI compound, e.g., as described herein.

In some embodiments, the technology comprises use of a photoinhibitor, e.g., a "precise photoinhibitor", a photoinhibitor having fast back reaction kinetics, and/or a "precise photoinhibitor" having fast back reaction kinetics as described herein and in U.S. Prov. Pat. App. Ser. No. 62/632,834, which is expressly incorporated herein by reference in its entirety.

Accordingly, in some embodiments, the technology provided herein relates to photoinhibitors that are activated by light to form a polymerization inhibiting species and that have a fast back reaction that reforms the inactive photoinhibitor from the polymerization inhibiting species. In some embodiments, when not activated by light (e.g., in the inactive state), the photoinhibitors do not inhibit and/or retard polymerization activity and do not have initiating activity; when activated by light, the photoinhibitors form an inhibiting species that inhibits polymerization and that does not initiate polymerization. Accordingly, the technology provided herein relates to photoinhibition that is quickly turned "on" and quickly turned "off" by the presence and absence of light and that does not have undesirable inhibition and/or initiation activities.

In some embodiments, the photoinhibitor compounds of the technology (e.g., compounds having fast back reaction kinetics and/or HABI (e.g., bridged HABI compounds)) do not exhibit photoinitiation activity when irradiated (e.g., when photoactivated) and thus only exhibit photoinhibition when irradiated (e.g., when photoactivated). Moreover, in some embodiments, the non-photoactivated photoinhibitor compounds of the technology do not retard polymerization rates (e.g., by chain transfer reactions).

In some embodiments, the photoinhibitor compounds are precise photoinhibitor compounds.

In some embodiments, the photoinhibitor compounds are precise photoinhibitor compounds having fast back reaction kinetics.

Finally, in some embodiments, the photoinhibitor compounds of the technology typically exhibit very weak or zero absorbance in the blue region of the electromagnetic spectrum and moderately absorb in the near-UV region of the electromagnetic spectrum, thus complementing the absorbance spectra of several photoinitiators activated by blue light.

In some embodiments, the technology provides a composition comprising a photoinhibitor (e.g., a HABI photoinhibitor (e.g., a bridged HABI photoinhibitor)) at approximately 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %.

The technology relates to compositions comprising any suitable polymerizable liquid. In some embodiments, the liquid (also referred to as "resin" herein) comprises monomers, particularly a photopolymerizable and/or free radical polymerizable monomers, and a suitable initiator such as a free radical initiator, and combinations thereof. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cute site monomers, functionalized PEGs, etc., including combinations thereof. In some embodiments, polymerizable monomers include, but are not limited to, monomeric, dendritic, and oligomeric forms of acrylates, methacrylates, vinyl esters, styrenics, other vinylic species, and mixtures thereof. Examples of liquid resins, monomers, and initiators include, but are not limited to, those described in U.S. Pat. Nos. 8,232,043; 8,119,214; 7,935,476; 7,767,728; 7,649,029; in Int'l Pat. Pub. No. WO 2012129968 A1; in Chinese patent application CN 102715751 A; and in Japanese patent application JP 2012210408A, each of which is incorporated herein by reference.

In particular, embodiments provide compositions comprising a monomer such as, e.g., hydroxyethyl methacrylate; n-lauryl acrylate; tetrahydrofurfuryl methacrylate; 2,2,2-trifluoroethyl methacrylate; isobornyl methacrylate; polypropylene glycol monomethacrylates, aliphatic urethane acrylate (e.g., RAHN GENOMER 1122); hydroxyethyl acrylate; n-lauryl methacrylate; tetrahydrofurfuryl acrylate; 2,2,2-trifluoroethyl acrylate; isobornyl acrylate; polypropylene glycol monoacrylates; trimethylpropane triacrylate; trimethylpropane trimethacrylate; pentaerythritol tetraacrylate; pentaerythritol tetraacrylate; triethylene glycol diacrylate; triethylene glycol dimethacrylate; tetrathylene glycol diacrylate; tetrathylene glycol dimethacrylate; neopentyldimethacrylate; neopentylacrylate; hexane dioldimethacrylate; hexane diol diacrylate; polyethylene glycol 400 dimethacrylate; polyethylene glycol 400 diacrylate; diethylglycol diacrylate; diethylene glycol dimethacrylate; ethylene glycol diacrylate; ethylene glycol dimethacrylate; ethoxylated bis phenol A dimethacrylate; ethoxylated bis phenol A diacrylate; bisphenol A glycidyl methacrylate; bisphenol A glycidyl acrylate; ditrimethylolpropane tetraacrylate; or ditrimethylolpropane tetraacrylate.

Particular embodiments provide compositions comprising an acrylate monomer, e.g., an acrylate monomer, a methacrylate monomer, etc. In some embodiments, the acrylate monomer is an acrylate monomer such as, but not limited to, (meth)acrylic acid monomers such as (meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-pentyl (meth)acrylate, n-hexyl(meth) acrylate, cyclohexyl(meth)acrylate, n-heptyl(meth)acrylate, n-octyl(meth)acrylate, 2-ethylhexyl(meth)acrylate, nonyl(meth)acrylate, decyl (meth)acrylate, dodecyl(meth)acrylate, phenyl(meth)acrylate, toluoyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth) acrylate, stearyl(meth)acrylate, glycidyl(meth)acrylate, 2-aminoethyl(meth)acrylate, 3-(methacryloyloxypropyl) trimethoxysilane, (meth)acrylic acid-ethylene oxide adducts, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth) acrylate, perfluoromethyl(meth) acrylate, diperfluoromethylmethyl(meth)acrylate, 2-perfluoromethyl-2-perfluoroethylethyl(meth)acrylate, 2-perfluorohexylethyl(meth)acrylate, 2-perfluorodecylethyl(meth) acrylate and 2-perfluorohexadecylethyl(meth)acrylate.

Some embodiments provide a composition comprising n-butyl acrylate, methyl methacrylate, 2-ethylhexyl acrylate, methyl acrylate, tert-butyl acrylate, 2-hydroxyethyl acrylate, glycidyl methacrylate, or a combination thereof. However, embodiments of the technology encompass compositions comprising any acrylate or (meth)acrylate.

In some embodiments, the technology provides a composition comprising a monomer at approximately 1 to 99.99 wt % (e.g., approximately 1, 2, 3, 4, 5, 6, 7, 8, 9, 10, 15, 20, 25, 30, 35, 40, 45, 50, 55, 60, 65, 70, 75, 80, 85, 90, 91, 92, 93, 94, 95, 96, 97, 98, 99, 99.1, 99.2. 99.3, 99.4, 99.5, 99.6, 99.7, 99.8, 99.9, 99.95, to 99.99 wt %).

Embodiments of the technology provide a composition comprising a photoinitiator. The technology is not limited in the photoinitiator provided it is chemically compatible with the photoinhibitor compounds (e.g., a photoinhibitor compound having fast back reaction kinetics (e.g., a HABI photoinhibitor (e.g., a bridged HABI photoinhibitor))) described herein. Further, embodiments relate to use of a photoinitiator that is optically compatible with the photoinhibitor compounds (e.g., a photoinhibitor compound having fast back reaction kinetics (e.g., a HABI photoinhibitor (e.g., a bridged HABI photoinhibitor))) described herein. In particular, the technology comprises use of a photoinitiator that is activated by a wavelength of light that is different than the wavelength of light that activates the photoinhibitor (e.g., a photoinhibitor compound having fast back reaction kinetics (e.g., a HABI photoinhibitor (e.g., a bridged HABI photoinhibitor))).

Accordingly, the technology comprises use of a wide variety of photoinitiator compounds and irradiation conditions for activating the photoinitiator to effect the photoinitiation process. Non-limiting examples of the photoinitiator include benzophenones, thioxanthones, anthraquinones, camphorquinones, thioxanthones, benzoylformate esters, hydroxyacetophenones, alkylaminoacetophenones, benzil ketals, dialkoxyacetophenones, benzoin ethers, phosphine oxides, acyloximino esters, alphahaloacetophenones, trichloromethyl-S-triazines, titanocenes, dibenzylidene ketones, ketocoumarins, dye sensitized photoinitiation systems, maleimides, and mixtures thereof. Particular examples of photoinitiators include, e.g., 1-hydroxy-cyclohexyl-phenyl-ketone (IRGACURE 184; BASF, Hawthorne, N.J.); a 1:1 mixture of 1-hydroxy-cyclohexyl-phenyl-ketone and benzophenone (IRGACURE 500; BASF); 2-hydroxy-2-methyl-1-phenyl-1-propanone (DAROCUR 1173; BASF); 2-hydroxy-1-[4-(2-hydroxyethoxy)phenyl]-2-methyl-1-propanone (IRGACURE 2959; BASF); methyl benzoylformate (DAROCUR MBF; BASF); oxy-phenyl-acetic acid 2-[2-oxo-2-phenyl-acetoxy-ethoxy]-ethyl ester; oxy-phenyl-acetic 2-[2-hydroxy-ethoxy]-ethyl ester; a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester (IRGACURE 754; BASF); alpha,alpha-dimethoxy-alpha-phenylacetophenone (IRGACURE 651; BASF); 2-benzyl-2-(dimethylamino)-1-[4-(4-morpholinyl)-phenyl]-1-butanone (IRGACURE 369; BASF); 2-methyl-1-[4-(methylthio)phenyl]-2-(4-morpholinyl)-1-propanone (IRGACURE 907; BASF); a 3:7 mixture of 2-benzyl-2-(dimethylamino)-1-[4-(4-morpholinyl) phenyl]-1-butanone and alpha,alpha-dimethoxy-alpha-phenylacetophenone per weight (IRGACURE 1300; BASF); diphenyl-(2,4,6-trimethylbenzoyl) phosphine oxide (DAROCUR TPO; BASF); a 1:1 mixture of diphenyl-(2,4,6-trimethylbenzoyl)-phosphine oxide and 2-hydroxy-2-methyl-1-phenyl-1-propanone (DAROCUR 4265; BASF); phenyl bis(2,4,6-trimethyl benzoyl) phosphine oxide, which may be used in pure form (IRGACURE 819; BASF, Hawthorne, N.J.) or dispersed in water (45% active, IRGACURE 819DW; BASF); 2:8 mixture of phosphine oxide, phenyl bis(2,4,6-trimethyl benzoyl) and 2-hydroxy-2-methyl-1-phenyl-1-propanone (IRGACURE 2022; BASF); IRGACURE 2100, which comprises phenyl-bis(2,4,6-trimethylbenzoyl)-phosphine oxide); bis-(eta 5-2, 4-cyclopentadien-1-yl)-bis-[2,6-difluoro-3-(1H-pyrrol-1-yl) phenyl]-titanium (IRGACURE 784; BASF); (4-methylphenyl) [4-(2-methylpropyl)phenyl]-iodonium hexafluorophosphate (IRGACURE 250; BASF); 2-(4-methylbenzyl)-2-(dimethylamino)-1-(4-morpholinophenyl)-butan-1-one (IRGACURE 379; BASF); 4-(2-hydroxyethoxy)phenyl-(2-hydroxy-2-propyl)ketone (IRGACURE 2959; BASF); bis-(2,6-dimethoxybenzoyl)-2,4,4-trimethylpentylphosphine oxide; a mixture of bis-(2,6-dimethoxybenzoyl)-2,4,4-trimethylpentylphosphine oxide and 2-hydroxy-2-methyl-1-phenyl-propanone (IRGACURE 1700; BASF); 4-Isopropyl-9-thioxanthenone; and mixtures thereof.

In some embodiments, the photoinitiator is used in an amount ranging from approximately 0.01 to approximately 25 weight percent (wt %) of the composition (e.g., from approximately 0.1 to approximately 3.0 wt % of the composition (e.g., approximately 0.2 to 0.5 wt % of the composition)). In some embodiments, the technology provides a composition comprising a photoinitiator at approximately 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %.

Embodiments of the technology provide a composition further comprising a coinitiator, e.g., to enhance the polymerization rate, extent, quality, etc. The technology is not limited in the coinitiator. Non-limiting examples of co-initiators include primary, secondary, and tertiary amines; alcohols; and thiols. Particular examples of coinitiators include, e.g., dimethylaminobenzoate, isoamyl 4-(dimethylamino)benzoate, 2-ethylhexyl 4-(dimethylamino)benzoate; ethyl 4-(dimethylamino)benzoate; 3-(dimethylamino)propyl acrylate; 2-(dimethylamino)ethyl methacrylate; 4-(dimethylamino)benzophenones, 4-(diethylamino)benzophenones; 4,4'-bis(diethylamino)benzophenones; methyl diethanolamine; triethylamine; hexane thiol; heptane thiol; octane thiol; nonane thiol; decane thiol; undecane thiol; dodecane thiol; isooctyl 3-mercaptopropionate; pentaerythritol tetrakis(3-mercaptopropionate); 4,4'-thiobisbenzenethiol; trimethylolpropane tris(3-mercaptopropionate); CN374 (SARTOMER); CN371 (SARTOMER), CN373 (SARTOMER), GENOMER 5142 (RAHN); GENOMER 5161 (RAHN); GENOMER 5271 (RAHN); GENOMER 5275 (RAHN), and TEMPIC (BRUNO BOC, Germany).

In some embodiments, the coinitiator is used in an amount ranging from approximately 0.0 to approximately 25 weight percent (wt %) of the composition (e.g., approximately 0.1 to approximately 3.0 wt % of the composition (e.g., 0.1 to 1.0 wt %) when used in embodiments of the compositions). In some embodiments, the technology provides a composition comprising a coinitiator at approximately 0, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %.

Some embodiments comprise use of a photon absorbing component, e.g., a light blocking dye (also known as a "photoabsorber"). In some embodiments, a photon absorbing component is selected in accordance with the wavelengths of the first and second lights. In some embodiments, dyes are used to both attenuate light and to transfer energy to photoactive species increasing the sensitivity of the system to a given wavelength for either or both photoinitiation and photoinhibition processes. In some embodiments, the concentration of the chosen dye is highly dependent on the light absorption properties of the given dye and ranges from approximately 0.001 to approximately 5 weight percent (wt %) of the composition. Useful classes of dyes include compounds commonly used as UV absorbers for decreasing weathering of coatings including, such as, 2-hydroxyphenyl-benzophenones; 2-(2-hydroxyphenyl)-benzotriazoles; and 2-hydroxyphenyl-s-triazines Other useful dyes include those used for histological staining or dying of fabrics. A non-limiting list includes Martius yellow, Quinoline yellow, Sudan red, Sudan I, Sudan IV, eosin, eosin Y, neutral red, and acid red. Pigments can also be used to scatter and attenuate light.

In some embodiments, the photon absorbing component (e.g., a light blocking dye) is used in an amount ranging from approximately 0.0 to approximately 25 weight percent (wt %) of the composition (e.g., approximately 0.1 to approximately 3.0 wt % of the composition (e.g., 0.1 to 1.0 wt %) when used in embodiments of the compositions). In some embodiments, the technology provides a composition comprising a photon absorbing component (e.g., a light blocking dye) at approximately 0, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %.

Some embodiments do not comprise a photon absorbing component (e.g., in some embodiments, compositions are "photoabsorber-free"). In particular, embodiments are provided in which compositions are photoabsorber-free to increase or maximize the penetration of a wavelength of light through a composition as described herein (e.g., comprising a polymerizable monomer, a photoinitiator, and a photoinhibitor (e.g., a photoinhibitor compound having fast back reaction kinetics (e.g., a HABI photoinhibitor (e.g., a bridged HABI photoinhibitor)))).

In some embodiments, a composition further comprises solid particles suspended or dispersed therein. Any suitable solid particle can be used, depending upon the end product being fabricated. In some embodiments, the solid particles are metallic, organic/polymeric, inorganic, or composites or mixtures thereof. In some embodiments, the solid particles are nonconductive, semi-conductive, or conductive (including metallic and non-metallic or polymer conductors); in some embodiments, the solid particles are magnetic, ferromagnetic, paramagnetic, or nonmagnetic. The particles can be of any suitable shape, including spherical, elliptical, cylindrical, etc.

In some embodiments, a composition comprises a pigment, dye, active compound, pharmaceutical compound, or detectable compound (e.g., fluorescent, phosphorescent, radioactive). In some embodiments, a composition comprises a protein, peptide, nucleic acid (DNA, RNA (e.g., siRNA)), sugar, small organic compound (e.g., drug and drug-like compound), etc., including combinations thereof.

In some embodiments, the compositions are homogenous. The technology is related to forming polymerized structures; accordingly, in some embodiments, the compositions are heterogeneous because the compositions, in some embodiments, comprise polymerized and non-polymerized regions. In some embodiments, compositions of the technology comprise a polymer (e.g., comprising polymerized monomers). In some embodiments, a polymerized region is patterned, localized, etc.

Hexaarylbiimidazole (HABI) Compounds for Three-Dimensional Printing

In some embodiments, the technology relates to the use of a hexaarylbiimidazole (HABI) compound as a photoactivated inhibitor of polymerization ("photoinhibitor"). Hexaarylbiimidazole (HABI) was developed in the 1960s as a photochromic molecule by Hayashi and Maeda (see, e.g., Hayashi and Maeda (1960) "Preparation of a new phototropic substance" Bull. Chem. Soc. Jpn. 33(4): 565-66, incorporated herein by reference). The general structure of a HABI compound is shown in FIG. 4A and one particular HABI compound is shown on the left in FIG. 4B. FIG. 4B shows: i) the light-induced homolytic cleavage of the HABI C—N bond to produce two radicals (e.g., triphenylimidazolyl radicals ("TPIR"), also known as lophyl radicals); and ii) recombination of the two radicals in the "back reaction" to reform the HABI imidazole dimer (accordingly, also called a triphenylimidazolyl dimer "TPID"). The recombination "back reaction" is driven by thermal energy and radical diffusion. The lophyl radical has a large absorption band in the visible region of the electromagnetic spectrum, whereas HABI absorbs only in the UV region of the electromagnetic spectrum and is therefore colorless. Consequently, HABI generates a colored radical species upon UV light irradiation and the radicals slowly reform to produce the colorless HABI imidazole dimer when light irradiation is stopped. FIG. 6 shows o-chlorohexaarylbiimidazole (o-Cl-HABI), the light-induced reaction forming the chloro-triphenylimidizolyl radicals, and the thermally driven back reaction to reform the o-Cl-HABI. The halflife of the radicals formed in this reaction is approximately tens of seconds (e.g., approximately 10 s). Thus, in some embodiments, the technology relates to an o-chlorohexaarylbiimidazole (o-Cl-HABI) that has a half-life of approximately tens of seconds (e.g., approximately 10 s).

Cleavage of the HABI C—N bond by UV irradiation occurs in less than 100 fs and is thus nearly (e.g., substantially, effectively) instantaneous; recombination of the radicals to reform HABI is a second order reaction that occurs over a time of up to a few minutes at room temperature. Thus, the lophyl radicals formed from HABI have a half-life of tens of seconds to several (e.g., 5 to 10 or more) minutes (see, e.g., Satoh et al. (2007) "Ultrafast laser photolysis study on photodissociation dynamics of a hexaarylbiimidazole derivative" Chem. Phys. Lett. 448 (4-6): 228-31; Sathe, et al. (2015) "Re-examining the Photomediated Dissociation and Recombination Kinetics of Hexaarylbiimidazoles" Ind. Eng. Chem. Res. 54 (16): 4203-12, each of which is incorporated herein by reference). HABI has been known as a photoinitiator, e.g., for imaging and photoresists. HABI compounds do not initiate on their own upon formation of radicals. When used as a photoinitiator, the radical abstracts hydrogen atoms from coinitiator thiol groups (e.g., a crystal violet precursor) to form an initiating moiety. See, e.g., Dessauer, R. (2006) Photochemistry History and Commercial Applications of Heaarylbiimidazoles, Elsevier.

In some embodiments, the technology relates to use of a bridged HABI. See, e.g., Iwahori et al. (2007) "Rational design of a new class of diffusion-inhibited HABI with fast back-reaction" J Phys Org Chem 20: 857-63; Fujita et al. (2008) "Photochromism of a radical diffusion-inhibited hexaarylbiimidazole derivative with intense coloration and fast decoloration performance" Org Lett 10: 3105-08; Kishimoto and Abe (2009) "A fast photochromic molecule that colors only under UV light" J Am Chem Soc 131: 4227-29; Harada et al. (2010) "Remarkable acceleration for back-reaction of a fast photochromic molecule" J Phys Chem Lett 1: 1112-15; Mutoh et al. (2010) "An efficient strategy for enhancing the photosensitivity of photochromic [2.2]paracyclophane-bridged imidazole dimers" J Photopolym Sci Technol 23: 301-06; Kimoto et al. (2010) "Fast photochromic polymers carrying [2.2]paracyclophane-bridged imidazole dimer" Macromolecules 43: 3764-69; Hatano et al. (2010) "Unprecedented radical-radical reaction of a [2.2]paracyclophane derivative containing an imidazolyl radical moiety" Org Lett 12: 4152-55; Hatano et al. (2011) "Reversible photogeneration of a stable chiral radical-pair from a fast photochromic molecule" J Phys Chem Lett 2: 2680-82; Mutoh and Abe (2011) "Comprehensive understanding of structure-photosensitivity relationships of photochromic [2.2]paracyclophane-bridged imidazole dimers" J Phys Chem A 115: 4650-56; Takizawa et al. (2011) "Photochromic organogel based on [2.2]paracyclophane-bridged imidazole dimer with tetrapodal urea moieties" Dyes Pigm 89: 254-59; Mutoh and Abe (2011) "Photochromism of a water-soluble vesicular [2.2]paracyclophane bridged imidazole dimer" Chem Comm 47:8868-70; Yamashita and Abe (2011) "Photochromic properties of [2.2]paracyclophane-bridged imidazole dimer with increased photosensitivity by introducing pyrenyl moiety" J Phys Chem A 115: 13332-37; Kawai et al. (2012) "Entropy-controlled thermal back-reaction of photochromic [2.2]paracyclophane-bridged imidazole dimer" Dyes Pigm 92: 872-76; Mutoh et al. (2012) "Spectroelectrochemistry of a photochromic [2.2]paracyclophane-bridged imidazole dimer: Clarification of the electrochemical behavior of HABI" J Phys Chem A 116: 6792-97; Mutoh et al. (2013) "Photochromism of a naphthalene-bridged imidazole dimer constrained to the 'anti' conformation" Org Lett 15: 2938-41; Shima et al. (2014) "Enhancing the versatility and functionality of fast photochromic bridged-imidazole dimers by flipping imidazole ring" J Am Chem Soc 136: 3796-99; Iwasaki et al. (2014) "A chiral BINOL-bridged imidazole dimer possessing sub-millisecond fast photochromism" Chem Commun 50: 7481-84; and Yamaguchi et al. (2015) "Nanosecond photochromic molecular switching of a biphenyl-bridged imidazole dimer revealed by wide range transient absorption spectroscopy" Chem Commun 51: 1375-78, each of which is incorporated herein by reference in its entirety.

Similar to the conventional HABI molecules, the bridged HABI molecules form radicals instantaneously upon exposure to UV light. However, the radicals are linked by a covalent bond (e.g., one or more covalent bonds and/or, e.g., an R group), which prevents diffusion of the radicals away from one another and thus accelerates the thermally driven reformation of the bridged HABI molecule. Accordingly, the bridged HABI molecules instantaneously produce radicals upon UV light irradiation and the radicals rapidly disappear when UV irradiation is stopped.

As used herein, the term "bridged HABI" refers to a HABI molecule in which the triphenylimidazolyl radicals are linked (e.g., by one or more covalent bonds or by an R group) to each other such that they do not diffuse away from one another upon hemolytic cleavage of the bond connecting the imidazole centers (e.g., by light). As used herein, the term "X-bridged HABI", where "X" refers to an R group (e.g., moiety, chemical group, etc.), refers to a HABI wherein the imidazolyl moieties are linked by the R group. See, e.g., FIGS. 5A, 5B, 5C, 5D, and 5E. In some embodiments, the technology relates to the use of a photoinhibitor that forms inhibiting moieties having a half life shorter than 10 seconds (e.g., shorter than 10.0, 9.9, 9.8, 9.7, 9.6, 9.5, 9.4, 9.3, 9.2, 9.1, 9.0, 8.9, 8.8, 8.7, 8.6, 8.5, 8.4, 8.3, 8.2, 8.1, 8.0, 7.9, 7.8, 7.7, 7.6, 7.5, 7.4, 7.3, 7.2, 7.1, 7.0, 6.9, 6.8, 6.7, 6.6, 6.5, 6.4, 6.3, 6.2, 6.1, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1, 0.01, 0.001, or 0.0001 seconds).

In an exemplary embodiment, the half-life of the radicals formed from a naphthalene-bridged HABI and a [2.2]paracyclophane-bridged HABI dimer are approximately 830 ms and 33 ms at 25° C. in benzene, respectively. See, e.g., Iwahori et al. (2007) "Rational design of a new class of diffusion-inhibited HABI with fast back-reaction" J Phys Org Chem 20: 857-63; Fujita et al. (2008) "Photochromism of a radical diffusion-inhibited hexaarylbiimidazole derivative with intense coloration and fast decoloration performance" Org Lett 10: 3105-08; Kishimoto and Abe (2009) "A fast photochromic molecule that colors only under UV light" J Am Chem Soc 131: 4227-29, each of which is incorporated herein in its entirety.

Additional exemplary embodiments relate to use of a HABI in which the imidazole moieties are linked by a 1,1'-bi-naphthol bridge. The 1,1'-bi-naphthol-bridged HABI has a half-life of approximately 100 µs. See, e.g., Iwasaki et al. (2014) "A chiral BINOL-bridged imidazole dimer possessing sub-millisecond fast photochromism" Chem Commun 50: 7481-84, incorporated herein by reference. In some embodiments, the technology relates to use of a HABI comprising a bond linking the imidazolyl groups (e.g., a bond links the imidazolyl groups; see, e.g., FIG. 5D) that has a half-life of approximately 100 ns, which is the fastest thermal back reaction for a HABI compound presently known in the art. See, e.g., Yamaguchi et al. (2015) "Nanosecond photochromic molecular switching of a biphenyl-bridged imidazole dimer revealed by wide range transient absorption spectroscopy" Chem Commun 51: 1375-78, incorporated herein by reference in its entirety.

Accordingly, the technology relates in some embodiments to use of bridged HABI molecules as photoactivatable inhibitors of polymerization. In some embodiments, the bridged HABI molecules form a radical upon irradiation by light (e.g., at an appropriate wavelength to form a radical from the HABI). In some embodiments, the radical rapidly disappears upon stopping the irradiation by light. For example, embodiments relate to a bridged HABI that forms a radical having a half-life of approximately 100 ns to 100 µs to 100 ms to 100 s (e.g., 10, 20, 30, 40, 50, 60, 70, 80, 90, 100, 200, 300, 400, 500, 600, 700, 800, 900, or 1000 ns; 10, 20, 30, 40, 50, 60, 70, 80, 90, 100, 200, 300, 400, 500, 600, 700, 800, 900, or 1000 µs; 10, 20, 30, 40, 50, 60, 70, 80, 90, 100, 200, 300, 400, 500, 600, 700, 800, 900, or 1000 ms; or 0, 20, 30, 40, 50, 60, 70, 80, 90, 100, 200, 300, 400, 500, 600, 700, 800, 900, or 1000 s). That is, after formation of the radical by irradiation of the bridged HABI at the appropriate wavelength, the radical rapidly reforms the bridged HABI upon stopping the irradiation. Consequently, the radical is only formed in the region irradiated by the appropriate wavelength to form a radical from the HABI.

Like HABI compounds, bridged HABI compounds do not exhibit photoinitiation activity when irradiated. Moreover, bridged HABI compounds do not participate in chain transfer reactions and thus polymerization rates are not inherently retarded by the presence of HABI compounds. Finally, bridged HABI compounds typically exhibit very weak absorbance in the blue region of the electromagnetic spectrum and moderately absorb in the near-UV region of the electromagnetic spectrum, thus complementing the absorbance spectrum of several photoinitiators activated by blue light. Finally, bridged HABI compounds exhibit fast back reaction kinetics.

Irradiation for Three-Dimensional Printing

Embodiments relate to irradiating polymerizable compositions (e.g., comprising a polymerizable monomer, a photoinitiator, and a photoinhibitor (e.g., a photoinhibitor compound having fast back reaction kinetics (e.g., a HABI photoinhibitor (e.g., a bridged HABI photoinhibitor)))) with multiple wavelengths of light. In some embodiments, a first wavelength produces initiating radicals from the photoinitiator and a second wavelength produces inhibiting radicals from a photoinhibitor (e.g., a photoinhibitor compound having fast back reaction kinetics (e.g., a HABI photoinhibitor (e.g., a bridged HABI photoinhibitor))). During irradiation, regions (e.g., volumes, areas, etc.) of the composition are exposed to: 1) the first wavelength only; 2) the second wavelength only; or 3) both the first and second wavelengths. Accordingly, polymerization occurs in regions irradiated by the first wavelength only (e.g., in regions irradiated by the first wavelength but not irradiated by the second wavelength). And, polymerization is inhibited in regions irradiated by the second wavelength (e.g., in regions irradiated by the second wavelength and the first wavelength; and in regions irradiated by the second wavelength but not irradiated by the first wavelength). Thus, by providing control of the wavelength, intensity, pattern (e.g., cross sectional area, cross section shape, etc.), and direction of the first and/or second wavelengths of light (e.g., as provided by one or more sources), the technology provides control over the polymerized region in the composition. In some embodiments, wavelength, intensity, pattern (e.g., cross sectional area, cross section shape, etc.), and direction of the first and/or second wavelengths of light (e.g., as provided by one or more sources) is controlled (e.g., varies) as a function of time.

Figure 23:
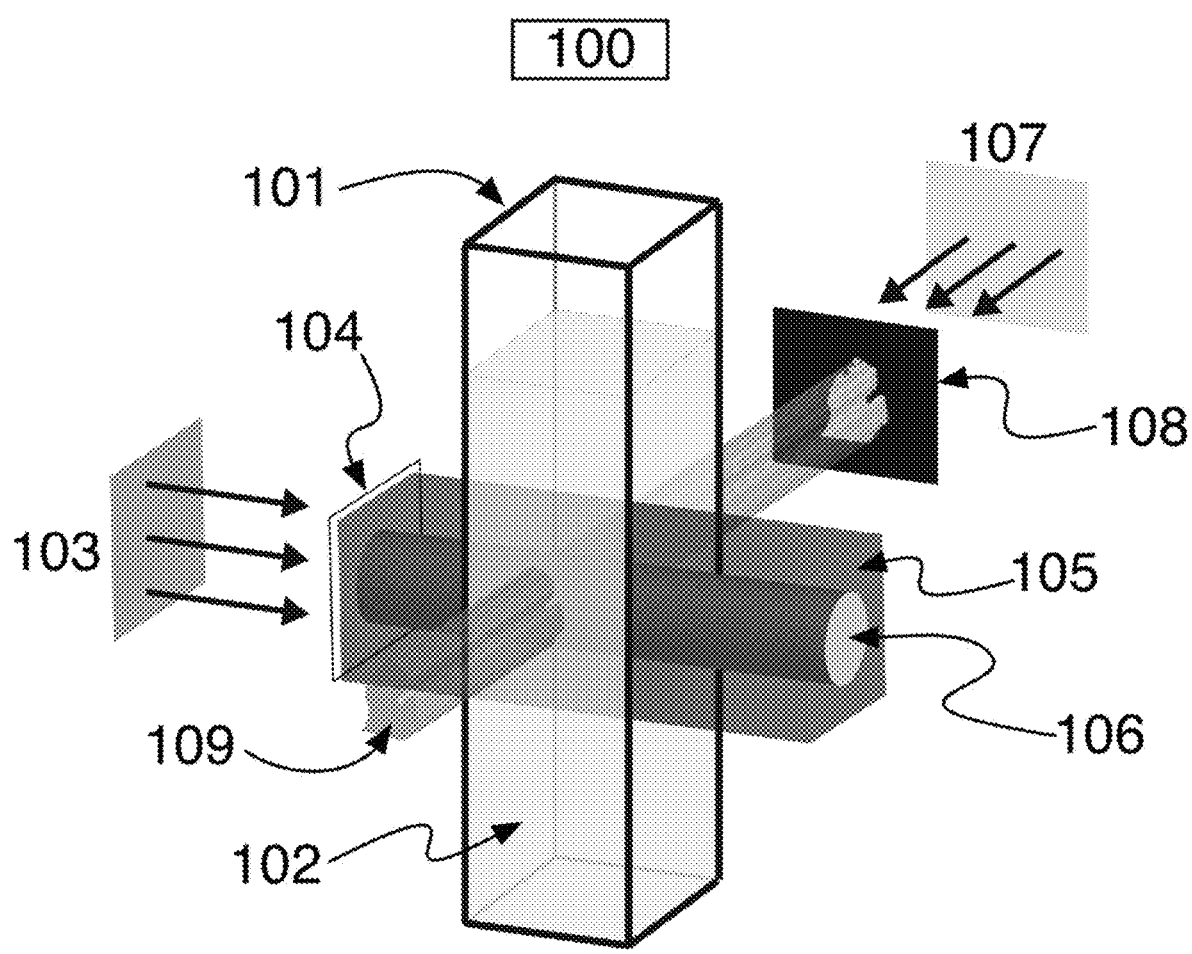
FIG. 23 is a schematic showing an embodiment 100 of the technology in which a composition 102 in a reaction vessel 101 is irradiated by a first source providing a blue wavelength of light 107 and a second source providing a near-UV wavelength of light 103. The embodiment also shows two pattern (e.g., mask) components 104 and 108, a photoinhibition region 105 comprising a non-irradiated volume 106 within it, and a photoinitiation region 109.

For instance, FIG. 23 shows a diagram exemplifying an embodiment 100 of the technology described herein. FIG. 23 shows a cuvette 101 comprising a composition 102 as described herein, e.g., a composition comprising a polymerizable monomer (e.g., a di(meth)acrylate monomer), a photoinitiator (e.g., camphorquinone), and a photoinhibitor (e.g., a photoinhibitor compound having fast back reaction kinetics (e.g., a HABI photoinhibitor (e.g., a bridged HABI photoinhibitor))). In some embodiments, the compositions do not comprise a photoabsorber (e.g., in some embodiments, the composition is photoabsorber-free).

As shown in the exemplary figure, the composition is irradiated by a near-UV light 103 (e.g., approximately 365 nm) to activate the photoinhibitor in the composition 102. The near-UV light is provided as a pattern to produce a region within the composition having a particular shape that comprises the photoinhibitor. In some embodiments, the pattern is provided by a pattern component 104 such as a mask. FIG. 23 shows the source of the near-UV light 103 at the left; in the embodiment shown, the near-UV light passes through a mask or other component 104 to provide the near-UV light in a pattern that irradiates the composition to produce the inhibiting moiety (e.g., the inhibiting radical). In the embodiment shown in the figure, the near-UV light 103 irradiates a photoinhibition region 105 that is a square prism with a non-irradiated cylindrical volume 106 in its center. Accordingly, the near-UV light 103 produces the inhibiting species from the photoinhibitor (e.g., a photoinhibitor compound having fast back reaction kinetics (e.g., a HABI photoinhibitor (e.g., a bridged HABI photoinhibitor))) within the photoinhibition region 105 but not within the cylindrical volume 106.

Simultaneously, in the embodiment shown in the exemplary figure, the composition is irradiated by a blue light 107 (e.g., approximately 470 nm) to activate the photoinitiator in the composition 102. In some embodiments, the blue light 107 is provided as a pattern to produce a region within the composition having a particular shape that comprises the photoinitiator. In some embodiments, the pattern is provided by a pattern component 108 such as a mask. FIG. 23 shows the source of the blue light 107 at the top right; in the embodiment shown, the blue light passes through a mask or other component 108 to provide the blue light in a pattern that irradiates the composition to produce the initiating moiety (e.g., the initiating radical). In the embodiment shown in the figure, the blue light 107 irradiates a photoinitiation region 109 shaped like a prismatic volume, e.g., having ends shaped like the patterned light, through the composition. Accordingly, the blue light 107 produces the photoinitiator within the photoinitiator region 109.

Accordingly, the polymerizable monomer is polymerized in the region within the composition that is defined in three dimensions as being both 1) irradiated by the blue light 107 to form the photoinitiator; and 2) not irradiated by the near-UV light 103 to form the photoinhibitor. Thus, according to the technology, a three-dimensional item of polymerized material is formed instantaneously within the composition without forming a series of stacked two-dimensional slabs in a layer-by-layer process. Furthermore, according to the technology, three-dimensional item of polymerized material is buoyant within the composition and thus portions of the polymerized item that might be broken, distorted, or otherwise deformed by gravity or other forces are supported by buoyancy and, in some embodiments, the technology consequently does not require structural supports for polymerized items.

While FIG. 23 depicts an illustrative embodiment of the technology, the technology is not limited to the features and aspects shown therein or discussed herein in reference to FIG. 4.

For instance, the technology is not limited in the light used for irradiation and/or the light sources that are used for irradiation, e.g., a light having a first wavelength and a light having a second wavelength. The technology is not limited in the direction and/or relative angle of the sources providing the first and second wavelengths. The technology is not limited in the cross sectional shapes, areas, and/or patterns of the first and/or second wavelengths or the intensities of the first and/or second wavelengths. The technology is not limited in the wavelengths of the first and/or second sources.

As noted herein, the technology is not limited in the source of the light (e.g., one or more sources of one or more wavelengths of light). Accordingly, embodiments of the technology comprise, and comprise use of, a suitable light source (or combination of light sources) selected to be appropriate for the particular monomer ("resin"), photoinitiator, and/or photoinhibitor employed. While embodiments are discussed in terms of a light source, embodiments also include sources of radiation including an electron beam and other ionizing radiation sources.

In some embodiments, the light source is an actinic radiation source, such as one or more light sources (e.g., one or more light sources providing visible and/or ultraviolet electromagnetic radiation). In some embodiments, a light source is, e.g., an incandescent light, fluorescent light, phosphorescent or luminescent light, laser, light-emitting diode, etc., including arrays thereof. In some embodiments, a light source provides even coverage of light. Accordingly, in some embodiments a light source is a collimated beam or a planar waveguide, e.g., to provide even coverage of a light.

In some embodiments, the first wavelength is produced by a first light source, and the second wavelength is produced by a second light source. In some embodiments, the first wavelength and the second wavelength are produced by the same light source. In some embodiments, the first wavelength and second wavelength have emission peak wavelengths that are at least 5 or 10 nm apart from one another (e.g., the emission peak of the first wavelength is at least 5, 6, 7, 8, 9, 10, or more nm apart from the emission peak of the second wavelength).

In particular, as discussed herein, the technology relates to use of a first wavelength to activate a photoinitiator. Activating the photoinitiator produces an initiating moiety (e.g., initiating radicals) from the photoinitiator. The initiating radicals initiate polymerization of the polymerizable monomers. Further, as discussed herein, the technology relates to use of a second wavelength to activate a photoinhibitor (e.g., a photoinhibitor compound having fast back reaction kinetics (e.g., a HABI photoinhibitor (e.g., a bridged HABI photoinhibitor))). Activating the photoinhibitor produces an inhibiting moiety (e.g., inhibiting radicals) from the photoinhibitor. The inhibiting radicals prevent polymerization of the polymerizable monomers. Accordingly, embodiments of the technology relate to use of: 1) a first wavelength of light that activates the photoinitiator and that does not activate the photoinhibitor; and 2) a second wavelength of light that activates the photoinitiator and that does not activate the photoinhibitor. Thus, the photoinhibitor, photoinitiator, first wavelength, and second wavelength are chosen such that: 1) the first wavelength of light activates the photoinitiator and does not activate the photoinhibitor; and 2) the second wavelength of light activates the photoinhibitor and does not activate the photoinhibitor.

In some embodiments, the first wavelength is at or near the peak of the absorbance spectrum of the photoinitiator, e.g., within 50 nm (e.g., within 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm) of the peak of the absorbance spectrum of the photoinitiator. In some embodiments, the second wavelength is at or near the peak of the absorbance spectrum of the photoinhibitor, e.g., within 50 nm (e.g., within 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm) of the peak of the absorbance spectrum of the photoinhibitor.

A wavelength of light that is not strongly absorbed penetrates more deeply into a composition comprising an absorbing compound (e.g., a photoinitiator or photoinhibitor) and therefore activates a larger volume of photoactivated compound (e.g., a photoinitiator or photoinhibitor). Accordingly, in some embodiments, the first wavelength is chosen to be a wavelength that activates the photoinitiator, but that is also not strongly absorbed by the photoinitiator; similarly, in some embodiments, the second wavelength is chosen to be a wavelength that activates the photoinhibitor, but that is also not strongly absorbed by the photoinhibitor.

In some embodiments, the first wavelength is not near the peak of the absorbance spectrum of the photoinitiator, e.g., at least 50 nm (e.g., at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm) away from the peak of the absorbance spectrum of the photoinitiator. In some embodiments, the second wavelength is not near the peak of the absorbance spectrum of the photoinhibitor, e.g., at least 50 nm (e.g., within 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm) away from the peak of the absorbance spectrum of the photoinhibitor. Similarly, in some embodiments, the absorbance of the photoinitiator at the first wavelength is less than 25% (e.g., less than 25, 24, 23, 22, 21, 20, 19, 18, 17, 16, 15, 14, 13, 12, 11, 10, 9, 8, 7, 6, 5, 4.5, 4, 3.5, 3, 2.5, 2, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1, or 0.05%) of the absorbance of the photoinitiator at the wavelength of the absorbance peak of the photoinitiator. And, in some embodiments, the absorbance of the photoinhibitor at the second wavelength is less than 25% (e.g., less than 25, 24, 23, 22, 21, 20, 19, 18, 17, 16, 15, 14, 13, 12, 11, 10, 9, 8, 7, 6, 5, 4.5, 4, 3.5, 3, 2.5, 2, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1, or 0.05%) of the absorbance of the photoinhibitor at the wavelength of the absorbance peak of the photoinhibitor.

In some embodiments, a first light source initiates polymerization of monomers in a polymerizable composition. Further, a second light source providing a different wavelength of light is provided to inhibit (e.g., prevent) and spatially restrict polymerization of monomers in the polymerizable composition. In some embodiments, the first and second light sources irradiate overlapping regions of the composition. In some embodiments, the first and second light sources irradiate adjacent regions of the composition. In some embodiments, the first and second light sources irradiate different regions of the composition. In some embodiments, the shape and/or size of a polymerized region is determined by the difference of the photoinitiating pattern of the first light source and the photoinhibiting pattern of the second light source.

In some embodiments, light is provided in a pattern. In some embodiments, the first wavelength of light is provided as a pattern. In some embodiments, the second wavelength of light is provided as a pattern. The first and second wavelengths may be provided in patterns that are the same or different. In some embodiments, the methods comprise irradiating a composition as described herein with a pattern of a first wavelength of light. In some embodiments, the methods comprise irradiating a composition as described herein with a pattern of a second wavelength of light. In some embodiments, different patterns of light for two different wavelengths of light are used. In some embodiments, the patterns overlap in different configurations. In some embodiments, the methods comprise irradiating a composition as described herein with a first pattern of a first wavelength of light. In some embodiments, the methods comprise irradiating a composition as described herein with a second pattern of a second wavelength of light.

In some embodiments, the technology provides a pattern having a resolution with millions of pixel elements. In some embodiments, the technology provides a pattern having millions of pixel elements whose wavelength and/or intensities are varied to change the pattern of irradiation provided to the composition. For example, in some embodiments the pattern is provided by a DLP comprising more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) rows and/or more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) columns. In some embodiments the pattern is provided by a LCD comprising more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) rows and/or more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) columns.

In some embodiments, a light source is a liquid crystal display (LCD), light emitting diode (LED), or a digital light projector (DLP), e.g., to deliver a pattern of light. In some embodiments, the light source includes a pattern-forming element operatively associated with a controller. In some embodiments, the light source or pattern forming element comprises a digital (or deformable) micromirror device (DMD) with digital light processing (DLP), a spatial modulator (SLM), or a microelectromechanical system (MEMS) mirror array, a mask (aka a reticle), a silhouette, or a combination thereof. See, U.S. Pat. No. 7,902,526, incorporated herein by reference. In some embodiments, the light source comprises a spatial light modulation array such as a liquid crystal light valve array or micromirror array or DMD (e.g., with an operatively associated digital light processor, typically under the control of a suitable controller), configured to carry out exposure or irradiation of a composition as described herein (e.g., by maskless photolithography). See, e.g., U.S. Pat. Nos. 6,312,134; 6,248,509; 6,238,852; and 5,691,541, each of which is incorporated herein by reference.

In some embodiments, the technology provides a pattern having a resolution with millions of pixel elements. In some embodiments, the technology provides a pattern having millions of pixel elements whose wavelength and/or intensities are varied to change the pattern of irradiation provided to the composition. For example, in some embodiments the pattern is provided by a DLP comprising more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) rows and/or more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) columns. In some embodiments the pattern is provided by a LCD comprising more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) rows and/or more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) columns.

The technology is not limited in the pattern of irradiation produced by a first and/or second light source. For example, in some embodiments, the pattern comprises one or more geometric shapes, one or more irregular shapes, or one or more lines, dots, or other graphic features. In some embodiments, the pattern of irradiation changes with time, e.g., in some embodiments the pattern of irradiation is provided as a series of patterned images, e.g., a movie.

For example, in some embodiments, the technology comprises use of irradiation provided as a time-variable pattern of the first and/or second wavelength. In some embodiments, the length of time that each pattern of irradiation is provided depends on, e.g., the wavelength and/or intensity of the wavelength, the presence or absence of a photon absorbing substance (e.g., a dye) in the composition, the photoinitiator used, the photoinhibitor used (e.g., a photoinhibitor compound having fast back reaction kinetics (e.g., a HABI photoinhibitor (e.g., a bridged HABI photoinhibitor)))), and the volume of the composition (e.g., the dimensions of the composition (e.g., in the direction in which the light is travelling)). In some embodiments, a composition is irradiated by a pattern for a time that is approximately 1 ps to 6,000 seconds or more (e.g., approximately 0.001, 0.005, 0.01, 0.05, 0.1, 0.5, or 1 ns; approximately 0.001, 0.005, 0.01, 0.05, 0.1, 0.5, or 1 µs; approximately 0.001, 0.005, 0.01, 0.05, 0.1, 0.5, or 1 ms; approximately 0.001, 0.005, 0.01, 0.05, 0.1, 0.5, or 1 s; or approximately 0.001, 0.005, 0.01, 0.05, 0.1, 0.5, or 1 µs; approximately 0.001, 0.005, 0.01, 0.05, 0.1, 0.5, or 1 minute).

In some embodiments, a "dark" period is provided between each irradiation pattern. That is, in some embodiments, the composition is not irradiated for a period of time between the time periods of irradiation by the first and/or second wavelength. In some embodiments, the period of time during which the composition is not irradiated between periods of irradiation is approximately 1 ns to 6,000 seconds or more (e.g., approximately 0.001, 0.005, 0.01, 0.05, 0.1, 0.5, or 1 ns; approximately 0.001, 0.005, 0.01, 0.05, 0.1, 0.5, or 1 µs; approximately 0.001, 0.005, 0.01, 0.05, 0.1, 0.5, or 1 ms; approximately 0.001, 0.005, 0.01, 0.05, 0.1, 0.5, or 1 s; or approximately 0.001, 0.005, 0.01, 0.05, 0.1, 0.5, or 1 µs; approximately 0.001, 0.005, 0.01, 0.05, 0.1, 0.5, or 1 minute). In some embodiments, the period of time during which the composition is not irradiated between periods of irradiation is approximately 0.1 ps to 1 second (e.g., approximately 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1 ps; approximately 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1 ns; approximately 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1 µs; or approximately 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1 s). Thus, in some embodiments, the pattern varies tens, hundreds, thousands, or millions of times to produce a polymerized article within the composition.

The technology is not limited in the intensity of the first and/or second wavelengths provided by the first and/or second sources. For example, embodiments comprise light provided at intensities of from 0.001 to 1000 mW/cm$^2$ (e.g., approximately 0.001, 0.005, 0.01, 0.05, 0.1, 0.5, 1, 5, 10, 50, 100, 500, or 1000 mW/cm$^2$). In some embodiments, light is provided having a wavelength in the UV, visible, and/or infrared regions of the electromagnetic spectrum (e.g., wavelengths of 10 nm to 1 mm (e.g., 10, 20, 30, 40, 50, 60, 70, 80, 90, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795, 800, 805, 810, 815, 820, 825, 830, 835, 840, 845, 850, 855, 860, 865, 870, 875, 880, 885, 890, 895, 900, 905, 910, 915, 920, 925, 930, 935, 940, 945, 950, 955, 960, 965, 970, 975, 980, 985, 990, 995, or 1000 nm)).

The technology is not limited in the cross sectional area of the beam and/or two-dimensional pattern that is provided (e.g., the beam or pattern of the first and/or second wavelengths of light provided by the first and/or second sources). For example, in some embodiments the cross sectional area of the beam and/or two-dimensional pattern of the first and/or second wavelength is approximately 0.5 µm$^2$ to 10,000 mm$^2$ (e.g., approximately 0.5, 0.6, 0.7, 0.8, 0.9, 1, 2, 3, 4, 5, 6, 7, 8, 9, 10, 20, 30, 40, 50, 60, 70, 80, 90, 100, 200, 300, 400, 500, 600, 700, 800, 900, or 1000 µm$^2$; approximately 0.5, 0.6, 0.7, 0.8, 0.9, 1, 2, 3, 4, 5, 6, 7, 8, 9, 10, 20, 30, 40, 50, 60, 70, 80, 90, 100, 200, 300, 400, 500, 600, 700, 800, 900, or 1000 mm$^2$; or approximately 0.5, 0.6, 0.7, 0.8, 0.9, 1, 2, 3, 4, 5, 6, 7, 8, 9, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, or 10,000 mm$^2$) In some embodiments, the cross sectional area of the beam and/or two-dimensional pattern that is provided (e.g., the beam or pattern of the first and/or second wavelengths of light provided by the first and/or second sources) is varied (e.g., increased, decreased) with time.

The technology is not limited in the orientation of the direction of propagation of the first and/or second wavelengths from the first and/or second sources to the composition. The technology is not limited in the angle between the direction of propagation of the first and second wavelengths from the first and second sources to the composition. For example, in some embodiments the first and second wavelengths are parallel (e.g., and may have the same or different intensities). In some embodiments, the first and second wavelengths are perpendicular. In some embodiments, the first and second wavelengths are antiparallel (e.g., provided at a 180° angle between the direction of propagation of the first and second wavelengths from the first and second sources to the composition). The technology comprises embodiments in which the first and second wavelengths are provided from the first and second sources with an angle of 0-180° between them (e.g., 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, or 180° between them). Some embodiments comprise changing the angle of propagation of the first and/or second wavelengths from the first and/or second source to the composition. Some embodiments comprise changing the angle of propagation of the first and/or second wavelengths from the first and/or second source to the composition as a function of time.

In some embodiments, irradiation as described herein finds use in methods of producing an item comprising a polymer, e.g., by the polymerization of polymerizable monomers. Thus, in some embodiments the technology comprises irradiating a composition, e.g., with a first and/or a second wavelength, e.g., as provided by a first and/or a second wavelength of light. Embodiments of methods comprising irradiating steps are described herein.

Methods for Three-Dimensional Printing

The technology provides embodiments of methods. In particular, the technology relates to methods of producing a polymer, e.g., by irradiating a composition comprising a polymerizable monomer, a photoinitiator, and a photoinhibitor (e.g., a photoinhibitor compound having fast back reaction kinetics (e.g., a HABI photoinhibitor (e.g., a bridged HABI photoinhibitor))) with a first wavelength of light (e.g., to produce an initiating moiety (e.g., an initiating radical) from the photoinitiator) and a second wavelength of light (e.g., to produce an inhibiting moiety (e.g., an inhibiting radical) from a photoinhibitor (e.g., a photoinhibitor compound having fast back reaction kinetics (e.g., a HABI photoinhibitor (e.g., a bridged HABI photoinhibitor))). Accordingly, methods comprise irradiating the composition with the first and second wavelengths to produce arbitrary three-dimensional objects comprising polymer.

In some embodiments, methods comprise providing a composition comprising a polymerizable monomer, a photoinitiator, and a photoinhibitor (e.g., a photoinhibitor compound having fast back reaction kinetics (e.g., a HABI photoinhibitor (e.g., a bridged HABI photoinhibitor))). In some embodiments, methods comprise providing a reaction container (e.g., a vessel such as a cuvette). In some embodiments, the reaction chamber comprises a composition as described herein. In some embodiments, the reaction chamber is transparent to the first and/or second wavelengths of light used to irradiate the composition. In some embodiments, the chamber comprises a material that provides a band pass filter, e.g., to transmit to the composition a selected wavelength or range of wavelengths of light (e.g., as provided by the first and/or second sources of light).

In some embodiments, methods comprise a step of irradiating the composition with a first wavelength of light, e.g., to initiate polymerization of monomers by producing a radical from the photoinitiator. In some embodiments, methods comprise a step of irradiating the composition with a second wavelength of light, e.g., to prevent, inhibit, minimize, and/or stop polymerization of monomers by producing a radical from a photoinhibitor (e.g., a photoinhibitor compound having fast back reaction kinetics (e.g., a HABI photoinhibitor (e.g., a bridged HABI photoinhibitor))). Thus, in some embodiments, a first wavelength of light is focused on a composition as provided herein, e.g., to polymerize a polymerizable monomer in the composition ("photoinitiation"). In some embodiments, a second, different wavelength of light is focused on a composition as provided herein, e.g., to prevent, inhibit, minimize, and stop the polymerization of the polymerizable monomer ("photoinhibition"). In the embodiments of methods, the first and second wavelengths and/or the first and second sources are provided as described herein.

In some embodiments, the first wavelength is produced by a first light source, and the second wavelength is produced by a second light source. Thus, in some embodiments, methods comprise producing a first wavelength and, in some embodiments, methods comprise producing a second wavelength.

In some embodiments, the shape and/or size of a polymerized region is determined by the difference of the photoinitiating pattern of the first light source and the photoinhibiting pattern of the second light source.

In some embodiments, methods comprise providing a first wavelength in a pattern (e.g., a first pattern). In some embodiments, methods comprise providing a second wavelength in a pattern (e.g., a second pattern). In some embodiments, the first and/or second patterns are a time-variable pattern as described herein.

In some embodiments, the methods comprise moving a first wavelength of light and a second wavelength of light to move the region of the composition irradiated by the first wavelength, second wavelength, and/or both the first and second wavelengths, e.g., as a function of time.

In some embodiments, methods comprise inhibiting, preventing, terminating, minimizing, and/or inhibiting polymerization in a region of the composition. In some embodiments, methods comprise inhibiting, preventing, terminating, minimizing, and/or inhibiting polymerization by irradiating a region of the composition with the second wavelength of light, e.g., as provided by a second light source. In some embodiments, photoinhibition of polymerization is rapidly eliminated in the absence of the photoinhibition irradiation wavelength because the photoinhibitor having fast back reaction kinetics reforms from the inhibiting radical with a half-life of approximately 100 ns to 100 µs to 100 ms to 100 s (e.g., 10, 20, 30, 40, 50, 60, 70, 80, 90, 100, 200, 300, 400, 500, 600, 700, 800, 900, or 1000 ns; 10, 20, 30, 40, 50, 60, 70, 80, 90, 100, 200, 300, 400, 500, 600, 700, 800, 900, or 1000 µs; 10, 20, 30, 40, 50, 60, 70, 80, 90, 100, 200, 300, 400, 500, 600, 700, 800, 900, or 1000 ms; or 0, 20, 30, 40, 50, 60, 70, 80, 90, 100, 200, 300, 400, 500, 600, 700, 800, 900, or 1000 s). In some embodiments, while the photoinhibitor (e.g., a photoinhibitor compound having fast back reaction kinetics (e.g., a HABI photoinhibitor (e.g., a bridged HABI photoinhibitor)) and inhibiting species formed therefrom are incapable of initiating free radical polymerization of polymerizable monomers (e.g., methacrylate monomers), the inhibiting species rapidly recombine with and terminate the growing polymer chain. Accordingly, in some embodiments, methods comprise inhibiting, preventing, terminating, minimizing, and/or inhibiting polymerization.

In some embodiments, the methods further comprise varying the intensity of the first wavelength of light. In some embodiments, the methods further comprise varying the intensity of the second wavelength of light. In some embodiments, varying the intensity of the first and/or second wavelength of light changes the region of the composition in which polymerization occurs.

In some embodiments, the methods comprise varying the intensity and/or the wavelength of the first source of light. In some embodiments, the methods further comprise varying the intensity and/or wavelength of the second source of light. In some embodiments, varying the intensity and/or wavelength of the first and/or second sources of light changes the region of the composition in which polymerization occurs.

In some embodiments, methods comprise a step of irradiating the composition with a first source of light, e.g., to initiate polymerization of monomers by producing a radical from the photoinitiator. In some embodiments, methods comprise a step of irradiating the composition with a second source of light, e.g., to prevent, terminate, minimize, and/or inhibit polymerization of monomers by producing a radical from a photoinhibitor (e.g., a photoinhibitor compound having fast back reaction kinetics (e.g., a HABI photoinhibitor (e.g., a bridged HABI photoinhibitor))). In some embodiments, methods comprise a step of irradiating the composition with a first source of light, e.g., to produce a region (e.g., a three-dimensional region) within the composition where monomers polymerize. In some embodiments, methods comprise a step of irradiating the composition with a second source of light, e.g., to produce a region (e.g., a three-dimensional region) within the composition where monomers do not polymerize. In some embodiments, a region irradiated by both the first source of light and the second source of light is a region within the composition where monomers do not polymerize because the initiating radicals do not initiate polymerization in the presence of the inhibiting radicals. Accordingly, embodiments of the technology comprise producing a polymerization region. In some embodiments, methods comprise producing a time-variable polymerization region within the composition.

In some embodiments, methods comprise irradiating a composition as provided herein with a first wavelength and/or a second wavelength for a time that is approximately 1 ns to 6,000 seconds or more (e.g., approximately 0.001, 0.005, 0.01, 0.05, 0.1, 0.5, or 1 µs; approximately 0.001, 0.005, 0.01, 0.05, 0.1, 0.5, or 1 ms; approximately 0.001, 0.005, 0.01, 0.05, 0.1, 0.5, or 1 s; or approximately 0.001, 0.005, 0.01, 0.05, 0.1, 0.5, or 1 µs; approximately 0.001, 0.005, 0.01, 0.05, 0.1, 0.5, or 1 minute). Some embodiments comprise providing periods of time wherein the composition is not irradiated, e.g., in some embodiments, methods comprise not irradiating the composition for a period of time between subsequent steps of irradiating the composition by the first and/or second wavelength. In some embodiments, the period of time of not irradiating the composition, e.g., between periods of irradiating the composition, is approximately 1 ns to 6,000 seconds or more (e.g., approximately 0.001, 0.005, 0.01, 0.05, 0.1, 0.5, or 1 ns; approximately 0.001, 0.005, 0.01, 0.05, 0.1, 0.5, or 1 µs; approximately 0.001, 0.005, 0.01, 0.05, 0.1, 0.5, or 1 ms; approximately 0.001, 0.005, 0.01, 0.05, 0.1, 0.5, or 1 s; or approximately 0.001, 0.005, 0.01, 0.05, 0.1, 0.5, or 1 µs; approximately 0.001, 0.005, 0.01, 0.05, 0.1, 0.5, or 1 minute). In some embodiments, the period of time during which the composition is not irradiated between periods of irradiation is approximately 0.1 ps to 1 second (e.g., approximately 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1 ps; approximately 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1 ns; approximately 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1 µs; or approximately 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1 s). Thus, in some embodiments, the pattern varies tens, hundreds, thousands, or millions of times to produce a polymerized article within the composition.

Some embodiments comprise constantly irradiating with the first wavelength of light and varying the second wavelength of light. Some embodiments comprise constantly irradiating with the second wavelength of light and varying the first wavelength of light. Some embodiments comprise irradiating a composition as described herein with a first source providing one or more of a constant intensity, wavelength, and/or pattern of light and irradiating the composition as described herein with a second source providing one or more of a varying intensity, wavelength, and/or pattern of light. Some embodiments comprise irradiating a composition as described herein with a second source providing one or more of a constant intensity, wavelength, and/or pattern of light and irradiating the composition as described herein with a first source providing one or more of a varying intensity, wavelength, and/or pattern of light.

In some embodiments, methods comprise producing a polymerizing region in a composition comprising a polymerizable monomer, a photoinitiator, and a photoinhibitor (e.g., a photoinhibitor compound having fast back reaction kinetics (e.g., a HABI photoinhibitor (e.g., a bridged HABI photoinhibitor))). In some embodiments, the polymerizing region is a three-dimensional space contacted by light having a wavelength and intensity that activates the photoinitiator; in some embodiments, the polymerizing region is not contacted by light having an intensity and/or wavelength that activates the photoinhibitor. That is, in some embodiments the polymerizing region comprises sufficient photoinitiating radicals to produce polymer from monomer but does not comprise sufficient photoinhibitor to inhibit production of polymer from monomer.

As described herein, the size, wavelength, intensity, and pattern of the first and second wavelengths of light produce the three-dimensional space in the composition that is the polymerizing region. In some embodiments, the three-dimensional space has dimensions of approximately 0.5 µm-100 cm×0.5 µm-100 cm×0.5 µm-100 cm. Accordingly, the three-dimensional space is shaped, in various embodiments, as a dot, a thin rod or line, a slab, a prism, or a cube. The shape of the polymerizing region, however, is not limited to these particularly listed shapes and can be any arbitrary shape produced by the intersecting patterns of the first and second wavelengths of light. In some embodiments, methods comprise varying the polymerizing region as a function of time, e.g., varying the shape, volume, position, etc. of the polymerizing region.

Systems for Three-Dimensional Printing

In some embodiments, the technology relates to systems, e.g., comprising a composition as described herein, a first wavelength of light (e.g., as produced by a first light source), and a second wavelength of light (e.g., as produced by a second light source).

For instance, system embodiments comprise one or more suitable light sources selected to be appropriate for the particular monomer ("resin"), photoinitiator, and/or photoinhibitor. While embodiments are discussed in terms of one or more light sources, embodiments also include sources of radiation including an electron beam and other ionizing radiation sources. In some embodiments, the first and second wavelengths of light are produced from the same light source and in some embodiments the first and second wavelengths are produced from a first and second light source. The various types of light sources are described herein and the first and second light sources are independently selected and need not be the same but may be.

In some embodiments, a light source is an actinic radiation source (e.g., one or more light sources providing visible and/or ultraviolet electromagnetic radiation). In some embodiments, a light source is, e.g., an incandescent light, fluorescent light, phosphorescent or luminescent light, laser, light-emitting diode, etc., including arrays of any of the foregoing. In some embodiments, a light source provides even coverage of light. Accordingly, in some embodiments a light source is a collimated beam or a planar waveguide, e.g., to provide even coverage of a light.

In some embodiments, systems comprise one or more filters, e.g., to transmit to the composition a selected wavelength or range of wavelengths of light (e.g., as provided by the first and/or second sources of light).

In some embodiments, embodiments, systems comprise one or more masks, e.g., to irradiate a composition with a first and/or second wavelength of light in a specific shape or pattern.

In some embodiments, light is provided in a pattern. Accordingly, in some embodiments a light source is a liquid crystal display (LCD), light emitting diode (LED), or a digital light projector (DLP), e.g., to deliver a pattern of light. In some embodiments, the light source includes a pattern-forming element operatively associated with a controller. In some embodiments, the light source or pattern forming element comprises a digital (or deformable) micromirror device (DMD) with digital light processing (DLP), a spatial modulator (SLM), or a microelectromechanical system (MEMS) mirror array, a mask (aka a reticle), a silhouette, or a combination thereof. See, U.S. Pat. No. 7,902,526, incorporated herein by reference. In some embodiments, the light source comprises a spatial light modulation array such as a liquid crystal light valve array or micromirror array or DMD (e.g., with an operatively associated digital light processor, typically in turn under the control of a suitable controller), configured to carry out exposure or irradiation of a composition as described herein (e.g., by maskless photolithography). See, e.g., U.S. Pat. Nos. 6,312,134; 6,248,509; 6,238,852; and 5,691,541, incorporated herein by reference.

In some embodiments, a light source directs a first light and/or a second light into a composition as described herein. In some embodiments, the second light has a second wavelength selected to produce photoinhibition (e.g., to create a photoinhibition layer and/or to create a photoinhibition volume) within the liquid. The first light has a first wavelength, different than the second wavelength, that is used to polymerize the photoactive resin in the liquid (e.g., within a photoinitiation layer). In some embodiments, the first light has a first wavelength that produces an initiating radical from the photoinitiator and the second light has a second wavelength, different than the first wavelength, that forms a radical from a bridged HABI photoinhibitor compound. In some embodiments, the first and/or second light(s) are provided in accordance with a defined pattern or patterns. In addition, various embodiments provided that the one or more light sources can be a dual wavelength illumination source device or separate illumination devices.

In some embodiments, systems comprise a reaction container (e.g., a vessel such as a cuvette). In some embodiments, the reaction chamber comprises a composition as described herein. In some embodiments, the reaction chamber is transparent to the first and/or second wavelengths of light used to irradiate the composition. In some embodiments, the chamber comprises a material that provides a band pass filter, e.g., to transmit to the composition a selected wavelength or range of wavelengths of light (e.g., as provided by the first and/or second sources of light).

In some embodiments, the one or more light sources is/are connected with a computer (or other controller). In some embodiments, the technology comprises use of a computer and/or microprocessor. For example, embodiments of technology are implemented in digital electronic circuitry, or in computer software, firmware, or hardware, including embodiments of methods described herein. For example, embodiments of the technology are implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

In some embodiments, the technology comprises use of a "data processing apparatus". The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by, and/or under the control of, one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), etc. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Some embodiments of the technology are implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

A computer includes a processor and a memory. The processor can be one or more hardware processors, which can each include multiple processor cores. The memory can include both volatile and non-volatile memory, such as Random Access Memory (RAM) and Flash RAM. The computer can include various types of computer storage media and devices, which can include the memory, to store instructions of programs that run on the processor. For example, a 3D printing program can be stored in the memory and run on the processor to implement the techniques described herein.

Uses for Three-Dimensional Printing

The technology is not limited in its use and finds use in a wide variety of polymer-associated technologies. In some embodiments, the compositions, methods, and systems described herein are particularly useful for making three-dimensional articles. For instance, the technology described herein (e.g., related to using dual-wavelength irradiation) finds use in three-dimensional printing. In contrast to conventional three dimensional (3D) printing based on additive manufacturing by the accretion of construction material, the present technology provides, in some embodiments, for the production of polymerized articles in toto using a single exposure by the first and/or second wavelengths to produce the polymerization region of the desired shape. In some embodiments, a 3D printed object is created by utilizing computer-aided design (CAD) data of an object to control sequential irradiation of a composition as provided herein with constant and/or changing patterns, wavelengths, and/or intensities of the first and/or second wavelengths of light.

In some embodiments, the technology finds use to improve additive manufacturing method in which two-dimensional slabs are polymerized and added in succession to produce a three-dimensional object. In some embodiments, the technology finds use in producing the two-dimensional slabs that are the basis of additive 3D printing.

In some embodiments, the technology finds use in continuous layer interface production (CLIP). In particular, in some embodiments, the use of the first wavelength, second wavelength, and a composition as described herein (e.g., comprising a photoinhibitor (e.g., a photoinhibitor compound having fast back reaction kinetics (e.g., a HABI photoinhibitor (e.g., a bridged HABI photoinhibitor)))) finds use in producing a dead zone in CLIP. See, e.g., U.S. Pat. Nos. 9,205,601; 9,216,546; and U.S. Pat. App. Pub. No. 2016/0067921, each of which is incorporated herein by reference. In particular, the two-wavelength photoinitiator/photoinhibitor technology provided herein finds use in the three-dimensional printing technology described in U.S. Pat. App. Pub. No. 2016/0067921. In some embodiments, TED used in U.S. Pat. App. Pub. No. 2016/0067921 is replaced by another photoinhibitor (e.g., a photoinhibitor compound having fast back reaction kinetics (e.g., a HABI photoinhibitor (e.g., a bridged HABI photoinhibitor))).

In some embodiments, the technology finds use in stereolithography (SL). SL is one type of additive manufacturing where a liquid resin is hardened by selective exposure to a radiation to form each 2D layer. In some embodiments, the radiation is in the form of electromagnetic waves (e.g., light, photons) or an electron beam. The most commonly applied energy source is ultraviolet, visible, or infrared radiation. The liquid photopolymer resin can contain monomers, oligomers, fillers and additives such as photoinitiators, blockers, colorants and other types depending on the targeted properties of the resin.

In some embodiments, the technology finds use in true additive manufacturing and/or in direct write lithography. Products that may be produced by the compositions, methods, and systems described herein include, but are not limited to, large-scale models or prototypes, small custom products, miniature or microminiature products or devices, etc. Examples include, but are not limited to, mechanical parts, medical devices and implantable medical devices such as stents, drug delivery depots, functional structures, microneedle arrays, fibers and rods such as waveguides, micromechanical devices, microfluidic devices, etc.

In some embodiments, the technology finds use in producing further exemplary products including, but not limited to, medical devices and implantable medical devices such as stents, drug delivery depots, catheters, breast implants, testicle implants, pectoral implants, eye implants, contact lenses, dental aligners, microfluidics, seals, shrouds, and other applications requiring high biocompatibility; functional structures; microneedle arrays; fibers; rods; waveguides; micromechanical devices; microfluidic devices; fasteners; electronic device housings; gears, propellers, and impellers; wheels; mechanical device housings; tools; structural elements; hinges including living hinges; boat and watercraft hulls and decks; wheels; bottles, jars, and other containers; pipes, liquid tubes, and connectors; foot-ware soles, heels, innersoles, and midsoles; bushings, o-rings, and gaskets; shock absorbers, funnel/hose assembly, and cushions; electronic device housings; shin guards, athletic cups, knee pads, elbow pads, foam liners, padding or inserts, helmets, helmet straps, head gear, shoe cleats, gloves, and other wearable or athletic equipment; brushes, combs, rings, jewelry, buttons, snaps, fasteners, watch bands, or watch housings; mobile phone or tablet casings or housings; computer keyboards, keyboard buttons, or components; remote control buttons or components; auto dashboard components, buttons, or dials; auto body parts, paneling, and other automotive, aircraft or boat parts; cookware, bakeware, kitchen utensils, and steamers; and any number of other three-dimensional objects.

Deadzone Control for Three-Dimensional Printing

Layerless or continuous stereolithographic (SLA) three-dimensional printing provides significant improvements over traditional layer-by-layer approaches of forming objects from a polymer. Most importantly, continuous printing technologies provide a dramatic improvement in the achievable print speed. Some conventional continuous three-dimensional printing technologies achieve improved print speeds by creating an $O_2$-inhibited "dead zone" of polymer near the projection window which prevents adhesion of the polymer to the projection window during the printing process. See, e.g., U.S. Pat. Nos. 9,205,601 and 9,216,546, each of which is incorporated herein by reference. See also Tumbleston et al. (2015) "Continuous liquid interface production of 3D objects" Science 347: 1349, incorporated herein by reference.

However, conventional continuous printing technologies comprising use of "dead zone" inhibition of polymerization are limited by certain performance characteristics. First, in some of these technologies, the dead zone thickness is strongly dependent on the intensity of the photoinitiating light. In particular, while high intensity light is favorable for rapid polymerization and high print speeds, the high intensity also produces a small dead zone thickness that limits print speeds and the size and shape of printed objects. Therefore, the use of high intensity light reduces or even negates many benefits of continuous printing methods. Second, the thickness of the dead zone in $O_2$-inhibited continuous printing technologies is typically approximately 100 μm thick. This narrow dead zone hinders the reflow of uncured resin into the print area during printing, thus limiting print speeds. Further, liquid reflow into the dead zone depends on the cross-sectional area of the item being printed, which further limits the size and shapes of printed items. And, oxygen terminates acrylate photo-polymerization, thus increasing materials costs. Accordingly, production of items with large cross-sectional areas is severely limited and therefore printing speeds for such parts are generally very slow. Improvements in the three-dimensional printing art are needed.

The technology relates, in some embodiments, to producing and/or controlling dead zone thickness and/or shape in continuous liquid stereolithogrphy three-dimensional printing. In particular, some embodiments of the technology comprise producing and/or controlling dead zone thickness and/or shape without limiting the intensity of initiating wavelengths of light. In particular embodiments, the technology comprises use of a photopolymer system comprising a photoinitiator and a photoinhibitor having complementary absorbance spectra. For example, in some embodiments polymerization is inhibited by UV light and initiated by blue light. Using embodiments of the technology, controlling the penetration depth into the resin bath of the wavelength of light that activates the photoinhibitor (e.g., to produce the inhibiting species (e.g., a radical inhibiting species)) enables facile control of the dead zone thickness.

In extant technologies, a dead zone having a small thickness (e.g., approximately 10 to 100 μm) is produced, e.g., in technologies using 02 as a photoinhibitor. See, e.g., Tumbleston et al. (2015) "Continuous liquid interface production of 3D objects" Science 347: 1349, incorporated herein by reference. The small thickness of the dead zone severely limits resin reflow rates into the dead zone, which consequently limits print speeds. In particular, small dead zone thickness substantially limits the print speed of items having large cross-sectional areas (e.g., on the order of a few square centimeters). Increasing the dead zone thickness in $O_2$-inhibited continuous 3D printing at a constant initiating intensity has been difficult to achieve; thus, attempts to improve 3D print speeds of regions with large cross sectional areas has failed.

In contrast, the technology provided herein produces a dead zone having a larger thickness than conventional technologies. For example, in some embodiments, the technology produces a dead zone having a thickness that is an order of magnitude larger than the dead zone thickness provided by extant technologies (e.g., 100 μm to 1000 μm). That is, in some embodiments the technology provided herein produces a dead zone having a thickness of at least approximately 1 mm to 10 mm (e.g., at least approximately 1, 2, 3, 4, 5, 6, 7, 8, 9, or 10 mm). In some embodiments, the technology provided herein produces a dead zone having a thickness that is greater than 10 mm. In some embodiments, the increased dead zone thickness minimizes and/or eliminates problems related to resin reflow rates and associated limits on print speed.

Thus, in some embodiments, the technology provides a dead zone for continuous three-dimensional printing methods (e.g., continuous liquid interface production (CLIP) 3D printing) while maintaining high intensity initiating light to improve print speeds of large cross sectional area parts.

In particular, the technology comprises use of a two-wavelength system in which a first wavelength (e.g., blue light) initiates polymerization and a second wavelength (e.g., UV) inhibits polymerization. In some embodiments, the technology comprises use of a UV-activated photoinhibitor in a continuous 3D printing technology to create a light-controlled dead zone. Thus, embodiments allow for controlling dead zone thickness, e.g., by adjusting the components of the resin composition (e.g., comprising polymerizable monomers, photoinitiator, photoinhibitor, and, optionally an absorbing dye (e.g., a UV-absorbing dye)) or the intensity of the inhibiting and initiating light sources (e.g., providing the inhibiting and initiating wavelengths).

Continuous Liquid Interface Printing (CLIP)

The technology relates to providing an improved dead zone for continuous three-dimensional printing techniques, such as CLIP. In short, CLIP is a continuous three-dimensional printing process that produces a polymerized item from a composition comprising a liquid photopolymer resin. The composition is held in a reaction chamber comprising a "window" that is transparent to a wavelength of light that initiates polymerization of the resin. A light source provides a beam of the polymerizing light through the window, illuminating the composition to initiate polymerization of the item. The object is lifted slowly up from the composition to allow resin to reflow under the item and maintain contact with the bottom of the item. A "dead zone" lies below the object, which is a persistent liquid interface that prevents the resin from attaching to the window because photopolymerization is inhibited in the dead zone between the window and the polymerizer. See, e.g., U.S. Pat. Nos. 9,205,601 and 9,216,546; and U.S. Pat. App. Pub. No. 2016/0107380, each of which is incorporated herein by reference. See also Tumbleston et al. (2015) "Continuous liquid interface production of 3D objects" Science 347: 1349 and Int'l Pat. App. No. PCT/US2016/054467 (Int'l Pat. Pub. No. WO 2017/059082 A1), each of which is incorporated herein by reference. The CLIP technology provided improvements over previous layer-by-layer approaches. For instance, CLIP methods have printing speeds that are approximately 100 times faster than the traditional layer-by-layer methods.

While current CLIP technologies print small cross-sectional area parts (e.g., having cross-sectional areas below 1-3 cm$^2$), technologies based on $O_2$-based inhibition strategies are limited in their ability to produce large-cross sectional area parts rapidly due to the resin reflow limitations of an oxygen-inhibited dead zone. In particular, extant CLIP methods have printing speeds up to approximately 1000 mm/hour. Further, some technologies comprise use of an irreversibly photoactivated photoinhibitor (e.g., butyl nitrite) (see, e.g., Int'l Pat. App. No. PCT/US2016/054467 (Int'l Pat. Pub. No. WO 2017/059082 A1). After photoactivation, an irreversibly photoactivated photoinhibitor does not recombine to form an inactive compound by a back reaction and thus inhibits polymerization in the absence of the photoactivating wavelength and/or can diffuse into regions of the composition where inhibition is not desired. These limitations severely limit the geometries that are able to be rapidly printed using this technology.

In contrast to extant technologies, embodiments of the technology described herein related to continuous liquid interface production having an increased dead zone size and/or controllable dead zone thickness. In some embodiments, the technology produces items with improved speed and having cross sectional areas of any size. In particular embodiments, the technology provides a method of controlling dead zone thickness through use of a chemical photoinhibitor to inhibit polymerization; and provides related three-dimensional printing systems and apparatuses that incorporate this method.

In particular, the technology provides methods for controlling dead zone size to inhibit free radical polymerization in the region above the projection window in stereolithographic printing method. In particular, the technology is based on use of a photoactivatable photoinhibitor (e.g., a photoinhibitor that produces a species that inhibits polymerization of a polymerizable monomer upon irradiation by an appropriate wavelength and intensity of light) and a light source to provide irradiation by an appropriate wavelength and intensity of light. Using this technology, the shape and/or thickness of the dead zone is controlled by the penetration depth of the activating light, which is controlled by adjusting the wavelength intensity, adjusting the concentration of light absorbing substances that attenuate the intensity of the activating wavelength, and/or the adjusting the photoinhibitor concentration. The technology thus provides control of the thickness of the dead zone.

In sum, the technology comprises use of a two-wavelength system for continuous 3D printing. A first wavelength (e.g., blue light) initiates the polymerization and a second wavelength (e.g., UV) inhibits the polymerization through the use of a photoinhibitor. Controlling the penetration depth of the second wavelength into the composition controls the depth to which inhibition occurs, thus producing the dead zone.

Compositions for Deadzone Control

The technology relates to compositions for producing a polymer, e.g., to produce a patterned article of manufacture, e.g., for three-dimensional (3D) printing, etc. In particular, the technology relates to producing a polymer from polymerizable monomers (e.g., from a "resin"). The technology is not limited in the polymerizable monomer used provided that polymerization of the monomer is initiated by a radical formed from the photoinitiator and polymerization of the monomer is inhibited by a radical formed from the photoinhibitor. That is, embodiments provide that polymerization of the monomers occurs where the photoinitiator is activated by a first wavelength of light and polymerization of the monomers does not occur where the photoinhibitor is activated by a second wavelength of light.

Accordingly, embodiments relate to compositions comprising a monomer, a photoinitiator, and a photoinhibitor. In some embodiments, compositions further comprise one or more light absorbing dyes. In some embodiments, compositions further comprise one or more coinitiators. In some embodiments, compositions comprise one or more solvents.

Embodiments of compositions comprise a photoinhibitor. For example, in some embodiments, the technology relates to a composition comprising a photoinhibitor that is, e.g., a liquid or a gas. In some embodiments, the specific inhibitor depends upon the monomer being polymerized and the polymerization reaction.

A wide variety of radicals is known which tend to preferentially terminate growing polymer radicals, rather than initiating polymerizations. For example, ketyl radicals are known in the art to terminate rather than initiate photopolymerizations. Similarly, the technology comprises use of a controlled radical polymerization that uses a radical species to selectively terminate growing radical chains. Examples of terminating radicals that find use in embodiments of the technology include, but are not limited to, the sulfanylthiocarbonyl and other radicals generated in photoiniferter polymerizations; the sulfanylthiocarbonyl radicals used in reversible addition-fragmentation chain transfer polymerization; and the nitrosyl radicals used in nitroxide mediate polymerization.

In some other embodiments, the technology comprises use of a non-radical species that is generated to terminate growing radical chains, e.g., a metal/ligand complex such as those used as deactivators in atom-transfer radical polymerization (ATRP). Therefore, additional non-limiting examples of a photoinhibitor that finds use in embodiments of the technology include thiocarbamates, xanthates, dithiobenzoates, photoinititators that generate ketyl and other radicals that tend to terminate growing polymer chains radicals (e.g., camphorquinone and benzophenones), ATRP deactivators, and polymeric versions thereof.

In some embodiments, the photoinhibitor is, but not limited to: zinc dimethyl dithiocarbamate; zinc diethyl dithiocarbamate; zinc dibutyl dithiocarbamate; nickel dibutyl dithiocarbamate; zinc dibenzyl dithiocarbamate; tetramethylthiuram disulfide; tetraethylthiuram disulfide; tetramethylthiuram monosulfide; tetrabenzylthiuram disulfide; tetraisobutylthiuram disulfide; dipentamethylene thiuram hexasulfide; N,N'-dimethyl N,N'-di(4-pyridinyl)thiuram disulfide; 3-Butenyl 2-(dodecylthiocarbonothioylthio)-2-methylpropionate; 4-Cyano-4-[(dodecylsulfanylthiocarbonyl)sulfanyl]pentanoic acid; 4-Cyano-4-[(dodecylsulfanylthiocarbonyl)sulfanyl]pentanol; Cyanomethyl dodecyl trithiocarbonate; Cyanomethyl [3-(trimethoxysilyl)propyl]trithiocarbonate; 2-Cyano-2-propyl dodecyl trithiocarbonate; S,S-Dibenzyl trithiocarbonate; 2-(Dodecylthiocarbonothioylthio)-2-methylpropionic acid; 2-(Dodecylthiocarbonothioylthio)-2-methylpropionic acid N-hydroxysuccinimide; Benzyl 1H-pyrrole-1-carbodithioate; Cyanomethyl diphenylcarbamodithioate; Cyanomethyl methyl(phenyl)carbamodithioate; Cyanomethyl methyl(4-pyridyl)carbamodithioate; 2-Cyanopropan-2-yl N-methyl-N-(pyridin-4-yl)carbamodithioate; Methyl 2-[methyl(4-pyridinyl)carbamothioylthio]propionate; 1-Succinimidyl-4-cyano-4-[N-methyl-N-(4-pyridyl)carbamothioylthio] pentanoate; Benzyl benzodithioate; Cyanomethyl benzodithioate; 4-Cyano-4-(phenylcarbonothioylthio)pentanoic acid; 4-Cyano-4-(phenylcarbonothioylthio)pentanoic acid N-succinimidyl ester; 2-Cyano-2-propyl benzodithioate; 2-Cyano-2-propyl 4-cyanobenzodithioate; Ethyl 2-(4-methoxyphenylcarbonothioylthio)acetate; 2-Phenyl-2-propyl benzodithioate; Cyanomethyl methyl(4-pyridyl)carbamodithioate; 2-Cyanopropan-2-yl N-methyl-N-(pyridin-4-yl)carbamodithioate; or Methyl 2-[methyl(4-pyridinyl)carbamothioylthio]propionate.

In some embodiments, the photoinhibitor is used in amounts ranging from about 0.01 to about 25 weight percent (wt %) of the composition. In some embodiments, the technology provides a composition comprising a photoinhibitor at approximately 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %.

Embodiments of compositions comprise a photoinhibitor (e.g., a photoinhibitor compound having fast back reaction kinetics (e.g., a HABI photoinhibitor (e.g., a bridged HABI photoinhibitor))). The bridged HABI photoinhibitor may be one known in the art, as described herein, or a substituted variation thereof (e.g., comprising one or more moieties (e.g., an alkyl, halogenated alkyl, alkoxyalkyl, alkylamino, cycloalkyl, heterocycloalkyl, polyalkylene, alkoxyl, alkenyl, cycloalkenyl, alkynyl, cycloalkynyl, aryl, heteroaryl, aldehyde, amino, halo, or thio)).

In some embodiments, the photoinhibitor is a HABI compound or a bridged HABI compound, e.g., as described herein. In some embodiments, the technology comprises use of a photoinhibitor, e.g., a "precise photoinhibitor", a photoinhibitor having fast back reaction kinetics, and/or a "precise photoinhibitor" having fast back reaction kinetics as described herein and in U.S. Prov. Pat. App. Ser. No. 62/632,834, which is expressly incorporated herein by reference in its entirety.

In some embodiments, the technology provides a composition comprising a HABI photoinhibitor (e.g., a bridged HABI photoinhibitor) at approximately 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %.

In some embodiments, the photoinhibitor is tetraethylthiuram disulfide (TED). TED is an iniferter that inhibits the photopolymerization of acrylate monomers in the presence of UV light. This occurs by homolytic cleavage of the TED molecule in the presence of ultraviolet light to form two dithiocarbamyl (DTC) radicals. Accordingly, embodiments comprise TED as a photoinhibitor.

The technology relates to compositions comprising any suitable polymerizable liquid. In some embodiments, the liquid (also referred to as "resin" herein) comprises monomers, particularly a photopolymerizable and/or free radical polymerizable monomers, and a suitable initiator such as a free radical initiator, and combinations thereof. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cute site monomers, functionalized PEGs, etc., including combinations thereof. In some embodiments, polymerizable monomers include, but are not limited to, monomeric, dendritic, and oligomeric forms of acrylates, methacrylates, vinyl esters, styrenics, other vinylic species, and mixtures thereof. Examples of liquid resins, monomers, and initiators include, but are not limited to, those described in U.S. Pat. Nos. 8,232,043; 8,119,214; 7,935,476; 7,767,728; 7,649,029; in Int'l Pat. Pub. No. WO 2012129968 A1; in Chinese patent application CN 102715751 A; and in Japanese patent application JP 2012210408A, each of which is incorporated herein by reference.

In particular, embodiments provide compositions comprising a monomer such as, e.g., hydroxyethyl methacrylate; n-lauryl acrylate; tetrahydrofurfuryl methacrylate; 2,2,2-trifluoroethyl methacrylate; isobornyl methacrylate; polypropylene glycol monomethacrylates, aliphatic urethane acrylate (e.g., RAHN GENOMER 1122); hydroxyethyl acrylate; n-lauryl methacrylate; tetrahydrofurfuryl acrylate; 2,2,2-trifluoroethyl acrylate; isobornyl acrylate; polypropylene glycol monoacrylates; trimethylpropane triacrylate; trimethylpropane trimethacrylate; pentaerythritol tetraacrylate; pentaerythritol tetraacrylate; triethylene glycol diacrylate; triethylene glycol dimethacrylate; tetrathylene glycol diacrylate; tetrathylene glycol dimethacrylate; neopentyldimethacrylate; neopentylacrylate; hexane dioldimethacrylate; hexane diol diacrylate; polyethylene glycol 400 dimethacrylate; polyethylene glycol 400 diacrylate; diethylglycol diacrylate; diethylene glycol dimethacrylate; ethylene glycol diacrylate; ethylene glycol dimethacrylate; ethoxylated bis phenol A dimethacrylate; ethoxylated bis phenol A diacrylate; bisphenol A glycidyl methacrylate; bisphenol A glycidyl acrylate; ditrimethylolpropane tetraacrylate; or ditrimethylolpropane tetraacrylate.

Particular embodiments provide compositions comprising an acrylate monomer, e.g., an acrylate monomer, a methacrylate monomer, etc. In some embodiments, the acrylate monomer is an acrylate monomer such as, but not limited to, (meth)acrylic acid monomers such as (meth)acrylic acid, methyl(meth)acrylate, ethyl(meth)acrylate, n-propyl(meth) acrylate, isopropyl(meth)acrylate, n-butyl(meth)acrylate, isobutyl(meth)acrylate, tert-butyl(meth)acrylate, n-pentyl (meth)acrylate, n-hexyl(meth) acrylate, cyclohexyl(meth) acrylate, n-heptyl(meth)acrylate, n-octyl(meth) acrylate, 2-ethylhexyl(meth)acrylate, nonyl(meth)acrylate, decyl (meth)acrylate, dodecyl(meth)acrylate, phenyl(meth)acrylate, toluoyl(meth)acrylate, benzyl(meth)acrylate, 2-methoxyethyl(meth)acrylate, 3-methoxybutyl(meth)acrylate, 2-hydroxyethyl(meth) acrylate, 2-hydroxypropyl(meth) acrylate, stearyl(meth)acrylate, glycidyl(meth)acrylate, 2-aminoethyl(meth)acrylate, 3-(methacryloyloxypropyl) trimethoxysilane, (meth)acrylic acid-ethylene oxide adducts, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth) acrylate, perfluoromethyl(meth) acrylate, diperfluoromethylmethyl(meth)acrylate, 2-perfluoromethyl-2-perfluoroethylethyl(meth)acrylate, 2-perfluorohexylethyl(meth)acrylate, 2-perfluorodecylethyl(meth) acrylate and 2-perfluorohexadecylethyl(meth)acrylate.

Some embodiments provide a composition comprising n-butyl acrylate, methyl methacrylate, 2-ethylhexyl acrylate, methyl acrylate, tert-butyl acrylate, 2-hydroxyethyl acrylate, glycidyl methacrylate, or a combination thereof. However, embodiments of the technology encompass compositions comprising any acrylate or (meth)acrylate.

In some embodiments, the technology provides a composition comprising a monomer at approximately 1 to 99.99 wt % (e.g., approximately 1, 2, 3, 4, 5, 6, 7, 8, 9, 10, 15, 20, 25, 30, 35, 40, 45, 50, 55, 60, 65, 70, 75, 80, 85, 90, 91, 92, 93, 94, 95, 96, 97, 98, 99, 99.1, 99.2. 99.3, 99.4, 99.5, 99.6, 99.7, 99.8, 99.9, 99.95, to 99.99 wt %).

Embodiments of the technology provide a composition comprising a photoinitiator. The technology is not limited in the photoinitiator provided it is chemically compatible with the photoinhibitor compounds (e.g., a photoinhibitor compound having fast back reaction kinetics (e.g., a HABI photoinhibitor (e.g., a bridged HABI photoinhibitor))) described herein. Further, embodiments relate to use of a photoinitiator that is optically compatible with the photoinhibitor compounds described herein. In particular, the technology comprises use of a photoinitiator that is activated by a wavelength of light that is different than the wavelength of light that activates the photoinhibitor.

Accordingly, the technology comprises use of a wide variety of photoinitiator compounds and irradiation conditions for activating the photoinitiator to effect the photoinitiation process. Non-limiting examples of the photoinitiator include benzophenones, thioxanthones, anthraquinones, camphorquinones, thioxanthones, benzoylformate esters, hydroxyacetophenones, alkylaminoacetophenones, benzil ketals, dialkoxyacetophenones, benzoin ethers, phosphine oxides, acyloximino esters, alphahaloacetophenones, trichloromethyl-S-triazines, titanocenes, dibenzylidene ketones, ketocoumarins, dye sensitized photoinitiation systems, maleimides, and mixtures thereof. Particular examples of photoinitiators include, e.g., 1-hydroxy-cyclohexyl-phenyl-ketone (IRGACURE 184; BASF, Hawthorne, N.J.); a 1:1 mixture of 1-hydroxy-cyclohexyl-phenyl-ketone and benzophenone (IRGACURE 500; BASF); 2-hydroxy-2-methyl-1-phenyl-1-propanone (DAROCUR 1173; BASF); 2-hydroxy-1-[4-(2-hydroxyethoxy)phenyl]-2-methyl-1-propanone (IRGACURE 2959; BASF); methyl benzoylformate (DAROCUR MBF; BASF); oxy-phenyl-acetic acid 2-[2-oxo-2-phenyl-acetoxy-ethoxy]-ethyl ester; oxy-phenyl-acetic 2-[2-hydroxy-ethoxy]-ethyl ester; a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester (IRGACURE 754; BASF); alpha,alpha-dimethoxy-alpha-phenylacetophenone (IRGACURE 651; BASF); 2-benzyl-2-(dimethylamino)-1-[4-(4-morpholinyl)-phenyl]-1-butanone (IRGACURE 369; BASF); 2-methyl-1-[4-(methylthio)phenyl]-2-(4-morpholinyl)-1-propanone (IRGACURE 907; BASF); a 3:7 mixture of 2-benzyl-2-(dimethylamino)-1-[4-(4-morpholinyl) phenyl]-1-butanone and alpha,alpha-dimethoxy-alpha-phenylacetophenone per weight (IRGACURE 1300; BASF); diphenyl-(2,4,6-trimethylbenzoyl) phosphine oxide (DAROCUR TPO; BASF); a 1:1 mixture of diphenyl-(2,4,6-trimethylbenzoyl)-phosphine oxide and 2-hydroxy-2-methyl-1-phenyl-1-propanone (DAROCUR 4265; BASF); phenyl bis(2,4,6-trimethyl benzoyl) phosphine oxide, which may be used in pure form (IRGACURE 819; BASF, Hawthorne, N.J.) or dispersed in water (45% active, IRGACURE 819DW; BASF); 2:8 mixture of phosphine oxide, phenyl bis(2,4,6-trimethyl benzoyl) and 2-hydroxy-2-methyl-1-phenyl-1-propanone (IRGACURE 2022; BASF); IRGACURE 2100, which comprises phenyl-bis(2,4,6-trimethylbenzoyl)-phosphine oxide); bis-(eta 5-2, 4-cyclopentadien-1-yl)-bis-[2,6-difluoro-3-(1H-pyrrol-1-yl) phenyl]-titanium (IRGACURE 784; BASF); (4-methylphenyl) [4-(2-methylpropyl)phenyl]-iodonium hexafluorophosphate (IRGACURE 250; BASF); 2-(4-methylbenzyl)-2-(dimethylamino)-1-(4-morpholinophenyl)-butan-1-one (IRGACURE 379; BASF); 4-(2-hydroxyethoxy)phenyl-(2-hydroxy-2-propyl)ketone (IRGACURE 2959; BASF); bis-(2,6-dimethoxybenzoyl)-2,4,4-trimethylpentylphosphine oxide; a mixture of bis-(2,6-dimethoxybenzoyl)-2,4,4-trimethylpentylphosphine oxide and 2-hydroxy-2-methyl-1-phenyl-propanone (IRGACURE 1700; BASF); 4-Isopropyl-9-thioxanthenone; and mixtures thereof.

In some embodiments, the photoinitiator is used in an amount ranging from approximately 0.01 to approximately 25 weight percent (wt %) of the composition (e.g., from approximately 0.1 to approximately 3.0 wt % of the composition (e.g., approximately 0.2 to 0.5 wt % of the composition)). In some embodiments, the technology provides a composition comprising a photoinitiator at approximately 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %.

Embodiments of the technology provide a composition further comprising a coinitiator, e.g., to enhance the polymerization rate, extent, quality, etc. The technology is not limited in the coinitiator. Non-limiting examples of co-initiators include primary, secondary, and tertiary amines; alcohols; and thiols. Particular examples of coinitiators include, e.g., dimethylaminobenzoate, isoamyl 4-(dimethylamino)benzoate, 2-ethylhexyl 4-(dimethylamino)benzoate; ethyl 4-(dimethylamino)benzoate; 3-(dimethylamino)propyl acrylate; 2-(dimethylamino)ethyl methacrylate; 4-(dimethylamino)benzophenones, 4-(diethylamino)benzophenones; 4,4'-bis(diethylamino)benzophenones; methyl diethanolamine; triethylamine; hexane thiol; heptane thiol; octane thiol; nonane thiol; decane thiol; undecane thiol; dodecane thiol; isooctyl 3-mercaptopropionate; pentaerythritol tetrakis(3-mercaptopropionate); 4,4'-thiobisbenzenethiol; trimethylolpropane tris(3-mercaptopropionate); CN374 (SARTOMER); CN371 (SARTOMER), CN373 (SARTOMER), GENOMER 5142 (RAHN); GENOMER 5161 (RAHN); GENOMER 5271 (RAHN); GENOMER 5275 (RAHN), and TEMPIC (BRUNO BOC, Germany).

In some embodiments, the coinitiator is used in an amount ranging from approximately 0.0 to approximately 25 weight percent (wt %) of the composition (e.g., approximately 0.1 to approximately 3.0 wt % of the composition (e.g., 0.1 to 1.0 wt %) when used in embodiments of the compositions). In some embodiments, the technology provides a composition comprising a coinitiator at approximately 0, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %.

Some embodiments comprise use of a photon absorbing component, e.g., a light blocking dye (also known as a "photoabsorber"). In some embodiments, a photon absorbing component is selected in accordance with the wavelengths of the first and second lights. In some embodiments, dyes are used to both attenuate light and to transfer energy to photoactive species increasing the sensitivity of the system to a given wavelength for either or both photoinitiation and photoinhibition processes. In some embodiments, the concentration of the chosen dye is highly dependent on the light absorption properties of the given dye and ranges from approximately 0.001 to approximately 5 weight percent (wt %) of the composition. Useful classes of dyes include compounds commonly used as UV absorbers for decreasing weathering of coatings including, such as, 2-hydroxyphenyl-benzophenones; 2-(2-hydroxyphenyl)-benzotriazoles; and 2-hydroxyphenyl-s-triazines Other useful dyes include those used for histological staining or dying of fabrics. A non-limiting list includes Martius yellow, Quinoline yellow, Sudan red, Sudan I, Sudan IV, eosin, eosin Y, neutral red, and acid red. Pigments can also be used to scatter and attenuate light.

In some embodiments, the photon absorbing component (e.g., a light blocking dye) is used in an amount ranging from approximately 0.0 to approximately 25 weight percent (wt %) of the composition (e.g., approximately 0.1 to approximately 3.0 wt % of the composition (e.g., 0.1 to 1.0 wt %) when used in embodiments of the compositions). In some embodiments, the technology provides a composition comprising a photon absorbing component (e.g., a light blocking dye) at approximately 0, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, or 25 wt %.

Some embodiments do not comprise a photon absorbing component (e.g., in some embodiments, compositions are "photoabsorber-free"). In particular, embodiments are provided in which compositions are photoabsorber-free to increase or maximize the penetration of a wavelength of light through a composition as described herein (e.g., comprising a polymerizable monomer, a photoinitiator, and a photoinhibitor).

In some embodiments, a composition further comprises solid particles suspended or dispersed therein. Any suitable solid particle can be used, depending upon the end product being fabricated. In some embodiments, the solid particles are metallic, organic/polymeric, inorganic, or composites or mixtures thereof. In some embodiments, the solid particles are nonconductive, semi-conductive, or conductive (including metallic and non-metallic or polymer conductors); in some embodiments, the solid particles are magnetic, ferromagnetic, paramagnetic, or nonmagnetic. The particles can be of any suitable shape, including spherical, elliptical, cylindrical, etc.

In some embodiments, a composition comprises a pigment, dye, active compound, pharmaceutical compound, or detectable compound (e.g., fluorescent, phosphorescent, radioactive). In some embodiments, a composition comprises a protein, peptide, nucleic acid (DNA, RNA (e.g., siRNA)), sugar, small organic compound (e.g., drug and drug-like compound), etc., including combinations thereof.

In some embodiments, the compositions are homogenous. The technology is related to forming polymerized structures; accordingly, in some embodiments, the compositions are heterogeneous because the compositions, in some embodiments, comprise polymerized and non-polymerized regions. In some embodiments, compositions of the technology comprise a polymer (e.g., comprising polymerized monomers). In some embodiments, a polymerized region is patterned, localized, etc.

In some embodiments, the technology provided herein relates to photoinhibitors that are activated by light to form a polymerization inhibiting species and that have a fast back reaction that reforms the inactive photoinhibitor from the polymerization inhibiting species. In some embodiments, when not activated by light (e.g., in the inactive state), the photoinhibitors do not inhibit and/or do not retard polymerization activity and do not have initiating activity; when activated by light, the photoinhibitors form an inhibiting species that inhibits polymerization and that does not initiate polymerization. Accordingly, the technology provided herein relates to photoinhibition that is quickly turned "on" and quickly turned "off" by the presence and absence of light and that does not have undesirable inhibition and/or initiation activities.

In some embodiments, the photoinhibitor compounds of the technology (e.g., compounds having fast back reaction kinetics and/or HABI (e.g., bridged HABI compounds)) do not exhibit photoinitiation activity when irradiated (e.g., when photoactivated) and thus only exhibit photoinhibition when irradiated (e.g., when photoactivated). Moreover, in some embodiments, the non-photoactivated photoinhibitor compounds of the technology do not retard polymerization rates (e.g., by chain transfer reactions). Finally, in some embodiments, the photoinhibitor compounds of the technology typically exhibit very weak or zero absorbance in the blue region of the electromagnetic spectrum and moderately absorb in the near-UV region of the electromagnetic spectrum, thus complementing the absorbance spectra of several photoinitiators activated by blue light.

Like HABI compounds, bridged HABI compounds do not exhibit photoinitiation activity when irradiated. Moreover, bridged HABI compounds do not participate in chain transfer reactions and thus polymerization rates are not inherently retarded by the presence of HABI compounds. Finally, bridged HABI compounds typically exhibit very weak absorbance in the blue region of the electromagnetic spectrum and moderately absorb in the near-UV region of the electromagnetic spectrum, thus complementing the absorbance spectrum of several photoinitiators activated by blue light. Finally, bridged HABI compounds exhibit fast back reaction kinetics.

Hexaarylbiimidazole (HABI) Compounds for Deadzone Control

In some embodiments, the technology relates to the use of a hexaarylbiimidazole (HABI) compound as a photoactivated inhibitor of polymerization ("photoinhibitor"). Hexaarylbiimidazole (HABI) was developed in the 1960s as a photochromic molecule by Hayashi and Maeda (see, e.g., Hayashi and Maeda (1960) "Preparation of a new phototropic substance" Bull. Chem. Soc. Jpn. 33(4): 565-66, incorporated herein by reference). The recombination "back reaction" is driven by thermal energy and radical diffusion. The lophyl radical has a large absorption band in the visible region of the electromagnetic spectrum, whereas HABI absorbs only in the UV region of the electromagnetic spectrum and is therefore colorless. Consequently, HABI generates a colored radical species upon UV light irradiation and the radicals slowly reform to produce the colorless HABI imidazole dimer when light irradiation is stopped. Some embodiments comprise use of o-chlorohexaarylbiimidazole (o-Cl-HABI). Irradiation of o-Cl-HABI at the appropriate wavelength produces chloro-triphenylimidizolyl radicals, which reform the o-Cl-HABI by a thermally driven back reaction. The halflife of the radicals formed in this reaction is approximately tens of seconds (e.g., approximately 10 s). Thus, in some embodiments, the technology relates to an o-chlorohexaarylbiimidazole (o-Cl-HABI) that has a half-life of approximately tens of seconds (e.g., approximately 10 s).

Cleavage of the HABI C—N bond by UV irradiation occurs in less than 100 fs and is thus nearly (e.g., substantially, effectively) instantaneous; recombination of the radicals to reform HABI is a second order reaction that occurs over a time of up to a few minutes at room temperature. Thus, the lophyl radicals formed from HABI have a half-life of tens of seconds to several (e.g., 5 to 10 or more) minutes (see, e.g., Satoh et al. (2007) "Ultrafast laser photolysis study on photodissociation dynamics of a hexaarylbiimidazole derivative" Chem. Phys. Lett. 448 (4-6): 228-31; Sathe, et al. (2015) "Re-examining the Photomediated Dissociation and Recombination Kinetics of Hexaarylbiimidazoles" Ind. Eng. Chem. Res. 54 (16): 4203-12, each of which is incorporated herein by reference). HABI has been known as a photoinitiator, e.g., for imaging and photoresists. HABI compounds do not initiate on their own upon formation of radicals. When used as a photoinitiator, the radical abstracts hydrogen atoms from coinitiator thiol groups (e.g., a crystal violet precursor) to form an initiating moiety. See, e.g., Dessauer, R. (2006) Photochemistry History and Commercial Applications of Heaarylbiimidazoles, Elsevier.

In some embodiments, the technology relates to use of a bridged HABI. See, e.g., Iwahori et al. (2007) "Rational design of a new class of diffusion-inhibited HABI with fast back-reaction" J Phys Org Chem 20: 857-63; Fujita et al. (2008) "Photochromism of a radical diffusion-inhibited hexaarylbiimidazole derivative with intense coloration and fast decoloration performance" Org Lett 10: 3105-08; Kishimoto and Abe (2009) "A fast photochromic molecule that colors only under UV light" J Am Chem Soc 131: 4227-29; Harada et al. (2010) "Remarkable acceleration for back-reaction of a fast photochromic molecule" J Phys Chem Lett 1: 1112-15; Mutoh et al. (2010) "An efficient strategy for enhancing the photosensitivity of photochromic [2.2]paracyclophane-bridged imidazole dimers" J Photopolym Sci Technol 23: 301-06; Kimoto et al. (2010) "Fast photochromic polymers carrying [2.2]paracyclophane-bridged imidazole dimer" Macromolecules 43: 3764-69; Hatano et al. (2010) "Unprecedented radical-radical reaction of a [2.2]paracyclophane derivative containing an imidazolyl radical moiety" Org Lett 12: 4152-55; Hatano et al. (2011) "Reversible photogeneration of a stable chiral radical-pair from a fast photochromic molecule" J Phys Chem Lett 2: 2680-82; Mutoh and Abe (2011) "Comprehensive understanding of structure-photosensitivity relationships of photochromic [2.2]paracyclophane-bridged imidazole dimers" J Phys Chem A 115: 4650-56; Takizawa et al. (2011) "Photochromic organogel based on [2.2]paracyclophane-bridged imidazole dimer with tetrapodal urea moieties" Dyes Pigm 89: 254-59; Mutoh and Abe (2011) "Photochromism of a water-soluble vesicular [2.2]paracyclophane bridged imidazole dimer" Chem Comm 47:8868-70; Yamashita and Abe (2011) "Photochromic properties of [2.2]paracyclophane-bridged imidazole dimer with increased photosensitivity by introducing pyrenyl moiety" J Phys Chem A 115: 13332-37; Kawai et al. (2012) "Entropy-controlled thermal back-reaction of photochromic [2.2]paracyclophane-bridged imidazole dimer" Dyes Pigm 92: 872-76; Mutoh et al. (2012) "Spectroelectrochemistry of a photochromic [2.2]paracyclophane-bridged imidazole dimer: Clarification of the electrochemical behavior of HABI" J Phys Chem A 116: 6792-97; Mutoh et al. (2013) "Photochromism of a naphthalene-bridged imidazole dimer constrained to the 'anti' conformation" Org Lett 15: 2938-41; Shima et al. (2014) "Enhancing the versatility and functionality of fast photochromic bridged-imidazole dimers by flipping imidazole ring" J Am Chem Soc 136: 3796-99; Iwasaki et al. (2014) "A chiral BINOL-bridged imidazole dimer possessing sub-millisecond fast photochromism" Chem Commun 50: 7481-84; and Yamaguchi et al. (2015) "Nanosecond photochromic molecular switching of a biphenyl-bridged imidazole dimer revealed by wide range transient absorption spectroscopy" Chem Commun 51: 1375-78, each of which is incorporated herein by reference in its entirety.

Similar to the conventional HABI molecules, the bridged HABI molecules form radicals instantaneously upon exposure to UV light. However, the radicals are linked by a covalent bond (e.g., one or more covalent bonds and/or, e.g., an R group), which prevents diffusion of the radicals away from one another and thus accelerates the thermally driven reformation of the bridged HABI molecule. Accordingly, the bridged HABI molecules instantaneously produce radicals upon UV light irradiation and the radicals rapidly disappear when UV irradiation is stopped.

As used herein, the term "bridged HABI" refers to a HABI molecule in which the triphenylimidazolyl radicals are linked (e.g., by one or more covalent bonds or by an R group) to each other such that they do not diffuse away from one another upon hemolytic cleavage of the bond connecting the imidazole centers (e.g., by light). As used herein, the term "X-bridged HABI", where "X" refers to an R group (e.g., moiety, chemical group, etc.), refers to a HABI wherein the imidazolyl moieties are linked by the R group.

In an exemplary embodiment, the half-life of the radicals formed from a naphthalene-bridged HABI and a [2.2]paracyclophane-bridged HABI dimer are approximately 830 ms and 33 ms at 25° C. in benzene, respectively. See, e.g., Iwahori et al. (2007) "Rational design of a new class of diffusion-inhibited HABI with fast back-reaction" J Phys Org Chem 20: 857-63; Fujita et al. (2008) "Photochromism of a radical diffusion-inhibited hexaarylbiimidazole derivative with intense coloration and fast decoloration performance" Org Lett 10: 3105-08; Kishimoto and Abe (2009) "A fast photochromic molecule that colors only under UV light" J Am Chem Soc 131: 4227-29, each of which is incorporated herein in its entirety.

Additional exemplary embodiments relate to use of a HABI in which the imidazole moieties are linked by a 1,1'-bi-naphthol bridge. The 1,1'-bi-naphthol-bridged HABI has a half-life of approximately 100 μs. See, e.g., Iwasaki et al. (2014) "A chiral BINOL-bridged imidazole dimer possessing sub-millisecond fast photochromism" Chem Commun 50: 7481-84, incorporated herein by reference. In some embodiments, the technology relates to use of a HABI comprising a bond linking the imidazolyl groups (e.g., a bond links the imidazolyl groups) that has a half-life of approximately 100 ns, which is the fastest thermal back reaction for a HABI compound presently known in the art. See, e.g., Yamaguchi et al. (2015) "Nanosecond photochromic molecular switching of a biphenyl-bridged imidazole dimer revealed by wide range transient absorption spectroscopy" Chem Commun 51: 1375-78, incorporated herein by reference in its entirety.

The bridged HABI photoinhibitor may be one known in the art, as described herein, or a substituted variation thereof (e.g., comprising one or more moieties (e.g., an alkyl, halogenated alkyl, alkoxyalkyl, alkylamino, cycloalkyl, heterocycloalkyl, polyalkylene, alkoxyl, alkenyl, cycloalkenyl, alkynyl, cycloalkynyl, aryl, heteroaryl, aldehyde, amino, halo, or thio) on one or more phenyl rings and/or on the R group).

Accordingly, the technology relates in some embodiments to use of bridged HABI molecules as photoactivatable inhibitors of polymerization. In some embodiments, the bridged HABI molecules form a radical upon irradiation by light (e.g., at an appropriate wavelength to form a radical from the HABI). In some embodiments, the radical rapidly disappears upon stopping the irradiation by light. For example, embodiments relate to a bridged HABI that forms a radical having a half-life of approximately 100 ns to 100 μs to 100 ms to 100 s (e.g., 10, 20, 30, 40, 50, 60, 70, 80, 90, 100, 200, 300, 400, 500, 600, 700, 800, 900, or 1000 ns; 10, 20, 30, 40, 50, 60, 70, 80, 90, 100, 200, 300, 400, 500, 600, 700, 800, 900, or 1000 μs; 10, 20, 30, 40, 50, 60, 70, 80, 90, 100, 200, 300, 400, 500, 600, 700, 800, 900, or 1000 ms; or 0, 20, 30, 40, 50, 60, 70, 80, 90, 100, 200, 300, 400, 500, 600, 700, 800, 900, or 1000 s). That is, after formation of the radical by irradiation of the bridged HABI at the appropriate wavelength, the radical rapidly reforms the bridged HABI upon stopping the irradiation. Consequently, the radical is only formed in the region irradiated by the appropriate wavelength to form a radical from the HABI.

Technologies (e.g., methods, systems, kits, apparatuses, uses, and compositions) related to use of HABI compounds and bridged HABI compounds are described herein and in U.S. Prov. Pat. App. Ser. No. 62/632,834, which is expressly incorporated herein by reference in its entirety.

Irradiation for Deadzone Control

Embodiments relate to irradiating polymerizable compositions (e.g., comprising a polymerizable monomer, a photoinitiator, and a photoinhibitor) with multiple wavelengths of light The Beer-Lambert Law describes the variation in intensity of an incident light beam as it passes through an absorbing medium:

$$\frac{\phi_l}{\phi_0} = 10^{-\epsilon_i c_i l} \tag{1}$$

Where $\phi_1$ is the photon flux at a depth l into the medium, $\epsilon_i$ is the molar absorption coefficient, $c_i$ is the concentration of the absorbing species, and $\phi_0$ is the incident photon flux. It is possible to independently control the intensity of different wavelengths of light by varying their absorbance within a medium. This is commonly done in 3D printing by the addition of a light absorbing compound (e.g., a light absorbing dye) into photopolymer resin.

Figure 24:
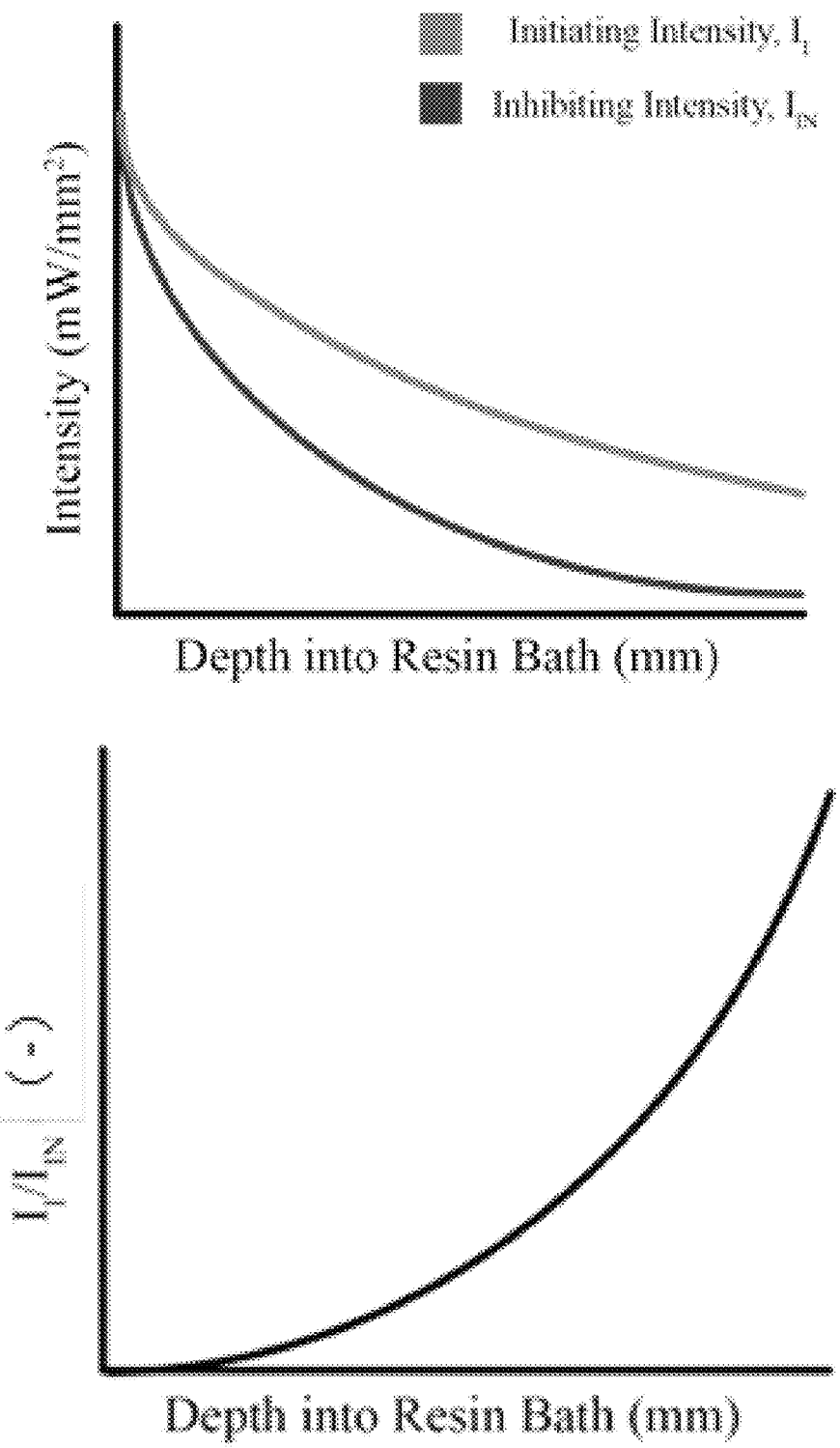
FIG. 24 shows a plot of initiating intensity (top plot, top line) and inhibiting intensity (top plot, bottom line) as a function of depth into a composition (e.g., resin bath); and a plot of the ratio of initiating and inhibiting intensities as a function of depth into a composition (e.g., resin bath) according to the technology provided herein (bottom plot).

According to embodiments of the technology, a two-wavelength system is used to produce a dead zone and produce an item comprising a polymer. In some embodiments, a first wavelength initiates polymerization (e.g., blue light) and a second wavelength inhibits polymerization (e.g., UV light). As shown previously, independently controlling the intensities of the first and second wavelengths lights within a polymer resin bath provides for manipulating the ratio of the initiating, $I_I$, and inhibiting, $I_{IN}$, intensities. See, e.g., FIG. 24.

The polymerization rate in the presence of a photoinhibiting species scales according to the equation:

$$(I_I - \beta \times I_{IN})^{0.5} \tag{2}$$

in which β is a constant encompassing the ratios of the inhibitor to the initiator absorption cross sections, quantum yields, and reaction rate constants.

Therefore, as the $I_I/I_{IN}$ ratio increases, the polymerization rate increases; thus, polymerization will occur more rapidly in the region away from the projection window. Thus, embodiments comprise producing a dead zone region at the window where polymerization is minimized, inhibited, prevented, terminated, and/or eliminated. In some embodiments, the thickness of the dead zone is modified by either adjusting the intensities of the incident lights or by modifying the composition of the polymer mixture to tune the absorbance. This technology provides the ability to modify the dead zone thickness while maintaining high curing light intensities.

In some embodiments, a first wavelength produces initiating radicals from the photoinitiator and a second wavelength produces inhibiting radicals from a photoinhibitor. During irradiation, regions (e.g., volumes, areas, etc.) of the composition are exposed to: 1) the first wavelength only; 2) the second wavelength only; or 3) both the first and second wavelengths. Accordingly, polymerization occurs in regions irradiated by the first wavelength only (e.g., in regions irradiated by the first wavelength but not irradiated by the second wavelength). And, polymerization is inhibited in regions irradiated by the second wavelength (e.g., in regions irradiated by the second wavelength and the first wavelength; and in regions irradiated by the second wavelength but not irradiated by the first wavelength). Thus, by providing control of the wavelength, intensity, pattern (e.g., cross sectional area, cross section shape, etc.), and direction of the first and/or second wavelengths of light (e.g., as provided by one or more sources), the technology provides control over the polymerized region in the composition. In some embodiments, wavelength, intensity, pattern (e.g., cross sectional area, cross section shape, etc.), and direction of the first and/or second wavelengths of light (e.g., as provided by one or more sources) is controlled (e.g., varies) as a function of time.

Figure 25A:
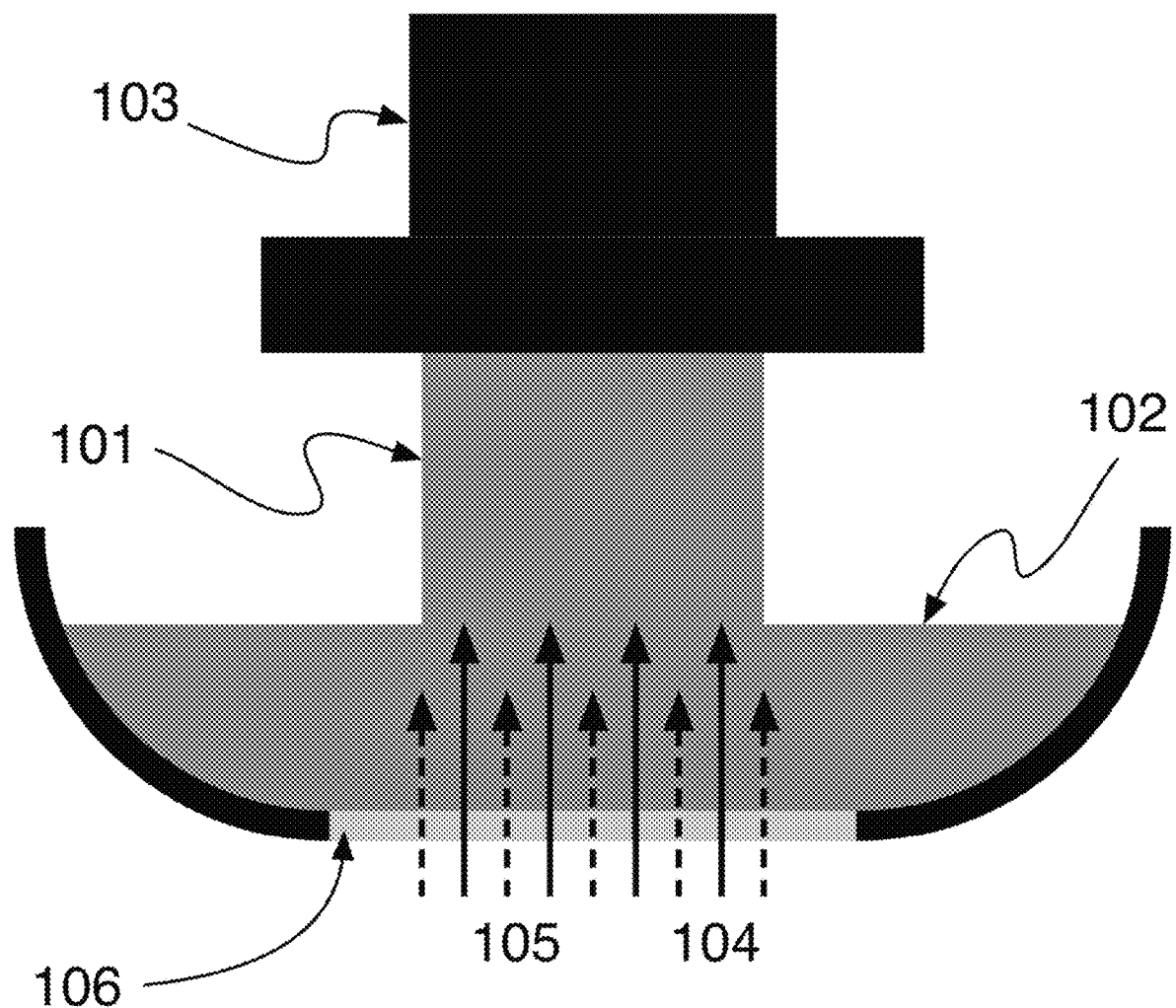
FIG. 25A is a schematic of an embodiment of the technology provided herein.
Figure 25B:
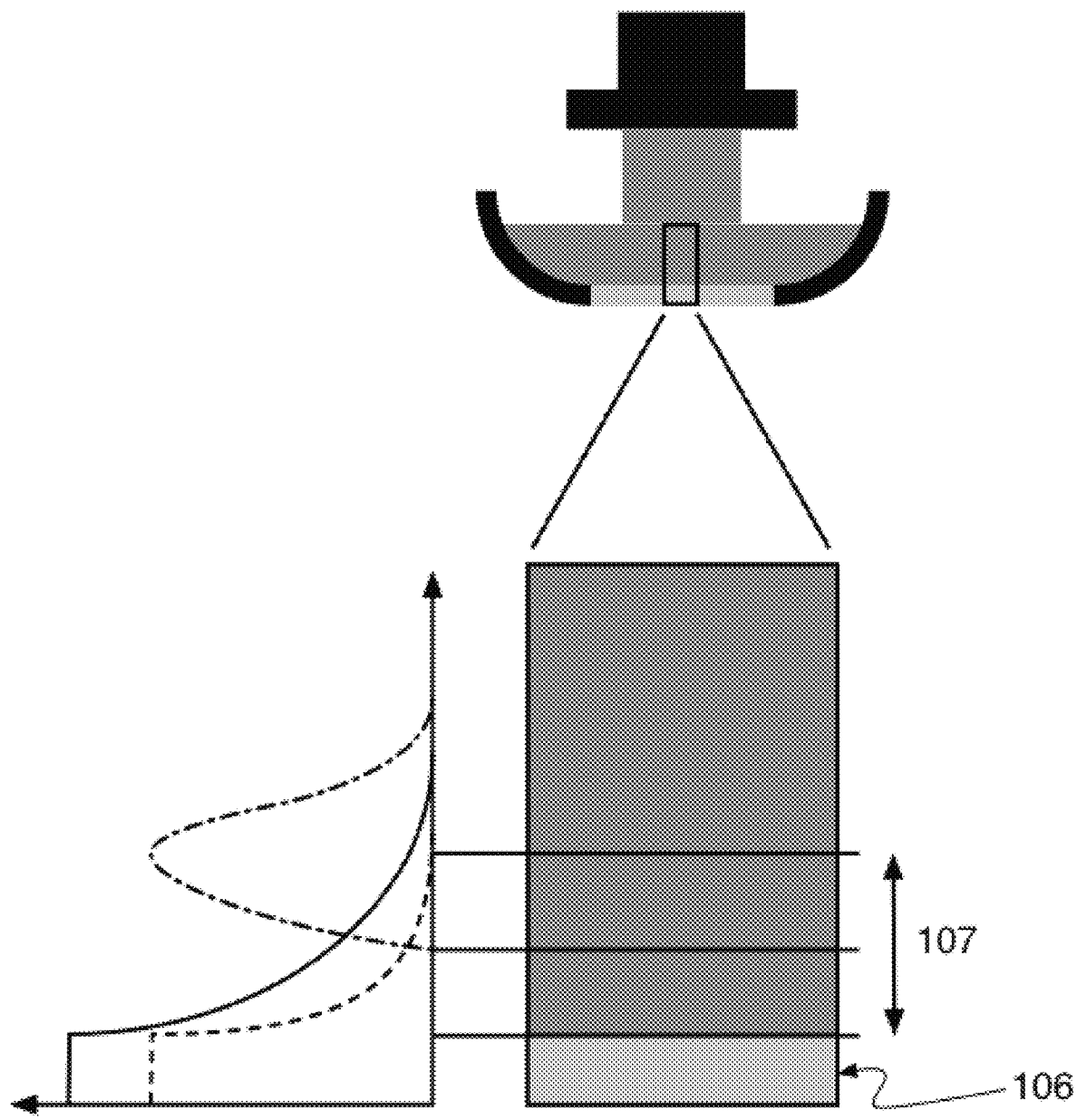
FIG. 25B shows a schematic enlargement of a region of the schematic shown in FIG. 25A. The plot at the left shows the intensity of the initiating wavelength (solid line), the intensity of the inhibiting wavelength (dashed line), and the polymerization reaction rate (dot-dash line) within the composition 102 shown at the right as a function of distance from the optically transparent window 106. The vertical axis shows distance (in arbitrary units appropriate to scale for a CLIP-type apparatus) from the optically transparent window 106 up through the resin composition 102 in the direction of the build support plate 103. The origin of the vertical axis is at the outside surface of the optically transparent window 106 upon which the first wavelength of light 104 (dotted lines) and second wavelength of light 105 (solid lines) impinge prior to passing through the optically transparent window 106 to irradiate the resin composition 102. The horizontal axis shows the intensities of the initiating wavelength (solid line) and the inhibiting wavelength (dashed line) with the origin at zero (0). The intensities of the initiating and inhibiting wavelengths are highest prior to and when passing through the optically transparent window 106 and decrease to zero as the initiating and inhibiting wavelengths pass through the resin composition 102. The horizontal axis also shows the relative polymerization reaction rate (dash-dot line) producing the polymer with the origin at (zero). The dead zone 107 is the region where photoinhibition occurs within the resin composition such that the polymerizable monomers do not polymerize. Above the dead zone 107, polymerization occurs where inhibition does not inhibit polymerization and the initiating intensity is sufficient to activate the photoinitiator (e.g., to produce an initiating species (e.g., an initiating radical)).

For instance, FIGS. 25A and 25B shows a schematic diagram exemplifying an embodiment of the technology described herein. In FIG. 25A, an item 101 is being produced from a resin composition 102 (e.g., comprising a polymerizable monomer, a photoinitiator, and a photoinhibitor) according to an embodiment of the technology provided herein. A build support plate 103 is attached to the item 101 and draws it up from the resin composition 102. A first wavelength of light 104 (dotted lines) and a second wavelength of light 105 (solid lines) irradiate the resin composition 102 through an optically transparent window 106. The first wavelength of light 104 has a wavelength and intensity to activate the photoinhibitor (e.g., to produce an inhibiting species (e.g., an inhibiting radical) in the composition. The second wavelength of light 105 has a wavelength and intensity to activate the photoinitiator (e.g., to produce an initiating species (e.g., an initiating radical) in the composition. The first wavelength of light 104 activates the photoinhibitor to produce the dead zone 107 as shown in FIG. 25B.

FIG. 25B shows a schematic enlargement of a region of the schematic shown in FIG. 25A. The plot at the left shows the intensity of the initiating wavelength (solid line), the intensity of the inhibiting wavelength (dashed line), and the polymerization reaction rate (dot-dash line) within the composition 102 shown at the right as a function of distance from the optically transparent window 106. The vertical axis shows distance (in arbitrary units appropriate to scale for a CLIP-type apparatus) from the optically transparent window 106 up through the resin composition 102 in the direction of the build support plate 103. The origin of the vertical axis is at the outside surface of the optically transparent window 106 upon which the first wavelength of light 104 (dotted lines) and second wavelength of light 105 (solid lines) impinge prior to passing through the optically transparent window 106 to irradiate the resin composition 102. The horizontal axis shows the intensities of the initiating wavelength (solid line) and the inhibiting wavelength (dashed line) with the origin at zero (0). The intensities of the initiating and inhibiting wavelengths are highest prior to and when passing through the optically transparent window 106 and decrease to zero as the initiating and inhibiting wavelengths pass through the resin composition 102. The horizontal axis also shows the relative polymerization reaction rate (dash-dot line) producing the polymer with the origin at (zero). The dead zone 107 is the region where photoinhibition occurs within the resin composition such that the polymerizable monomers do not polymerize. Above the dead zone 107, polymerization occurs where inhibition does not inhibit polymerization and the initiating intensity is sufficient to activate the photoinitiator (e.g., to produce an initiating species (e.g., an initiating radical)).

In some embodiments, the resin composition 102 comprises a polymerizable monomer (e.g., a di(meth)acrylate monomer), a photoinitiator (e.g., camphorquinone), and a photoinhibitor. In some embodiments, the compositions comprise a photoabsorber. In some embodiments, the compositions do not comprise a photoabsorber (e.g., in some embodiments, the composition is photoabsorber-free).

In some embodiments, the resin composition 102 is irradiated by a near-UV light 104 (e.g., approximately 364 nm) to activate the photoinhibitor in the resin composition 102. In some embodiments, the near-UV light 104 is provided as a pattern to produce a region within the resin composition 102 having a particular shape that comprises the photoinhibitor. In some embodiments, the pattern is provided by a pattern component such as a mask. In some embodiments, the near-UV light 104 passes through a mask or other component to provide the near-UV light in a pattern that irradiates the composition to produce the inhibiting moiety (e.g., the inhibiting radical).

Simultaneously, in some embodiments, the resin composition 102 is irradiated by a blue light 105 (e.g., approximately 470 nm) to activate the photoinitiator in the resin composition 102. In some embodiments, the blue light 107 is provided as a pattern to produce a region within the composition having a particular shape that comprises the photoinitiator. In some embodiments, the pattern is provided by a pattern component such as a mask. In some embodiments, the blue light passes through a mask or other component to provide the blue light in a pattern that irradiates the composition to produce the initiating moiety (e.g., the initiating radical).

While FIGS. 25A and 25B depict an illustrative embodiment of the technology, the technology is not limited to the features and aspects shown therein or discussed herein in reference to FIGS. 25A and 25B.

For instance, the technology is not limited in the light used for irradiation and/or the light sources that are used for irradiation, e.g., a light having a first wavelength and a light having a second wavelength. The technology is not limited in the cross sectional shapes, areas, and/or patterns of the first and/or second wavelengths or the intensities of the first and/or second wavelengths. The technology is not limited in the wavelengths of the first and/or second sources.

As noted herein, the technology is not limited in the source of the light (e.g., one or more sources of one or more wavelengths of light). Accordingly, embodiments of the technology comprise, and comprise use of, a suitable light source (or combination of light sources) selected to be appropriate for the particular monomer ("resin"), photoinitiator, and/or photoinhibitor employed. While embodiments are discussed in terms of a light source, embodiments also include sources of radiation including an electron beam and other ionizing radiation sources.

In some embodiments, the light source is an actinic radiation source, such as one or more light sources (e.g., one or more light sources providing visible and/or ultraviolet electromagnetic radiation). In some embodiments, a light source is, e.g., an incandescent light, fluorescent light, phosphorescent or luminescent light, laser, light-emitting diode, etc., including arrays thereof. In some embodiments, a light source provides even coverage of light. Accordingly, in some embodiments a light source is a collimated beam or a planar waveguide, e.g., to provide even coverage of a light.

In some embodiments, the first wavelength is produced by a first light source, and the second wavelength is produced by a second light source. In some embodiments, the first wavelength and the second wavelength are produced by the same light source. In some embodiments, the first wavelength and second wavelength have emission peak wavelengths that are at least 5 or 10 nm apart from one another (e.g., the emission peak of the first wavelength is at least 5, 6, 7, 8, 9, 10, or more nm apart from the emission peak of the second wavelength).

In particular, as discussed herein, the technology relates to use of a first wavelength to activate a photoinitiator. Activating the photoinitiator produces an initiating moiety (e.g., initiating radicals) from the photoinitiator. The initiating radicals initiate polymerization of the polymerizable monomers. Further, as discussed herein, the technology relates to use of a second wavelength to activate a photoinhibitor. Activating the photoinhibitor produces an inhibiting moiety (e.g., inhibiting radicals) from the photoinhibitor. The inhibiting radicals prevent polymerization of the polymerizable monomers. Accordingly, embodiments of the technology relate to use of: 1) a first wavelength of light that activates the photoinitiator and that does not activate the photoinhibitor; and 2) a second wavelength of light that activates the photoinitiator and that does not activate the photoinhibitor. Thus, the photoinhibitor, photoinitiator, first wavelength, and second wavelength are chosen such that: 1) the first wavelength of light activates the photoinitiator and does not activate the photoinhibitor; and 2) the second wavelength of light activates the photoinhibitor and does not activate the photoinhibitor.

In some embodiments, the first wavelength is at or near the peak of the absorbance spectrum of the photoinitiator, e.g., within 50 nm (e.g., within 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm) of the peak of the absorbance spectrum of the photoinitiator. In some embodiments, the second wavelength is at or near the peak of the absorbance spectrum of the photoinhibitor, e.g., within 50 nm (e.g., within 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm) of the peak of the absorbance spectrum of the photoinhibitor.

A wavelength of light that is not strongly absorbed penetrates more deeply into a composition comprising an absorbing compound (e.g., a photoinitiator or photoinhibitor) and therefore activates a larger volume of photoactivated compound (e.g., a photoinitiator or photoinhibitor). Accordingly, in some embodiments, the first wavelength is chosen to be a wavelength that activates the photoinitiator, but that is also not strongly absorbed by the photoinitiator; similarly, in some embodiments, the second wavelength is chosen to be a wavelength that activates the photoinhibitor, but that is also not strongly absorbed by the photoinhibitor.

In some embodiments, the first wavelength is not near the peak of the absorbance spectrum of the photoinitiator, e.g., at least 50 nm (e.g., at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm) away from the peak of the absorbance spectrum of the photoinitiator. In some embodiments, the second wavelength is not near the peak of the absorbance spectrum of the photoinhibitor, e.g., at least 50 nm (e.g., within 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm) away from the peak of the absorbance spectrum of the photoinhibitor. Similarly, in some embodiments, the absorbance of the photoinitiator at the first wavelength is less than 25% (e.g., less than 25, 24, 23, 22, 21, 20, 19, 18, 17, 16, 15, 14, 13, 12, 11, 10, 9, 8, 7, 6, 5, 4.5, 4, 3.5, 3, 2.5, 2, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1, or 0.05%) of the absorbance of the photoinitiator at the wavelength of the absorbance peak of the photoinitiator. And, in some embodiments, the absorbance of the photoinhibitor at the second wavelength is less than 25% (e.g., less than 25, 24, 23, 22, 21, 20, 19, 18, 17, 16, 15, 14, 13, 12, 11, 10, 9, 8, 7, 6, 5, 4.5, 4, 3.5, 3, 2.5, 2, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1, or 0.05%) of the absorbance of the photoinhibitor at the wavelength of the absorbance peak of the photoinhibitor.

In some embodiments, light is provided in a pattern. In some embodiments, the first wavelength of light is provided as a pattern. In some embodiments, the second wavelength of light is provided as a pattern. The first and second wavelengths may be provided in patterns that are the same or different. In some embodiments, the methods comprise irradiating a composition as described herein with a pattern of a first wavelength of light. In some embodiments, the methods comprise irradiating a composition as described herein with a pattern of a second wavelength of light. In some embodiments, different patterns of light for two different wavelengths of light are used. In some embodiments, the patterns overlap in different configurations. In some embodiments, the methods comprise irradiating a composition as described herein with a first pattern of a first wavelength of light. In some embodiments, the methods comprise irradiating a composition as described herein with a second pattern of a second wavelength of light.

In some embodiments, the technology provides a pattern having a resolution with millions of pixel elements. In some embodiments, the technology provides a pattern having millions of pixel elements whose wavelength and/or intensities are varied to change the pattern of irradiation provided to the composition. For example, in some embodiments the pattern is provided by a DLP comprising more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) rows and/or more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) columns. In some embodiments the pattern is provided by a LCD comprising more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) rows and/or more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) columns.

In some embodiments, a light source is a liquid crystal display (LCD), light emitting diode (LED), or a digital light projector (DLP), e.g., to deliver a pattern of light. In some embodiments, the light source includes a pattern-forming element operatively associated with a controller. In some embodiments, the light source or pattern forming element comprises a digital (or deformable) micromirror device (DMD) with digital light processing (DLP), a spatial modulator (SLM), or a microelectromechanical system (MEMS) mirror array, a mask (aka a reticle), a silhouette, or a combination thereof. See, U.S. Pat. No. 7,902,526, incorporated herein by reference. In some embodiments, the light source comprises a spatial light modulation array such as a liquid crystal light valve array or micromirror array or DMD (e.g., with an operatively associated digital light processor, typically under the control of a suitable controller, configured to carry out exposure or irradiation of a composition as described herein (e.g., by maskless photolithography). See, e.g., U.S. Pat. Nos. 6,312,134; 6,248,509; 6,238,852; and 5,691,541, each of which is incorporated herein by reference.

In some embodiments, the technology provides a pattern having a resolution with millions of pixel elements. In some embodiments, the technology provides a pattern having millions of pixel elements whose wavelength and/or intensities are varied to change the pattern of irradiation provided to the composition.

For example, in some embodiments the technology relates to controlling the intensity of a light source at pixel resolution (e.g., a first source providing a first wavelength to activate the photoinitiator and/or a second source providing a second wavelength to activate the photoinhibitor). Providing a light source with intensities varying at the pixel level provides, in some embodiments, a three-dimensional contour of light intensity at the first and/or second wavelength(s) that irradiates the composition comprising the polymerizable monomer, the photoinhibitor, and the photoinitiator. In some embodiments, the intensity at light is controlled at the pixel level and varies as a function of time at the pixel level.

For example, in some embodiments the pattern is provided by a DLP comprising more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) rows and/or more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) columns. In some embodiments the pattern is provided by a LCD comprising more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) rows and/or more than 1,000 (e.g., more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 thousand or more) columns.

The technology is not limited in the pattern of irradiation produced by a first and/or second light source. For example, in some embodiments, the pattern comprises one or more geometric shapes, one or more irregular shapes, or one or more lines, dots, or other graphic features. In some embodiments, the pattern of irradiation changes with time, e.g., in some embodiments the pattern of irradiation is provided as a series of patterned images, e.g., a movie.

For example, in some embodiments, the technology comprises use of irradiation provided as a time-variable pattern of the first and/or second wavelength. In some embodiments, the length of time that each pattern of irradiation is provided depends on, e.g., the wavelength and/or intensity of the wavelength, the presence or absence of a photon absorbing substance (e.g., a dye) in the composition, the photoinitiator used, the photoinhibitor used (e.g., a photoinhibitor compound having fast back reaction kinetics (e.g., a HABI photoinhibitor (e.g., a bridged HABI photoinhibitor)))), and the volume of the composition (e.g., the dimensions of the composition (e.g., in the direction in which the light is travelling)). In some embodiments, a composition is irradiated by a pattern for a time that is approximately 1 μs to 6,000 seconds or more (e.g., approximately 0.001, 0.005, 0.01, 0.05, 0.1, 0.5, or 1 ns; approximately 0.001, 0.005, 0.01, 0.05, 0.1, 0.5, or 1 μs; approximately 0.001, 0.005, 0.01, 0.05, 0.1, 0.5, or 1 ms; approximately 0.001, 0.005, 0.01, 0.05, 0.1, 0.5, or 1 s; or approximately 0.001, 0.005, 0.01, 0.05, 0.1, 0.5, or 1 μs; approximately 0.001, 0.005, 0.01, 0.05, 0.1, 0.5, or 1 minute).

In some embodiments, a "dark" period is provided between each irradiation pattern. That is, in some embodiments, the composition is not irradiated for a period of time between the time periods of irradiation by the first and/or second wavelength. In some embodiments, the period of time during which the composition is not irradiated between periods of irradiation is approximately 1 ns to 6,000 seconds or more (e.g., approximately 0.001, 0.005, 0.01, 0.05, 0.1, 0.5, or 1 ns; approximately 0.001, 0.005, 0.01, 0.05, 0.1, 0.5, or 1 μs; approximately 0.001, 0.005, 0.01, 0.05, 0.1, 0.5, or 1 ms; approximately 0.001, 0.005, 0.01, 0.05, 0.1, 0.5, or 1 s; or approximately 0.001, 0.005, 0.01, 0.05, 0.1, 0.5, or 1 μs; approximately 0.001, 0.005, 0.01, 0.05, 0.1, 0.5, or 1 minute). In some embodiments, the period of time during which the composition is not irradiated between periods of irradiation is approximately 0.1 ps to 1 second (e.g., approximately 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1 μs; approximately 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1 ns; approximately 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1 μs; or approximately 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1 s). Thus, in some embodiments, the pattern varies tens, hundreds, thousands, or millions of times to produce a polymerized article within the composition.

The technology is not limited in the intensity of the first and/or second wavelengths provided by the first and/or second sources (e.g., that are emitted from the first and/or second sources and/or that impinge on the outside surface of the optically transparent window 106). For example, embodiments comprise light provided at intensities of from 0.001 to 1000 mW/cm$^2$ (e.g., approximately 0.001, 0.005, 0.01, 0.05, 0.1, 0.5, 1, 5, 10, 50, 100, 500, or 1000 mW/cm$^2$). In some embodiments, light is provided having a wavelength in the UV, visible, and/or infrared regions of the electromagnetic spectrum (e.g., wavelengths of 10 nm to 1 mm (e.g., 10, 20, 30, 40, 50, 60, 70, 80, 90, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795, 800, 805, 810, 815, 820, 825, 830, 835, 840, 845, 850, 855, 860, 865, 870, 875, 880, 885, 890, 895, 900, 905, 910, 915, 920, 925, 930, 935, 940, 945, 950, 955, 960, 965, 970, 975, 980, 985, 990, 995, or 1000 nm)).

The technology is not limited in the cross sectional area of the beam and/or two-dimensional pattern that is provided (e.g., the beam or pattern of the first and/or second wavelengths of light provided by the first and/or second sources). For example, in some embodiments the cross sectional area of the beam and/or two-dimensional pattern of the first and/or second wavelength is approximately 0.5 μm$^2$ to 10,000 mm$^2$ (e.g., approximately 0.5, 0.6, 0.7, 0.8, 0.9, 1, 2, 3, 4, 5, 6, 7, 8, 9, 10, 20, 30, 40, 50, 60, 70, 80, 90, 100, 200, 300, 400, 500, 600, 700, 800, 900, or 1000 μm$^2$; approximately 0.5, 0.6, 0.7, 0.8, 0.9, 1, 2, 3, 4, 5, 6, 7, 8, 9, 10, 20, 30, 40, 50, 60, 70, 80, 90, 100, 200, 300, 400, 500, 600, 700, 800, 900, or 1000 mm$^2$; or approximately 0.5, 0.6, 0.7, 0.8, 0.9, 1, 2, 3, 4, 5, 6, 7, 8, 9, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, or 10,000 mm$^2$) In some embodiments, the cross sectional area of the beam and/or two-dimensional pattern that is provided (e.g., the beam or pattern of the first and/or second wavelengths of light provided by the first and/or second sources) is varied (e.g., increased, decreased) with time.

In some embodiments, irradiation as described herein finds use in methods of producing an item comprising a polymer, e.g., by the polymerization of polymerizable monomers. Thus, in some embodiments the technology comprises irradiating a composition, e.g., with a first and/or a second wavelength, e.g., as provided by a first and/or a second wavelength of light. Embodiments of methods comprising irradiating steps are described herein. Technologies (e.g., methods, systems, apparatuses, kits, and compositions) related to use of two-color irradiation and photoinhibitor/photoinitiator combinations are described herein and in U.S. Prov. Pat. App. Ser. No. 62/632,903, which is expressly incorporated herein by reference in its entirety.

Uses for Deadzone Control

The technology is not limited in its use and finds use in a wide variety of polymer-associated technologies. In some embodiments, the compositions, methods, and systems described herein are particularly useful for making three-dimensional articles. For instance, the technology described herein (e.g., photoinhibitor compounds having fast back reaction kinetics (e.g., a HABI photoinhibitor (e.g., a bridged HABI photoinhibitor))) find use in three-dimensional printing (e.g., ultra-rapid 3D printing). Three dimensional (3D) printing or additive manufacturing is a process in which a 3D digital model is manufactured by the accretion of construction material. In some embodiments, a 3D printed object is created by utilizing computer-aided design (CAD) data of an object through sequential construction of two dimensional (2D) layers or slices that correspond to cross-sections of 3D objects.

In some embodiments, the technology finds use in continuous layer interface production (CLIP). In particular, in some embodiments, the photoinhibitor compound having fast back reaction kinetics (e.g., a HABI photoinhibitor (e.g., a bridged HABI photoinhibitor)) finds use in producing a dead zone in CLIP. See, e.g., U.S. Pat. Nos. 9,205,601; 9,216,546; and U.S. Pat. App. Pub. No. 2016/0067921, each of which is incorporated herein by reference. In particular, the photoinhibitor compounds having fast back reaction kinetics (e.g., a HABI photoinhibitor (e.g., a bridged HABI photoinhibitor)) and photoinitiator/photoinhibitor technology provided herein finds use in the three-dimensional printing technology described in U.S. Pat. App. Pub. No.

2016/0067921 with the TED being replaced by the bridged HABI photoinhibitors described herein.

In some embodiments, the technology finds use in stereolithography (SL). SL is one type of additive manufacturing where a liquid resin is hardened by selective exposure to a radiation to form each 2D layer. In some embodiments, the radiation is in the form of electromagnetic waves (e.g., light, photons) or an electron beam. The most commonly applied energy source is ultraviolet, visible, or infrared radiation. The liquid photopolymer resin can contain monomers, oligomers, fillers and additives such as photoinitiators, blockers, colorants and other types depending on the targeted properties of the resin.

In some embodiments, the technology finds use in true additive manufacturing and/or in direct write lithography. Products that may be produced by the compositions, methods, and systems described herein include, but are not limited to, large-scale models or prototypes, small custom products, miniature or microminiature products or devices, etc. Examples include, but are not limited to, mechanical parts, medical devices and implantable medical devices such as stents, drug delivery depots, functional structures, microneedle arrays, fibers and rods such as waveguides, micromechanical devices, microfluidic devices, etc.

In some embodiments, the technology finds use in producing further exemplary products including, but not limited to, medical devices and implantable medical devices such as stents, drug delivery depots, catheters, breast implants, testicle implants, pectoral implants, eye implants, contact lenses, dental aligners, microfluidics, seals, shrouds, and other applications requiring high biocompatibility; functional structures; microneedle arrays; fibers; rods; waveguides; micromechanical devices; microfluidic devices; fasteners; electronic device housings; gears, propellers, and impellers; wheels; mechanical device housings; tools; structural elements; hinges including living hinges; boat and watercraft hulls and decks; wheels; bottles, jars, and other containers; pipes, liquid tubes, and connectors; foot-ware soles, heels, innersoles, and midsoles; bushings, o-rings, and gaskets; shock absorbers, funnel/hose assembly, and cushions; electronic device housings; shin guards, athletic cups, knee pads, elbow pads, foam liners, padding or inserts, helmets, helmet straps, head gear, shoe cleats, gloves, and other wearable or athletic equipment; brushes, combs, rings, jewelry, buttons, snaps, fasteners, watch bands, or watch housings; mobile phone or tablet casings or housings; computer keyboards, keyboard buttons, or components; remote control buttons or components; auto dashboard components, buttons, or dials; auto body parts, paneling, and other automotive, aircraft or boat parts; cookware, bakeware, kitchen utensils, and steamers; and any number of other three-dimensional objects.

EXAMPLES

Contemporary, layer-wise additive manufacturing approaches afford sluggish object fabrication rates and often yield parts with ridged surfaces; in contrast, continuous stereolithographic printing overcomes the layer-wise operation of conventional devices, greatly increasing achievable print speeds and generating objects with smooth surfaces. During the development of embodiments of the technology provided herein, experiments were conducted to test methods for rapid and continuous stereolithographic additive manufacturing by employing two-color irradiation of (meth) acrylate resin formulations containing complementary photo-initiator and photo-inhibitor species. In this approach, photopatterned polymerization inhibition volumes generated by irradiation at one wavelength spatially confine the region photopolymerized by a second, concurrent irradiation wavelength. Moreover, the inhibition volumes created using this method enable localized control of the polymerized region thickness to effect single-exposure, far-side topographical patterning.

Materials and Methods

Triethylene glycol dimethacrylate (TEGDMA, Esstech Inc., Essington, Pa., USA) and bisphenol A glycidyl methacrylate (bisGMA, Esstech) were formulated as a mixture consisting of 50 wt % TEGDMA and 50 wt % bisGMA. N-(npropyl) maleimide (NPM, Alfa Aesar, Haverhill, Mass., USA) and triethylene glycol divinyl ether (TEGDVE, Sigma-Aldrich, St. Louis, Mo., USA) were formulated as a mixture such that the maleimide and vinyl ether functional groups were present at a 1:1 stoichiometric ratio. Bisphenol A ethoxylate diacrylate, EO/phenol 4.0 (BPAEDA, Sigma-Aldrich) was used without comonomers. (±)-Camphorquinone (CQ, Esstech) was used as a blue light-active photoinitiator in conjunction with ethyl-4-dimethylaminobenzoate (EDAB, Esstech) as a co-initiator at the concentrations indicated. 2,2'-Bis(2-chlorophenyl)-4,4',5,5'-tetraphenyl-1, 2'-biimidazole (o-Cl-HABI, TCI America, Portland, Oreg., USA) was used as a photoinhibitor at the concentrations indicated. Owing to poor solubility of o-Cl-HABI in the monomers, o-Cl-HABI was dissolved in tetrahydrofuran (THF, containing 0.025% butylated hydroxytoluene as preservative, Fisher Scientific, Hampton, NH, USA) as a ~30 wt % solution prior to formulating the resins. 2-Mercaptobenzothiazole (MBT, Sigma-Aldrich) was used as a co-initiator in conjunction with o-Cl-HABI.

The bisGMA/TEGDMA monomer mixture was formulated with 0.2 wt % CQ, 0.5 wt % EDAB, and 3 wt % o-Cl-HABI. BPAEDA was formulated with 0.2 wt % CQ, 0.5 wt % EDAB, and 2 wt % o-Cl-HABI. The TEGDVE/ NPM monomer mixture was formulated with 1.0 wt % CQ, 0.5 wt % EDAB, and 5 wt % o-Cl-HABI. All monomer quantities were adjusted to account for the THF in which o-Cl-HABI was dissolved.

For the o-Cl-HABI photoinitiation testing, bisGMA/ TEGDMA was formulated with 1 wt % o-Cl-HABI and either no co-initiator or 0.5 wt % of either EDAB or MBT.

Photopolymerizable resins was prepared with a 1/0.5/3 wt % mixture of CQ, EDAB, and o-Cl-HABI, respectively. Inhibition volume thickness tests were conducted with exclusively trimethylolpropane triacrylate (TMPTA, Alfa Aesar) as monomer. Resins used for continuous 3D printing and varying intensity printing were mixtures of monomers, oligomers and reactive diluents. Monomers used were TMPTA, TEGDMA, 1,6-hexandiol diacrylate (HDDA, TCI America, Portland, Oreg., USA). Sartomer CN2920 (Sartomer, Exton, Pa., USA) and Sartomer CN981 (Sartomer) were the oligomers used. Isobornyl acrylate (TCI America) was used as a reactive diluent. Tinuvin 328 (BASF, Florham Park, NJ, USA) was used as a UV absorber and Epolight 5675 (Epolin, Newark, NJ, USA) was used as the blue light absorber. All chemicals were used as received. All polymerizations were conducted at room temperature.

UV-visible spectrophotometry was performed on 1 wt % solutions of o-Cl-HABI and CQ in tetrahydrofuran, and $1.1 \times 10^{-4}$ M Tinuvin 328 and $1 \times 10^{-2}$ g/L Epolight 5675 in isopropyl alcohol using an Agilent Technologies Cary 60 UV-Vis spectrophotometer. Spectra were collected from 200 to 800 nm with 1 nm spacing on solutions using a 1 mm path length quartz cuvette in the dark.

For FT-IR spectroscopy, blue light was provided by a collimated, LED-based illumination source (Thorlabs M470L3-C1) with an emittance centered at 470 nm (FWHM 25 nm), used in combination with a current-adjustable LED driver (Thorlabs LEDD1B) for intensity control. UV light was provided by a UV spot curing system (Omnicure LX500, Excelitas Technologies) equipped with an Omnicure LED MAX head with an emittance centered at 365 nm. Irradiation intensities were measured with an International Light IL1400A radiometer equipped with a GaAsP Detector (model SEL005), a 10× attenuation neutral density filter (model QNDS1), and a quartz diffuser (model W).

Resin formulations were introduced between NaCl crystal windows (International Crystal Laboratories) separated by spacers (26 μm thick for bisGMA/TEGDMA, 51 μm thick for BPAEDA, and 13 μm NPM/TEGDVE to maintain constant sample thickness during polymerization. Each sample was placed in a Thermo Scientific Nicolet 6700 FTIR spectrometer equipped with a horizontal transmission accessory, as described previously, and spectra were collected from 650 to 4000 cm$^{-1}$ at a rate of 2 per second. The functional group conversion upon irradiation was determined by monitoring the disappearance of the peak area centered at 1635 cm$^{-1}$ for the methacrylate stretch, 1636 cm$^{-1}$ for the acrylate stretch, 1618 cm$^{-1}$ for the vinyl ether stretch, and 829 cm$^{-1}$ for the maleimide C=C double bond stretch. The respective sample thicknesses for the formulations were chosen to ensure that the functional group peaks remained within the linear regime of the instrument detector while affording good signal to noise and maintaining optically thin and isothermal polymerization conditions. All experiments were performed in triplicate, and the photoinitiator and photoinhibitor concentrations and irradiation intensities were as indicated in the materials section and figure captions.

For inhibition volume thickness measurements, UV light from a high powered light emitting diode (LED) ($\lambda_{max}$=365 nm, 1400 mA, Thorlabs #M365LP1) was collimated using an aspheric condenser lens (ϕ=50 mm, F=32 mm, NA=0.76, Thorlabs #ACL50832U) and focused with an adjustable collimation adapter (Thorlabs #SM2F). Optical components were held in place with a 60-mm cage cube system (Thorlabs #LC6W). A high powered blue LED($\lambda_{max}$=458 nm, IF=1400 mA, Osram LE B Q7WP-5C8C-24) was retrofitted into a commercial DLP projector (Optoma ML750). Light from the blue projection system passed through a bi-convex (ϕ=50 mm, F=100 mm, NA=0.76, Thorlabs LB1630) lens to reduce the focal distance and superimposed with the UV light using a long pass dichroic mirror (ϕ=50 mm, 425 nm cutoff, Thorlabs DMLP425L). The UV LED was driven by a BuckPuck LED driver (I=1000 mA, LEDdynamics Inc. 3023-D-E-1000) and the blue LED was driven by a constant current power supply (10000 mA, Mean Well HLG-120H-12B). The intensity of the LEDs were controlled using a custom Lab VIEW virtual instrument (VI) which output a 0-5 V analog signal which adjusted the current from the LED driver. Light intensity at a given voltage was calibrated by using an International Light IL1400A radiometer. 800 μm thick 3D-printed (Markforged Mark II, Nylon) spacers were affixed to a glass slide using epoxy adhesive to create a well for the photopolymer. Resin was pipetted into the well and sealed with another glass slide. The resin was then cured for 10 s at $I_{blue}$=78.5 mW/cm$^2$ under with varying UV irradiation intensities to give $0<I_{UV}/I_{blue}<2$. The cured resin was rinsed using isopropanol and re-exposed to blue light for an additional minute to complete curing. The thickness of the cured part was measured with a micrometer. The thickness of the inhibition volume was then calculated from $h_{IV}=h_s-h_c$ where $h_{IV}$, $h_s$, and $h_c$ are the thicknesses of the inhibition volume, spacer, and cured plug, respectively.

For continuous 3D-printing, a custom build head was designed using Autodesk Fusion 360 and fabricated out of nylon using 3D printing (Markforged Mark I$_f$). A metal base plate was attached at the base of the build head using two wingnuts. The build head was attached to a commercially available linear screw actuator (Rattmmotor CBX1605-300A) to enable vertical motion. Motion was controlled using an on/off digital signal from a custom Labview VI to start/stop a signal from a signal generator (Agilent 33220A). Models were designed using Designspark Mechanical 2.0 or AutoDesk Fusion 360 and exported as STL files. Image slices were created from STL files using Autodesk Netfabb 2017. Image slices were displayed concurrently with the build head motion using a Labview VI. Parts were washed with isopropanol after printing to remove uncured resin.

Volumetric Polymerization Inhibition Patterning

Figure 8A:
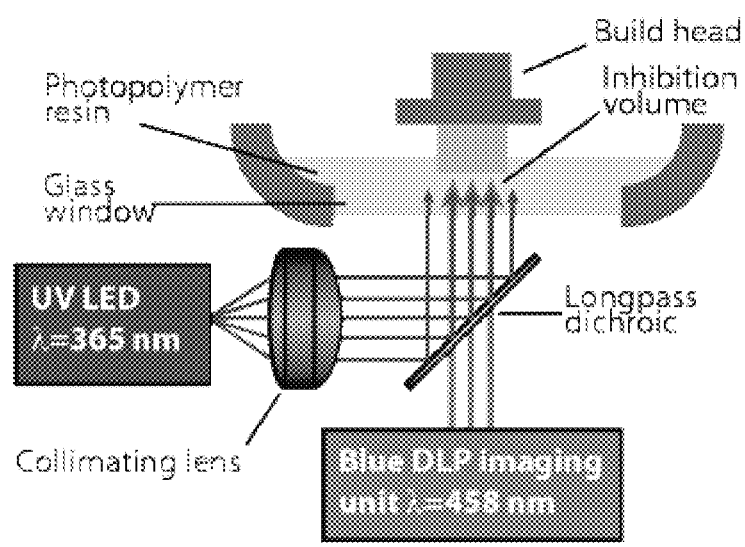
FIG. 8A-FIG. 8F show concurrent, two-color photoinitiation and photoinhibition.

The process (see, e.g., FIG. 8A) uses a build head that is drawn upwards out of a photopolymerizable resin and two illumination sources at different wavelengths. Patterned illumination from below through a transparent glass window initiates polymerization of the resin while illumination at a second wavelength inhibits the polymerization reaction immediately adjacent to the glass window, eliminating adhesion and enabling continuous operation. Print speeds of approximately 2 meters per hour have been achieved, and the process is compatible with a wide variety of resins including acrylates, methacrylates, and vinyl ethers. In addition, by varying the intensity of the light source on a per-pixel basis, the system can perform true 3D printing in a single exposure/layer with no stage translation.

Figure 8B:
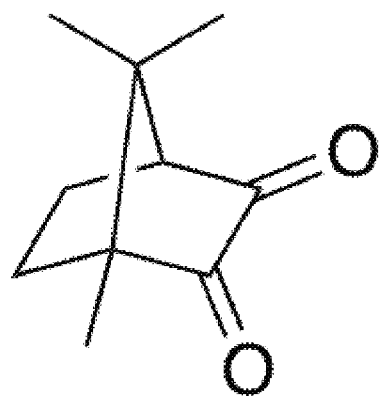
Figure 8C:
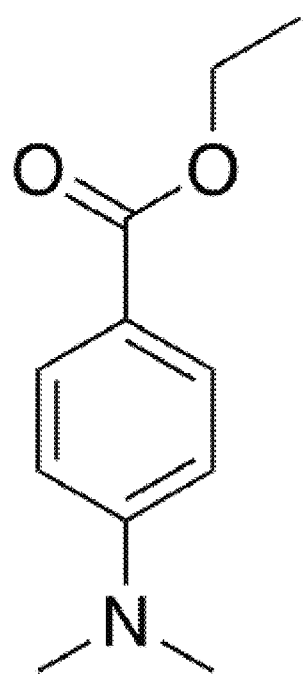
Figure 8D:
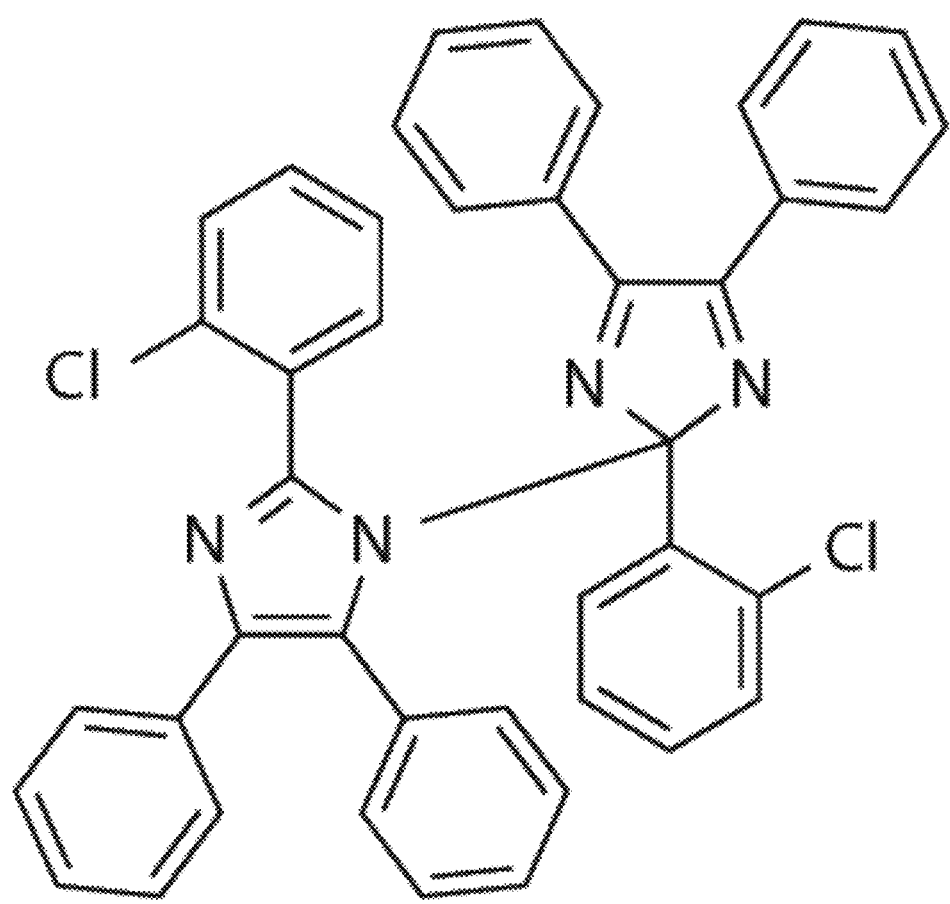

In some embodiments, the system uses a multi-color system to achieve volumetric patterning by the photochemical generation of both polymerization initiation and polymerization inhibition species. Common amongst all contemporary SLA devices is the use of a single wavelength of light to initiate polymerization patterned in a plane. In contrast, the technology provided herein uses one wavelength to photochemically activate polymerization and a second wavelength to inhibit that reaction. Here, photopolymerizable resins are formulated with camphorquinone (CQ, FIG. 8B) and ethyl-4-(dimethylamino) benzoate (EDAB, FIG. 8C), as a visible light photoinitiator and coinitiator, respectively, and bis[2-(o-chlorophenyl)-4,5-diphenylimidazole] (o-Cl-HABI, FIG. 8D) as a photoinhibitor. Whereas HABIs are well known as effective photoinitiators in the presence of complementary, hydrogen-donating co-initiators, in the absence of co-initiators, the lophyl radicals generated upon HABI photolysis efficiently inhibit radical-mediated, chain growth polymerization (FIG. 9) by rapidly recombining with propagating, carbon-centered radicals and thus can be used to prevent polymerization adjacent to the illumination window.

Figure 9:
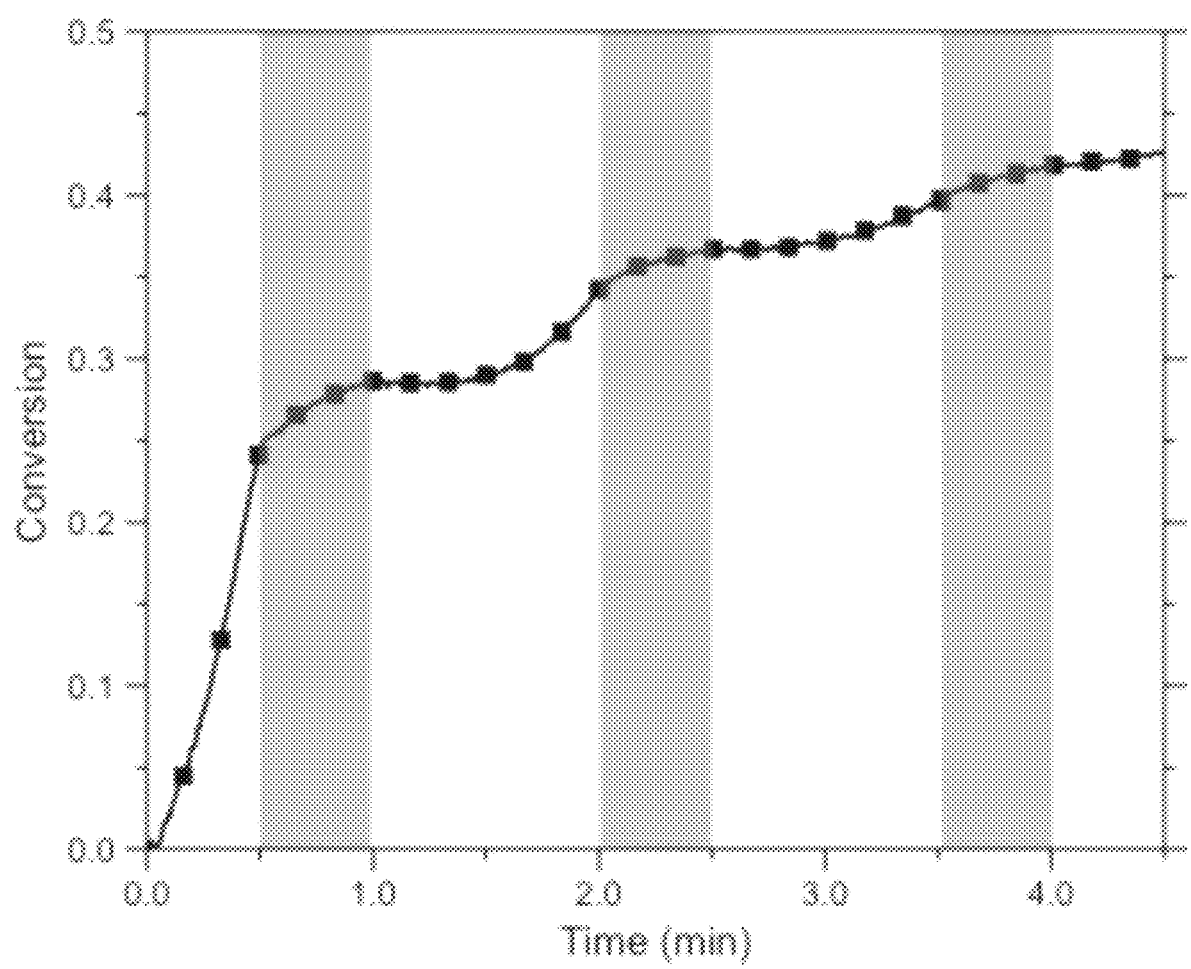
FIG. 9 is a plot showing the wavelength selective photoinitiation and transient photoinhibition of methacrylate polymerization. The plot shows data for methacrylate conversion versus time for bisGMA/TEGDMA formulated with CQ/EDAB and o-Cl-HABI under continuous irradiation with 470 nm at 100 mW/cm$^2$ and intermittent irradiation with 365 nm at 30 mW/cm$^2$ during the shaded periods as indicated. The accumulation of lophyl radicals during the 30 second UV irradiation periods afford decreased polymerization rates. Upon cessation of UV irradiation, the polymerization rates recover after induction times of approximately 30 seconds owing to the relatively slow consumption of lophyl radicals by recombination.

Data were collected measuring methacrylate conversion to polymer versus time for bisGMA/TEGDMA formulated with CQ/EDAB and o-Cl-HABI under continuous irradiation with 470 nm at 100 mW/cm$^2$ and intermittent irradiation with 365 nm at 30 mW/cm$^2$ for 30 seconds (FIG. 9, UV irradiation indicated by the shaded periods). The accumulation of lophyl radicals during the 30 second UV irradiation periods afford decreased polymerization rates. Upon cessation of UV irradiation, the polymerization rates recover after a lag time of approximately 30 seconds during which the lophyl radicals recombine to relieve the inhibition.

Figure 7:
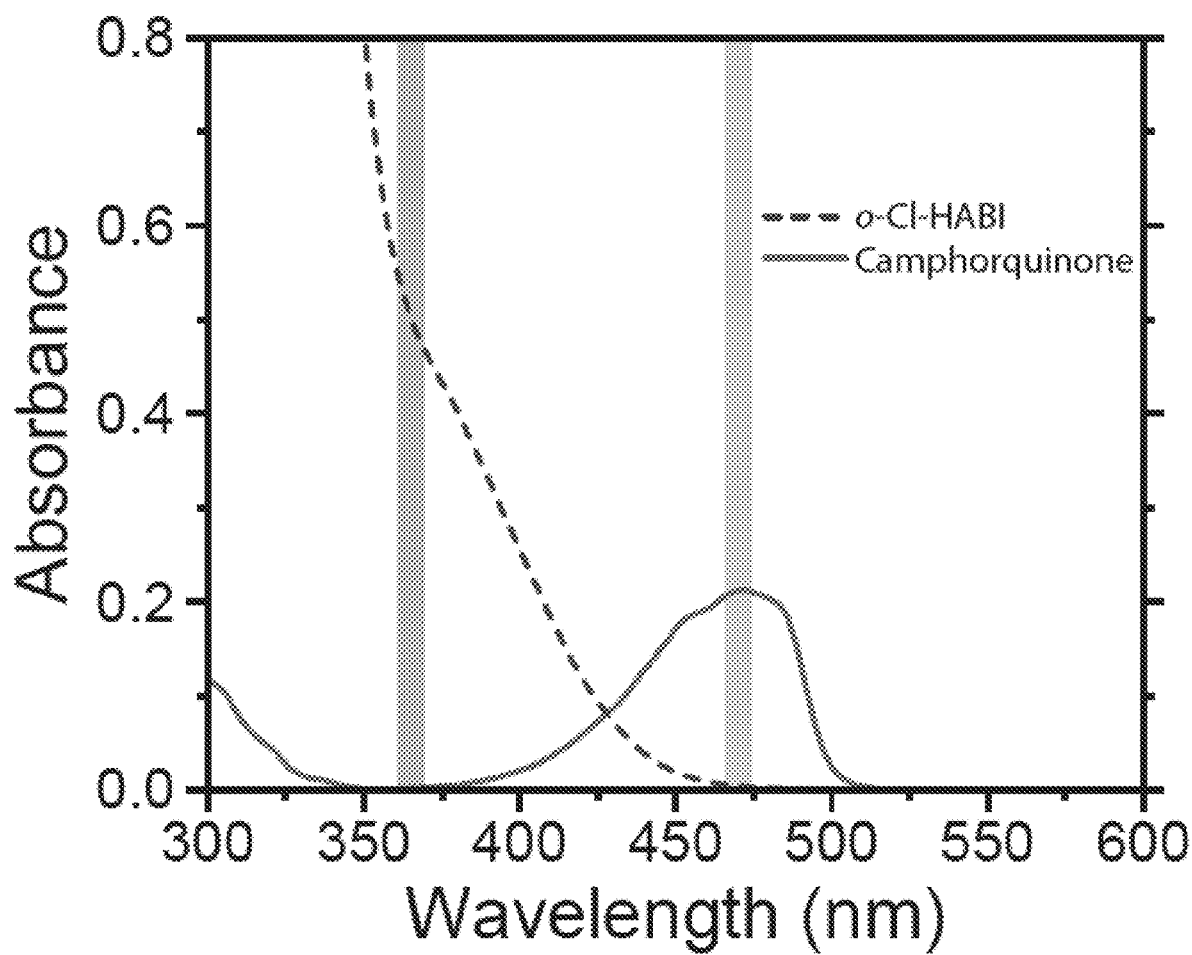
FIG. 7 is a plot showing the absorbance spectra of o-Cl-HABI (dotted line) and camphorquinone (solid line). One grey bar indicates the region of the absorption maximum of approximately 470 nm for camphorquinone. Another grey bar shows a convenient range of wavelengths (e.g., approximately 365 nm) within the transmission window of camphorquinone at which o-Cl-HABI absorbs and that is consequently useful for activation of o-Cl-HABI.

Independently controlling initiation and inhibition necessitates that photoinitiating and photoinhibiting species have complementary absorbance spectra. As shown in FIG. 7, o-Cl-HABI exhibits very weak absorbance in the blue region of the spectrum and moderate absorbance in the near UV, complementing the absorbance spectrum of CQ which absorbs blue light ($\lambda_{max}$=470 nm) but absorbs poorly in the near UV. This minimal overlap in the absorbance spectra of CQ and o-Cl-HABI in the near UV to blue region of the spectrum enables polymerization to be selectively initiated with blue light and inhibited with UV light.

Figure 8E:
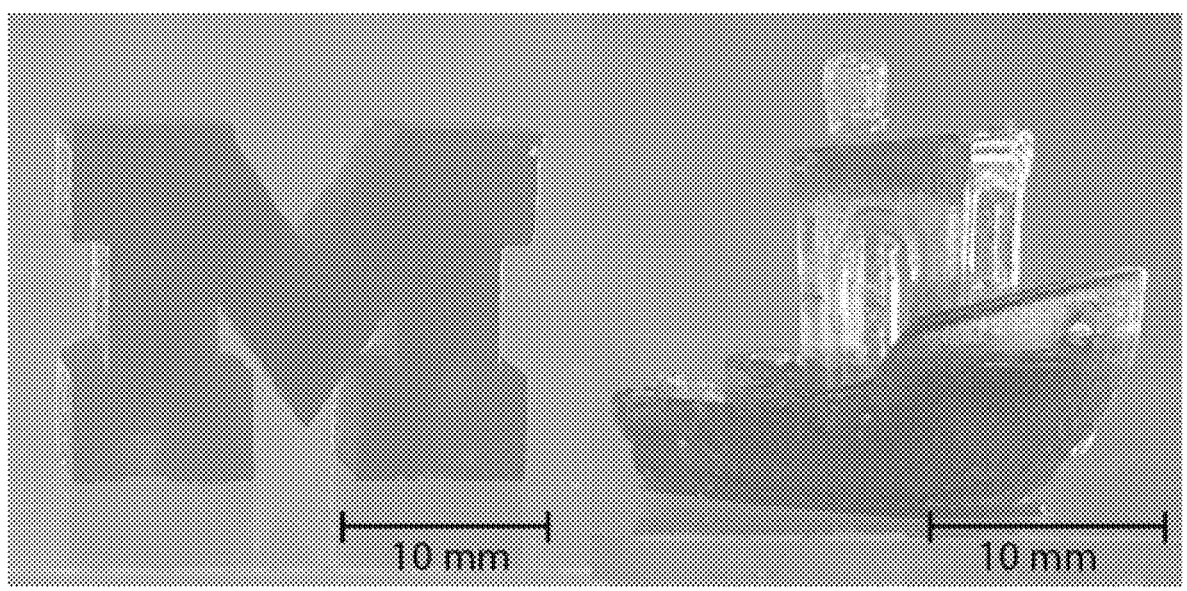

The thickness of the polymerization inhibition volume can be controlled by varying the ratio of the intensities of the two illuminating light sources. When both UV and blue light are supplied to the resin, an inhibition volume with no polymerization is generated adjacent to the window. Above this region, polymerization proceeds allowing the continuous printing of objects to proceed, such as those shown in FIG. 8E, without deleterious window adhesion. Importantly, the inhibition volume thickness (e.g., the vertical distance into the resin from the transparent window in which no polymerization occurs) is dependent on the incident initiating and inhibiting light intensities, ($I_{blue,0}$ and $I_{UV,0}$ respectively) such that:

$$\text{Inhibition volume thickness} = \frac{\log\left(\frac{\beta I_{UV,0}}{I_{blue,0}}\right)}{1/h_{UV}^{-1} - 1/h_{blue}}$$

Here, the inhibition coefficient ($\beta$) is a constant for a given resin composition, and incorporates the ratio of inhibitor to initiator absorbance cross sections, quantum yield, and reaction rate constants. The absorption height of a material, $h_{UV}$ and $h_{blue}$, is defined as the inverse of the sum of the concentrations of all absorbing species ($c_i$) multiplied by their wavelength-specific absorptivity ($\varepsilon_i$)

$$h_i = \frac{1}{\sum \varepsilon_i c_i}$$

and is equal to the depth into an absorbing medium in which the light is 90% attenuated.

Figure 8F:
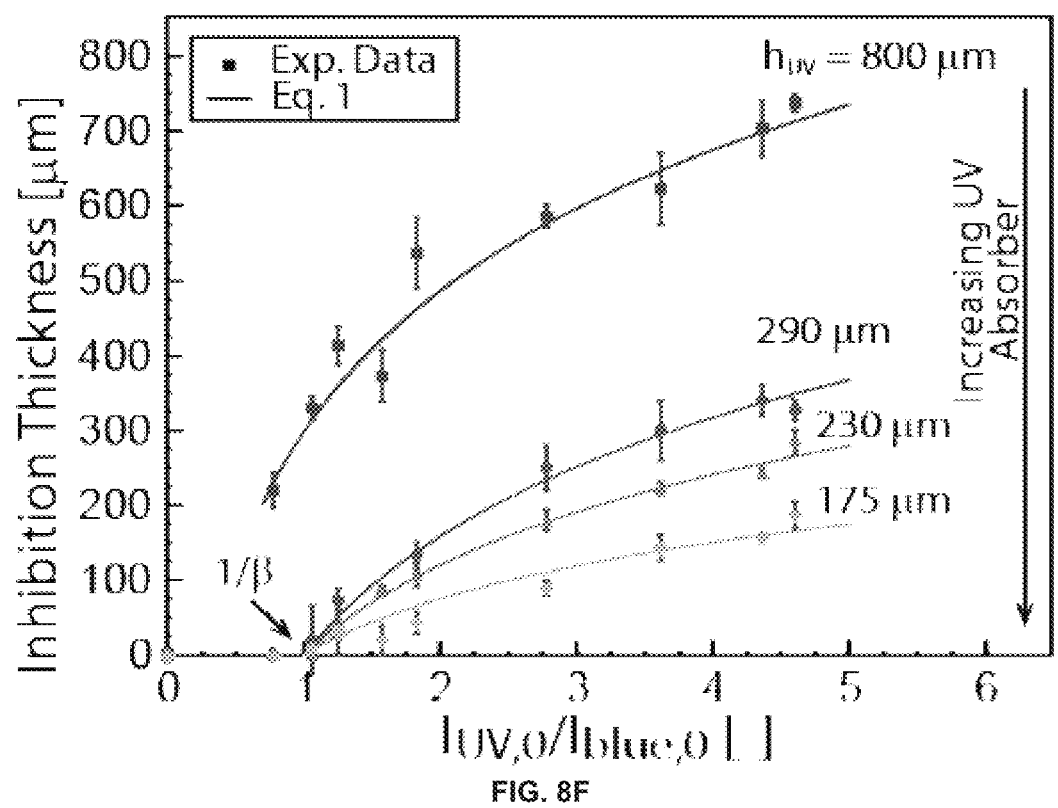
Figure 14:
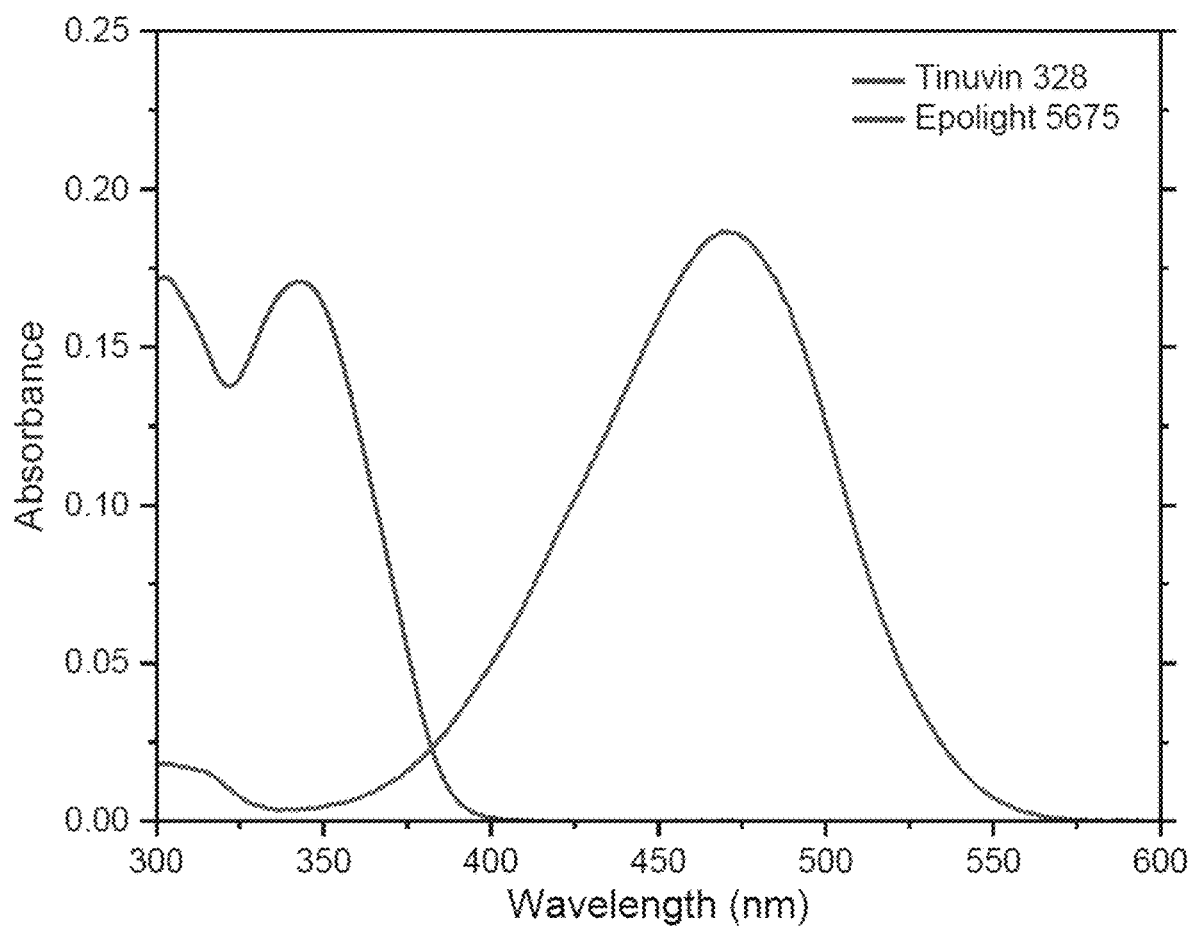
FIG. 14 is a plot of the UV-vis spectra of ultraviolet and blue light absorbers. The absorbance spectra of Tinuvin 328 and Epolight 5675 ($1.1 \times 10^{-4}$ M and $1 \times 10^{-2}$ g/L, respectively) in isopropyl alcohol reveal no absorbance by Tinuvin 328 in the visible region of the spectrum and relatively low absorbance by Epolight 5675 in the near UV spectral region, enabling their use to independently control resin absorbance in the blue and near UV.

FIG. 8F shows inhibition volume thickness, calculated using a subtractive technique, is controlled by varying both the ratios of the incident radiation and the concentration of the UV absorber. Adjustment of $I_{UV,0}/I_{blue,0}$ changes the relative rates of initiating and inhibiting radical generation within the resin (trimethylolpropane triacrylate (TMPTA)) and can be used to control the inhibition thickness. Alternatively, the UV absorber concentration (Tinuvin 328, see FIG. 14) can be changed to achieve a similar control over the inhibition volume thickness. Increasing the UV absorber concentration to decrease $h_{UV}$ selectively confines UV light, and hence generation of inhibiting radicals, to progressively thinner regions above the projection window. It is important to note that a minimum intensity ratio, at which initiation and inhibition rates are balanced, is required to generate an inhibition volume and can be shown to equal ($I_{UV}/I_{blue}$) crit=1/$\beta$. In this TMPTA-based system, 1/$\beta$ is found to be approximately one; nevertheless, this value is dependent on resin composition, necessitating experimental determination for specific resin formulations.

Figure 13:
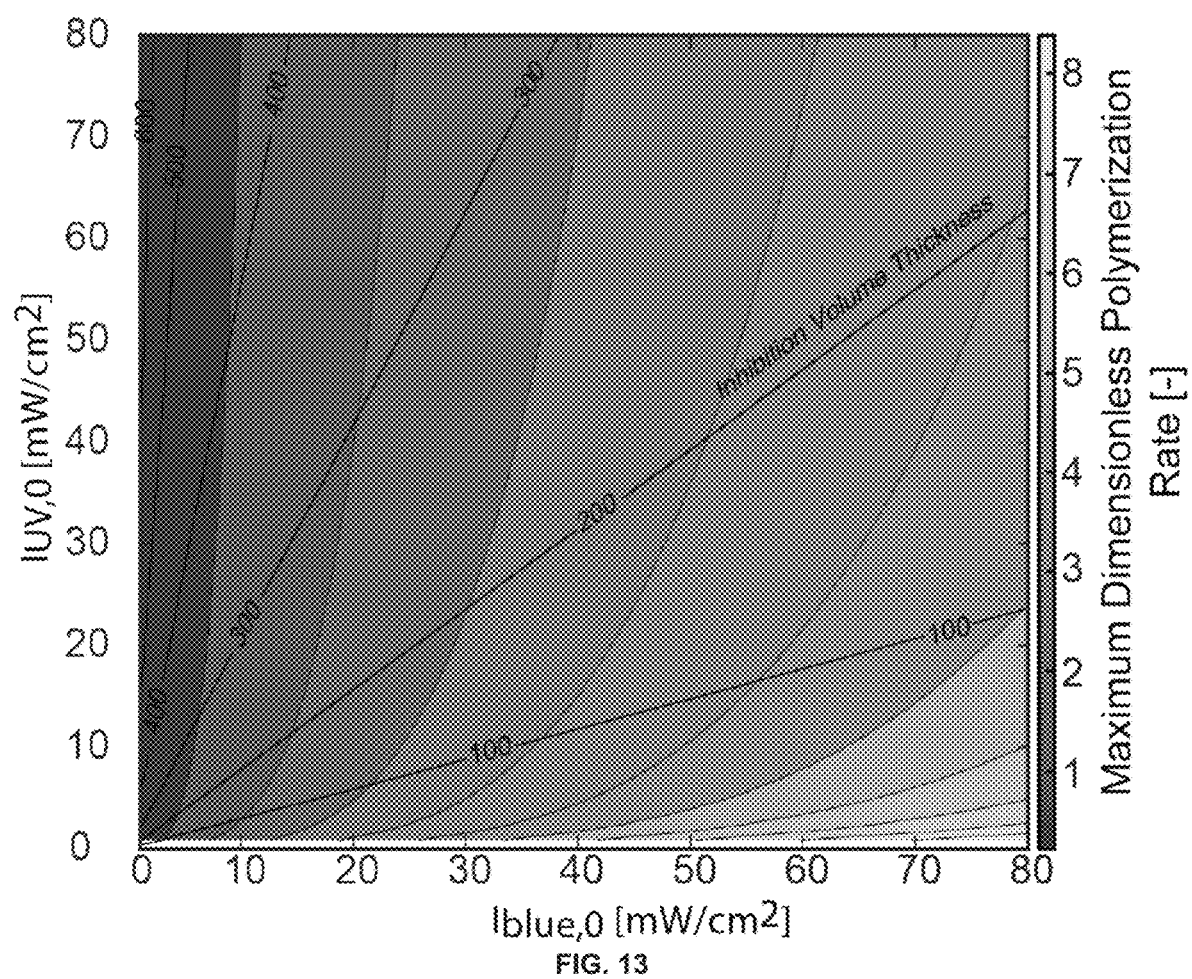
FIG. 13 is a plot showing the effect of incident UV and blue illumination intensities on inhibition volume thickness and polymerization rate. Adjustment of $I_{UV,0}/I_{blue,0}$ along an isorate line allows for adjustment of the inhibition volume thickness while maintaining the same polymerization rate. Additionally, raised polymerization rates can be attained for a given inhibition volume thickness.

The thickness of this polymerization inhibition volume adjacent to the projection window is a critical parameter for continuous stereolithographic fabrication. Previously reported inhibition layers resulting from oxygen inhibition are typically only tens of micrometers thick. Although this inhibition layer eliminates adhesion to the window, its small thickness curtails resin reflow underneath the emergent object, especially in objects with large cross sectional areas, and necessitates the use of low viscosity resins or fabrication of small cross section objects. Here, the inhibition volume thickness can be modulated by altering the UV absorbance of the resin or by varying the intensities of the initiating and inhibiting light sources, such that inhibition volume thicknesses in the hundreds of microns are readily obtained. These thick inhibition volumes are particularly desirable when using viscous resin formulations, further expanding the monomer palette, or to allow resin reflow into the print area for objects with large cross sectional areas. Nevertheless, increases in the inhibition volume thickness are typically accompanied by decreased polymerization rates, and hence slower print speeds, owing to attenuation of the initiation wavelength intensity within the resin bath. Notably, the system described here can negate this limitation and achieve equivalent polymerization rates for different inhibition volume thicknesses by accompanying any variation in the inhibition wavelength intensity with a corresponding initiation wavelength intensity change (see FIG. 13).

The large inhibition volume, in conjunction with high photoinitiation rates, facilitate continuous and rapid object printing. Notably, high photoinitiation wavelength intensities to effect rapid polymerization rates exacerbate separation and resin reflow issues in conventional and diffusion-reliant methods, can be used in this system since the inhibiting intensity is adjustable to maintain an inhibition volume. The maximum print speed for continuous printing in this system is a function of the absorption heights at the inhibiting and initiating wavelengths, $h_{UV}$ and $h_{blue}$, the intensity of the initiating and inhibiting wavelength ($I_{blue,0}$ here), and the amount of energy required to cure the resin, $E_c$, such that:

$$\text{Max} \cdot \text{print speed} \propto \frac{I_{blue,0} h_{blue} - \beta I_{UV,0} h_{UV}}{E_c}$$

Figure 12A:
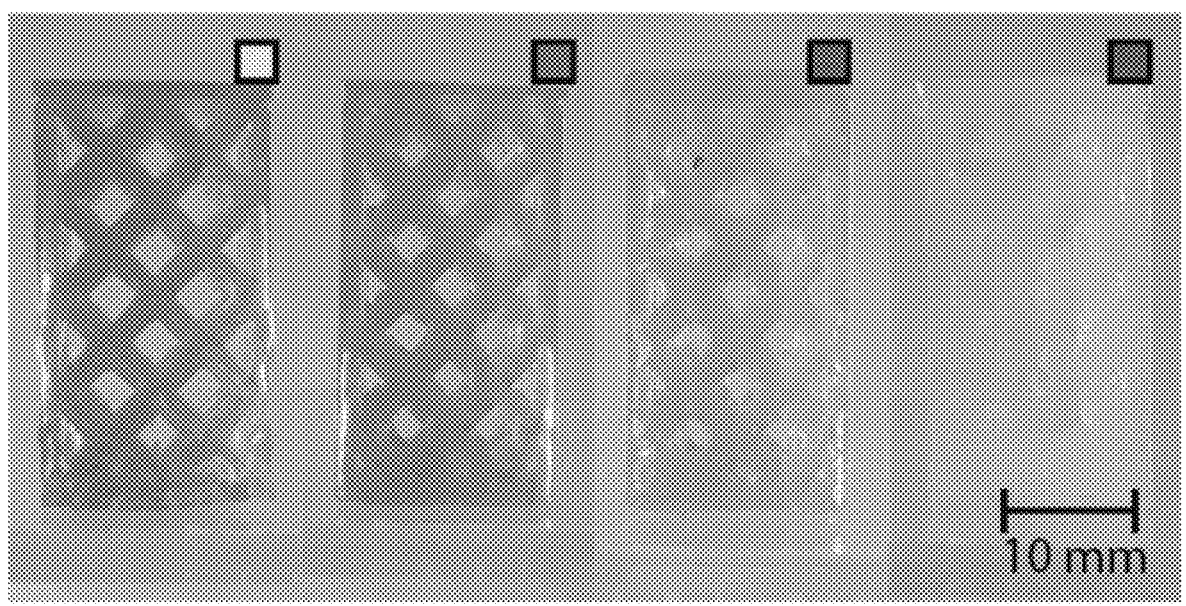
FIG. 12A is a series of photographs showing argyle models printed using two-color photoinitiation and photoinhibition to provide continuous printing.
Figure 12B:
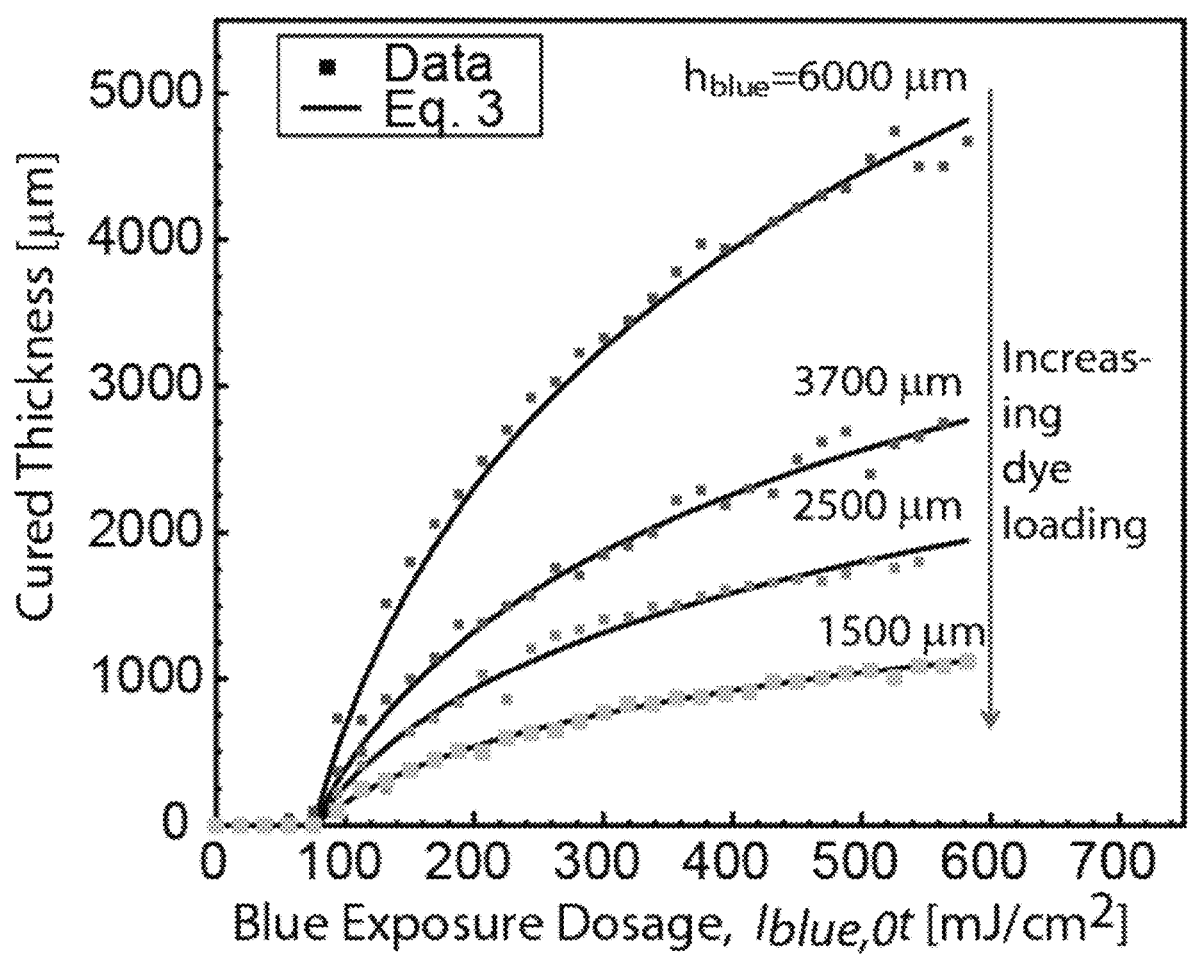
FIG. 12B is a plot showing cured thickness versus dosage of blue light for four acrylate-based resin formulations prepared with varying blue-5 absorbing dye (Epolight 5675) loadings.
Figure 12C:
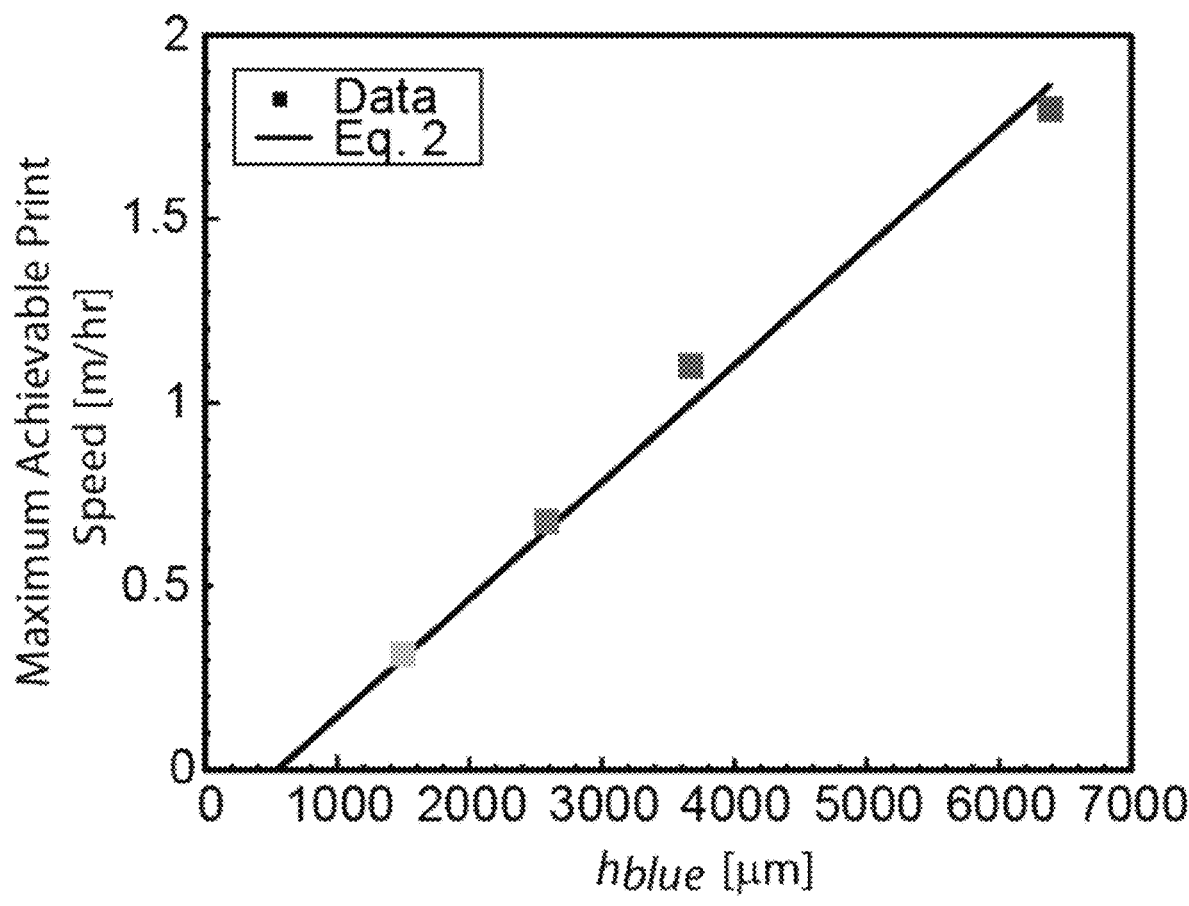
FIG. 12C is a plot showing maximum vertical print speeds achievable for varying blue absorbance heights. All printing was done with $I_{blue,0}$ of 110 mW/cm$^2$ and $I_{UV,0}$ of 130 mW/cm$^2$ with $h_{UV}$ of 125 μm.

Practically, theoretical maximum print speed is difficult to achieve owing to lingering inhibiting radicals, mechanical properties of the cured resin, and reflow limitations dictated by the resin viscosity. Nevertheless, in some embodiments, the technology prints parts at speeds up to almost 2 meters per hour, e.g., for the gyroid structures shown in FIG. 12A. In this system, the depth to which light penetrates and ultimately cures resin is controlled by modulating the resin's blue absorbance (FIG. 12B) with the cured thickness for a given irradiation dose of initiating light given by:

$$\text{Cured Thickness} = h_{blue} \log\left(\frac{I_{blue,0} t}{E_c}\right)$$

where $I_{blue,0} \cdot t$ is the product of the irradiation intensity and time. Unwanted polymerization beyond the designed feature (known as "cure through") is present in resins with low absorbance causing poor vertical resolution. Adding blue-adsorbing dyes (e.g., Epolight 5675, see FIG. 14) can remedy this but, as has been previously reported, a compromise between vertical resolution and print speed exists in continuous AM systems (FIG. 12C).

Figure 10A:
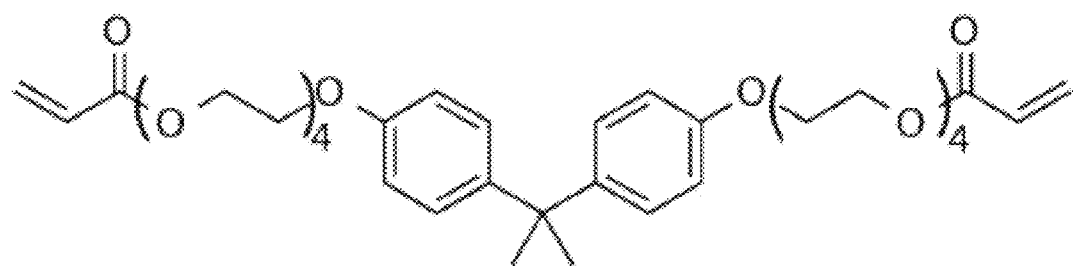
FIG. 10A-FIG. E show the structures of (FIG. 10A) bisphenol A ethoxylate diacrylate (BPAEDA, n≈4)
Figure 10B:
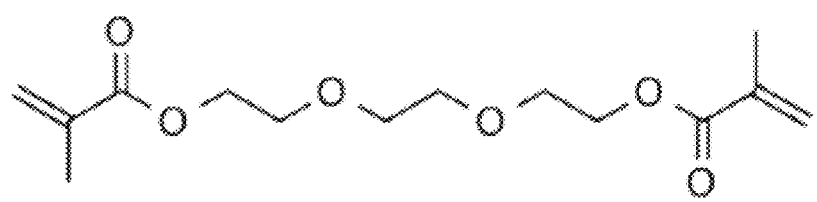
(FIG. 10B) triethylene glycol dimethacrylate (TEGDMA)
Figure 10C:
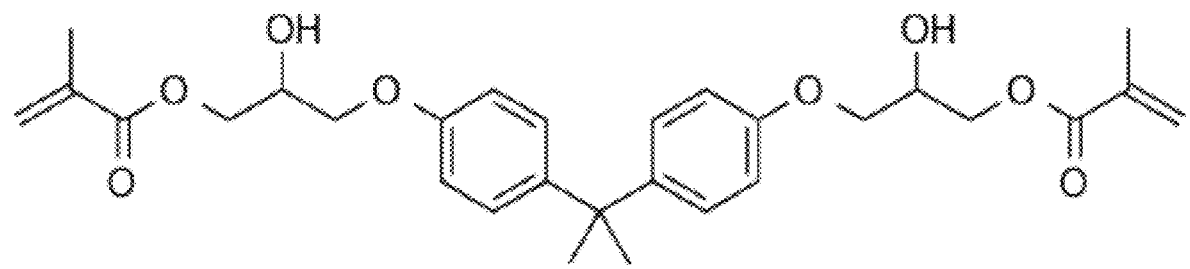
(FIG. 10C) bisphenol A glycerolate dimethacrylate (bisGMA)
Figure 10D:
(FIG. 10D) triethylene glycol divinyl ether (TEGDVE)
Figure 10E:
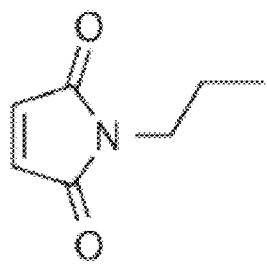
(FIG. 10E) N-propylmaleimide (NPM).
Figure 10F:
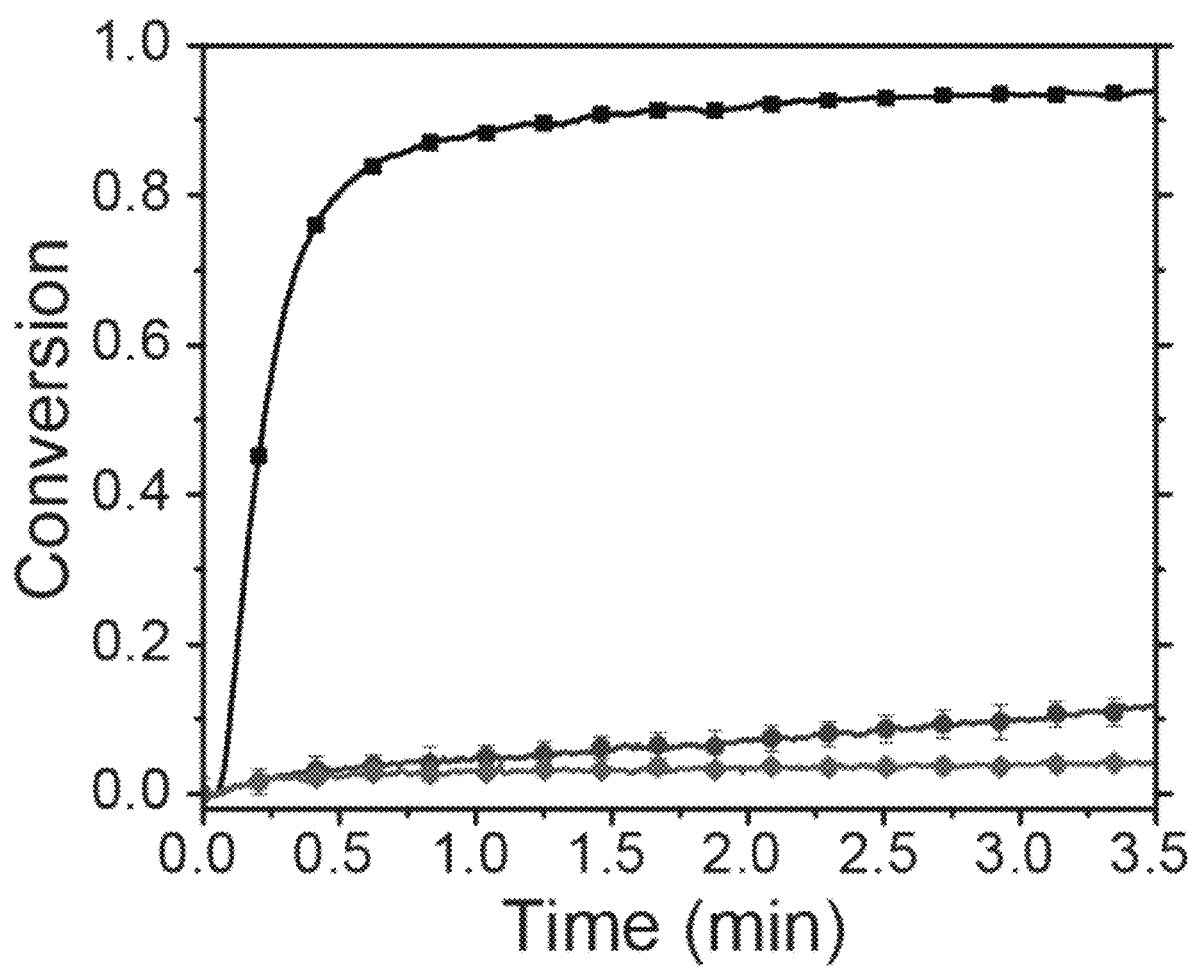
Figure 10G:
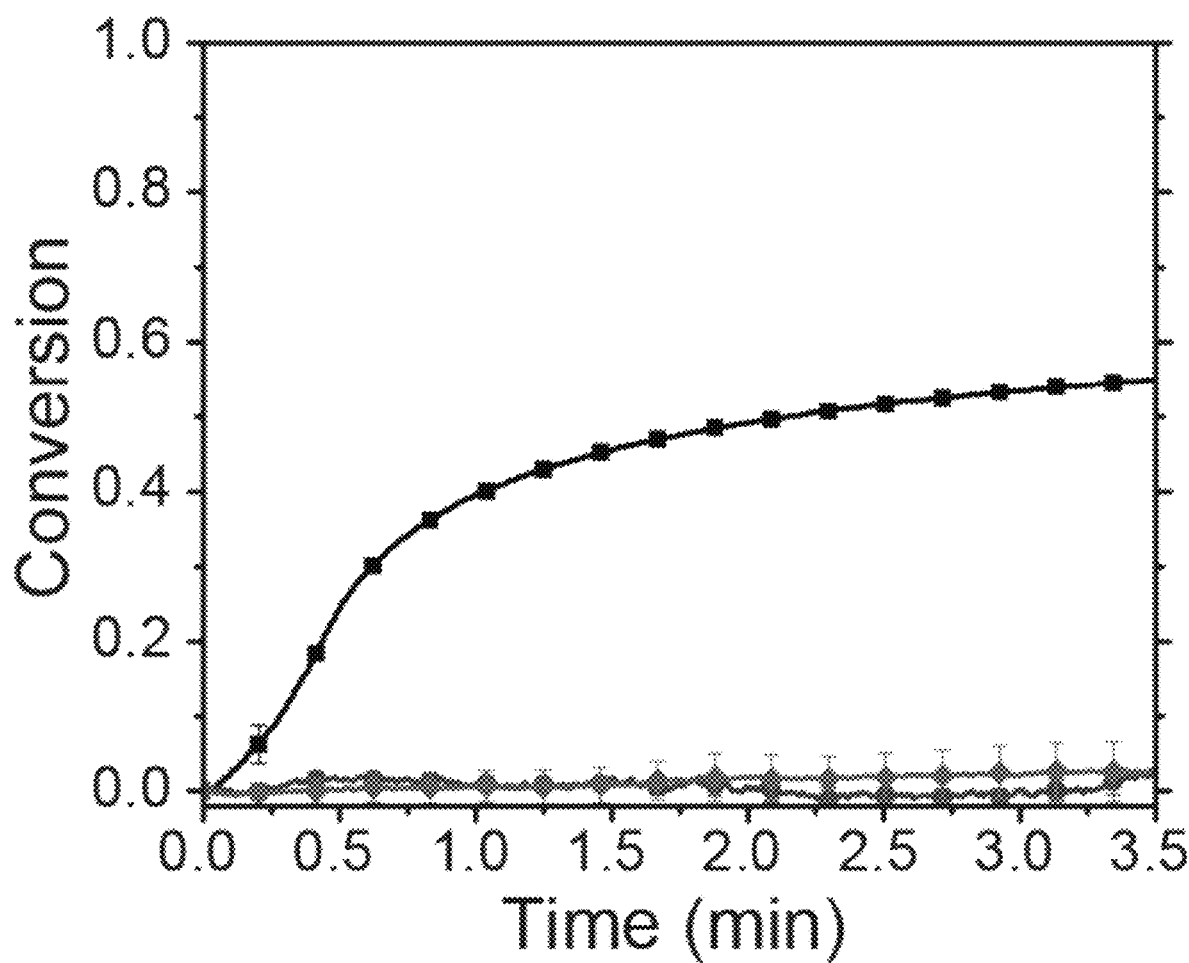
Figure 10H:
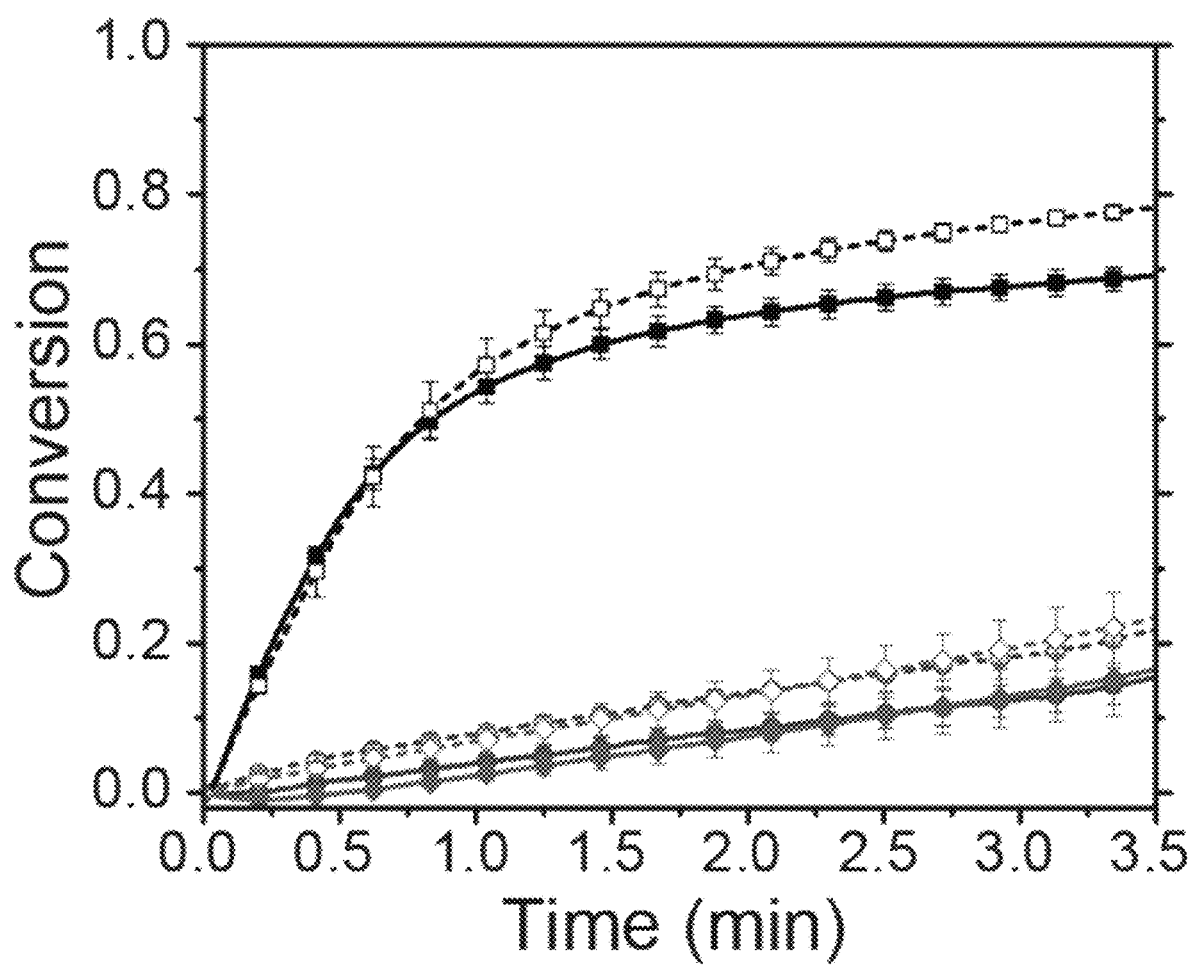

The concurrent photoinitiation and photoinhibition described here can be applied to a range of monomer classes for use in this AM system. HABIs exhibit several attributes favoring their potential as universal photoinhibitors of radical-mediated, chain-growth polymerizations, including their favorable absorbance spectra and the inability of HABI-derived lophyl radicals to directly initiate polymerization of (meth)acrylates, greatly expanding the compatible monomer palette. To demonstrate the broad applicability of our photoinitiator/photoinhibitor system, acrylate, methacrylate, and vinyl ether/maleimide (e.g., electron donor and electron acceptor monomers) resins (see FIG. 10A-E) formulated with CQ, EDAB, and o-Cl-HABI displayed rapid curing upon blue irradiation, suggesting that the HABI did not produce polymerization rate-retarding chain transfer reactions, and while under exclusive near UV irradiation, very limited to no curing was observed. Upon concurrent blue and near-UV irradiation, polymerization rates decreased precipitously relative to those observed under exclusively blue irradiation for all resin formulations examined, approaching zero for the (meth)acrylates (FIG. 10F-H). Note that other two-color irradiation schemes have been demonstrated previously for sub-diffraction, direct-write photolithography. These systems used CQ and EDAB as a blue light photoinitiator system and tetraethylthiuram disulfide (TETD) as a UV-active photoinhibitor. Unfortunately, the utility of TETD in rapid additive manufacturing is hindered by its participation in chain transfer reactions with propagating radical species, resulting in significantly reduced photopolymerization rates at raised TETD concentrations even under exclusively photoinitiating irradiation, while co-irradiation at the photoinhibition wavelength yields reduced polymerization rates but does not completely cease polymerization. Moreover, TETD has only been shown to effectively inhibit methacrylate resins, limiting the palette of compatible monomers.

Figure 11A:
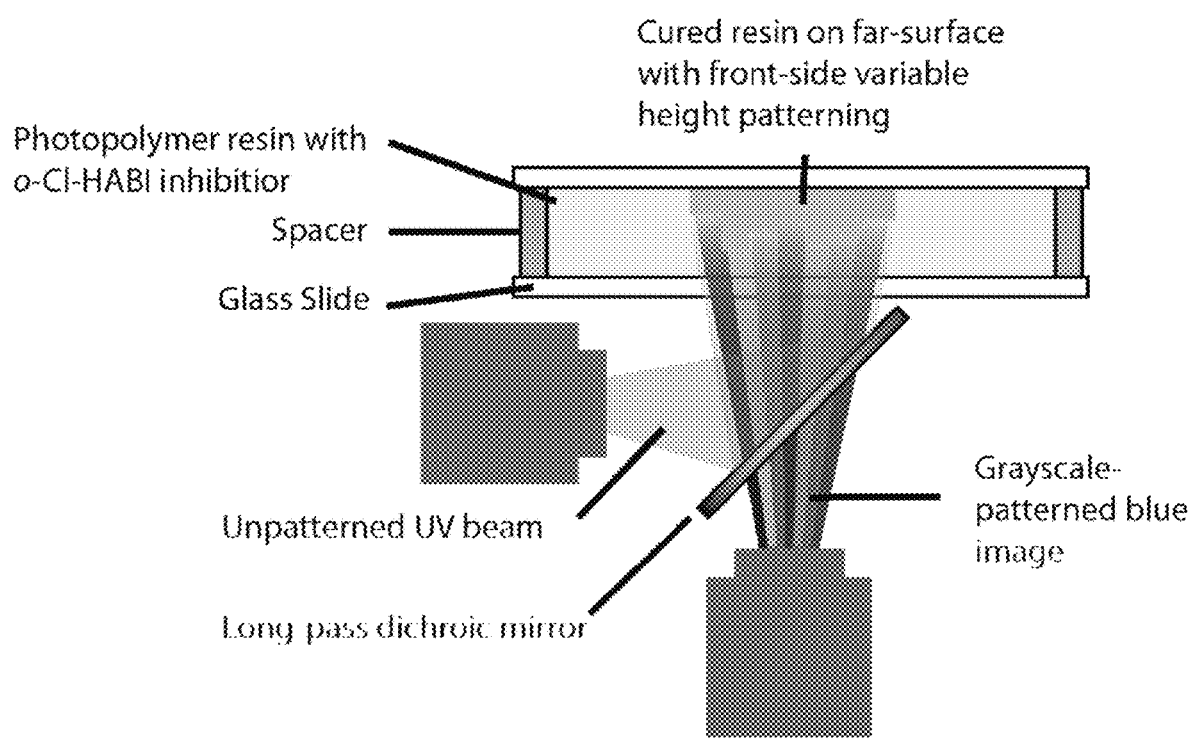
FIG. 11A is a schematic drawing of an embodiment of the technology used for intensity-patterned printing, e.g., using two-color photoinitiation and photoinhibition for controllable, far surface patterning of complex 3D structures.
Figure 11B:
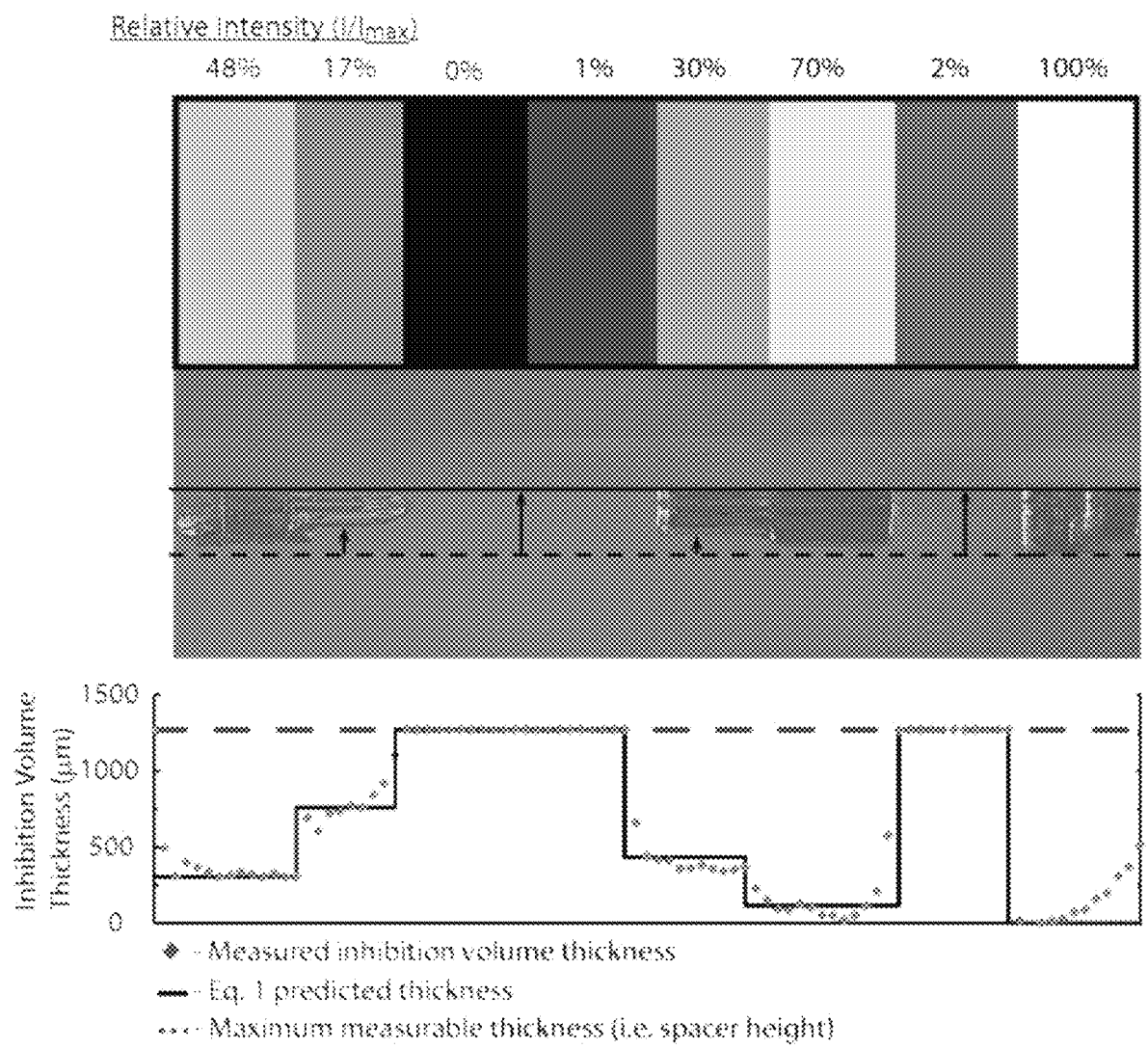
FIG. 11B shows use of variable intensity images to provide pixel-wise variation of $I_{UV,0}/I_{blue,0}$ and the inhibition height.
Figure 11C:
FIG. 11C is a four-level intensity image of the University of Michigan seal.
Figure 11D:
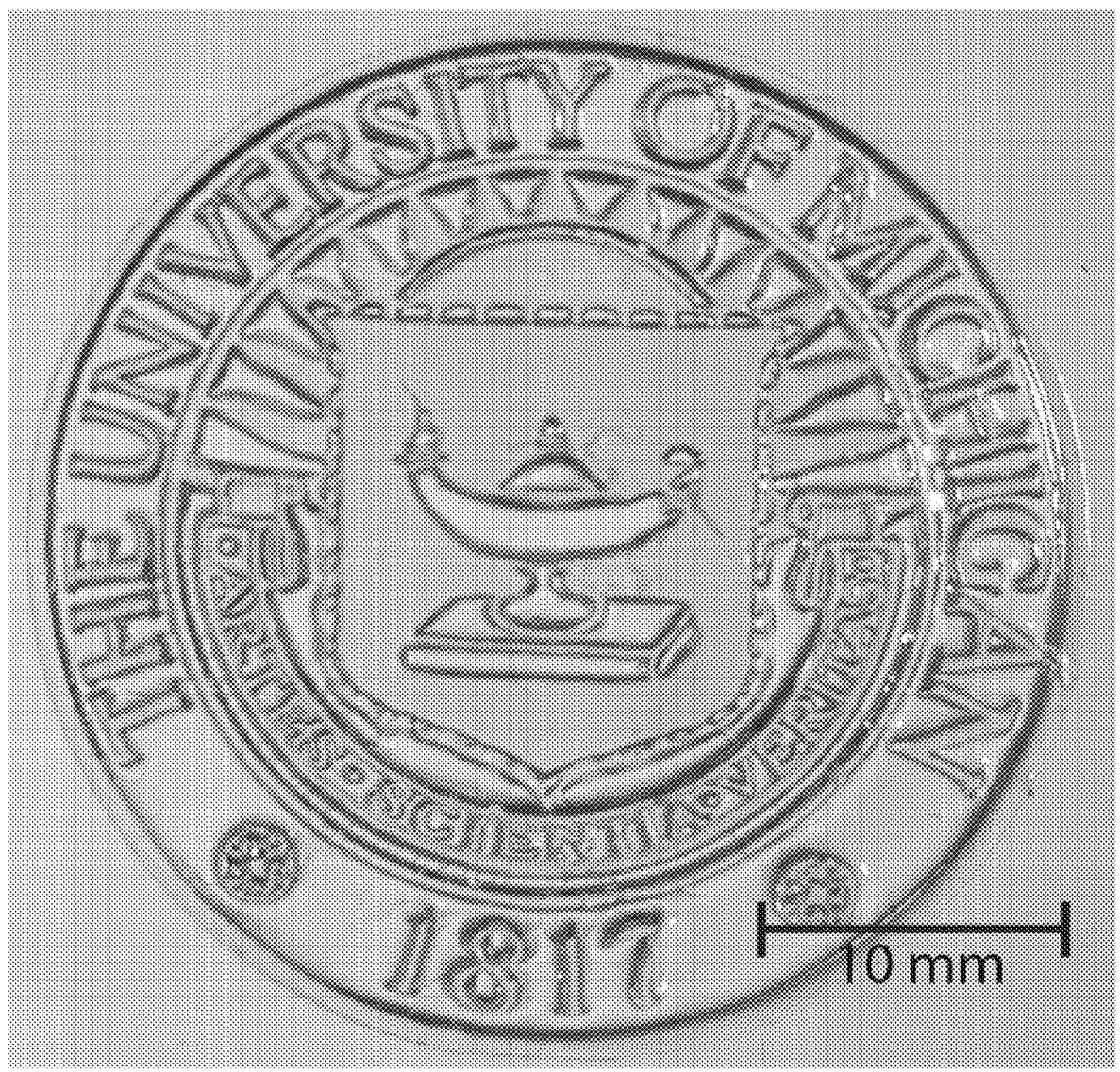
FIG. 11D is a variable thickness part produced by a single, intensity-patterned exposure using the image in FIG. 11C.

In some embodiments, the technology comprises use of concurrent photoinitiation and photoinhibition in conjunction with spatially specific variation in light intensity to produce complex, three-dimensional surface features with a single, two-color exposure. Projecting blue images of variable intensities (e.g., varying the intensity on a pixel-by-pixel basis) against a constant UV background affords spatial variation of $I_{UV,0}/I_{blue,0}$, consequently varying the inhibition volume thickness. This modulation creates a complex, three-dimensionally patterned inhibition volume, which enables localized surface patterning of features that is currently unattainable by contemporary methods. FIG. 11A shows a schematic of this procedure where the single-exposure 3D printing was demonstrated with resin containing CQ/EDAB and o-Cl-HABI contained between two glass slides. The resin was exposed to a blue image of varying intensity, and this image was superimposed on a uniform, collimated UV beam (FIG. 7A). A single ten second exposure yields cured features with a thickness variation of up to 1200 μm (FIG. 11B). The magnitude of this variation can again be modulated by adjusting the absorption characteristics of the resin via the incorporation of dyes (e.g., by adjusting $h_{UV}$ and $h_{blue}$). The ability to use this technique to produce patterned features with three-dimensional structures is demonstrated with a four intensity-level image (FIG. 11C). The cured resin resulting from exposure to the image in FIG. 11C shows the expected variation in thickness, and the 200 μm text 5 features are readily resolved.

The controllable, concurrent photoinitiation and photoinhibition used in this fabrication system has, in addition to high vertical print speeds, considerable advantages over contemporary approaches. By eliminating the need for thin, O2-permeable projection windows this process has the potential to be scaled for rapid production of very large objects. Moreover, by dynamically controlling inhibition using this method, reflow into the inhibition volume during printing can be optimized to ameliorate reflow problems associated with production of large cross-sectional area parts, significantly broadening the applicability of AM for mass production. Using variable intensity irradiation with concurrent photoinitiation and photoinhibition allows single step fabrication of cured materials with intricate surface topographies, enabling rapid generation of personalized products or to overcome numerous time-consuming steps currently used in microfabrication. The application of multi-wavelength systems to SLA is a new direction in additive manufacturing where, in addition to the volumetric polymerization control described here, two-color systems designed to effect orthogonal reactions may enable fabrication of parts with localized material and chemical properties.

Bridged HABI Compounds with Fast Back-Reaction Kinetics

Figure 15:
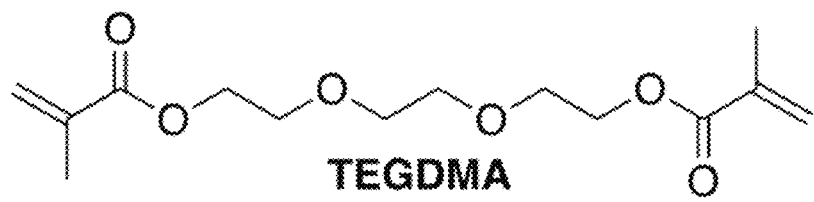
FIG. 15 shows the structures of triethylene glycol dimethacrylate (TEGDMA) and bisphenol A glycidyl methacrylate (bisGMA).
Figure 15:
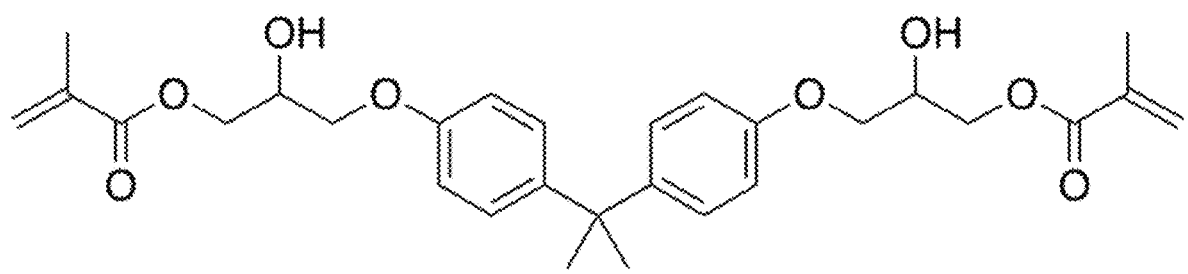

During the development of embodiments of the technology provided herein, experiments were conducted to test the polymerization initiation and inhibition in a composition and/or system comprising a bridged HABI compound (see, e.g., FIGS. 5A, 5B, 5C, 5D, and/or 5E). A dimethacrylate-based monomer mixture (50/50 bisGMA/TEGDMA; see FIG. 15) was formulated with 0.2% camphorquinone (CQ), 0.5% ethyl-4-(dimethylamino)benzoate (EDAB), 5% bridged HABI (e.g., a cyclophane-based HABI ("pincer")). CQ, EDAB, and bridged HABI were dissolved in THF prior to formulating with the monomer mixture.

Resin formulations were introduced between NaCl crystal windows separated by spacers (13 μm thick). Each sample was placed in a Thermo Scientific Nicolet 6700 Fourier transform infrared (FTIR) spectrometer equipped with a horizontal transmission accessory, and spectra were collected from 650 to 4000 $cm^{-1}$ at a rate of 2 per second as described above. The methacrylate conversion upon irradiation was determined by monitoring the disappearance of the peak area centered at 1635 $cm^{-1}$. Data collected indicated the wavelength-selective photoinitiation and photoinhibition of radical-mediated, chain growth photopolymerization using bridged HABI compound as a photoinhibitor (FIG. 16).

Blue light was provided by a collimated, light-emitting diode (LED)-based illumination source (Thorlabs M470L3-C1) with an emittance centered at 470 nm, used in combination with a current-adjustable LED driver (Thorlabs LEDD1B) for intensity control. UV light was provided by a UV spot curing system (OmniCure LX500, Excelitas Technologies) equipped with an OmniCure LED MAX head with an emittance centered at 365 nm.

Figure 16:
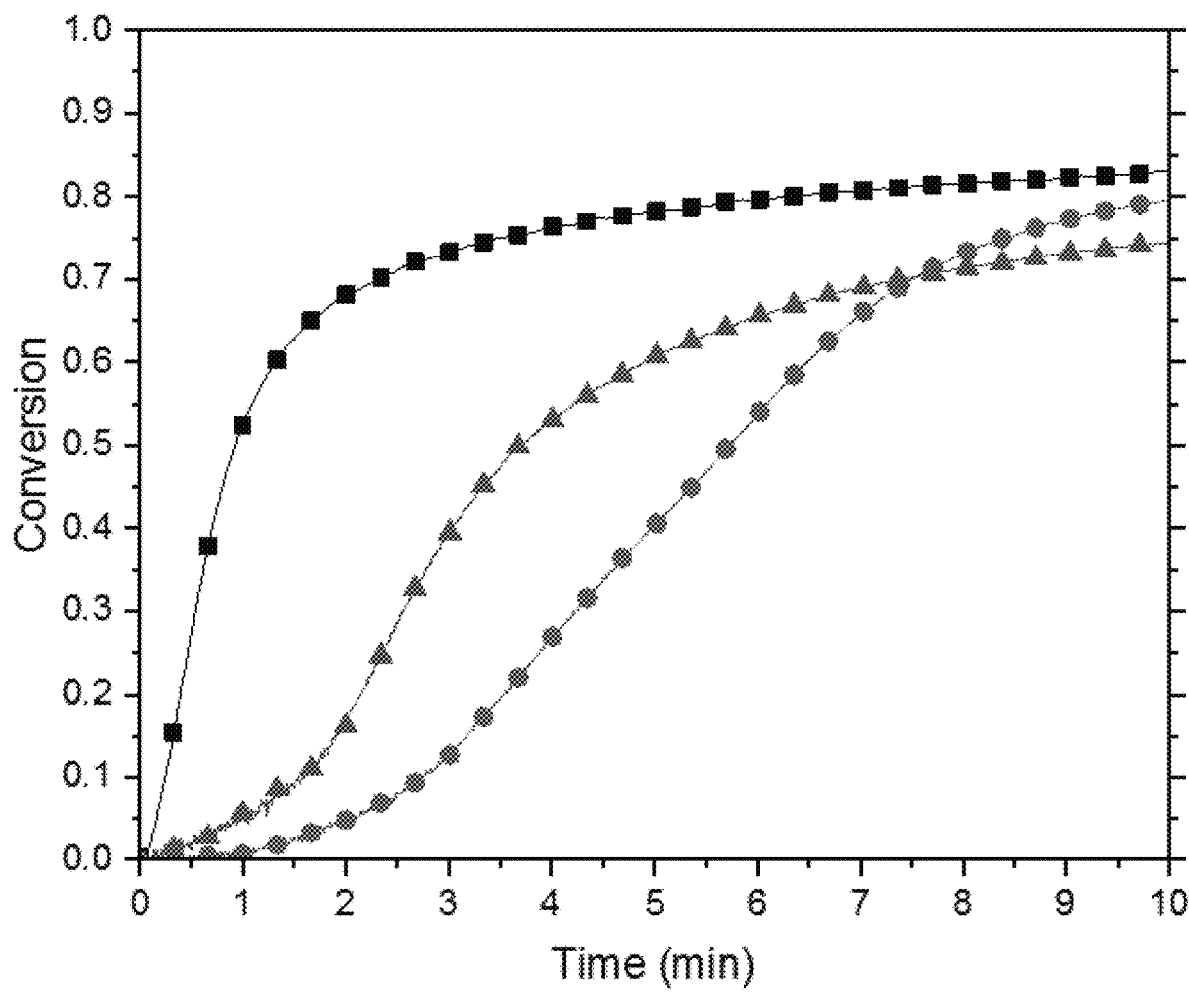
FIG. 16 is a plot showing wavelength-selective photoinitiation and photoinhibition of radical-mediated, chain growth photopolymerization. Continuous irradiation with exclusively 470 nm at 50 mW/cm$^2$ (black line, squares), 470 nm at 50 mW/cm$^2$ and 365 nm at 30 mW/cm$^2$ (blue line, diamonds), and 365 nm at 30 mW/cm$^2$ (red line, circles).

Data collected indicated the wavelength-selective photoinitiation and photoinhibition of radical-mediated, chain growth photopolymerization using bridged HABI compound as a photoinhibitor (FIG. 16).

Figure 17:
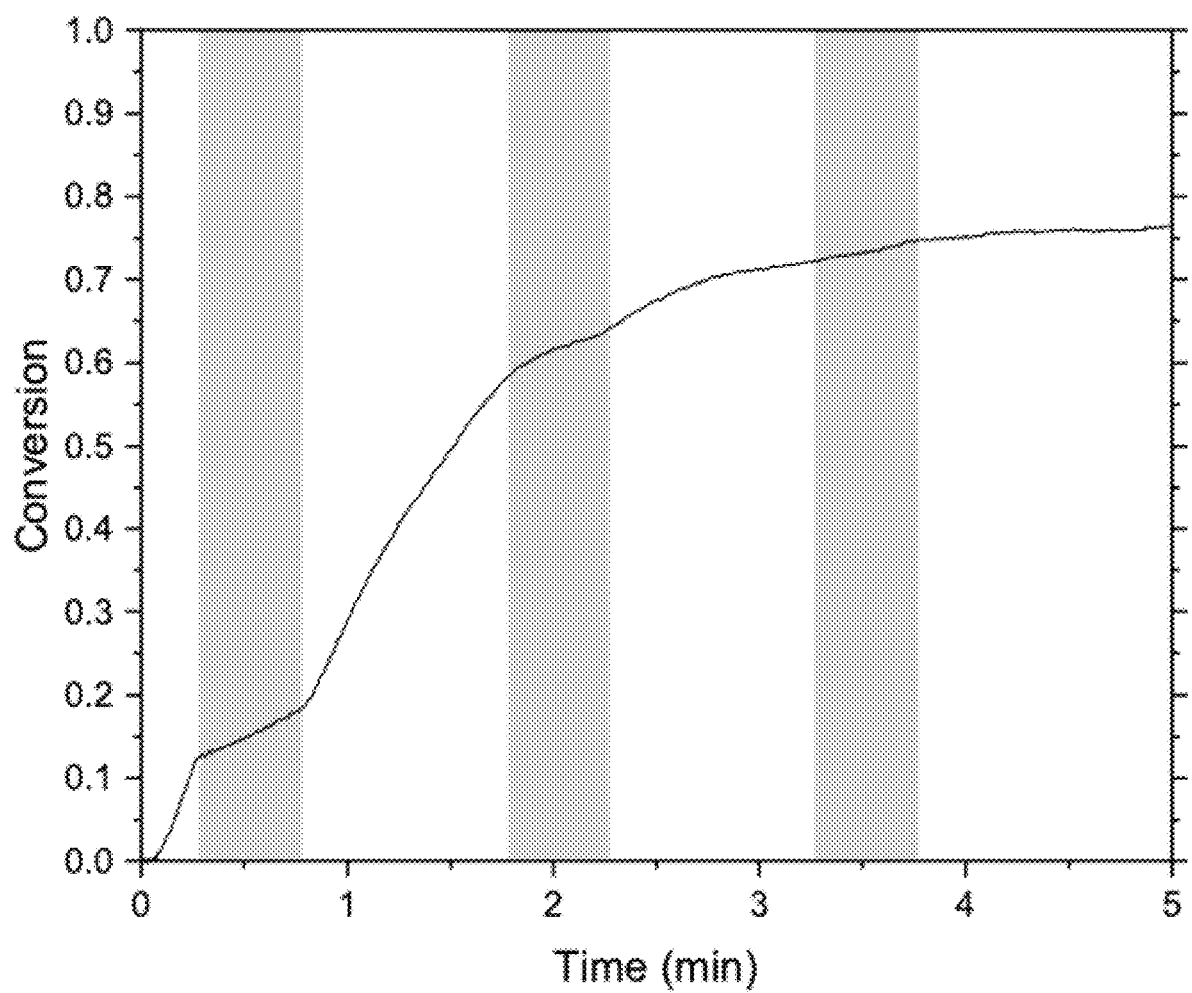
FIG. 17 is a plot showing the wavelength selective photoinitiation and transient photoinhibition of methacrylate polymerization by a bridged HABI. Methacrylate conversion versus time for bisGMA/TEGDMA formulated with CQ/EDAB and bridged HABI (e.g., the "pincer" HABI shown in FIG. 5E) under continuous irradiation with 470 nm at 50 mW/cm$^2$ and intermittent irradiation with 365 nm at 30 mW/cm$^2$ during the shaded periods as indicated.

Furthermore, data collected indicated the precise control of polymerization using the bridged HABI compound as a photoinhibitor. Methacrylate conversion to polymer versus time was measured for bisGMA/TEGDMA formulated with CQ/EDAB and a bridged HABI under continuous irradiation with 470 nm at 100 mW/$cm^2$ and intermittent irradiation with 365 nm at 30 mW/$cm^2$ for 30 second intervals (FIG. 17). In FIG. 17, irradiation by UV is indicated by the shaded time intervals during which polymerization rate slows. The accumulation of tethered lophyl radicals during the 30 second UV irradiation periods decreased and/or minimized polymerization rates. Upon cessation of UV irradiation (FIG. 17, non-shaded intervals), photoinhibition was also stopped and the polymerization rate recovered instantaneously to the rate prior to UV irradiation owing to the fast recombination kinetics of the bridged HABI compounds (FIG. 17, non-shaded period from approximately 45 seconds to 1 minute 45 seconds). By comparison, upon cessation of UV irradiation in similar experiments described above testing photoinhibition by a non-bridged HABI (e.g., o-Cl-HABI), polymerization resumed much more slowly (with approximately a 30-second lag time) and did not resume a polymerization rate measured prior to UV irradiation (FIG. 9).

Accordingly, in some embodiments comprising use of a "precise photoinhibitor" (e.g., a bridged HABI compound), the free-radical chain-growth polymerization can be near-instantaneously "turned on" and "turned off" on the macro scale, a feat currently unattainable through use of the other photoinhibitors TETD and o-Cl-HABI.

Butyl Nitrite Photoinhibitors

Figure 18:
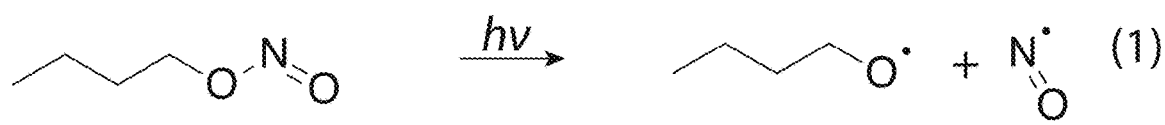
FIG. 18 shows a scheme of reactions following photolysis of butyl nitrite.
Figure 18:
Figure 18:
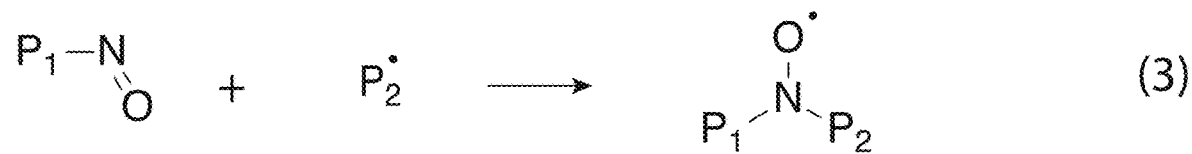
Figure 18:
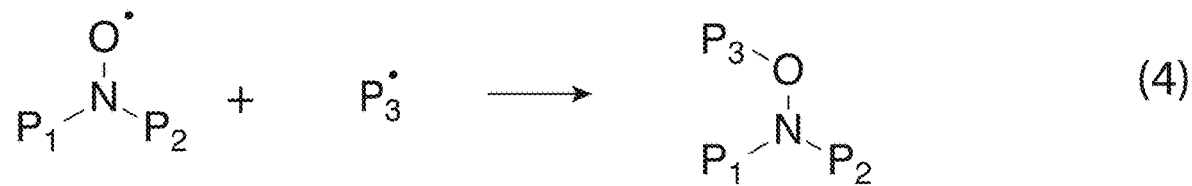
Figure 18:

During the development of embodiments of the technology described herein, experiments were conducted to test photoinhibition by nitrites. Nitrites, both inorganic and organic, are known to be inhibitors or retarders of free-radical chain-growth polymerization. Inorganic nitrite salts can react with water to form nitric oxide and nitrous oxide species, while organic nitrites reportedly require activation to effect polymerization inhibition. Thermal decomposition of organic nitrites results in the formation of nitric oxide, an efficient inhibitor of radical-mediated polymerizations, and alkoxide radicals which can initiate polymerization. Higher molecular weight nitrites have been explored to inhibit styrene and butadiene polymerization during distillation, generally requiring low concentrations (0.0001-0.1%) to be effective. Although alkyl nitrite photolysis has been extensively investigated, studies into their use as photoinhibitors has been limited to an examination of butyl nitrite (BN) as a UV-activated inhibitor of thermally-initiated, radical-mediated chain-growth polymerization. As summarized in Scheme 1 (FIG. 18), this UV-induced photoinhibition was attributed to the photolysis of BN, generating nitric oxide (1) which in turn affords a nitroso spin trap upon chain termination (2). This spin trap subsequently terminates a second propagating polymer chain (3), and the generated nitroxide radical terminates another active radical center (4). Thus, although the alkoxy radical also generated by alkyl nitrite photolysis acts to initiate polymerization (5), one photolysis event affords a net two inhibition events.

Figure 19:
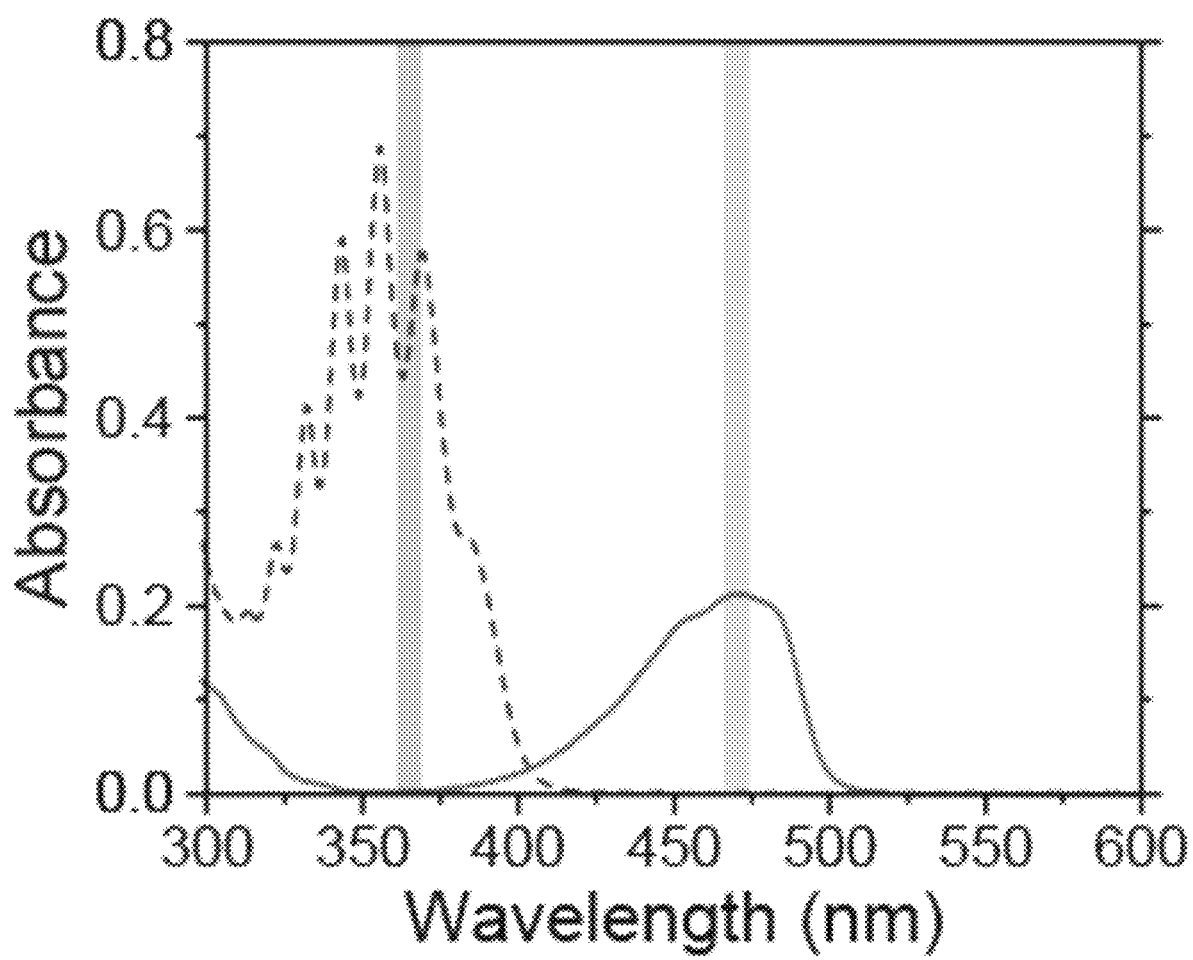
FIG. 19 is a plot showing UV-visible absorbance spectra of CQ (solid blue line) and BN (dashed purple line) in THF. The near UV and visible wavelengths used in the butyl nitrite examples are high-lighted.

Similar to TETD and o-Cl-HABI, BN exhibits very weak absorbance in the blue region of the spectrum and moderate absorbance in the near UV, thus complementing the absorbance spectrum of CQ, which has an absorbance maximum near 470 nm while displaying very little ab-sorbance in the near UV (FIG. 19). This enables for selective activation of either the photoinitiator or the pho-toinhibitor through irradiation with blue or near UV light, respectively.

Figure 20A:
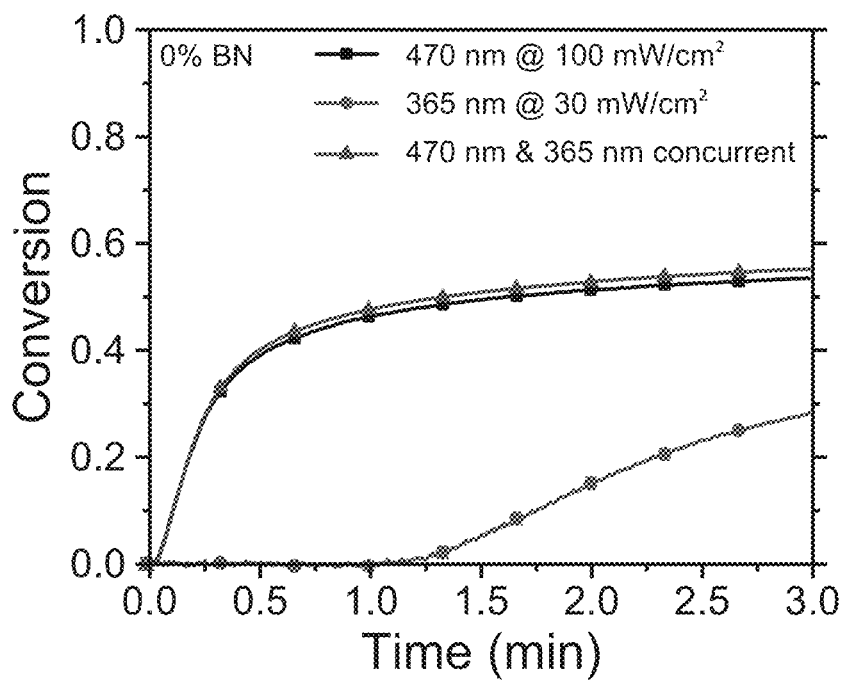
FIG. 20A-FIG. 20D are plots showing the wavelength-selective photoinitiation and photoinhibition of methacrylate-based bisGMA/TEGDMA formulations as monitored by FTIR at BN concentrations of (FIG. 20A) 0% (control), (FIG. 20B) 0.5%, (FIG. 20C) 1%, and (FIG. 20D) 3% BN. Irradiation intensities are indicated in the inset for the data collected.
Figure 20B:
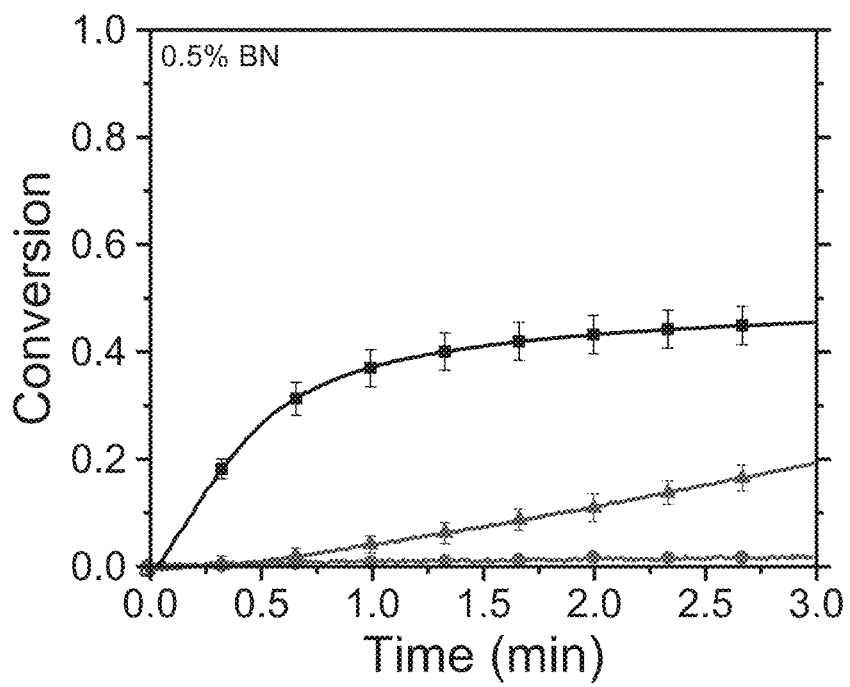
Figure 20C:
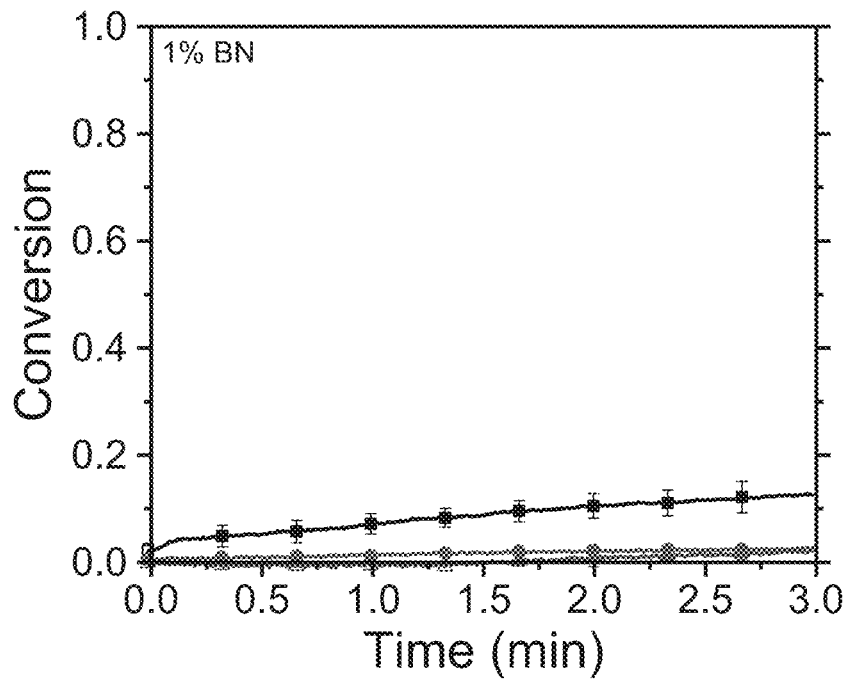
Figure 20D:
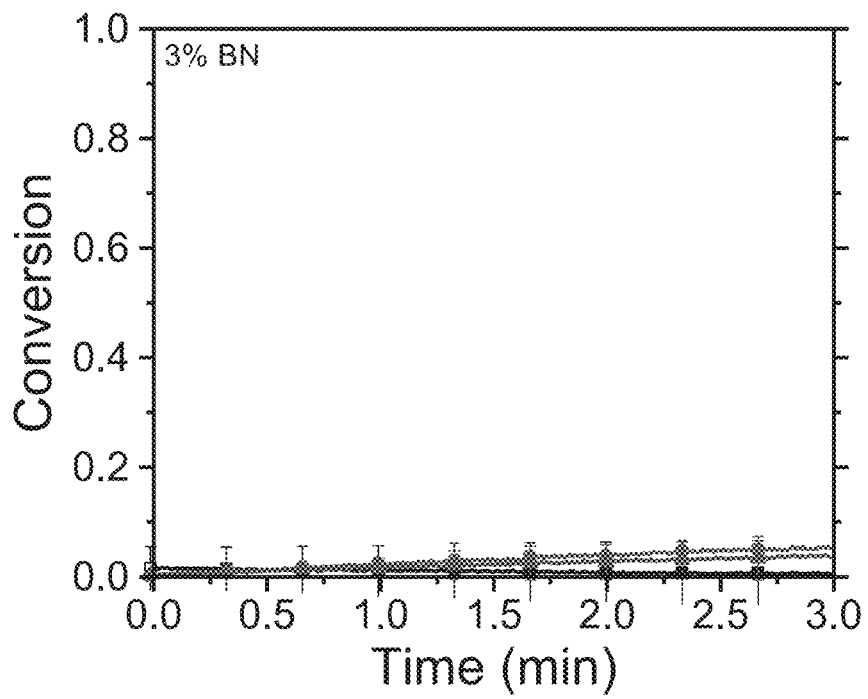
Figure 21A:
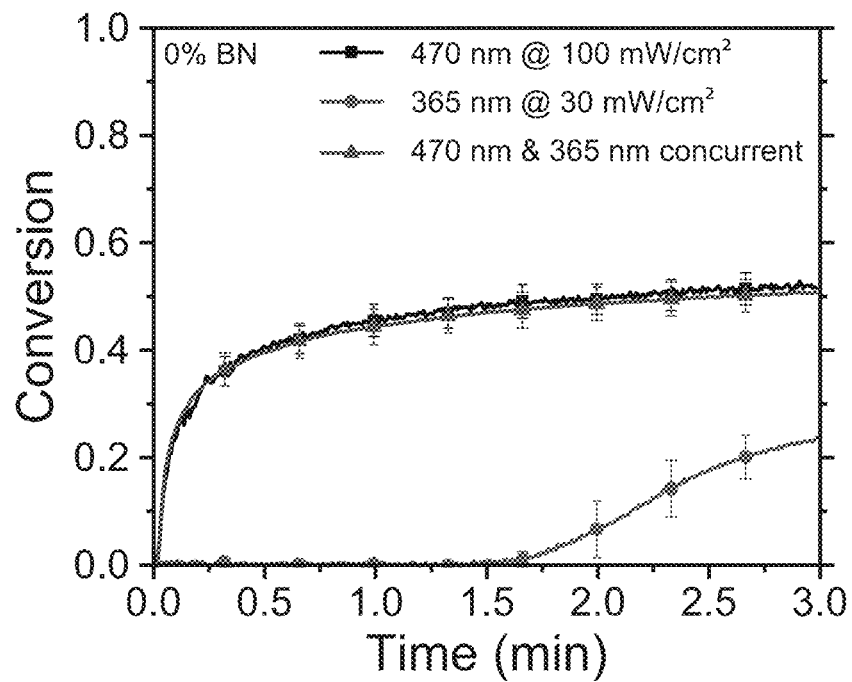
FIG. 21A-FIG. 21D are plots showing the wavelength-selective photoinitiation and photoinhibition of acrylate-based TMPTA formulation as monitored by FTIR at BN concentrations of (FIG. 21A) 0% (control), (FIG. 21B) 0.5%, (FIG. 21C) 1%, and (FIG. 21D) 3% BN. Irradiation intensities are indicated in the inset for the data collected.
Figure 21B:
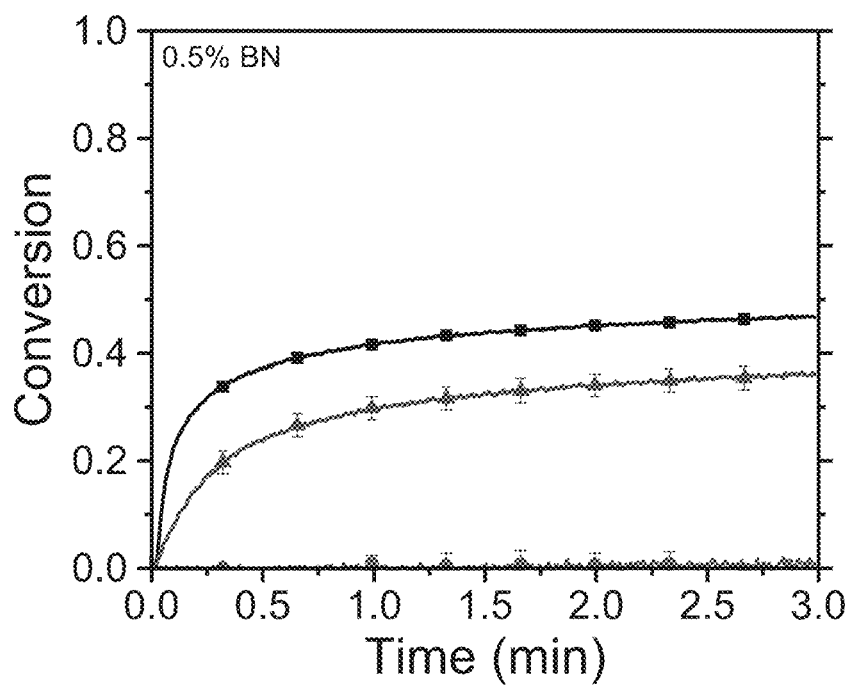
Figure 21C:
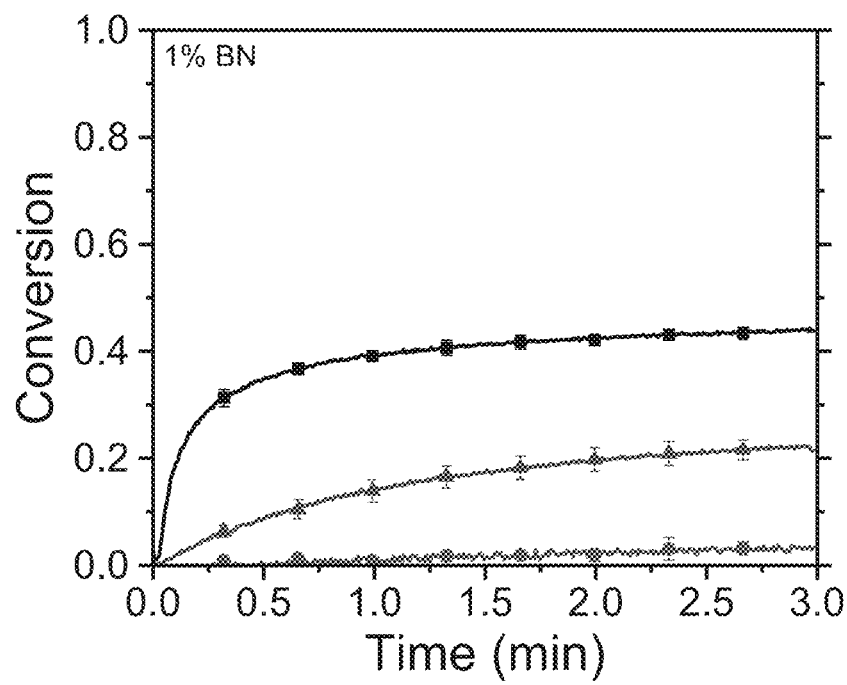
Figure 21D:
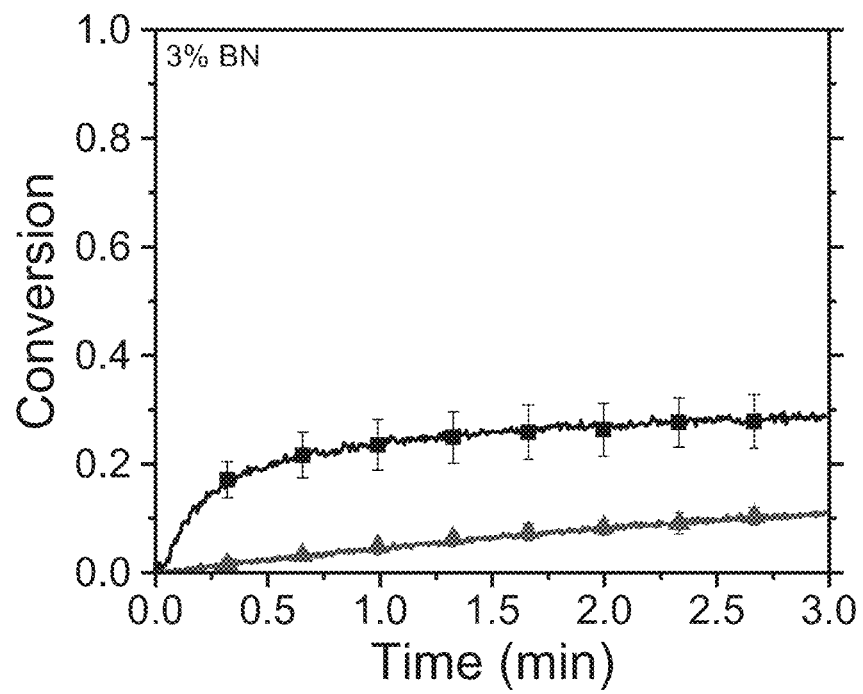
Figure 22:
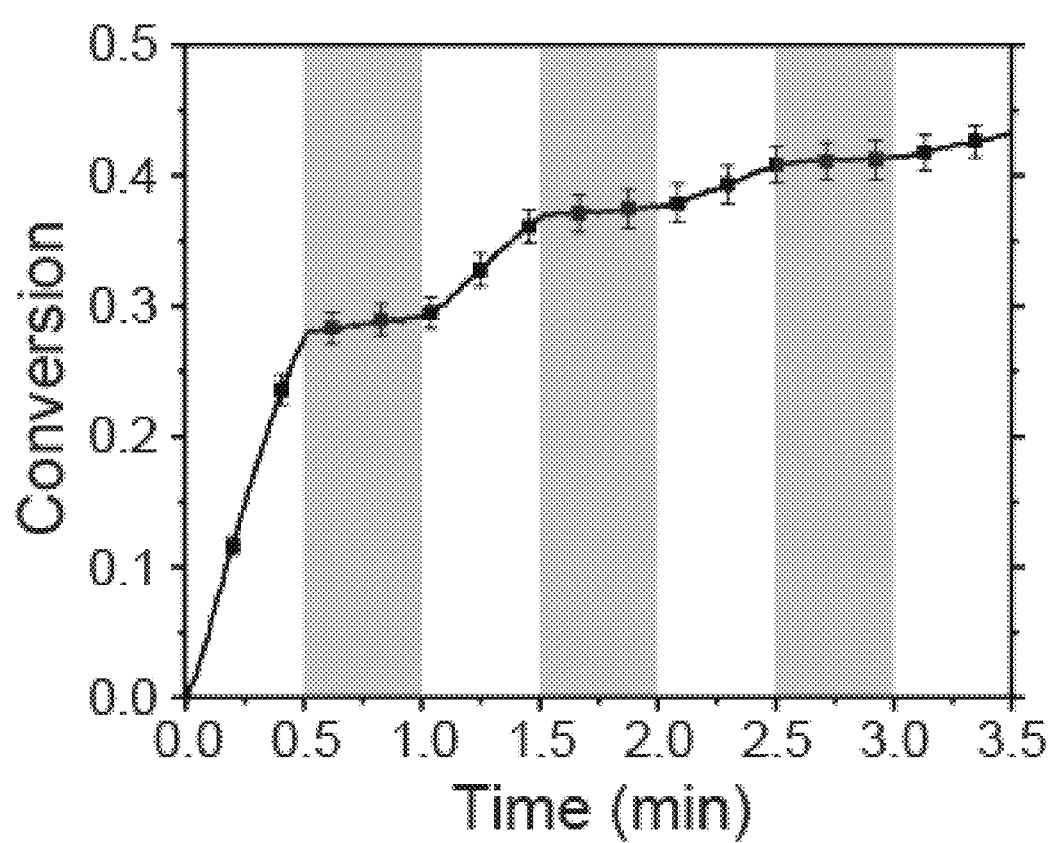
FIG. 22 is a plot showing Transient photoinhibition of TEGDMA/bisGMA using continuous irradiation under blue light with intermittent near-UV exposure for 30 seconds (shaded intervals).

Having established the optical compatibility between BN and CQ, experiments were conducted to explore the capacity of BN photolysis to inhibit free radical chain-growth photopolymerizations by formulating BN, CQ, and EDAB (a coinitiator commonly used in conjunction with CQ) in (meth)acrylate resins. The conversion of (meth)acrylate functional groups was monitored by Fourier transform infrared (FTIR) spectroscopy during the irradiation of formulated resins under irradiation with blue (470 nm) and near UV (365 nm) light. Negligible polymerization was observed for triethyleneglycol dimethacrylate (TEGDMA)/bisphenol A glycidyl dimethacrylate (bisGMA) resin formulations containing BN upon irradiation at 365 nm (see FIG. 20A-D); indeed, an extended induction period occurred even in the absence of BN (FIG. 20A), demonstrating the low initiating radical generation rate afforded by the CQ/EDAB photoinitiator system under near UV irradiation. Whereas BN acts as a photoinhibitor of the thermal bulk polymerization of methyl methacrylate under near UV irradiation, it does not affect the polymerization without photoactivation. In contrast, both the polymerization rate and overall conversion of the methacrylate formulations examined here under blue irradiation progressively decreased with raised BN concentration (see FIG. 20A-D). Nevertheless, for resins formulated with low BN concentrations, concurrent irradiation under both blue and near UV light yielded significantly reduced polymerization rates relative to those attained under blue irradiation alone (FIGS. 20B and 20C), demonstrating the ability of alkyl nitrites to act as photoinhibitors for radical-mediated methacrylate polymerizations.

To further evaluate the breadth of alkyl nitrite photoinhibition capacity, trimethylolpropane triacrylate (TMPTA)-based acrylate resins were similarly formulated with BN, CQ, and EDAB, and their photopolymerization behaviour under blue and near UV irradiation was examined (see FIG. 21A-D). Under 365 nm irradiation, an extended induction period was again observed in the absence of BN; however, whereas no significant polymerization was observed for formulations containing low BN concentrations, some curing did proceed at a raised BN concentration (see FIG. 21A-21D). Notably, under exclusively blue light irradiation, only a modest decrease in polymerization rate was observed with raised BN concentration. Irradiation with near-UV light led to. Photopolymerization inhibition under concurrent blue and near UV irradiation was significantly less effective for TMPTA than for the bis-GMA/TEGDMA system, potentially attributable to the higher reactivity of acrylates relative to methacrylate functional groups. Evaluation of other (meth)acrylate monomers does indicate that the relative effectiveness of BN as a photoinhibitor seems to be very monomer-dependent. Nevertheless, BN does allow for effective photoinhibition of various monomer formulations.

As described herein for the study of o-Cl-HABI as a photoinhibitor, one limitation of o-Cl-HABI for some embodiments was the longer lifetime of the inhibiting lophyl radical. The impact of BN-derived radicals during and post-activation was evaluated through monitoring the methacrylate conversion under constant blue irradiation, with periods of near-UV exposure. Through this, it was observed that BN photoinhibition was effective and immediate upon near-UV exposure. Following near-UV irradiation, polymerization resumed rapidly, indicating prompt consumption of the inhibiting radicals in favor of polymer propagation. These results seem to contrast those of Sadykov, who reported a significant induction time post-irradiation. This discrepancy could be explained by the rates at which initiating radicals are being generated. While CQ initiated rapidly under our conditions, the conditions used by Sadykov lead to a much slower generation of initiating radicals. Under the conditions used in the experiments conducted during the development of embodiments of the technology described herein, the free-radical chain-growth polymerization can be near-instantaneously "turned on" and "turned off" on the macro scale, a feat currently unattainable through use of the other photoinhibitors TETD and o-Cl-HABI.

Having determined BN as an effective photoinhibitor of TMPTA, with significant differences between exclusive blue curing and concurrent curing, experiments were conducted to test the difference in curing times through a photomask litho-graphic approach. The resin on a transparent surface was irradiated uniformly through the surface with the initiating wavelength, while being irradiated through a photomask with the inhibiting wavelength. As a result of this, the region blocked from near-UV irradiation cures rapidly, while the exposed areas remain liquid and can be washed away with solvent. Through this approach embodiments of the technology inhibit polymerization to up to 5 mm of resin, while still achieving effective polymerization of simple shapes.

While the patterning though photomask inhibition in 2D serves its purpose as a demonstration of the concept, the use of this approach is limited, as the same result can be obtained through irradiation of the resin with curing light through a negative photomask. This patterning of photoinitiating and photoinhibiting lights does open up opportunities for the manufacturing of more complex 3D structures. For example, as described herein, perpendicular irradiation of initiating and inhibiting lights provide for the production of more complex 3D structures in a single exposure of the two colors of light. In this example of a quartz cuvette, blue light is patterned through a triangular photomask, resulting in the curing of the resin into a triangular prism. Perpendicular to the blue irradiation, near-UV light is irradiated through a circular photomask. As a result, the pattern of near-UV light is prevented from being cured by the blue light, producing a triangular prism with a circle shape inhibited through the center in a single exposure of the two colors of light. Manufacturing a similar piece with a single light exposure is not attainable through contemporary approaches, and this technique opens up a new direction of "true" 3D printing.

In conclusion, embodiments provide use of butyl nitrite as a photoinhibitor of free-radical chain-growth photopolymerizations, e.g., in a two-color irradiation setup. In some embodiments, the effectiveness of BN as a photoinhibitor is strongly monomer dependent, and inclusion of BN can lead to reduced polymerization without BN activation. In contrast to previously-reported work, the inhibiting radicals appear to cease inhibition shortly following the removal of near-UV irradiation. BN proved effective for 2D patterning of the inhibition through a photomask, the results of which translated effectively to a 3D irradiation setup. This allows for rapid, single-exposure fabrication of more complex structures otherwise unattainable, and opening up the path for a new approach to "true" 3D printing.

Two-Wavelength Dead Zone Control

During the development of embodiments of the technology provided herein, a continuous liquid interphase production system was designed. During the development of embodiments of the technology, experiments were designed to test and implement resins into a continuous 3D printing system. In some embodiments, the technology finds use to improve the speed of printing parts having small cross sectional areas.

The standard resin system used in these experiments comprises components previously described (Scott et al. (2009) "Two-Color Single-Photo Photoinitiation and Photoinhibition for Subdiffraction Photolithography" Science 324: 913-17). This system comprises a composition comprising camphorquinone (CQ), ethyl-dimethylamino benzoate (EDAB), tetraethylthiuram disulfide (TED), and triethylene glycol dimethacrylate (TEGDMA). CQ and EDAB are the initiators and co-initiator, respectively. This initiator system is activated by blue light and has very little absorbance in the UV range. TED is the UV-activated photoinhibitor and TEGDMA is the methacrylate polymerizable monomer. During the development of embodiments of the technology, a composition comprises 1.0/0.5/3.0 wt % CQ/EDAB/TED in TEGDMA (see Scott et al., supra).

Figure 26:
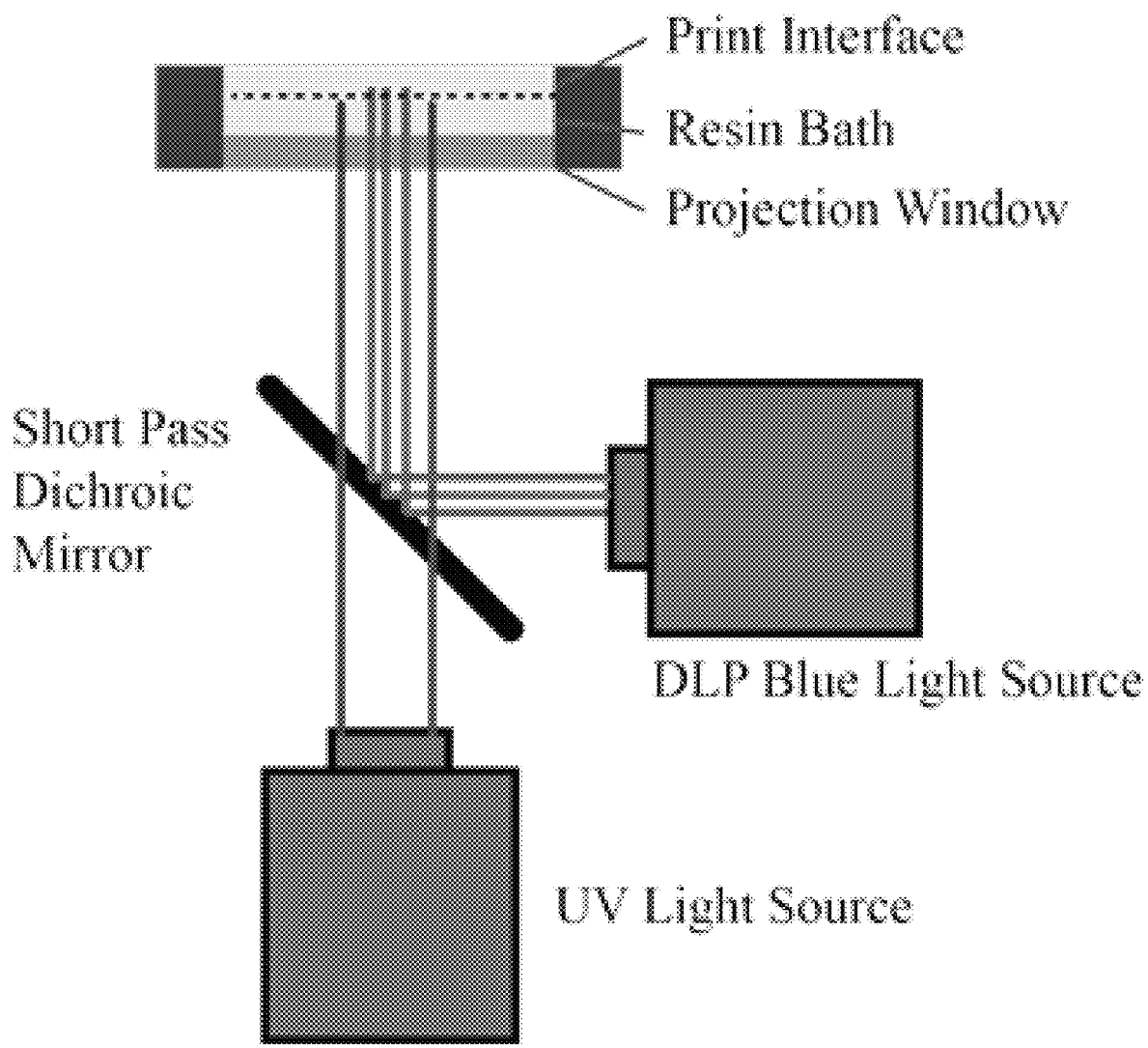
FIG. 26 shows an apparatus and/or system according to embodiments of the technology provided herein. The apparatus comprises a resin bath in a reaction vessel comprising a projection window (e.g., an optically transparent window). A blue light source (a DLP) and a UV light source simultaneously irradiate the composition through the optically transparent window. A short pass dichroic mirror is used to combine the blue and UV wavelengths for irradiation of the composition.

Experiments use an optical system that simultaneously irradiates the resin with blue light and UV light. A simplified schematic of this setup is shown in FIG. 26. In the exemplary embodiment shown in FIG. 26, the system comprises two light sources—a UV source (e.g., a VISITECH LE4960H UV-388) and a blue light source (e.g. DLP LIGHTCRAFTER 4500 fitted with a blue LED source at 473 nm). The system further comprises a long pass dichroic mirror with a 425 nm cutoff (e.g. the THORLABS DMLP425L). The DLP provides patterns of irradiating light, which projects patterns as directed by a software object (e.g., encoded in a stereolithography file ("STL" file or "PLY" file or other file type) as known in the art for 3D printing).

During the development of embodiments of the technology, the molar absorption coefficients of resins at the wavelengths of interest are calculated using a spectrophotometer and standard methods. Beer-Lambert's law is used to model the intensity levels within the resin bath to determine rough estimates for experimental conditions to test. In some embodiments, the technology provides at least an order-of-magnitude improvement in dead zone thickness relative to oxygen-inhibited CLIP, which is approximately 100 μm to 1000 μm. Accordingly, the technology provided herein produces a dead zone having a thickness of at least approximately 1 mm to 10 mm (e.g., at least approximately 1, 2, 3, 4, 5, 6, 7, 8, 9, or 10 mm). In some embodiments, the technology provided herein produces a dead zone having a thickness that is greater than 10 mm.

During the development of embodiments of the technology described herein, the dead zone thickness is measured according to Tumbleston et al. (Tumbleston et al. (2015). "Continuous liquid interface production of" 3D objects, Science 347: 1349-52) with some modification. In particular, experiments are conducted in which a known thickness of liquid resin ($Z_R$) is placed between a glass slide and the projection window. The UV intensity and exposure time are varied over a range of blue light intensity levels. After irradiation, the thickness of the cured resin ($Z_C$) is measured using a standard thickness probe, such that the thickness of the dead zone is calculated by subtraction ($Z_D = Z_R - Z_C$).

In some embodiments, compositions comprise a photoinitiator having a molar absorption coefficient for the activating wavelength (e.g., UV for TED) that is not sufficient to form a dead zone of millimeter thickness. Accordingly, in some embodiments, the compositions further comprise a UV absorber to increase the absorbance of UV wavelengths and reduce the dead zone thickness. Thus, experiments are performed during the development of some embodiments of the technology using the above mentioned method to investigate the effect of UV absorber concentration on the thickness of the dead zone.

In some alternative embodiments, the technology comprises lateral projection of the inhibiting wavelength (e.g., high intensity light (e.g., UV light)) to inhibit an entire cross section of the resin bath as described herein and in U.S. Prov. Pat. App. Ser. No. 62/632,903, which is expressly incorporated herein by reference in its entirety.

In some embodiments, light is provided as an evanescent waves (e.g., high intensity light (e.g., UV light)) to inhibit polymerization in a thin region at the window. See, e.g., Fuchs et al. (2011). "Ultrathin Selective Molecularly Imprinted Polymer Microdots Obtained by Evanescent Wave Photopolymerization" Chemistry of Materials 23:

3645-51. Accordingly, embodiments comprising use of light provided as an evanescent wave provide a technology for producing inhibition (e.g., to produce a dead zone) that is controllable independently from the initiating light.

Some embodiments comprise use of oxygen inhibition to produce a controllable dead zone, however embodiments comprise use of a UV-active water cleaving catalyst such as CoO rather than supplying $O_2$ through by diffusion (see, e.g., Liao et al. (2014). "Efficient solar water-splitting using a nanocrystalline CoO photocatalyst" Nature Nanotechnology 9: 69-73). In some embodiments, this technology provides better control over the dead zone than extant $O_2$-based strategies for dead zone inhibition, and hence provides a technology comprising use of higher initiating intensities and thus improved print speeds relative to extant technologies.

During the development of embodiments of the technology described herein, experiments are conducted to incorporate a standard resin into a continuous 3D printing system as described herein. In particular, embodiments comprise use of the optical setup described above (FIG. 26) that is further modified to include a controllable build plate similar to those in most stereolithographic 3D printer systems. Accordingly, embodiments comprise a system for 3D printing comprising a build plate that is capable of being raised and lowered at very precise rates. In some embodiments, this assembly is repurposed from an extant 3D printer. In some embodiments, the assembly is a custom system comprising a linear beam actuator fitted with a controllable stepper motor and an Arduino control module capable of precisely controlling the stepping.

During the development of some embodiments of the technology, experiments are conducted in which the thickness of the cured resin at the provided dead zone thickness is measured as a function of time. In particular, measurement of the polymerization rates at different intensity ratios is measured using standard techniques to estimate the curing rate of the polymer at the dead zone interface. For instance, some experiments test curing rate by projecting simple patterns of the initiating wavelength (e.g., using the DLP LIGHTCRAFTER 4500) and raising the build plate at various speeds to determine the final achievable print speed.

In some extant technologies, photo-polymerizing a monomer at a controlled depth is sometimes compromised by "through-polymerization", which is when a curing light passes through the desired depth and cures resin beyond the desired depth. In 3D printing this causes poor resolution of features in the vertical dimension. Accordingly, in some embodiments, the penetration of curing light is controlled by adjusting the absorbance of curing light in the resin. In particular, experiments conducted during the development of the technology provided herein adjust the concentration of CQ in the resin or incorporate blue light absorbers (such as those available from Everlight Chemical) to control the depth of penetration of the initiating wavelength of light.

During the development of embodiments of the technology provided herein, experiments are conduced to test various resins (e.g., polymerizable monomers) and/or photoinitiators and/or photoinhibitors. Embodiments of the technology provide for the production of parts comprising materials having a wide range of physical properties. While embodiments comprising use of the standard resin described above are tested to using a UV-controllable dead zone, experiments are conducted also to test other materials that provide properties such as flexibility, optical transparency, and mechanical strength. Thus, embodiments relate to applying the technologies provided to a wide variety of resin compositions, e.g., different monomers, to produce items having properties such as a wide range of hardness or optical characteristics.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A method of producing a polymerized item, the method comprising:
   a) providing a composition comprising a polymerizable monomer, a filler, a photoinitiator, and a photoinhibitor; and
   b) irradiating said composition with an intensity-patterned image comprising a plurality of pixels, wherein said plurality of pixels comprises pixels providing a wavelength of light at more than two intensities.

2. The method of claim 1, wherein said wavelength of light produces an initiating species from the photoinitiator.

3. The method of claim 2, wherein said initiating species polymerizes polymerizable monomers to produce at least a portion of a polymerized item.

4. The method of claim 1, wherein said intensity-patterned image comprising a plurality of pixels is a grayscale-patterned image.

5. The method of claim 1, further comprising varying an intensity of a pixel of said intensity-patterned image.

6. The method of claim 1, wherein said polymerized item varies in thickness in a dimension substantially parallel to the direction of said wavelength of light.

7. The method of claim 1, wherein said item comprises cured features with a thickness variation of up to 1200 µm.

8. The method of claim 1, wherein said filler comprises a metallic particle, an organic particle, a polymeric particle, or an inorganic particle.

9. The method of claim 1, wherein said filler comprises a nonconductive particle, a semi-conductive particle, or a conductive particle.

10. The method of claim 1, wherein said filler comprises a magnetic particle, a ferromagnetic magnetic particle, a paramagnetic particle, or a nonmagnetic particle.

11. The method of claim 1, wherein said filler comprises spherical particles, elliptical particles, or cylindrical particles.

12. The method of claim 1, wherein said filler comprises a pigment, a dye, a pharmaceutical compound, a detectable compound, a protein, a peptide, a nucleic acid, a sugar, or a small organic compound.

13. The method of claim 1, wherein said wavelength of light produces an inhibiting species from the photoinhibitor.

14. A method of producing a polymerized item, the method comprising:
   a) providing a viscous composition comprising a polymerizable monomer, a filler, a photoinitiator, and a photoinhibitor; and
   b) irradiating said composition with an intensity-patterned image comprising a plurality of pixels, wherein said plurality of pixels comprises pixels providing a wavelength of light at more than two intensities.

15. The method of claim 14, wherein said wavelength of light produces an initiating species from the photoinitiator.

16. The method of claim 14, wherein said viscous composition further comprises a photoinhibitor and said wavelength of light produces an inhibiting species from the photoinhibitor.

17. The method of claim 14, wherein said viscous composition has a viscosity greater than 1000 centipoise or greater than 10,000 centipoise prior to irradiating said composition.

18. The method of claim 14, further comprising varying an intensity of a pixel of said intensity-patterned image.

19. A system comprising: a composition comprising a polymerizable monomer, a filler, a photoinitiator, and a photoinhibitor; and
    a light source providing an intensity-patterned image comprising a plurality of pixels, wherein said plurality of pixels comprises pixels providing a wavelength of light at more than two intensities.

\* \* \* \* \*